United States Patent
Matyjaszewski et al.

(10) Patent No.: US 6,512,060 B1
(45) Date of Patent: Jan. 28, 2003

(54) ATOM OR GROUP TRANSFER RADICAL POLYMERIZATION

(75) Inventors: Krzysztof Matyjaszewski; Scott G. Gaynor; Simion Coca, all of Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/359,591

(22) Filed: Jul. 23, 1999

Related U.S. Application Data

(62) Division of application No. 09/034,187, filed on Mar. 3, 1998, which is a division of application No. 08/414,415, filed on Mar. 31, 1995, now Pat. No. 5,763,548, application No. 09/359,591, which is a division of application No. 09/018,554, filed on Feb. 4, 1998.
(60) Provisional application No. 60/039,543, filed on Mar. 11, 1997, and provisional application No. 60/041,620, filed on Apr. 2, 1997.

(51) Int. Cl.$^7$ .................................................. C08F 4/40
(52) U.S. Cl. ........................ 526/111; 526/135; 526/145; 526/147; 526/146; 526/172
(58) Field of Search ............................... 526/172, 111, 526/135, 145, 147, 146

(56) References Cited

U.S. PATENT DOCUMENTS

| | | |
|---|---|---|
| 3,862,978 A | 1/1975 | Decker et al. |
| 4,145,486 A | 3/1979 | Haag et al. |
| 5,169,914 A | 12/1992 | Kaszas et al. |
| 5,405,913 A | 4/1995 | Harwood et al. |
| 5,451,647 A | 9/1995 | Faust et al. |
| 5,708,102 A | 1/1998 | Fryd et al. |
| 5,763,548 A * | 6/1998 | Matyjaszewski et al. ... 526/135 |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A * | 9/1998 | Matyjaszewski et al. ... 526/135 |
| 5,811,500 A | 9/1998 | Dubois et al. |
| 5,854,364 A | 12/1998 | Senninger et al. |
| 5,886,118 A | 3/1999 | Percec |
| 5,910,549 A | 6/1999 | Matyjaszewski et al. |
| 5,945,491 A | 8/1999 | Matyjaszewski et al. |

FOREIGN PATENT DOCUMENTS

| | | |
|---|---|---|
| CN | 1165828 A | 11/1997 |
| EP | 0 265 091 A1 | 4/1988 |
| EP | 0 789 036 A2 | 8/1997 |
| EP | 0 816 385 A1 | 1/1998 |
| EP | 0 824 110 A1 | 2/1998 |
| EP | 0 824 111 A1 | 2/1998 |
| EP | 0 826 698 A1 | 3/1998 |
| EP | 0 832 902 A2 | 4/1998 |
| WO | WO 97/47661 | 12/1997 |
| WO | WO 98/06758 | 2/1998 |
| WO | WO 98/20050 | 5/1998 |

OTHER PUBLICATIONS

Kamigata et al., J. Chem. Soc. Perkin Trans I, pp 627–633, 1991.*

T. Nakata et al., "New Initiator Systems for Radical Polymerization of Vinyl Monomers", *Polymer Letters*, vol. 5, pp. 697–701, 1967.
T. E. Patten et al, "Polymers with very Low Polydispersitles from Atom Transfer Radical Polymerization", *Science*, vol. 272, pp. 866–868, May 10, 1996.
V. Percec et al, "Self–Regulated Phase Transfer of $Cu_2o$/bpy, Cu(0)/bpy, and $Cu_2o$/cu(0)/bpy Catalyzed "Living" Radical Polymerization Initiated with Sulfonyl Chlorides", *Macromolecules*, vol. 31, No. 12, pp. 4053–4056, 1998.
A. Orochov et al, "Redox–Transfer, Part VI, Determination of Hammet's O–Constant for the Oxidation of Cuprous Chloride by Aromatic Sulphonyl Chlorides", *J. Chem. Soc.* (*B*), pp. 255–259.
N. Kamigata et al, "Novel Perfluoroalkylation of Alkenes with Perfluoroalkanesulphonyl Chlorides Catalysed by a Ruthenium (II) Complex", *J. Chem. Soc. Perkin Trans*, pp. 627–622, 1991.
V. Percec et al, ""Living" Radical Polymerization of Styrene Initiated by Arenesulfonyl Chlorides and $Cu^1(bpy)_n c1$", *Macromolecules*, vol. 28, No. 23, pp. 7970–7972, 1995.
V. Percec et al, "Metal–Catalyzed "Living" Radical Polymerization of Styrene Initiated with Arenesulfonyl Chlorides. From Heterogeneous to Homogeneous Catalysis", *Macromolecules*, vol. 29, No. 10, pp. 3665–3668, 1996.
Chemical Abstracts, vol. 85, 1976, pp. 20.
O. W. Webster, "Living Polymerization Methods", *Science*, vol. 25, Feb. 22, pp. 887–893, 1991.
S. Coca et al, "Polymerization of Acrylates by Atom Transfer Radical Polymerization. Homopolymerization of 2–Hydroxyethyl Acrylate", *Journal of Polymer Science: Part A: Polymer Chemistry*. vol. 36, pp. 1417–1424, 1998.
C. Granel et al "Controlled Radical Polymerization of Methacrylic Monomers in the Presence of Bis(ortho–chelated) Arylnickel(II) cCmplex and Different Activated Alkyl Halides", *Macromolecules*, vol. 29, No. 27, pp. 8576–8582, 1996.
K. Matyjaszewski et al, " Zerovalent Metals in Controlled/ "Living" Radical Polymerization", *Macromolecules*, vol. 30, No. 23, pp. 7348–7350, 1997.
C. Marestin et al, "Nitroxide Mediated Living Radical Polymerization of Styrene in Emulsion", *Macromolecules*, vol. 31, No. 12, pp. 4041–4044, 1998.

(List continued on next page.)

Primary Examiner—David W. Wu
Assistant Examiner—Ling-Siu Choi
(74) *Attorney, Agent, or Firm*—Kirkpatrick & Lockhart LLP

(57) ABSTRACT

A process for controlled coupling and chain extension, or atom transfer condensation polymerization, of molecules containing one or more radically transferable atoms or groups is provided, wherein transition metal compounds, optionally partially in the zero oxidation state, various ligands, counterions, and solvents are preferentially employed to preferentially give coupled and chain extended products that no longer contain a radically transferable atom or group.

35 Claims, 13 Drawing Sheets

OTHER PUBLICATIONS

J. Xia et al, "Controlled/"Living" Radical Polymerization. Homogeneous Reverse Atom Transfer Radical Polymerization Using AIBN as the Initiator", *Macromolecules*, vol. 30, No. 25, pp. 7692–7696, 1997.

S. A.F. Bon et al, "Controlled Radical Polymerization in Emulsion", *Macromolecules*, vol. 30, No. 2, pp. 324–326, 1997.

*Macromolecules* "Evidence for Living Radical Polymerization of Methyl Methacrylate with Ruthenium Complex: Effects of Protic and Radical Compounds and Reinitiation from the Recovered Polymers," T. Nishikawa et al., vol. 30, No. 8, 1997, pp. 2244–2248, 1997.

U. Schubert et al, "Design of Effective Systems for Controlled Radical Polymerization of Styrene: Application of 4,4'–Dimethyl and 5,5'–Dimethyl 2,2'–Bipyridine Copper(II) Complexes", *Macromol. Rapid Commun.*, vol. 20, No. 6, pp. 351–355, 1999.

Seong Mu Jo et al, "Effects of Various Copper Salts and Additives on Polymerization of Acrylonitrile by Atom Transfer Radical Polymerization "Am. Chem. Soc., polym. prepr., 38(1), 699–700 (1997).

Dorota Greszta et al, "Gradient Copolymers of Styrene and Acrylonitrile Via Atom Transfer Radical Polymerization", Am. Chem. Soc., polym. prepr., 38(1), 709–710 (1997).

Seong Mu Jo et al, "Polyacrylonitrile with Low Polydispersities by Atom Transfer Radical Polymerization", Am. Chem. Soc., polym. prepr., 38(1), 697–698 (1997).

Asscher, M. and Vofsi, D., "Chlorine Activation by Redox–transfer. Part IV. The Addition of Sulphonyl Chlorides to Vinylic Monomers and Other Olefins," *J. Chem. Soc.*, 1964, pp. 4962–4971.

M. Makino, E. Tokunaga and T. E. Hogen–Esch, "Controlled Atom Transfer Radical Polymerizations of Methyl Methocrylate under Micellar Conditions," *Am. Chem. Soc., Polym. Prepr.*, 1998 39(1), 288–289.

* cited by examiner

ATOM OR GROUP TRANSFER RADICAL POLYMERIZATION

The present application is a divisional application claiming priority under 35 U.S.C. §120 from U.S. application Ser. No. 09/018,554, filed Feb. 4, 1998 and claiming priority under 35 U.S.C. §119 from provisional application No. 60/039,543 filed on Mar. 11, 1997 and No. 60/041,620 filed on Apr. 2, 1997 and the present application is also a continuation-in-part application claiming priority under 35 U.S.C. § 120 from U.S. application Ser. No. 09/034,187 filed on Mar. 3, 1998 that is a divisional and claims priority under 35 U.S.C. §120 from U.S. application Ser. No. 08/414,415 filed Mar. 31, 1995 and has issued into U.S. Pat. No. 5,763,548.

BACKGROUND OF THE INVENTION

1. Field of the Invention

The present invention relates to improvements in the choice of transition metal, ligands, counterions and initiators in the atom or group transfer radical polymerization process, and new polymeric products produced thereby.

2. Discussion of the Background

Living polymerization systems have been developed which allow for the control of molecular weight, end group functionality, and architecture. [Webster, O. *Science*, 1991, 251 887] Most notably, these systems involve ionic polymerization. As these polymerization systems are ionic in nature, the reaction conditions required to successfully carry out the polymerization include the complete exclusion of water from the reaction medium. Another problem with ionic living polymerizations is that one is restricted in the number of monomers which can be successfully polymerized. Also, due to the high chemoselectivity of the propagating ionic centers, it is very difficult, if not impossible, to obtain random copolymers of two or more monomers; block copolymers are generally formed.

Radical polymerization is one of the most widely used methods for preparing high polymer from a wide range of vinyl monomers. Although radical polymerization of vinyl monomers is very effective, it does not allow for the direct control of molecular weight ($DP_n \neq \Delta[Monomer]/[Initiator]_o$), control of chain end functionalities or for the control of the chain architecture, e.g., linear vs. branched or graft polymers. In the past five years, much interest has been focused on developing a polymerization system which is radical in nature but at the same time allows for the high degree of control found in the ionic living systems.

A polymerization system has been previously disclosed that does provide for the control of molecular weight, end groups, and chain architecture, and that was radical in nature. (Matyjaszewski, K.; Wang, J.-S. Macromolecules 1995, 28, 7901; Matyjaszewski, K.; Patten, T.; Xia, J.; Abernathy, T. *Science* 1996, 272 866; U.S. patent applications-Ser. Nos. 08/414,415; 08/559,309; 08/677,828) the contents of which are hereby incorporated by reference. This process has been termed atom transfer radical polymerization, ATRP. ATRP employs the reversible activation and deactivation of a compound containing a radically transferable atom or group to form a propagating radical (R) by a redox reaction between the radical and a transition metal complex ($M_t^{n+1}$) with a radically transferable group (X), Scheme 1.

Scheme 1

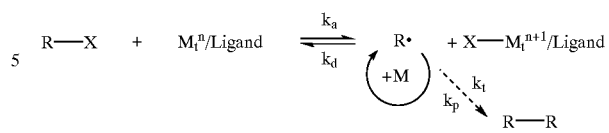

Controlled polymerization is initiated by use, or formation, of a molecule containing a radically transferable atom or group. Previous work had concentrated on the use of an alkyl halide adjacent to a group which can stabilize the formed radical. Other initiators may contain inorganic/pseudo halogen groups which can also participate in atom transfer, such as nitrogen, oxygen, phosphorous, sulfur, tin, etc.

The most important aspect of the reaction outlined in Scheme 1 is the establishment of an equilibrium between the active radicals and the dormant species, R-X (dormant polymer chains=$P_n$-X). Understanding and controlling the balance of this equilibrium is very important in controlling the radical polymerization. If the equilibrium is shifted too far towards the dormant species, then there would be no polymerization. However, if the equilibrium is shifted too far towards the active radical, too many radicals are formed resulting in undesirable bimolecular termination between radicals. This would result in a polymerization that is not controlled. An example of this type of irreversible redox initiation is the use of peroxides in the presence of iron (II). By obtaining an equilibrium which maintains a low, but nearly constant concentration of radicals, bimolecular termination between growing radicals can be suppressed, one obtains high polymer.

Using copper as an example of the transition metal that participates in the redox cycle, the rate of polymerization has been shown to obey the following rate law:

$$R_0 = (k_p)(k_{eq})[M][R-X]\frac{[M_t^n]}{[X-M_t^{n+1}]} \quad (1)$$

When $k_p$=rate constant of propagation; $k_{eq}$=equilibrium constant; [M],[R-X], [$M_t^n$][$M_t^{n-1}$-X] are the respective concentrations of monomer, initiator, transition metal compound and oxidized transition metal compound.

ATRP involves the use of low valent metal salts, $M^n$, e.g., copper (I), iron (II), etc., which can homolytically abstract an atom or group, X, from a functionalized compound to initiate the polymerization, as shown above in Scheme 1. Deactivation of the growing polymer chain by reaction with the now higher oxidation state metal, $M_t^{n-1}$-X, reverts the metal back to its lower oxidation state and an oligomer with the X group at the chain end. This process repeats itself, re-initiating the polymer chain to begin propagation again. After numerous repetitions, high polymer can be obtained with $DP_n=\Delta[M]/[I]_o$ and $M_w/M_n<1.5$.

Previously, pure metals have been employed to prepare ill-defined polymers. Otsu has reported the use of nickel (0) in a "living" polymerization, but the resulting polymer had very broad polydispersities, $M_w/M_n>2$. [Otsu, T.; Tazaki, T.; Yohioka, M. *Chemistry Express* 1990, 5(10), 801] In fact, the resulting polymer had a bimodal distribution upon examination of the size exclusion chromatograms, indicating that this was not a controlled or "living" polymerization. This failure to obtain a controlled polymerization is most likely due to the slow deactivation of the propagating radical. It can also be attributed to nickel favoring the +2 oxidation state versus the +1 oxidation state. As such, nickel (0) would initiate the polymerization by formation of a radical and nickel (I). The nickel (I) would then preferentially react with an alkyl halide to form nickel (II) and a second radical. The back reaction to nickel (0) from nickel (I), or from nickel (II) to nickel (I), would not be favored, resulting in an uncontrolled radical polymerization. Additionally, as a side reaction, the radical may be reduced to an anion by nickel (I), forming nickel (II).

Others have reported the use of zero valent metals to initiate polymerization of vinyl metals, also without controlling the polymerization.[Bamford, C. H.; Duncan, F. J.; Reynolds, R. J. W.; Seddon, J. D. *J. Polym. Sci., Part C* 1968, 23, 419; Otsu, T.; Tazaki, T.; Yoshioka, M. *Chemistry Express* 1990, 5(10), 801; Otsu, T.; Aoki, S.; Nishimura, M.; Yamaguchi, M.; Kusuki, Y. *J. Polym. Sci., Polym. Letters* 1967, 5, 835; Otsu, T.; Yamaguchi, M.; Takemura, Y.; Kusuki, Y.; Aoki, A. *J. Polym. Sci., Polilin. Letters* 1967, 5, 697].

Recently, it was reported that iron metal was successfully used catalytically in the addition of carbon tetrachloride or chloroform to alkenes.[Bellesia, F.; Forti, L.; Ghelfi, F.; Pagnoni, U. *Synthetic Communications* 1997, 27(6), 961; Forti, L.; Ghelfi, F.; Lancellotti, M. L.; Pagnoni, U. M. *Synthetic Communications* 1996, 26(9), 1699] Similar systems have been employed to prepare low molar mass polyhalogenated organic molecules.[Decker, D. L.; Moore, C.; Tousignant, W. G., U.S. Pat. No. 3,862,978, 1975; Kondakov, S. E.; Smirnov, V. V. *Kinet. Catal.* 1995, 36(3), 315] The mechanism was the same as that in atom transfer radical addition: only monoadducts or low molar mass organic molecules were prepared by insertion of the alkene in one of the carbon halogen bonds of carbon tetrachloride (or chloroform).

SUMMARY OF THE INVENTION

Accordingly, one object of the present invention is to provide new metal catalysts and systems for use in atom transfer radical polymerization.

A further object of the present invention is to provide new ligands and counterions associated with the metal for use in controlling atom transfer radical polymerization reactions.

Another object of the present invention is to provide new materials that could not be previously prepared conveniently using other polymerization methods that are now readily available through ATRP.

A further object of the present invention is to provide new ways in which to control ATRP reactions.

Another object of the present invention is to provide a method for coupling molecules using atom transfer radical addition using the metal systems of the present invention in a non-polymerization reaction.

Another object of the present invention is to provide methods for modifying the chain ends of functionalized polymers to change their functionality, using the ATRP technology and other chemistries.

These and other objects of the present invention have been satisfied by the discovery of a wide range of new metals and metal combinations, as well as defining roles of counterions and ligands for use in ATRP reactions and methods for their use in preparing not only polymers but also lower molecular weight compounds formed by coupling of two low molecular weight radicals.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
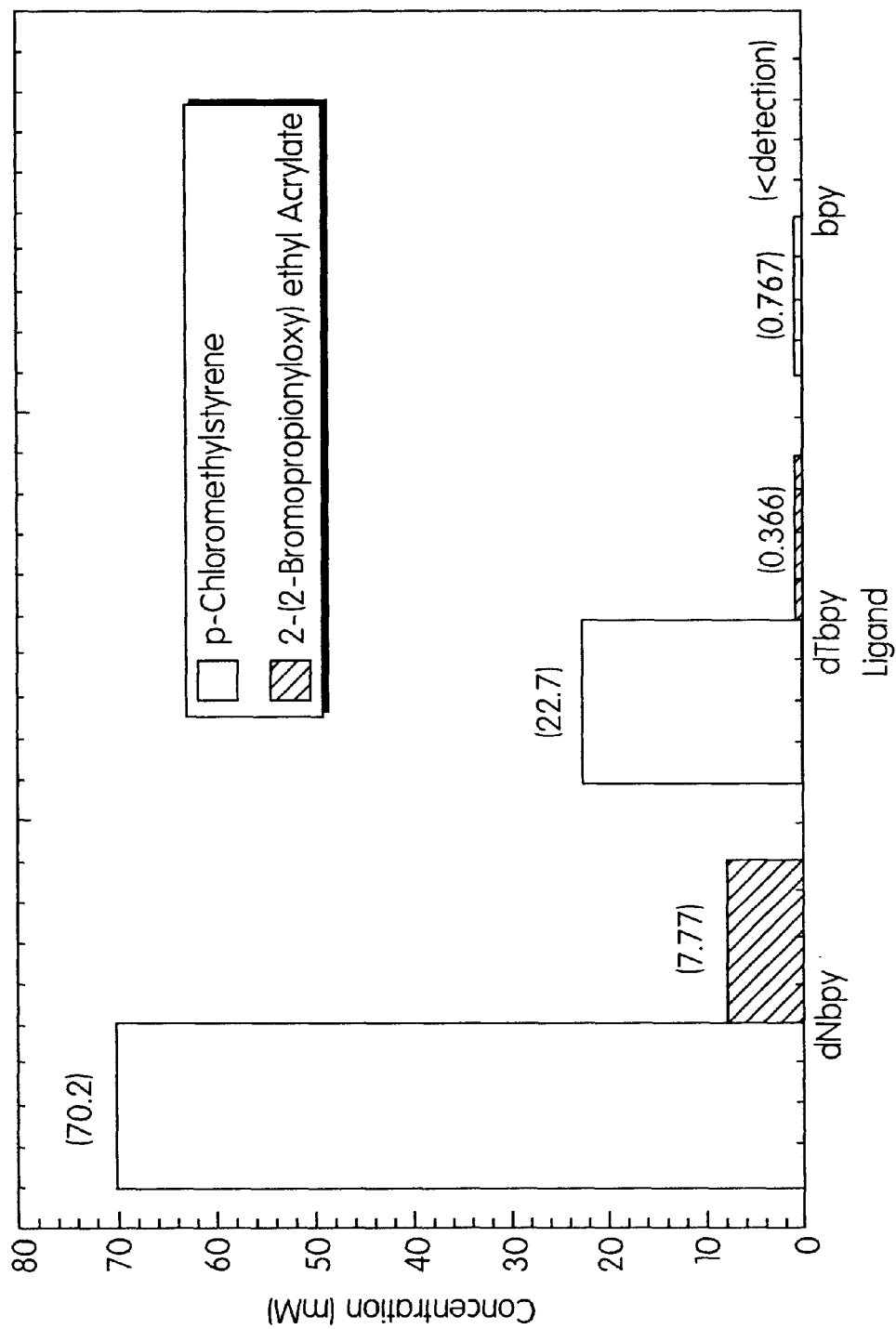
FIG. 1 is a graphical representation of the solubility of Cu using different ligands in two different monomers.

The present invention relates to the "controlled" polymerization of radically (co)polymerizable monomers by atom or group transfer radical polymerization using various initiators, transition metals, transition metal compounds and combinations thereof, and various ligands and counterions for the transition metal component. The conventional ATRP process as developed by the present inventors comprises:

polymerizing one or more radically (co)polymerizable monomers in the presence of a system initially comprising:

an initiator having one or more radically transferable atoms or groups, a transition metal compound that participates in a reversible redox cycle with the initiator, a dormant polymer chain end, a growing polymer chain end or a mixture thereof, and one or more N-, O-, P-, or S-containing ligands which coordinate in a σ-bond or a π-bond to the transition metal, or any C containing compound which can coordinate in a π-bond to the transition metal, to form a (co)polymer.

In the present invention, it has been found that the use of a zero valent transition metal ($M_t^0$) either in place of the transition metal compound or in addition to the transition metal compound provides surprising improvements in reaction rate, control or both. A further embodiment of the present invention provides improvements by using mixed transition metal compound systems in which one of the transition metals is in a higher of two available oxidation states and the other is in a lower of two available oxidation states, wherein the two metals are different. The present inventors have discovered new ligands and counterions for the transition metal and have defined the critical role they play in controlling the polymerization reaction of different monomers, providing rate enhancement, providing control over the initiation, propagation and copolymerization of different monomers, as well as solubility to the transition metal compound in the polymerization reaction, even in bulk polymerizations. These new embodiments of the ATRP process provide the ability to generate new and interesting types of polymers, such as gradient copolymers, bottle-brush copolymers, graft copolymers and block or graft copolymers in any (co)monomer sequence wherein the blocks or grafts may be made of monomers that may/may not copolymerize with the other monomers contained within the polymer. This can be achieved by the present process through manipulation of the reactivity of the growing polymer chain end as well as by use of transitional monomers or groups. The "living" nature of the present process provides the ability to make these polymers.

The monomers useful in the present polymerization processes can be any radically (co)polymerizable monomers. Within the context of the present invention, the phrase "radically (co)polymerizable monomer" indicates that the monomer can be either homopolymerized by radical polymerization or can be radically copolymerized with another monomer, even though the monomer in question cannot itself be radically homopolymerized. Such monomers typically include any ethylenically unsaturated monomer, including but not limited to, styrenes, acrylates, methacrylates, acrylamides, acrylonitriles, isobutylene, dienes, vinyl acetate, N-cyclohexyl maleimide, 2-hydroxyethyl acrylates, 2-hydroxyethyl methacrylates, and fluoro-containing vinyl monomers. These monomers can optionally be substituted by any substituent that does not interfere with the polymerization process, such as alkyl, alkoxy, aryl, heteroaryl, benzyl, vinyl, allyl, hydroxy, epoxy, amide, ethers, esters, ketones, maleimides, succinimides, sulfoxides, glycidyl or silyl.

The process provided in the present invention allows for the production of a vast range of polymer products having highly controlled molecular weight distribution and highly controlled functionality, both along the chain as well as at termini of the polymer chains. Polymers prepared from the present process can have essentially all of the head groups identical and essentially all of the tail groups identical, something not possible in conventional radical polymerizations. Further, due to the range of functionality that is tolerant of radical processes, it is possible to prepare functionalized compounds and polymers that can be used further in ionic or other non-radical processes to further modify the compounds or polymers.

The improvements in the ATRP process provided by the present invention include improvements in the robust nature of the process, such as the ability to conduct the process in unpurified monomers or in the presence of air. The ATRP chemistry is found to be useful not only in polymerization but also in coupling of molecules of any size, by generation and coupling of the appropriate radicals. Additionally, the ATRP chemistry acts to remove $O_2$ from the system to generate an $O_2$ free reaction medium. Due to the controlled ability to generate the radicals by removal of a radically transferable atom or group, the present invention provides efficient methods for preparation of a wide variety of compounds, from small organic molecules to oligomers to polymers. Additionally, the present processes provide the ability to manipulate the termini of polymers due to the presence of the radically transferable atom or group on the terminus after ATRP polymerization. This permits substitution of the radically transferable atom or group by hydride (using hydride transfer agents), other functional groups and end-capping groups.

In the context of the present invention, the term "controlled" refers to the ability to produce a product having one or more properties which are reasonably close to their predicted value (presuming a particular initiator efficiency). For example, if one assumes 100% initiator efficiency, the molar ratio of initiator to monomer leads to a particular predicted molecular weight. The polymerization is said to be "controlled" if the resulting number average molecular weight ($M_n$(act)) is reasonably close to the predicted number average molecular weight ($M_n$(theory)); e.g., within an order of magnitude, preferably within a factor of four, more preferably within a factor of three and most preferably within a factor of two (i.e., $M_n$(act) is in the range of from $(0.1) \times M_n$(theory) to $10 \times M_n$(theory), preferably from $(0.25) \times M_n$(theory) to $4 \times M_n$(theory), more preferably from $(0.5) \times M_n$(theory) to $2 M_n$(theory), and most preferably from $(0.8) \times M_n$(theory) to $1.2 \times M_n$(theory)). One exception is the polymerization of AB* monomers (vide infra) and each monomer is an initiator.

Similarly, one can "control" the polydispersity by ensuring that the rate of deactivation is the same or greater than the initial rate of propagation or by adding additional initiator throughout the polymerization. Additionally, the efficiency of initiator can be controlled by rate of additional catalyst/initiator components. The term "redox conjugate" refers to the corresponding oxidized or reduced form of the transition metal catalyst.

New Transition Metal Systems

Iron (II) $X_2$

ATRP can be extended to a wide range of other metal systems, thereby fully demonstrating the versatility of this approach to obtain "living" radical polymerization systems. Using iron (II) salts in conjunction with one or more ligands, results in the synthesis of polymers with controlled molecular weight and polydispersities which are narrower ($M_w/M_n \leq 1$) than those obtained by conventional free radical polymerization. These catalysts are nearly colorless, adding to their potential usefulness, since they can be left in the final polymer product without the side effect of undesirable coloring of the polymer.

Manganese (II) $X_2$

Manganese (II) $Cl_2$ complexed with either 2,2'-bipyridine (bpy) or 2,2'-bipyridine with other ligands, can be used to polymerize styrene, methyl acrylate, or methyl methacrylate. In all cases, the molecular weights are in agreement with those predicted by $DP_n = \Delta[Monomer]/[Initiator]_o$, but the polydispersities are higher than those obtained using either copper (I) or iron (II) salts, $M_w/M_n > 1.5$. Consistent with previous work by the present inventors comparing the effectiveness of the catalysts when homogenous or heterogeneous, the homogeneous catalysts [4,4-di(5-nonyl)-2,2'-bipyridine (dNbpy)] gave better results.

Referring back to Scheme 1, these results indicate that the rate of activation ($k_a$) is fast enough to allow for polymerization, and that the rate of deactivation ($k_d$) is fast enough for the degree of polymerization to be defined by $DP = \Delta[Monomer]/[Initiator]_o$. However, $k_d$ is not fast enough to yield polymers with very narrow $M_w/M_n$, as has been seen with copper (I) based catalyst systems, i.e., $k_d$(copper)>$k_d$(chromium). Although the polydispersities of the polymers prepared by this catalyst are somewhat higher than those obtained by copper or iron, the rates are much faster. With this metal one may sacrifice narrow polydispersities for faster rates, and still obtain polymers with predefined molecular weights, controlled topology and known functionality at the initiating site and growing polymer chain end(s).

Chromium (II) $X_2$

When chromium (II) chloride is used, molecular weights and polydispersities are both higher than what would be expected in ATRP (a "living" polymerization). In fact, with the counter ions and ligands used to date, the results are consistent with those that would be obtained by a simple redox reaction ($k_p >> k_d$).

Mixed Metal Systems

The use of mixed metal systems can provide additional control to the ATRP process, by augmenting the catalytic reactivity of a first transition metal compound in the presence of a second and different transition metal compound. In the present invention mixed metal systems can be prepared from any two or more of the transition metals conventionally used for ATRP. However, certain mixed metal systems have been found by the present inventors to provide surprising control improvements in the ATRP process. These combinations include, but are not limited to, those where the first and second transition metals are selected from the group consisting of copper, iron, manganese, chromium, nickel, silver, palladium, platinum, rhenium, iridium, indium, ruthenium, samarium, zinc and rhodium. In these mixed metal systems, the first and second transition metals can both be transition metal compounds in which one metal is in a higher of at least two available oxidation states and the second metal is in a lower of two available oxidation states. Alternatively, one of the transition metals may be present as the metal in its zero oxidation state, such as $Fe^\circ$. As a further embodiment, there may be two transition metal compounds wherein the transition metals are selected as noted above, and a third transition metal in its zero oxidation state. These mixed metal combinations provide advantages in one or more of polydispersity control, polymerization rate control, initiation rate control, etc. The choice of ligands and/or counterions on the transition metal compounds should be made to satisfy the following relationship in order to provide improvements in polydispersity: kd(transition metal in lower oxidation state)<$k_d$(transition metal in higher oxidation state). This is the case since $M_w/M_n = 1 + [I]_o k_p/[D] k_d$, at complete conversion, where [I]=the initiator, [D]=the deactivator ($M_t^{n-1}$). Within the context of the present invention, when describing the oxidation state of a transition metal, the phrase "higher oxidation state" refers to a higher of at least two available oxidation states for that particular metal and the phrase "lower oxidation state" refers to a lower of at least two available oxidation states for the particular metal. Examples of these mixed metal systems are described below.

$MnCl_2/CrCl_3$

To show the effect of mixed metal systems which do not meet the above criteria, $MnCl_2$ was used as the lower oxidation state transition metal, while $CrCl_3$ was used for the transition metal in the higher oxidation state. As noted above, if $k_d$(Mn(III))<$k_d$(Cr(III)), then addition of $CrCl_3$ to the reaction mixture would result in a lower $M_w/M_n$. However, if $k_d$(Mn(III))>$k_d$(Cr(III)), then there would be no effect of adding $CrCl_3$ to the reaction mixture. As there was no noticeable effect of added Cr(III) on the polydispersities of the final polymers it was concluded that $k_d$(Mn(III))>$k_d$(Cr(III)). Although chromium did not work under these conditions, by changing the ligands, one may be able to shift the reduction potential of the chromium metal, so that the reduction of Cr(III) to Cr(II) becomes more favorable, thereby making the deactivation reaction more facile.

$MnCl_2/CuCl_2$

Copper (II) can be added as excess redox conjugate to the polymerization of radically (co)polymerizable monomers, such as styrene, methyl acrylate, and methyl methacrylate, by ATRP using $MnCl_2$/dNbpy. In these polymerizations, there is a marked decrease in the polydispersities of the final polymers, compared to using $MnCl_2$ alone. This leads to the conclusion that $k_d$(Cu(II))>$k_d$(Mn(III)). Rates are comparable to using $MnCl_2$ alone.

Use of Zero Valent Metals for the Controlled Polymerization of Alkenes

Iron powder ($Fe^\circ$) alone has been demonstrated as an ATRP catalyst by polymerization of styrene in the presence of various ligands. When the polymerization is conducted in the presence of DMF (which can also act as a solvent), tributylamine, or triphenylphosphine, low molecular weight polymers are obtained with narrow polydispersities, indicating that the reaction between ($Fe^\circ$) and the alkyl halide initiates the polymerization.

A similar set of reactions can be performed using copper powder ($Cu^\circ$) in the presence of appropriate ligands. In these cases, well defined polymers with molecular weights that increase with conversion are obtained for the polymerization of radically (co)polymerizable monomers, such as styrene, methyl acrylate and methyl methacrylate. In many examples, 2,2-bipyridine (bpy) or 4,4'-di(5-nonyl)-2,2'-bipyridine (dNbpy) has been used as the ligands, although 1,1,4,7,10,10-hexamethyltriethylenetetramine has been successfully used, demonstrating that other ligands can be used in the ATRP polymerization of vinyl monomers.

These polymerizations are quite fast. For the polymerization of styrene with copper powder /1,1,4,7,10,10-hexamethyltriethylenetetramine, the polymerization reaches complete conversion in two hours and the final polymer has $M_n$=12,500 ($M_{n,theory}$=10,400) and $M_w/M_n$=1.38. It should be noted that in these examples, the use of copper powder results in a heterogeneous catalytic system. The reaction solutions become colored as the polymerization progresses indicating that some copper species is solublized in the reaction medium. Since solid copper powder is also observed, one can realize that only a fraction of the actual copper added is needed for the polymerization to be successful with comparable rates. While the present inventors do not wish to be bound to any particular mechanism of operation, one proposed mechanism is the transfer of an electron to form the radical anion of the initiator, and copper (1) at the surface of the copper (0). The radical anion dissociates into the halogen anion and the radical; the copper (1) is complexed with the ligand and taken into solution. The reaction can then proceed as a normal ATRP reaction. Some initiator is lost at the beginning of the reaction as there is initially no deactivator present to prevent termination of the formed radicals.

The polymerization rates of conventional ATRP polymerizations can be significantly increased by adding the zero valent metal to the general ATKP polymerization. For example, when iron or copper powder is added to ATRP reactions using iron (II) dibromide or copper (I) bromide, respectively as the transition metal compounds, the rates are found to be extremely fast. A prime example of this is the polymerization of methyl acrylate with copper (I) bromide/copper powder/dnbpy. The polymerization is initiated by methyl 2-bromopropionate and after ninety minutes at 90° C., is found to reach 64% conversion, $M_n$=55,900 ($M_{n,theory}$=54,900) and $M_w/M_n$1.18. The molar ratios of the reagents were MA:Initiator: Cu(I):Cu(0):dnbpy= 1000:1:2:2.7:4. Only a small fraction of the copper powder is needed to enhance the rate of polymerization. In fact, polymerizations conducted with 10% of copper powder/dNbpy relative to initiator are found to be as fast as those polymerizations when only soluble copper (I)/dnbpy catalysts (in a 1:1 ratio with initiator) are used. This demonstrates a new method to increase the rate of polymerization by ATRP while at the same time reducing the amount of catalyst required in the polymerization system.

Similar rate enhancements are observed in the addition of iron powder to iron (II)/bpy polymerizations (alternatively, iron (III) can be used in place of the iron (II)). When the ATRP of styrene is conducted using iron (II) bromide without additional ligand, in the presence of 10% (v/v) of DMF, the reaction is very slow (22h, conversion=29%), with only low molecular weight oligomers being prepared ($M_n$= 1,200; $M_w/M_n$=1.44). When iron powder is added to a similar reaction mixture, the polymerization yields well defined polystyrene (17 h, conversion=86%, $M_n$=9,860, $M_{n,theory}$=9,100; $M_w/M_n$=1.22).

While not wanting to be bound to any particular mechanism of action, it is believed that excess metal that is in the higher oxidation state, i.e., copper (II), iron (III), is reduced by reaction with the zero valent metal. The proposed mechanism is outlined in Scheme 3. In the case of copper, only one equivalent of copper (0) is needed to reduce copper (II) to copper (I). Also, when the copper (II) is reduced, additional copper (I) is generated which can additionally activate polymer chains by the reaction outlined in Scheme 1. Since the polymerization is also successful when $M_t^o$ is the only metal used, the direct reaction of the initiator and the copper metal must also occur. However, it is believed that this reaction is a minor contribution in comparison to the reaction between the initiator and $M_t^n$.

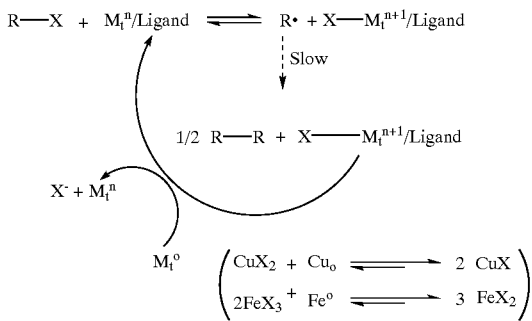

Scheme 3. Mechanism for consumption of higher oxidation state metal by zero valent metal.

In the case of iron, it is proposed that the resulting iron (I) complex further reduces a second equivalent of iron (III) to form iron (II). Thus, iron (0) is a more efficient scavenger of high oxidation state metals in comparison to copper (0). The enhanced rate of polymerization is a consequence of a lower concentration of higher oxidation state metal ($M_t^{n-1}$) which results in the formation of a higher concentration of radicals and subsequently, a faster rate of polymerization in accordance with equation (1).

To demonstrate the validity of the above mechanism, i.e. the reduction of the higher oxidation state metal by zero valent metal, ATRP was performed using only the higher oxidation state metal and the zero valent metal in the presence of a suitable ATRP initiator, i.e., 1-phenylethyl bromide, methyl 2-bromopropionate, etc. This proves to be an extremely efficient catalyst system as demonstrated in the examples below. Such examples include the polymerization of styrene using either iron (III) tribromide/iron powder (7 h, conversion=55%, $M_n$=5,780, $M_{n,theory}$=5,940; $M_w/M_n$= 1.13), copper (I) bromide/copper (0) (3h, conversion=92%, $M_n$=10,000, $M_{n,theory}$=9,700; $M_w/M_n$=1.09). Similar results are obtained with methyl acrylate using copper (II) bromide/copper (0) (1.7 h, conversion=67%, $M_n$=11,400, $M_{n,theory}$= 11,700; $M_w/M_n$=1.10) and methyl methacrylate with iron (III) tribromide/iron powder (18 h, conversion=75%, M, =75,100, $M_{n,theory}$=75,000; $M_w/M_n$=1.24).

Thus, zero valent metals can be used alone to obtain well defined polymers from vinyl monomers. Additionally, varied amounts of zero valent metals in the presence of conventional ATRP catalyst systems, or with higher oxidation state metals, has been found to enhance the rate of polymerization and still yields well defined polymers.

An additional benefit of using zero valent metals is that they can be used to generate the lower (active) oxidation state metal catalyst in situ by using a combination of the higher oxidation state metal halide, the ligand, and the zero valent metal. All three of these components can be varied to control the rate of formation of the lower oxidation state metal, i.e., the rate of the redox reaction between $M_t^{n+1}$ and $M_t^o$, the rate of activation of the initiator, $k_a$, and/or the rate of deactivation of the radical center, $k_d$ (specifically, the rate of reduction of the higher oxidation state transition metal can be affected by temperature, the shape and/or surface area of the zero valent metal, and rate/efficiency of mixing). All of these factors can be used to control the molecular weight, molecular weight distribution, rate of polymerization, and in some cases, the topology of the final polymer.

Use of zero valent metals also allows for the preparation of well-defined polymers without taking steps to purify the monomer prior to polymerization. Generally, for controlled radical polymerization, all inhibitor and/or oxygen must be removed, otherwise termination of the active radicals will occur, resulting in too high a concentration of deactivator, i.e., $M_t^{n+1}$. This translates into a very slow polymerization; i.e., the polymerization apparently does not occur. With the addition of zero valent metals, the excess deactivator is scavenged and returned to its active state. So long as the amount of inhibitor and/or oxygen in the polymerization medium is lower in concentration than the available metal zero, a controlled/"living" polymerization will be obtained.

In ATRP systems where the concentration of the initiator is very high, the initial radical concentration can be high, resulting in termination and a build-up of the deactivator. This situation has been observed in the polymerization of AB* monomers, where A is a polymerizable vinyl bond and B* is a functional group containing a radically transferable atom or group. For some AB* monomers, it was not possible to lower the catalyst concentration below 1%, otherwise the polymerization would not proceed due to the build-up of deactivator. By adding a zero valent metal, the deactivator concentration is lowered, thus allowing for the reduction in the amount of catalyst needed for successful polymerization. Additionally, by varying the surface area of the zero valent metal (powder versus turning), it is possible to adjust the rate of reaction between the deactivator and the zero valent metal, and thus control the amount of deactivator present in the polymerization medium. This enables one to control the topology of the final polymer (vide infra).

If the concentration of deactivator is kept to very low levels, then deactivation does not occur, but termination between two radicals does. If termination is predominately by coupling, then numerous synthetic possibilities are available. If coupling occurs between polymer chains, each with just one active center, the molecular weight of the polymer chain is doubled. If each polymer chain has two active sites, chain extension can occur, as in a condensation polymerization. With continued improvement in catalyst performance, this new type of atom transfer condensation polymerization could lead to novel polymer compositions. If the number of active sites is greater than two, crosslinked materials can be obtained. This is especially useful for solventless coatings where telechelic polymers mixed with varied amounts of multifunctional (having an average of >2 radically transferable atoms or groups) components in the presence of zero valent metals, and heated to yield a crosslinked coating. A similar type of crosslinking carried out to form bulk materials with low Tg matrices would lead to elastomeric materials with a controlled network of crosslinks. Such materials would have a controllable % elongation, dependent on the molecular weight of the telechelic matrix polymer, and high tensile strength because many crosslinks would be stressed. Alternatively, the multifunctional components can be used alone, without the presence of telechelic polymers, to form the solventless coating.

Additionally, polymer chains can be capped with functional groups by introduction of small molecules containing both the desired functional group and a radically transferable atom or group. Although a combination of products will be obtained (coupling can occur between two small molecules, two polymer chains, and between a small molecule and polymer chain (the desired reaction)), the amount of coupling between polymer chains alone should be minor due to the faster rates of termination of small molecules with polymeric radicals and with each other. The products of termination between small molecules can then be simply removed by precipitation of the polymer.

The removal of the halogen atom at a chain end can be accomplished by using either $M_t^n$ in at least a stoichiometric amount, or, more conveniently, by using a catalytic amount of $M_t^n$/ligand and at least a stoichiometric amount of $M_t^0$. The coupling reactions with small molecules is one method, as are the reaction of the resulting radicals with hydride transfer agents such as thiols, tin hydrides, silyl hydrides, etc. The halogens can be replaced by reaction of the radical chain end (or small molecule, oligomer) with stable free radical deactivators, i.e., TEMPO. TEMPO, and other nitroxides, can and have been used to preferentially trap the radicals, resulting in the preparation of alkoxy amines. Alkoxy amines can themselves be used as initiators in controlled radical polymerizations; the use of macromolecular alkoxy amines results in the formation of block and/or graft copolymers. [Solomon, D. H.; Rizzardo, E; Cacioli, P. U.S. Pat. No. 4,581,429 1985; Hawker, C. J. *J. Amer. Chem. Soc.* 1994, 116, 11314; Hawker, C. J.; Barclay, G. G.; Orellana, A.; Dao, J.; Devonport, W. *Macromolecules* 1996, 29, 5245]

These synthetic possibilities are possible only if the concentration of the deactivator is kept low. This is generally not possible in controlled radical reactions since termination leads to a build up of deactivator. However, this problem has been overcome by the use of zero valent metals to scavenge the deactivator.

It is now possible to make less stable $M_t^n$ species in situ from higher oxidation state species, i.e., $M_t^{n+m}$. Such $M_t^{n+m}$ species are generally cheaper and oxidatively more stable. As an example, copper (I) trifluoromethane sulfonate (triflate) is quite difficult to isolate and handle (requiring the complete exclusion of oxygen, i.e., use of a glovebox, Schlenk techniques, etc.) due to oxidative instability. By using the much more stable copper (II) ditriflate, the catalyst precursor can be handled in air and only becomes unstable when reduced to the copper (I) species. This reduction can occur by various means such as the application of an electric current, use of a reductive metal, i.e., copper, iron, zinc, etc. by electron transfer with an organic or inorganic reagent, etc.

Ligands/Counterions
Copper (I) X

Some suitable ligands for ATRP with copper (I) catalysts include bi- or tri-dentate pyridine based ligands, and linear, aliphatic, multidentate, amine ligands. These latter ligands are readily available and are much cheaper than the bipyridines previously demonstrated. Suitable preferred amine ligands include: N,N,N',N',N"-pentamethyldiethylenetriamine (PMDETA), 1,1,4,7,10,10-hexamethyltriethylenetetramine (HMTETA), and tetramethylethylenediamine (TMEDA). When styrene is polymerized using these ligands, only TMEDA yields a homogeneous catalyst system. When the catalyst is heterogeneous it is present as a fine precipitate which may aid in the removal of the catalyst at the end of the polymerization. An insoluble catalyst is obtained for the polymerization of MMA only when PMDETA was used. Homogeneous catalyst systems are obtained for methyl acrylate using all three of the linear amines. Using these linear amine ligands, good control of molecular weight can be obtained with narrow polydispersities. In addition to the use of linear amines, branched multidentate ligands can be used. This was demonstrated by use of tris(2-(dimethylamino)ethyl)amine has successfully polymerized styrene, methyl acrylate and methyl methacrylate. In fact, the rate of polymerization is greatly enhanced for the polymerization of methyl acrylate when this ligand was used.

The cyclic ligand, 1,4,8,11-tetramethyl-1,4,8,11-tetraazacyclotetradecane, can also be used in the present process. Due to its strong coordination to the metal center, this ligand prevents the monomer/solvent from displacing the ligand and lowering the activity of the catalyst.

8-Hydroxyquinoline can also be used as a ligand/counter ion. It was thought that this ligand might displace the halogen atom to form Cu-O-quinoline. It was found that only one equivalent of bpy is needed for the polymerization to proceed instead of the normal two equivalents. Polymerizations of radically (co)polymerizable monomers, such as styrene, methyl acrylate, and methyl methacrylate, with this ligand, give polymers with low polydispersities, $M_w/M_n<1.3$, and with good agreement between observed molecular weight and that predicted by theory.

Iron (II) X2

Simple monodentate ligands, such as tri(n-butyl) phosphine, tri(n-butyl)amine, and tri(n-octyl)amine can be used in conjunction with an iron (II) salt to obtain well defined polymers, such as polystyrene and poly(methyl methacrylate). For the polymerization of styrene, polymers with controlled molecular weight and polydispersity are particularly obtained when either tri(n-butyl)amine or tri(n-octyl)amine are used alone or as a mixed ligand system with 4,4'-di(5-nonyl)-2,2'-bipyridine, dNbpy. The best results are obtained when dNbpy and tri(n -butyl)amine are used together. In the polymerization of styrene, when the iron (II)/tri(n-octyl)amine catalyst is used with a small amount of tetrabutylammonium bromide added, results comparable to those obtained with copper (I)/dNbpy are obtained. This advancement is significant as the iron (II) and trialkyl ligands are quite inexpensive compared the copper (I)/ dNbpy combination.

Monodentate phosphine ligands can also be successfully used with iron (II) to obtain controlled polymerization, although the polydispersities are higher than those obtained with the amines. Low polydispersities can be obtained when the phosphine ligands are used in conjunction with dNbpy.

By correctly selecting the ligand, it is possible to adjust its solubility in the reaction medium. For example, by using ligands with attached alkyl groups the resulting catalyst can be rendered soluble in organic solvents. Similarly by attaching fluorinated alkyl groups on the ligand, the catalyst will become soluble in $CO_2$. Hydrophilic groups on the ligand render the catalyst soluble in water. In fact, due to the polar nature of the transition metal/ligand complex, the catalyst itself is generally found to be soluble in water. By exchanging the ligand on the catalyst after the reaction, it is possible to separate the catalyst and the polymer into two different phases. For example, at the end of a polymerization using ATRP, where the catalyst contains a hydrophobic ligand, i.e., dNbpy, treating the reaction mixture with an aqueous solution containing a ligand that renders the catalyst complex water soluble (e.g. bpy), results in a dynamic exchange of the two types of ligand. As the catalyst becomes water soluble, it moves into the water phase and is then removed by separation of the water and organic phase. A catalyst with fluorinated groups (or containing polysiloxane groups) can similarly be extracted using liquid or supercritical $CO_2$.

The catalyst and the polymer can also be separated if the reaction solvent is chosen so that the polymer is not soluble under certain conditions, i.e., lower temperatures, but the catalyst remains soluble. This phenomenon is exemplified by polymerization of butyl acrylate in ethylene carbonate. Poly(butyl acrylate) is not soluble in ethylene carbonate at room temperature, but is at the higher reaction temperatures, generally greater than 50° C. When the polymerization is completed, the reaction mixture is cooled to room temperature at which point the poly(butyl acrylate) precipitates out of solution; the catalyst remains in the ethylene carbonate/residual monomer solution.

Precipitation of the catalyst from the reaction mixture can also be used to remove the metal species. This is performed by treating a reaction mixture with an aqueous solution of a salt having an anionic component which binds more strongly to the transition metal than the counter ion used in the ATRP reaction, but which results in a transition metal complex that is not soluble in either the aqueous or organic phases, and thus precipitates. This has been demonstrated using a copper (I) catalyst with treatment using aqueous solutions of either sodium hydroxide or sodium sulfide.

Electron withdrawing or donating groups on the ligands can also affect the redox reaction between metal and the initiator. Electron donating groups stabilize, and favor the formation of the higher oxidation state species ($k_a$ is increased). Conversely, electron withdrawing groups stabilize the lower oxidation state species, favoring the dormant species (higher $k_d$).

Effect of Catalyst on the Polymerization of AB* Monomers

In 1952, Flory [Flory, P. J. *J. Am. Chem. Soc.* 1952, 74 2718] proposed that the polymerization of AB* monomers would lead to branched, but not crosslinked (network), structures. This proposal was first applied in the step-growth synthesis of polyphenylenes. [Webster, O. W.; Kim, Y. H. *J. Am. Chem. Soc.* 1990, 112 4592; Webster, O. W.; Kim, Y. H. *Macromolecules* 1992, 25(21), 5561] Subsequently, it was extended to other step-growth polymerizations such as aromatic[Frechet, J. M. J.; Hawker, C. J.; Lee, R. *J. Am. Chem. Soc.* 1991, 113 4583] and aliphatic[Hult, A.; Malmstrom, E.; Johansson, M. *J. Polym. Sci. Polym. Chem. Ed.* 1993, 31 619] esters, siloxanes,[Mathias, L. J.; Carothers, T. W. *J. Am. Chem. Soc.* 1991, 113 4043] and amines.[Suzuki, M.; Li, A.; Saegusa, T. *Macromolecules* 1992, 25 7071] Frechet et al.[Frechet, J. M. J.; Henmi, M.; Gitsov, I.; Aoshima, S.; Leduc, M.; Grubbs, R. B. *Science* 1995, 269 1080] later developed the concept of self condensing vinyl polymerization (SCVP) to prepare hyperbranched polymers by carbocationic systems. Shortly afterwards, SCVP was adapted to the radical polymerization of functionalized styrenes by Hawker et al.[Hawker, C. J.; Frechet, J. M. J.; Grubbs, R. B.; Dao, J. *J. Amer. Chem. Soc* 1995, 117 10763] and by Gaynor, et al.[Gaynor, S. G.; Edelman, S. Z.; Matyjaszewski, K. *Macromolecules* 1996, 29, 1079 and U.S. patent application Ser. No. 08/677,828]. In the present invention, the ATRP process can be used to prepare hyperbranched polymers such as hyperbranched acrylates.

To depict the monomers for SCVP, the designation AB* will be used instead of the conventional $AB_2$. The double bond is described by A, while B* is a functional group that can be transformed to an active center to initiate the polymerization of the double bonds. The B* group can be transformed to a cationic, radical or anionic active center. The activated B* adds across the double bond A to form the dimer. Scheme 4 shows the idealized case of one addition of monomer followed by deactivation to form the new group A*. The dimer, 2, can now be reactivated at either B* or A*. Addition of monomer at A* results in 3a, while addition at B* yields 3b. Further addition of monomer, or n-mer, to either 3a or 3b, can result in a polymer that is branched.

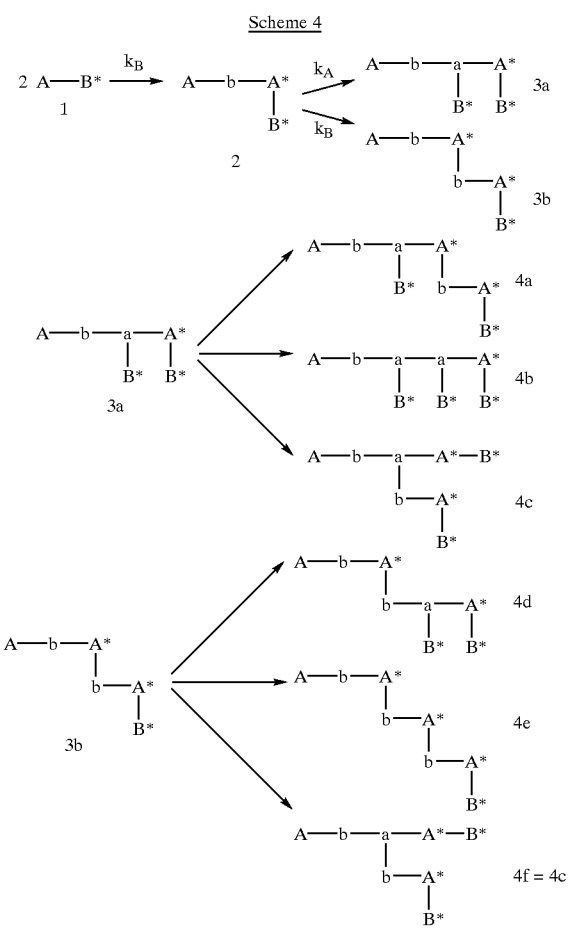

Scheme 4

For AB* monomers to be used in ATRP, they must contain a radically transferable group capable of interacting by atom or group transfer in a redox reaction with the transition metal. In a general description, the monomer can be depicted as $A\text{-}(R)_n\text{-}B^*$, wherein the double bond (A) is directly attached to the B* group (n=0) or is separated from the B* group by a spacer, R (n=1). Currently, the types of monomers that can be polymerized by ATRP, and consequently the type of A group, include any radically (co)polymerizable monomer having a C=C double bond, such as styrenes, acrylates, and methacrylates. The B* group can be any group having one or more radically transferable atoms or groups, such as halides or pseudohalides. These include species such as 2-halopropionyloxy, 2-haloisobutyryloxy, a-halonitriles, sulfonyl halides or a benzyl halide group. The versatility of this approach is enhanced by the wide variety of R groups that can be inserted between the double bond, A, and the functional group, B*. By changing the various groups, A, R or B*, a wide variety of monomers/materials can be developed.

In the synthesis of hyperbranched polymers using the ATRP process, the concentration of the transition metal conjugate must be at a level in which there is fast deactivation of the propagating radical, but not so high that the reaction is essentially stopped. This is related to the equation defining the rate of polymerization. It will be noted: that the rate of polymerization is proportional to $[M_t^n]$, $[M]$ and $[R-X]$, but inversely proportional to $[M_t^{n+1}]$. Due to the concentration of the initiator group (R-X~B*) being so high in AB* polymerization (bulk), the concentration of radicals is higher than that found for conventional ATRP.

This higher initiator concentration leads to an increase in bimolecular termination, $R_t=k_t[R\bullet]^2$, which thus leads to an increase in the transition metal conjugate concentration. In the catalyst system that uses dNbpy, the Cu(II) species remains in solution and therefore a decrease in the rate is observed. In fact, the end result is a polymerization that is so slow that it appears that there is no polymerization, except at higher temperatures. When bpy is used, the concentration of Cu(II) in solution is very low, as the Cu(II) species precipitated out of solution. This lower concentration of Cu(II) results in slow deactivation ($k_d$) of the propagating center, and a decrease in the amount of branching in the polymer chain. The decrease in degree of branching with decreasing temperature for the bpy systems is the result of a greater ratio of $k_p[M]$ to $k_d[M_t^{n+1}]$ with decreasing temperature. Also, the molecular weight decreases with increasing temperature, supporting this theory as chain length is proportional to $R_p/R_d$ (with the lower [Cu(II)], the rate of deactivation is lower, thus the formation of longer linear segments).

By adjustment of the alkyl chain in the 4,4'-dialkyl-2,2'-bipyridine, the concentration of soluble copper in the reaction medium can be manipulated. This was demonstrated with Cu (II) $X_2$ for two different monomers, p-chloromethylstyrene (p-CMS) and 2-(2-bromopropionyloxy)ethyl acrylate (BPEA) but can be extended to other monomer systems. As can be seen from FIG. 1, the concentration of copper in solution decreases in the order dNbpy>dTbpy>bpy (dTbpy=4,4'-di(t-butyl)-2,2'-bipyridine). Also, the Cu (II) appears to be more soluble in p-CMS than in BPEA. In polymerizations of BPEA using each of the above ligands, only the use of dTbpy yields hyperbranched polymer, while use of bpy yields a polymer that has a lower degree of branching.

The degree of branching is determined by comparison of the NMR signals of b and B*. During polymerization, consumption of the B* groups leads to branching and the formation of b. According to theoretical calculations, the highest degree of branching (DB) would be 0.5 at full conversion(DB=0 for a linear polymer; DB=1 for a dendrimer). When bpy is used, DB=0.45 at 100° C. This value decreases as the temperature is decreased in accordance with a reduction in Cu(II)-X concentration (at 70° C., DB=0.40; 50° C., DB=0.14). When dTbpy is used at 50° C., DB=0.48.

When dTbpy is used, the concentration of Cu(II) is kept at levels which are acceptable for relatively fast rates of polymerization while still obtaining high degrees of branching. A similar case is observed for p-CMS. Only with bpy is polymer obtained; the use of dTbpy or dNbpy does not yield polymer. This is due to the higher solubility of Cu (II) in this monomer with these ligands. By judicious choice of ligand, one is now able to control the chain architecture of the polymer, i.e., linear vs. branched (with variation in degree of branching) vs. hyperbranched.

Counter Ion (Cu-X)

$PF_6^-$

In solution, it is known that copper (I)-X/bipyridine can form structures of the type shown below. It has been believed that the monomeric species is the only species that partakes in ATRP. This is due to results that have been previously disclosed, which showed no difference in the polymerization of styrene when copper (I) Br/dNbpy or copper (I) $PF_6$/dNbpy were used. Copper (I) $PF_6$/dNbpy is known to be present only as the monomeric form.

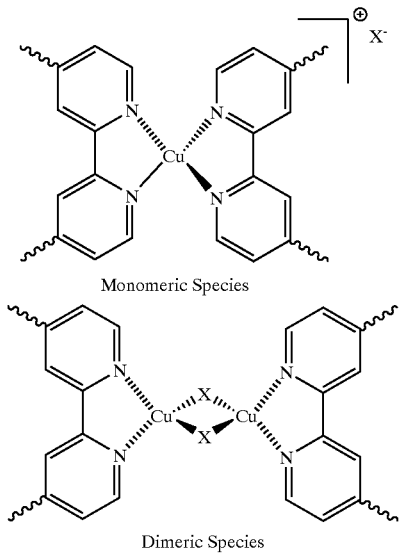

Monomeric Species

Dimeric Species

Polymerizations that were performed using the Cu (I) $PF_6$/dNbpy based catalyst system for both styrene and MMA showed few differences compared to Cu (I) Br. However, there was a marked difference between the two copper salts in the polymerization of methyl acrylate.

The rate observed using Cu (I) $PF_6$ was nearly a hundred times faster than using Cu (I) Br. When the Cu(I) $PF_6$ was used in a 1:1 ratio with an initiator using either bromine or iodine as the radically transferable group, the polymerization occurred at room temperature. In all cases, the molecular weights agreed with theory, but had higher polydispersities. The polydispersities were lowered, $M_w/M_n<1.3$, by addition of small amounts of either Cu (I) Br or Cu (II) $Br_2$, but these required heating to 90° C. If the ratio of Cu (I) $PF_6$ to initiator was lowered to 1:10, the reaction also required being heated to 90° C.

These results indicate that for acrylates, the rate of polymerization is greater in the presence of the monomeric Cu (I) $PF_6$ species than in the dimeric Cu (I) Br. As there was not such a large difference in the polymerization kinetics for styrene or methyl methacrylate when using Cu (I) $PF_6$, it can be assumed that in those monomers, the Cu (I) species is mostly monomeric.

Triflate Anion

The triflate anion is a non-coordinating ligand, similar to the $PF_6^-$ ligand. Some of the benefits of using this ligand are the copper (I) salt is much more soluble in organic solvents than when $PF_6^-$ is the counter ion. Additionally, the copper (I) triflate can be readily prepared from copper (II) triflate (which is commercially available) by reaction of the copper (II) with the copper (0).

The use of either of the triflate or hexafluorphosphate anions demonstrates that when the counter ion is selected so that bridging between metal centers through the ion is not possible, thus by controlling the architecture of the catalyst, it is possible to alter the reactivity of the catalyst. This is a general concept which can be extended to other transition metals useful in ATRP. Additional preferred counter ions that can be considered include the tetrasubstituted borates, such as tetrafluoroborate, tetra(perfluoroaryl)borate, etc.

Carboxylate Counter Ion

The use of Cu (I) carboxylates was explored. The use of the acetate counter ion (Cu(I)OAc), a non-radically transferable group, results in polymers with slightly higher than expected molecular weights and with broader polydispersities than obtained with Cu (I) Br. Addition of a small amount of Cu (I) Br or Cu (II) $Br_2$ to the polymerization mixture containing Cu (I) acetate results in a polymer with markedly lower polydispersities, $M_w/M_n$~1.2. However, the rates of polymerization are nearly twice as slow with added CuBr than without. These results inform the chemist that one may sacrifice narrow molecular weight distributions for increased rates of polymerization.

Another copper carboxylate that can be used is copper (I) 2-thiophenecarboxylate (Tc). This counter ion can also act as a ligand by coordination between the sulfur atom on the thiophene ring and the copper (I). In fact, only one equivalent of dNbpy is required for the polymerization to proceed. With the use of CuTc, the obtained molecular weights are slightly higher than predicted, but the polydispersities are quite narrow, $M_w/M_n$=1.2.

There are numerous examples of ligands similar to the Tc ligand, which contain both an anion and a pair of electrons that can be used in the present process to coordinate to the transition metal and act as a ligand as well as counterion. Some examples include: 8-oxyquinoline, mono and multiply substituted picolinates, thiocyanates, etc.

Differing Radically Transferable Groups on Initiator and Metal

When benzyl halide is used as an initiator to polymerize methyl methacrylate using a copper (I)-X catalyst, where X=the halogen on the benzyl halide, there is poor molecular weight control and high polydispersities are obtained, $M_w/M_n$>1.5. This was attributed to the slow rate of initiation of MMA by use of a benzyl halide. This is due to the slower apparent rate of monomer addition at the benzyl halide compared to the apparent rate of monomer addition at the 2-bromoisobutyryl group, i.e., the MMA chain end ($K_{eq}k_i$>$K_{eq}'k_p$, where $k_i$ is the rate constant of addition of the initiator radical to the monomer, $K_{eq}$ is the equilibrium constant for the initiator/initial copper complex, $k_p$ is the rate constant of addition of the propagating radical to the monomer, $K_{eq}'$ is the equilibrium constant for the polymer chain end/copper complex(es)). This difference in rates of activation/addition results in a high proportion of MMA being polymerized before all the initiator is consumed. The result is a polymerization that does not obey the equation, $DP=\Delta[M]/[I]_o$; i.e, the polymerization is not fully controlled.

Model studies by the present inventors have shown that when 1-phenylethyl chloride is heated in solution with copper (I) bromide (and vice versa), a mixture of 1-phenylethyl chloride and 1-phenylethyl bromide is obtained. It was also known from previous work by the inventors that when bromine is used as the radically transferable group, there is a faster polymerization than with chlorine, when the polymerization is carried out at the same temperature. This is due to the difference in bond dissociation energies (BDE) for the carbon-halogen bond: (BDE) C—Cl>(BDE)C—Br.

When benzyl bromide is used as the initiator in ATRP, and copper (I) chloride the catalyst, a controlled polymerization of MMA is obtained. The proposed mechanism is that due to the lability of the carbon-bromine bond, there is fast initiation. However, as the two halogens exchange during propagation, the difference between the apparent rates of addition of monomer at the two ends (initiator vs. polymer chain end) becomes less and therefore allows for a controlled polymerization. It appears that the exchange of end groups is dynamic, so that the chains all grow at nearly the same rate. Similar results are obtained when 2-halopropionates are used as the initiator and the metal center is either copper (I) chloride or bromide.

The application of these model studies to macromolecules results in the clean formation of blocks of monomer(s) where the resulting polymer chain end is more reactive towards the catalysts than the initiating sites on a macroinitiator containing a less efficient initiator group. Such examples include the use of copper (I) chloride to initiate the polymerization of MMA using bromine terminated poly (acrylate) or poly(styrene) macroinitiators. This allows for the controlled polymerization of MMA from nearly any type of initiating site.

Effect of Added Salts

Salts can be added to the reaction mixture of the present invention to adjust the polarity of the solvent, and thus change the catalyst structure/reactivity. The counter ion of the salt, which may or may not be a radically transferable atom or group, and which may or may not be the same as other groups in the system, can coordinate, or react, with the transition metal to form a different metal species. The formation of this species can then in turn affect the relative concentration of any other species in solution, if there are more than one. This has been demonstrated with the use of tetrabutylammonium bromide to generate the $[Cu(I)Br_2]^-$ species, which is unreactive towards alkyl halides for atom transfer radical reactions. This thus lowers the concentration of the active copper (1) species and therefore lowers the rate of polymerization.

Salts that do not modify the rate of polymerization, i.e., do not coordinate with the transition metal, can also be used as initiators, provided that they contain a radically transferable atom or group. Additionally, the salt may contain an inorganic component, or may be organic.

The counterion of the salt can contain halide as a radically transferable group. The salt can optionally contain one or more non-radically transferable atoms or groups as counterions in the salt. Suitable salts include metal and non-metal oxides, ammonium halides (such as tetraalkylammonium halides), phosphonium halides, nitrates, triflates, halides and pseudohalides, etc.

Effect of Solvent on ATRP

The rate of polymerization in ATRP can be greatly enhanced by using a polar, non-coordinating, solvent. The use of solvents, such as ethylene carbonate or propylene carbonate, can increase the rate of ATRP polymerization. Using the solvent ethylene carbonate yields a polymerization which is fast while still maintaining low polydispersities. This result allows for the time of polymerization to be shortened and still obtain very well defined polymer.

Similarly, the rate of polymerization of 2-hydroxyethyl methacrylate (HMEA) appears to be significantly faster than that of methyl methacrylate (MMA). This rate enhancement is attributed to the increase in polarity of the reaction medium due to the hydroxyl groups of the monomer/polymer. In fact, this rate appears to be too fast for controlled polymerization, as the polydispersities of the final polymer are significantly higher than that obtained in the polymerization of MMA. This would suggest that the ratio of propagation to deactivation ($k_p[M]/k_d[X-M_t^{n+1}]$) is too high.

To slow the rate of polymerization and obtain a controlled polymerization the reaction can be performed in DMF and/or in the presence of a salt or excess deactivator in addition to changing the ligand. These reaction conditions described later exemplify some methods to significantly slow down the rate of polymerization and are successful in preparing well-defined poly(HEMA).

Additional Parameters that Offer Control Over ATRP

All normal process variables can have an effect on ATRP. Temperature can change or modify catalyst structure and reactivity, higher temperature can lead to higher molecular weight polymer. Control over reaction medium polarity by ligands, counterion, salts and solvents affect catalyst structure and reactivity. Slow addition of initiator, or a component of the catalyst, can be used to control the rate of initiation. In conjunction with the additional methods for control over the ATRP process described in this text, these tools can be used to tailor catalyst activity to the requirements of the monomers.

Interactions of Propagating Radicals in Conventional Free Radical Polymerization with Cu(I) X There is no noticeable interaction between the propagating styryl radical and a metal in the lower oxidation state, e.g., Cu (I) X. In addition, the polymer tacticities and copolymer reactivity ratios obtained by ATRP and by conventional free radical polymerization are similar for the polymerization of styrene, methyl acrylate and methyl methacrylate. Thus the results suggest that ATRP is a radical polymerization.

We have now found that for acrylates and acrylonitrile, there is an effect when Cu (I) X/bpy is added to an AIBN initiated polymerization. The molecular weights that are obtained are lower when Cu (I) X/bpy is added, as are the polydispersities. Since the kinetic chain length is defined as $R_p/R_t$ (rate of polymerization/rate of termination) for a chain polymerization, one can conclude that the rate of propagation is reduced due to interactions between the propagating radical and the Cu (I) X/bpy complex.

It appears that this interaction occurs to a significant degree, enough to affect the molecular weights in a conventional free radical polymerization for acrylates and acrylonitrile. Any reaction between styryl and methacrylic radicals with Cu(I) most likely occurs at rates which do not significantly affect the kinetics and molecular weights. This finding may be significant in the design of future catalysts/materials. This interaction between a lower oxidation state metal and the propagating radical is a novel method for affecting the molecular weight of the resulting polymer chain without the use of chain transfer agents.

While there is no observed effect when methyl acrylate is polymerized in the presence of copper (II) triflate, the polymerization of styrene using AIBN, in the presence of copper (II) triflate does reduce the molecular weight of the polymer. Since the triflate group can not be transferred to the propagating radicals in either system, only electron transfer can occur. Therefore, in the case of styrene, the styrene radical is oxidized to a cation and the copper reduced to copper (I).

Similarly, the methyl acrylate radical can be reduced to the anion and the copper (I) oxidized to copper (II). A similar electron transfer reaction was also observed in the reaction of bromoacetonitrile and copper (I). Formation of the copper (II) is observed to be extremely fast, even at −78° C., indicative of an outersphere electron transfer reaction between copper (I) and the bromoacetonitrile and/or resulting radical. Such an electron transfer reaction is expected to occur in the polymerization of acrylonitrile and is considered a side reaction.

Initiators

Preparation of Initiators

Initiators for ATRP can be prepared by a variety of methods. Since all that is needed for an ATRP initiator is a radically transferable atom or group, such as a halogen, standard organic synthetic techniques can be applied to preparing ATRP initiators. Some general methods for preparing ATRP initiators will be described here. In general the initiators can have the general formula:

$$Y\text{---}(X)_n$$

wherein Y is the core of the molecule and X is the radically transferable atom or group. The number n can be any number 1 or higher, depending on the functionality of the core group Y. For example, when Y is benzyl and X is bromine, with n=1, the resulting compound is benzyl bromide. If Y is a phenyl moeity having a $CH_2$ group attached to each carbon of the phenyl ring and X is Br with n=6, the compound is hexa(bromomethyl) benzene, a hexafunctional initiator useful for the preparation of six polymer chains from a single initiator.

As a first division of the initiator types, there are two classes, small molecule and macromolecule. The small molecule initiators can be commercially available, such as benzylic halides, 2-halopropionates and 2-haloisobutyrates, 2-halopropionitriles, α-halomalonates, tosyl halides, carbon tetrahalides, carbon trihalides, etc. Of course, these functional groups can be incorporated into other small molecules. The incorporation of these functional groups can be done as a single substitution, or the small molecule can have more than one initiating site for ATRP. For example, a molecule containing more than one hydroxyl group, can undergo an esterification reaction to generate α-haloesters which can initiate ATRP. Of course, other initiator residues can be introduced as are desired. The small molecules to which the initiators are attached can be organic or inorganic based; so long as the initiator does not poison the catalyst or adversely interact with the propagating radical it can be used. Some examples of small molecules that were used as a foundation for the attachment of initiating sites are polydimethylsiloxane cubes, cyclotriphosphazene rings, 2-tris(hydroxyethyl)ethane, glucose based compounds, etc. Additionally, trichloromethyl isocyanate can be used to attach an initiator residue to any substance containing hydroxy, thiol, amine and/or amide groups.

Macroinitiators can take many different forms, and can be prepared by different methods. The macroinitiators can be soluble polymers, insoluble/crosslinked polymeric supports, surfaces, or solid inorganic supports. Some general methods for the preparation of the macroinitiators include modification of an existing material, (co)polymerization of an AB* monomer by ATRP/non-ATRP methods, or using initiators (for other types of polymerization) that contain an ATRP initiator residue. Again, modification of macromolecular compounds/substrates to generate an ATRP initiation site is straightforward to one skilled in the art of materials/polymer modification. For example, crosslinked polystyrene with halomethyl groups on the phenyl rings (used in solid-phase peptide synthesis), attached functional molecules to silica surfaces, brominated soluble polymers (such as (co) polymers of isoprene, styrene, and other monomers), or attached small molecules containing ATRP initiators to polymer chains can all be used as macromolecular initiators. If one or more initiating sites are at the polymer chain ends, then block (co)polymers are prepared; if the initiating sites are dispersed along the polymer chain, graft (co)polymers will be formed.

AB* monomers, or any type of monomer that contains an ATRP initiator residue, can be (co)polymerized, with or without other monomers, by virtually any polymerization process, except for ATRP to prepare linear polymers with pendant B* groups. The only requirement is that the ATRP initiator residue remains intact during and after the polymerization. This polymer can then be used to initiate ATRP when in the presence of a suitable vinyl monomer and ATRP catalyst. When ATRP is used to (co)polymerize the AB* monomers, (hyper)branched polymers will result. Of course, the macromolecules can also be used to initiate ATRP.

Functionalized initiators for other types of polymerization systems, i.e., conventional free radical, cationic ring opening, etc., can also be used. Again, the polymerization mechanism should not involve reaction with the ATRP initiating site. Also, in order to obtain pure block copolymers, each chain of the macroinitiator must be initiated by the original functionalized initiator. Some examples of these type of initiators would include functionalized azo compounds and peroxides (radical polymerization), functionalized transfer agents (cationic, anionic, radical polymerization), and 2-bromopropionyl bromide/silver triflate for the cationic ring opening polymerization of tetrahydrofuran.

The ATRP initiators can be designed to perform a specific function after being used to initiate ATRP reactions. For example, biodegradable (macro)initiators can be used as a method to recycle or degrade copolymers into reusable polymer segments. An example of this would be to use a difunctional biodegradable initiator to prepare a telechelic polymer. Since telechelic polymers can be used in step-growth polymerizations, assuming properly functionalized, linear polymers can be prepared with multiple biodegradable sites along the polymer chains. Under appropriate conditions, i.e., humidity, enzymes, etc., the biodegradable segments can break down, and the vinyl polymer segments recovered and recycled. Additionally, siloxane containing initiators can be used to prepare polymer with siloxane end groups/blocks. These polymers can be used in sol-gel processes.

It is also possible to use multifunctional initiators having one or more initiation sites for ATRP and one or more initiation sites capable of initiating a non-ATRP polymerization. The non-ATRP polymerization can include any polymerization mechanism, including, but not limited to, cationic, anionic, free radical, metathesis, ring opening and coordination polymerizations. Exemplary multifunctional initiators include, but are not limited to, 2-bromopropionyl bromide (for cationic or ring opening polymerizations and ATRP); halogenated AIBN derivatives or halogenated peroxide derivatives (for free radical and ATRP polymerizations); and 2-hydroxyethyl 2-bromopropionate (for anionic and ATRP polymerizations).

Reverse ATRP is the generation, in situ, of the initiator containing a radically transferable group and a lower oxidation state transition metal, by use of a conventional radical initiator and a transition metal in a higher oxidation state associated with a radically transferable ligand (X), e.g., Cu (II) Br$_2$, using the copper halide as a model. When the conventional free radical initiator decomposes, the radical formed may either begin to propagate or may react directly with the $M^{n-1} X_y L$ (as can the propagating chain) to form an alkyl halide and $M^n X_{y-1} L$. After most of the initiator/$M^{n+1} X_y L$ is consumed, predominately the alkyl halide and the lower oxidation metal species are present; these two can then begin ATRP.

Previously, Cu(II)X$_2$/bpy and AIBN have been used as a reverse ATRP catalyst system. (U.S. patent application Ser. No. 08/414,415 Matyjaszewski, K.; Wang, J.-S. Macromolecules, 1995, 28, 7572.) However, molecular weights were difficult to control and polydispersities were high. Also, the ratio of Cu(II) to AIBN was high, 20:1. The present invention provides an improved reverse ATRP process using dNbpy, to solubilize the catalyst, which leads to a significant improvement in the control of the polymerization and reduction in the amount of Cu(II) required.

Reverse ATRP can now be successfully used for the "living" polymerization of monomers such as styrene, methyl acrylate, methyl methacrylate, and acrylonitrile. The polymer molecular weights obtained agree with theory and polydispersities are quite low, $M_w/M_n \leq 1.2$. Due to the enhanced solubility of the Cu(II) by using dNbpy, as the ligand, the ratio of Cu(II):AIBN can be drastically reduced to a ratio of 1:1. Unlike standard AIBN initiated polymerizations, the reverse ATRP initiated polymers all have identical 2-cyanopropyl (from decomposition of AIBN) head groups and halogen tail groups which can further be converted into other functional groups. Additionally, substituents on the free radical initiator can be used to introduce additional functionality into the molecule.

The radical initiator used in reverse ATRP can be any conventional radical initiator, including but not limited to, organic peroxides, organic persulfates, inorganic persulfates, peroxydisulfate, azo compounds, peroxycarbonates, perborates, percarbonates, perchlorates, peracids, hydrogen peroxide and mixtures thereof. These initiators can also optionally contain other functional groups that do not interfere with ATRP.

Novel Polymers
New Acrylic Polymers by ATRP

There have been few reports of the synthesis of water soluble polymers by living polymerization. This is generally due to the fact that the functional groups on the repeat units which make the polymer soluble in water are susceptible to reaction with the propagating active center (cation or anion). By using radical polymerization this problem can be avoided. This is demonstrated in the present invention by polymerizing 2-hydroxyethyl acrylate with ATRP resulting in the successful preparation of a water soluble polymer. Molecular weight control is excellent and polydispersities are quite narrow. This polymerization can also be carried out in water demonstrating the robust nature of ATRP. Also, 2-hydroxyethyl methacrylate has been successfully polymerized using ATRP.

Glycidyl acrylate can also be polymerized using ATRP. The final material is well defined and $^1$H NMR shows that the glycidyl groups remain unaffected by the polymerization conditions. Other acrylic monomers that can be polymerized include, but are not limited to, vinyl acrylate, allyl acrylate, isobornyl acrylate, t-butyl acrylate (masked acrylic acid) and 2-(dimethylamino)ethyl methacrylate. Also, 3-(trimethoxysilyl)propyl methacrylate can be copolymerized with butyl acrylate by ATRP to form oligomers. These materials are found to crosslink upon exposure to ambient moisture demonstrating their potential use as solventless coatings.

Statistical Copolymers (Spontaneous Gradient Copolymers)

These copolymers are formed by the random copolymerization of two or more monomers. These polymers incorporate the differing monomers by Markovian statistics. The rate of incorporation of the respective monomers is dependent on the reactivity ratios of the monomers with respect to each other. In living polymerizations, where all chains are initiated at nearly the same time and there is no chain termination, gradient copolymers can be formed. This occurs when there is a molar imbalance between the monomers, or if one is preferentially consumed before the other(s). If there is an excess of a monomer(s) after the other(s) has been consumed, then the polymer chain continues to grow adding only the final, remaining monomer(s). This results in the formation of a block at the end of the polymer chain; in essence a gradient copolymer has been formed. The present invention provides a method for the synthesis of statistical copolymers, preferably those of styrene/acrylonitrile, styrene/butyl acrylate, and methyl acrylate/vinyl acetate. Additionally, copolymers with more than two components are possible.

Copolymers can be prepared with a wide variety of compositions, with excellent molecular weight control and very low polydispersities, $M_w/M_n<1.15$. Due to the "living" nature of the polymerization, all polymer chains are expected to have nearly the same composition and gradient along the polymer chain. This near uniform composition among the polymer chains is nearly impossible to obtain in conventional free radical polymerizations. In conventional free radical (co)polymerizations, one usually obtains a mixture of polymer chains consisting of homopolymer or a distribution of compositions. Polymer chains with identical compositions can only be formed under azeotropic conditions by conventional free radical polymerizations; azeotropic conditions are found for only one ratio of monomer A: monomer B. [N.B.: the narrow molecular weight distribution as obtained in the Examples below can only be obtained by "living" polymerizations. Also, in the ionic systems, statistical copolymers can not be formed due to large differences in the reactivity ratios between ionically polymerizable monomers.] The copolymer of methyl acrylate and vinyl acetate is also the first demonstrated use of vinyl acetate in ATRP.

Controlled (Forced) Gradient Copolymers

In statistical (or spontaneous gradient) copolymers, the change in polymer composition occurs as a result of the monomer feed composition varying with conversion as one monomer is consumed faster than the other(s) in the reaction mixture. This results in little control of the gradient's position and rate of change along the polymer chain. Gradient copolymers can also be prepared by controlled addition of comonomer(s) to the reaction mixture. By controlling the rate of monomer addition, it is possible to control the instantaneous composition, or gradient, of the two monomers along the polymer backbone. For living polymerizations, the chain grows at a uniform rate with no termination. Due to the lack of termination, when a monomer is added to the feed it will become incorporated into the polymer chain. This process was demonstrated by, but is not limited to, copolymers with styrene/butyl acrylate and styrene/acrylonitrile systems for the preparation of copolymers with different instantaneous gradients of composition along the chain.

As can be seen from the experimental data, the polymers have very good molecular weight control with narrow polydispersities, indicating a living polymerization. Also, the concentration of the added monomer can be seen to change along the polymer backbone, demonstrating control over the synthesis of a gradient copolymer.

A gradient copolymer can also be prepared using a difunctional or multifunctional initiator. This gradient copolymer would not gradually change composition along the backbone from one end to another, but rather be symmetrical, with the composition change emanating from the center of the polymer chain in the case of difunctional initiators. This material may have even more unique properties than the simple linear gradient copolymers described above.

Functional gradient copolymers can also be prepared by ATRP. This is demonstrated using a glycidyl residue as an initiator and bromine as the radically transferable group. Later, the bromine group is successfully transformed to an azide group by reaction with trimethylsilyl azide in the presence of tetrabutylammonium fluoride.

Alternating Copolymers

Alternating copolymers exemplified by copolymers of isobutene/acrylonitrile, isobutene/butyl acrylate and styrene/N-cyclohexyl maleimide (NCM) can also be prepared by ATRP. These monomers form strongly alternating microstructures due to the large difference in their reactivity ratios. The styrene/NCM copolymers are useful for high temperature applications due to its high $T_g$ (270° C.) and decomposition temperature (430°C.). The isobutene/acrylonitrile copolymers are useful as self plasticizing acrylonitrile, and aid in its thermal properties. Isobutene and butyl acrylate were also successfully alternatively copolymerized.

The alternating nature of the polymers was confirmed by mass spectrometry as demonstrated in the example below. The polymer composition was calculated on the observed molecular weights in the obtained spectra. It was determined that the composition was nearly 50:50, or 40:60, as was also determined by $^1$H NMR. Additionally, a small block of BA was added to the end of the polymer chain resulting in a 40:60 ratio of IB/BA.

Block Copolymers

Block copolymers containing butyl acrylate were prepared with styrene and 2-hydroxyethyl acrylate. Styrene/butyl acrylate block copolymers were prepared by first polymerizing styrene by ATRP, followed by addition of butyl acrylate after complete consumption of the styrene. This method of block copolymer formation yielded well defined block copolymers. These materials may find use as blend compatiblizers or as rubbers.

A block copolymer of butyl acrylate and 2-hydroxyethyl acrylate was prepared by ATRP of butyl acrylate followed by addition of 2-hydroxyethyl acrylate. This material may find use as a novel hydrophobic/hydrophilic material, or as a surfactant.

ABC triblock copolymers can also be formed, such as an ABC block copolymer of MMA/BA/Styrene. This can be formed with the initiator residue residing on the MMA end or on the Styrene end. This would result in the radically transferable atom or group ending up on the Styrene end or the MMA end, respectively. All acrylate ABA block copolymers are also available using the present technology, such as MMA/BA/MMA copolymers.

Although simple sequential addition of monomers is usually successful in the preparation of block copolymers of ATRP polymerizable monomers, it is sometimes difficult to switch from one type of monomer to another. This is attributed to the differences in the rate of activation of the polymer chain ends for the two different types of monomer. As described above, if the monomer being added has a higher ka value than the macroinitiator, then inefficient polymerizations will be observed. This is exemplified in the polymerization of MMA initiated by polystyrene. To overcome this difficulty, exchange of the halogens can be utilized (see above), or a "switching" monomer can be used. This monomer, ideally, will not homopolymerize but can be copolymerized, and has a $k_a$ comparable to or greater than that of the second monomer. At the end of polymerization of monomer A, the switching monomer is added. Since this monomer can not homopolymerize, only one unit is added. The polymer is then isolated and used to initiate the polymerization of monomer B. Some examples of this type of switching monomer can include sulfur dioxide, alkylidene malonates, diphenyl ethylene, etc.

Block copolymers can also be synthesized with polymers that are initially prepared by ring opening polymerization. Suitable monomers for such ring opening polymerization reactions include, but are not limited to, cyclic ethers (such as tetrahydrofuran), lactones (such as caprolactone), lactams (such as caprolactam), cycloalkanes and cycloalkenes (such as norbornene and dicyclopentadiene), tricyclophosphorazene, tetradimethylsiloxane, trioxanes, epoxides, oxetanes, orthoesters, carbonates, acetals, imines, oxazolines and cyclic sulfides. The resulting polymers can be terminated by addition of a compound containing a radically transferable atom or group, such as 4-bromomethyl benzaldehyde. As an example, ring opening metathesis polymerization (ROMP) can be performed to prepare polymers from monomers such as polynorbornene and polydicyclopentadiene. These two polymers can be synthesized using a commercial molybdenum ROMP catalyst [Mo(CHCPhMe$_2$)(NAr)(O-t-Bu)$_2$ (Ar=2,6-diisopropylphenyl)]. The polymerization is terminated by addition of 4-bromomethyl benzaldehyde. Addition of this reagent gives a polymer with a benzyl bromide end group; thus a macroinitiator for ATRP. These macroinitiators can be used to prepare block copolymers with styrene and methyl methacrylate. These materials may have novel properties, and act as blend compatibilizers. For example, a polymer with one block soluble in polyolefins and the other in polystyrene containing some ester groups could find utility in compatibilization of municipal plastic waste streams.

One novel type of block copolymer that can be prepared with ATRP is the formation of block copolymers in which one, or more, blocks contains a charged species, such as a cation or an anion. An example of this would be a block copolymer of 2-(dimethylamino)ethyl methacrylate and (meth)acrylic acid. One of the blocks would be nucleophilic/basic (trialkyl amine) and the other acidic (carboxylic acid). Because of this dual composition, it would be expected that the alkyl amine would be protonated and the carboxylic acid would be its conjugate base, the carboxy anion; assuming that the pH is essentially neutral. At higher pH levels, the amine would be expected to be unprotonated, while the carboxy anion would still remain. At lower pH, the converse would be true; both the amine and the carboxylic acid would be protonated. Under neutral pH conditions, the material would be expected to behave as a gel, due to interchain complexation between the carboxy anions and the protonated amine chain segments. This gel formation would be reversible based on the pH levels; higher or lower pH levels would disrupt the complexation.

Depending on pH, the resulting polymers would include block copolymers in which one block contains carboxy anion groups (from the methacrylic acid units) and the other block contains dimethylaminoethyl groups; in which one block contains carboxy anion groups and the other contains protonated dimethylaminoethyl groups; in which one block contains carboxylic acid groups and the other contains dimethylaminoethyl groups; and in which one block contains carboxylic acid groups and the other contains protonated dimethylaminoethyl groups. Of course, using other monomers would result in similar types of block copolymers for those monomers.

Another type of block copolymer available through ATRP is an amphiphobic block copolymer having one block that is hydrophilic and another that is hydrophobic. Exemplary of this embodiment is the block copolymer formed from 2-ethylhexyl acrylate and perfluoroacrylate or the copolymer formed from 2-ethylhexyl acrylate and butyl acrylate.

Bottle brush polymers can be prepared when AB* monomers are linearly homopolymerized or a polymer chain is modified so that each repeat unit has an ATRP initiating site or a site that can be converted into an active ATRP initiator. An example would be the complete or partial esterification of the hydroxyl groups present on hydroxyethyl acrylate or a soluble or insoluble cellulosic material to form an ATRP macroinitiator. Using this macroinitiator to polymerize vinyl monomers results in the formation of polymer chains emanating from each repeat unit. The steric strain between each of the polymer chains forces them to twist along, or helically wrap around the macroinitiator backbone, like a bottle brush. This macromolecule can also be used to initiate ATRP, generating block (co)polymers on the grafts.

It is possible to make a polymer with segments of the polymer backbone having grafts of different composition. This can be done by using protecting groups in one segment of the polymer and ATRP initiating sites on other(s). After polymerization by ATRP, the halogens can be removed, and the protecting groups removed. If necessary, ATRP initiating residues can be added to the deprotected sites. Again ATRP is performed, but this time at the new initiating sites, resulting in a block copolymer of grafted chains.

Another method involves the preparation of a linear (co)polymer of AB* repeat units. Some, or all of the radically transferable atoms or groups can be replaced with TEMPO units. This would be accomplished by reaction of the polymer with the appropriate amount of M$_t^0$/ligand in the presence of TEMPO. The two different types of initiator sites, ATRP or TEMPO, can be used to grow grafts of differing composition due to the different polymerization mechanisms.

Starburst polymers, that is, hypergrafted copolymers where the grafts have grafts, which also may contain grafts, can be prepared by copolymerizing, using ATRP, a TEMPO AB* monomer, where the B* is a TEMPO group, with a protected ATRP AB* monomer. After deprotection, the ATRP AB* monomer can be used to grow grafts off of the linear polymer by using the same composition of ATRP AB* and TEMPO AB* monomers. Deprotection followed by ATRP, again with the same ATRP/TEMPO AB* monomer mixture, can be repeated as often as desired. The resulting molecule is one which has grafts on top of grafts (the grafts are the result of polymerization from the ATRP AB* repeat units); this polymer would be the scaffolding for the subsequent polymerization of grafts from the TEMPO AB* sites. The TEMPO AB* sites can now be used to initiate the (co)polymerization of styrenes to fill in the scaffolding built by the ATRP AB* polymerized sites. Thus, a starburst polymer can be formed.

Graft Copolymers

The following examples of graft copolymers, poly(ethylene-graft-styrene), poly(ethylene-graft-methyl methacrylate), poly(PVC-graft-styrene), poly(isobutene-graft-styrene), and poly(butyl-graft-styrene), demonstrate the use of commercially available polymers as macroinitiators after post polymerization modification by the use of small molecules, such as Br$_2$ or SOCl$_2$, or by copolymerization.

Chlorosulfonated polyethylene was used as a macroinitiator for the ATRP of styrene and methyl methacrylate. This led to the formation of styrene or methyl methacrylate grafts off of the polyethylene backbone. These specific representative materials may find use as compatibilizers for ethylene blends. These materials are used as examples for the broader concept of preparation of graft copolymers with polyolefin backbones, by use of olefins as macroinitiators for ATRP.

Poly(vinyl chloride-co-vinyl chloroacetate) (1% vinyl chloroacetate) was used as a macroinitiator for the ATRP of styrene. This leads to the formation of styrene or butyl acrylate grafts off of the PVC backbone. This material may find use as a compatibilizer for PVC blends. Also, this method leads to the synthesis of self plasticizing PVC, when the graft is a low Tg polymer, such as butyl acrylate, which may make PVC less susceptible to embrittlement as the polymer ages. These materials are used as examples for the preparation of graft copolymers with olefin backbones, by use of polyolefins as macroinitiators for ATRP.

Thermoplastic elastomers can be prepared by using commercially available isobutene or butyl rubber polymers as macroinitiators. The commercial product on which the polyisobutene macroinitiator is based is actually a p-methylstyrene/isobutene copolymer. The methyl groups of the styrene are brominated yielding benzylic bromide side groups on the polyisobutene chain. These groups are used to initiate the polymerization of styrene to obtain poly (isobutene-graft-styrene). Similarly, butyl rubber with allylic bromine groups was used to prepare poly(butene-graft-styrene). Both of these graft copolymers behave as thermoplastic elastomers.

Organic/Inorganic Copolymers

It is possible to prepare copolymers that contain segments or blocks, where at least one is comprised of an organic based polymer and the other(s) is comprised of an inorganic polymer. This can be accomplished by one of two methods: use of a macroinitiator for ATRP that is the inorganic polymer or by polymerization of macromonomers that are inorganic polymers but contain end groups that are radically polymerizable vinyl groups. The use of an inorganic macroinitiator is exemplified by using either a poly (dimethylsiloxane) macroinitiator to prepare block or graft copolymers by ATRP; polyphosphazene macroinitiators are used to prepare graft copolymers. Polydimethylsiloxane macromonomers were prepared by anionic polymerization of cyclic hexamethylcyclotrisiloxane and quenching with 4-(chlorodimethylsilylethyl)styrene.

Additionally, ATRP was initiated from small molecules of dimethylsiloxane in the shape of cubes. These materials can be used in solgel processes to prepare crosslinked silica regions and uncrosslinked organic polymer regions in bulk materials.

Graft copolymers of polyphosphazene can be prepared by first ring opening polymerization of cyclic hexachlorotriphosphazene followed by treating with nucleophiles that contain ATRP initiating residues. The cyclic hexachlorotriphosphazene can itself be used to initiate ATRP when properly substituted. Such an initiator can have more than one arm, forming star (co)polymers.

Functional Groups

We will use the nomenclature convention that the functionality associated with the initiator residue resides at the tail of the polymer chain and the radically transferable group is at the head. We have confirmed through the use of various initiators, that one can produce a wide variety of polymers with similar or differing head and tail groups. These end groups can be directly used for a wide range of applications. These include: vinyl or allyl groups for macromonomer synthesis, epoxide groups for later condensation with amines, etc., cyano groups as latent amine functional groups, amine, carboxylic and hydroxy groups in surface adhesion/reactive polymers, and telechelic polymers.

When the radically transferable atom employed is a halogen, it is possible to perform simple reactions to transform the halogen to a more useful functionality. This has been demonstrated by the transformation of the halogen to an azide, and from azide to amino. Additionally, the alkyl halogen has been transformed to secondary, tertiary and quatemary amines by simple reaction of the alkyl halide with a small molecule amine, i.e., aminoethanol. As can be seen, one skilled in the art of organic chemistry can develop a wide variety of transformation methodologies for conversion of the halogen to other functional groups.

Transformation of Halogens

Simple Polymers

It is well known in chemistry that halogens are generally good leaving groups for various types of chemistry, such as nucleophilic and electrophilic substitution reactions, radical reactions and in various metal mediated coupling reactions, i.e., Stille reactions, etc. As such it is possible to transform the resulting halogen end groups of the polymer chains to other, more useful functional groups. Some demonstrated examples include nucleophilic substitution with the desired nucleophile ($N_3^-$, $HO^-$, etc.). In some cases, additional chemical reactions can be conducted to further transform the new functional group, i.e., reaction of azide functional polymers with triphenylphosphine to form the phosphoranimine, followed by hydrolysis to form the primary amine. Replacement of the halogen by nucleophilic substitution does not require the use of a naked nucleophile but can use basic organic reagents, such as amines. The amines can be substituted with functional groups prior to reaction with the halogen end group; other functional groups can be introduced in this manner, e.g. reaction of halogen end group with ethanol amine to introduce a hydroxy group. The use of telechelic polymers ((meth)acrylics, styrenes, acrylonitriles, etc. homopolymers and copolymers) can subsequently be used in chain extension reactions, i.e., formation of polyurethanes, polyamides, polyesters, etc.

Further radical reactions can be performed using the halogen end group to introduce functionality or to remove the halogen. Such reactions can include the use of the transition metal used in the polymerization to generate a radical which can then participate in various, known radical reactions for small molecules. These reactions can be reaction with a hydrogen transfer reagent to form a hydrogen end capped polymer, reaction with carbon dioxide in the presence of a hydrogen transfer reagent (forms an aldehyde), reaction with CO in presence of an alkene and proton transfer agent (forming a ketone), reaction with allyl stannane to form an allyl terminated polymer, etc. If the generated radical is captured by use of a stable free radical, such as the well known nitroxide radicals, the resulting polymer/compound can be used to initiate free radical polymerizations upon thermal decompostion of the carbon-nitroxide bond; these nitroxide initiators can also be used to obtain a "living"/controlled radical polymerization, but by a different mechanism.[Solomon, D. H.; Rizzardo, E; Cacioli, P. U.S. Pat. No. 4,581,429 1985; Hawker, C. J. *J. Amer. Chem. Soc.* 1994, 116, 11314; Hawker, C. J.; Barclay, G. G.; Orellana, A.; Dao, J.; Devonport, W. *Macromolecules* 1996, 29, 5245] Transition metal mediated coupling reactions between alkyl halides and/or substituted stannanes are well known, i.e., Suzuki, Stille, etc. couplings, as simple methods for forming carbon-carbon bonds, and which are generally not detrimental to functional groups, i.e., acrylic esters.

Functionalization of Hyperbranched Polymers

It has been demonstrated that the bromine end groups of a hyperbranched polymer can be replaced with azide groups trimethylsilyl azide/tetrabutylammonium fluoride. These materials can be used as crosslinking agents by decomposition of the azide groups to form reactive nitrenes by either thermal or WV degradation. These materials may find use in solventless coatings applications due to the low viscosity of the hyperbranched polymer and its high number of functional groups. It is obvious to one skilled in the art, that the functional groups introduced to the hyperbranched material need not be limited to azides but can be other as well.

The highly functionalized hyperbranched polymers may be used either by themselves or in conjunction with a telechelic polymer(s). The functional groups on the hyperbranched polymer and the telechelic polymer must be complimentary, so as to form a covalent bond between the two polymers. By using the telechelic polymers, the density of crosslinks are not as dense as if the hyperbranched polymers were crosslinked themselves, i.e. decomposition of the azides. Also, the crosslinking sites are not random, as in the preparation of crosslinked materials with divinyl comonomers, but are concentrated at nodes (the hyperbranched polymer). The flexibility/brittleness of the resulting material would be dependent on the concentration of hyperbranched polymer added, and the glass transitions of both the hyperbranched polymer and the telechelic polymer (s). The telechelic polymer can be a homopolymer, a random copolymer, a block copolymer, a gradient copolymer, and may have functional groups present that would not interact with the functional groups on either the hyperbranched or the telechelic polymer. Further control of the crosslinked polymer's final mechanical/physical properties can also be obtained by the number of reactive sites on the hyperbranched polymer and/or the molecular weight of the telechelic polymer.

EXAMPLES

Having generally described this invention, a further understanding can be obtained by reference to certain specific examples which are provided herein for purposes of illustration only and are not intended to be limiting unless otherwise specified.

It should be noted that in the Examples, the $M_n$s reported were obtained using Size Exclusion Chromatography (SEC) with retention times of unknown samples compared to linear polystyrene standards. It is known that branching results in a smaller hydrodynamic volume, and in turn, longer retention times in SEC. This yields a lower apparent molecular weight when compared to linear analogs.

Polymerization with Zero Valent Iron Catalyst(s)
Fe(0) Alone

Example 1
Bulk Polymerization of Styrene using $Fe^0/PPh_3$

Iron powder (10 mg), triphenyl phosphine (69 mg), styrene (1.0 ml) and 1-phenylethyl bromide (12 μL) were charged to a dry glass tube. A stir bar was added and the contents of the tube were degassed by freeze-pump-thaw (3x). The tube was then sealed under vacuum and the tube placed in an oil bath thermostatted at 110° C. for nine hours. The contents of the tube had become viscous. The tube was opened and the contents dissolved in THF. Conversion of the monomer was 70%. $M_n$=6,780; $M_w/M_n$=1.19.

Example 2
Bulk Polymerization of Styrene Using $Fe^0/NBu_3$

Iron powder (10 mg), tributyl amine (63 μL), styrene (1.0 ml) and 1-phenylethyl bromide (12 μL) were charged to a dry glass tube. A stir bar was added and the contents of the tube were degassed by freeze-pump-thaw (3x). The tube was then sealed under vacuum and the tube placed in an oil bath thermnostatted at 110° C. for nine hours. The contents of the tube had become viscous. The tube was opened and the contents dissolved in THF. Conversion of the monomer was 62%. $M_n$=6,400; $M_w/M_n$=1.51.

Example 3
Bulk Polymerization of Styrene Using $Fe^0$/N,N-Dimethylformamide

Iron powder (10 mg), N,N-dimethylformamide (100 μL), styrene (1.0 ml) and 1-phenylethyl bromide (12 μL) were charged to a dry glass tube. A stir bar was added and the contents of the tube were degassed by freeze-pump-thaw (3x). The tube was then sealed under vacuum and the tube placed in an oil bath thermostatted at 110° C. for nine hours. The contents of the tube had become viscous. The tube was opened and the contents dissolved in THF. Conversion of the monomer was 85%. $M_n$=8,960; $M_w/M_n$=1.33.

Example 4
Bulk Polymerization of Methyl Methacrylate Using $Fe^0/PPh_3$

Iron powder (6.0 mg), iron (II) bromide (34 mg), 4,4'-di (5-nonyl)-2,2'-bipyridine (15.4 mg), methyl methacrylate (5.0 ml), p-toluenesulfonyl chloride (9.0 mg), and o-xylene (5.0 ml) were charged to a dry flask. A stir bar was added, the flask sealed with a rubber septum, and the contents of the flask were degassed by sparging with argon. The flask was placed in an oil bath thermostatted at 80° C. for 18 hours. The contents of the tube had become viscous. The tube was opened and the contents dissolved in THF. Conversion of the monomer was 75%. $M_n$=75,100; $M_w/M_n$=1.24.

Example 5
Bulk Polymerization of Methyl Methacrylate Using $Fe^0/PPh_3$

Iron powder (5.3 mg), triphenyl phosphine (3.7 mg), methyl methacrylate (1.0 ml) and methyl 2-bromoisobutyrate (6.4 μL) were charged to a dry glass tube. A stir bar was added and the contents of the tube were degassed by freeze-pump-thaw (3x). The tube was then sealed under vacuum and the tube placed in an oil bath thermostatted at 80° C. for 2.25 hours. The contents of the tube had become viscous. The tube was opened and the contents dissolved in THF. Conversion of the monomer was 57%. $M_n$=5,200; $M_w/M_n$=1.78.

Example 6
Bulk Polymerization of Methyl Methacrylate Using $Fe^0$/dNbpy

Iron powder (5.3 mg), 4,4'-di(5-nonyl)-2,2'-bipyridine (38.2 mg), methyl methacrylate (1.0 ml) and p-toluenesulfonyl chloride (9.0 mg) were charged to a dry glass tube. A stir bar was added and the contents of the tube were degassed by freeze-pump-thaw (3x). The tube was then sealed under vacuum and the tube placed in an oil bath thermostatted at 80° C. for 0.8 hours. The contents of the tube had become viscous. The tube was opened and the contents dissolved in THF. Conversion of the monomer was 60%. $M_n$=6,300; $M_w/M_n$=2.07.

Example 7
Bulk Polymerization of Styrene Using $Fe^0$ without Ligand

Iron powder (10 mg), styrene (1.0 ml) and 1-phenylethyl bromide (12 μL) were charged to a dry glass tube. A stir bar was added and the contents of the tube were degassed by freeze-pump-thaw (3x). The tube was then sealed under vacuum and the tube placed in an oil bath thermostatted at 110° C. for 9 hours. The contents of the tube had become solid. The tube was opened and the contents dissolved in THF. Conversion of the monomer was 94%. $M_n$=84,600; $M_w/M_n$=2.8.

Fe(0)/Fe(n)

Example 8
Bulk Polymerization of Styrene Using $Fe^0/FeBr_2$/N,N-Dimethylformamide Iron powder (6 mg), iron (II) bromide (19 mg), N,N-dimethylformamide (100 µL), styrene (1.0 ml) and 1-phenylethyl bromide (12 µL) were charged to a dry glass tube. A stir bar was added and the contents of the tube were degassed by freeze-pump-thaw (3×). The tube was then sealed under vacuum and the tube placed in an oil bath thermostatted at 110° C. for seventeen hours. The contents of the tube had become viscous. The tube was opened and the contents dissolved in THF. Conversion of the monomer was 86%. $M_n$=9,860; $M_w/M_n$=1.22.

Example 9
Bulk Polymerization of Styrene Using $FeBr_2$/N,N-Dimethylformamide Iron (II) bromide (19 mg), N,N-dimethylformamide (100 µL), styrene (1.0 ml) and 1-phenylethyl bromide (12 µL) were charged to a dry glass tube. A stir bar was added and the contents of the tube were degassed by freeze-pump-thaw (3×). The tube was then sealed under vacuum and the tube placed in an oil bath thermostatted at 110° C. for twenty two hours. The tube was opened and the contents dissolved in THF. Conversion of the monomer was 29%. $M_n$=1,200; $M_w/M_n$=1.44.

Example 10
Bulk Polymerization of Styrene Using $Fe^0/FeBr_2$

Iron powder (2.0 mg), iron (II) bromide (6.3 mg), 4,4'-di(5-nonyl)-2,2'-bipyridine (35.6 mg), styrene (1.0 ml) and 1-phenylethyl bromide (4.0 µL) were charged to a dry glass tube. A stir bar was added and the contents of the tube were degassed by freeze-pump-thaw (3×). The tube was then sealed under vacuum and the tube placed in an oil bath thermostatted at 110° C. for twenty hours. The contents of the tube had become viscous. The tube was opened and the contents dissolved in THF. Conversion of the monomer was 59%. $M_n$=16,000; $M_w/M_n$=1.14.

Example 11
Bulk Polymerization of Styrene Using $FeBr_2$

Iron (II) bromide (19.0 mg), 4,4'-di(5-nonyl)-2,2'-bipyridine (71.2 mg), styrene (1.0 ml) and 1-phenylethyl bromide (12.0 µL) were charged to a dry glass tube. A stir bar was added and the contents of the tube were degassed by freeze-pump-thaw (3×). The tube was then sealed under vacuum and the tube placed in an oil bath thermostatted at 110° C. for twenty one hours. The contents of the tube had become viscous. The tube was opened and the contents dissolved in THF. Conversion of the monomer was 64%. $M_n$=6,470; $M_w/M_n$ 1.27.

Example 12
Bulk Polymerization of Styrene Using $Fe^0/FeBr_3$

Iron powder (10 mg), iron (III) tribromide (18.1 mg), 4,4'-di(5-nonyl)-2,2'-bipyridine (7.3 mg), styrene (1.0 ml) and 1-phenylethyl bromide (12 µL) were charged to a dry glass tube. A stir bar was added and the contents of the tube were degassed by freeze-pump-thaw (3×). The tube was then sealed under vacuum and the tube placed in an oil bath thermostatted at 110° C. for 9 hours. The contents of the tube had become viscous. The tube was opened and the contents dissolved in THF. Conversion of the monomer was 61%. $M_n$=6,540; $M_w/M_n$=1.15.

Polymerization with Zero Valent Copper Catalyst(s)
Cu(0) Alone

Example 13
Bulk Polymerization of Styrene Using $Cu^0$/2,2'-Bipyridine

Copper powder (6.4 mg), 2,2'-bipyridine (46.9 mg), styrene (1.14 ml) and 1-phenylethyl bromide (13.6 µL) were charged to a dry glass tube. A stir bar was added and the contents of the tube were degassed by freeze-pump-thaw (3×). The tube was then sealed under vacuum and the tube placed in an oil bath thermostatted at 110° C. for seven hours. The contents of the tube had become viscous. The tube was opened and the contents dissolved in THF. Conversion of the monomer was 81%. $M_n$=7,340; $M_w/M_n$=1.44.

Example 14
Bulk Polymerization of Styrene Using $Cu^0$/4,4'-di(5-nonyl)-2,2'-Bipyridine Copper powder (6.4 mg), 4,4'-di(5-nonyl)-2,2'-bipyridine (81.6 mg), styrene (1.14 ml) and 1-phenylethyl bromide (13.6 µL) were charged to a dry glass tube. A stir bar was added and the contents of the tube were degassed by freeze-pump-thaw (3×). The tube was then sealed under vacuum and the tube placed in an oil bath thermostatted at 110° C. for seven hours. The contents of the tube had become viscous. The tube was opened and the contents dissolved in THF. Conversion of the monomer was 98%. $M_n$=9,030; $M_w/M_n$=1.18.

Example 15
Bulk Polymerization of Styrene Using $Cu^0$/1,1,4,7,10,10-Hexamethyltriethylenetetramine Copper powder (6.4 mg), 1,1,4,7,10,10-hexamethyltriethylenetetramine (23.0 mg), styrene (1.14 ml) and 1-phenylethyl bromide (13.6 µL) were charged to a dry glass tube. A stir bar was added and the contents of the tube were degassed by freeze-pump-thaw (3×). The tube was then sealed under vacuum and the tube placed in an oil bath thermostatted at 110° C. for two hours. The contents of the tube had become viscous. The tube was opened and the contents dissolved in THF. Conversion of the monomer was 99%. $M_n$=12,500; $M_w/M_n$=1.38.

Example 16
Bulk Polymerization of Methyl Methacrylate Using $Cu^0$/dNbpy

Copper powder (6.4 mg), 4,4'-di(5-nonyl)-2,2'-bipyridine (81.6 mg), methyl methacrylate (1.07 ml) and p-toluenesulfonyl chloride (19.1 mg) were charged to a dry glass tube. A stir bar was added and the contents of the tube were degassed by freeze-pump-thaw (3×). The tube was then sealed under vacuum and the tube placed in an oil bath thermostatted at 70° C. for 0.5 hours. The contents of the tube had become solid. The tube was opened and the contents dissolved in THF. Conversion of the monomer was 93%. $M_n$=8,360; $M_w/M_n$=1.45.

Example 17
Bulk Polymerization of Methyl Methacrylate Using $Cu^0$/dNbpy

Copper powder (0.6 mg), 4,4'-di(5-nonyl)-2,2'-bipyridine (8.2 mg), methyl methacrylate (1.07 ml) and diethyl methyl bromomalonate (19.1 µL) were charged to a dry glass tube. A stir bar was added and the contents of the tube were degassed by freeze-pump-thaw (3×). The tube was then sealed under vacuum and the tube placed in an oil bath thermostatted at 70° C. for 7 hours. The contents of the tube had become solid. The tube was opened and the contents dissolved in THF. Conversion of the monomer was 81%. $M_n$=7,620; $M_w/M_n$=1.3 1.

Example 18
Bulk Polymerization of Methyl Acrylate Using Cu⁰/dNbpy

Copper powder (6.0 mg), 4,4'-di(5-nonyl)-2,2'-bipyridine (81.6 mg), methyl acrylate (1.07 ml) and diethyl methyl bromomalonate (19.1 µL) were charged to a dry glass tube. A stir bar was added and the contents of the tube were degassed by freeze-pump-thaw (3×). The tube was then sealed under vacuum and the tube placed in an oil bath thermostatted at 70° C. for 7 hours. The contents of the tube had become solid. The tube was opened and the contents dissolved in THF. Conversion of the monomer was 97%. $M_n$=14,500; $M_w/M_n$=1.31.
Cu(0)Cu(n)

Example 19
Bulk Polymerization of Styrene Using Cu⁰/CuBr

Copper powder (1.0 mg), copper (I) bromide (6.2 mg), 4,4'-di(5-nonyl)-2,2'-bipyridine (42.6 mg), styrene (1.14 ml) and 1-phenylethyl bromide (1.2 µL) were charged to a dry glass tube. A stir bar was added and the contents of the tube were degassed by freeze-pump-thaw (3×). The tube was then sealed under vacuum and the tube placed in an oil bath thermostatted at 110° C. for six hours. The contents of the tube had become viscous. The tube was opened and the contents dissolved in THF. Conversion of the monomer was 57%. $M_n$=57,200; $M_w/M_n$=1.33.

Example 20
Bulk Polymerization of Styrene Using Cu⁰/CuBr

Copper powder (0.06 mg), copper (I) bromide (1.5 mg), 4,4'-di(5-nonyl)-2,2'-bipyridine (8.2 mg), styrene (1.14 ml) and 1-phenylethyl bromide (13.6 µL) were charged to a dry glass tube. A stir bar was added and the contents of the tube were degassed by freeze-pump-thaw (3×). The tube was then sealed under vacuum and the tube placed in an oil bath thermostatted at 110° C. for seven hours. The contents of the tube had become solid. The tube was opened and the contents dissolved in THF. Conversion of the monomer was 90%. $M_n$=8,970; $M_w/M_n$=1.08.

Example 21
Bulk Polymerization of Styrene using Cu⁰/CuBr

Copper powder (0.6 mg), copper (I) bromide (14.5 mg), 4,4'-di(5-nonyl)-2,2'-bipyridine (82 mg), styrene (1.14 ml) and 1-phenylethyl bromide (13.6 µL) were charged to three dry glass tubes. A stir bar was added and the contents of the tubes were degassed by freeze-pump-thaw (3×). The tubes were then sealed under vacuum and the tubes placed in an oil bath thermostatted at 110° C. The tubes were removed periodically from the oil bath and opened and the contents dissolved in THF.

| Time (min) | Conversion | $M_n$ | $M_w/M_n$ |
| --- | --- | --- | --- |
| 45 | 0.63 | 6,440 | 1.09 |
| 105 | 0.75 | 7,450 | 1.08 |
| 180 | 0.85 | 8,360 | 1.09 |

Example 22
Bulk Polymerization of Methyl Acrylate Using Cu⁰/CuBr

Copper powder (0.06 mg), copper (I) bromide (0.6 mg), 4,4'-di(5-nonyl)-2,2'-bipyridine (8.2 mg), methyl acrylate (1.07 ml) and methyl 2-bromopropionate (11.1 µL) were charged to a dry glass tube. A stir bar was added and the contents of the tube were degassed by freeze-pump-thaw (3×). The tube was then sealed under vacuum and the tube placed in an oil bath thermostatted at 90° C. for three hours. The contents of the tube had become solid. The tube was opened and the contents dissolved in THF. Conversion of the monomer was 91%. $M_n$=8,830; $M_w/M_n$=1.23.

Example 23
Bulk Polymerization of Methyl Acrylate Using Cu⁰/CuBr

Copper powder (2.0 mg), copper (I) bromide (3.17 mg), 4,4'-di(5-nonyl)-2,2'-bipyridine (18.1 mg), methyl acrylate (1.07 ml) and methyl 2-bromopropionate (1.24 µL) were charged to a dry glass tube. A stir bar was added and the contents of the tube were degassed by freeze-pump-thaw (3×). The tube was then sealed under vacuum and the tube placed in an oil bath thermostatted at 90° C. for 1.5 hours. The contents of the tube had become solid. The tube was opened and the contents dissolved in THF. Conversion of the monomer was 64%. $M_n$=55,900; $M_w/M_n$=1.18.

Example 24
Bulk Polymerization of Methyl Acrylate Using Cu⁰/CuBr

Copper powder (3.0 mg), copper (I) bromide (3.17 mg), 4,4'-di(5-nonyl)-2,2'-bipyridine (18.1 mg), methyl acrylate (1.07 ml) and methyl 2-bromopropionate (1.24 µL) were charged to a dry glass tube. A stir bar was added and the contents of the tube were degassed by freeze-pump-thaw (3×). The tube was then sealed under vacuum and the tube placed in an oil bath thermostatted at 90° C. for 1.5 hours. The contents of the tube had become solid. The tube was opened and the contents dissolved in THF. Conversion of the monomer was 71%. $M_n$=58,400; $M_w/M_n$=1.18.

Example 25
Bulk Polymerization of Methyl Methacrylate Using Cu⁰/CuBr

Copper powder (0.06 mg), copper (I) bromide (0.6 mg), 4,4'-di(5-nonyl)-2,2'-bipyridine (8.2 mg), methyl methacrylate (1.08 ml) and p-toluenesulfonyl chloride (19 mg) were charged to a dry glass tube. A stir bar was added and the contents of the tube were degassed by freeze-pump-thaw (3×). The tube was then sealed under vacuum and the tube placed in an oil bath thermostatted at 90° C. for 3 hours. The contents of the tube had become solid. The tube was opened and the contents dissolved in THF. Conversion of the monomer was 93%. $M_n$=21,100; $M_w/M_n$=2.88.

Example 26
Bulk Polymerization of Methyl Methacrylate Using Cu⁰/CuBr

Copper powder (0.06 mg), copper (I) bromide (0.6 mg), 4,4'-di(5-nonyl)-2,2'-bipyridine (8.2 mg), methyl methacrylate (1.08 ml) and p-toluenesulfonyl chloride (19 mg) were charged to a dry glass tube. A stir bar was added and the contents of the tube were degassed by freeze-pump-thaw (3×). The tube was then sealed under vacuum and the tube placed in an oil bath thermostatted at 70° C. for 3 hours. The contents of the tube had become solid. The tube was opened and the contents dissolved in THF. Conversion of the monomer was 81%. $M_n$=7,860; $M_w/M_n$=1.09.

Example 27
Bulk Polymerization of Methyl Acrylate Using Cu⁰/CuBr

Copper powder (2.0 mg), copper (I) bromide (3.17 mg), 4,4'-di(5-nonyl)-2,2'-bipyridine (18.1 mg), methyl acrylate (1.07 ml) and methyl 2-bromopropionate (1.24 µL) were charged to a dry glass tube. A stir bar was added and the contents of the tube were degassed by freeze-pump-thaw (3×). The tube was then sealed under vacuum and the tube placed in an oil bath thermostatted at 90° C. for 1.5 hours.

The contents of the tube had become solid. The tube was opened and the contents dissolved in THF. Conversion of the monomer was 64%. $M_n$=55,900; $M_w/M_n$=1.18.

Example 28
Bulk Polymerization of Methyl Acrylate using $Cu^0/CuBr_2$

Copper powder (3.0 mg), copper (II) bromide (6.2 mg), 4,4'-di(5-nonyl)-2,2'-bipyridine (45.3 mg), methyl acrylate (1.0 ml) and methyl 2-bromopropionate (6.2 μL) were charged to a dry glass tube. A stir bar was added and the contents of the tube were degassed by freeze-pump-thaw (3×). The tube was then sealed under vacuum and the tube placed in an oil bath thermostatted at 90° C. for 1.2 hours. The contents of the tube had become solid. The tube was opened and the contents dissolved in THF. Conversion of the monomer was 67%. $M_n$=11,400; $M_w/M_n$=1.10.

Example 29
Bulk Polymerization of Styrene Using $Cu^0/CuBr_2$

Copper powder (10 mg), copper (II) bromide (10 mg), 4,4'-di(5-nonyl)-2,2'-bipyridine (71.2 mg), styrene (1.0 ml) and 1-phenylethyl bromide (12 μL) were charged to a dry glass tube. A stir bar was added and the contents of the tube were degassed by freeze-pump-thaw (3×). The tube was then sealed under vacuum and the tube placed in an oil bath thermostatted at 110° C. for 3 hours. The contents of the tube had become solid. The tube was opened and the contents dissolved in THF. Conversion of the monomer was 92%. $M_n$=10,000; $M_w/M_n$=1.09.

Example 30
Bulk Polymerization of Styrene Using $Cu^0/CuBr_2$

Copper powder (0.6 mg), copper (II) bromide (2.2 mg), 4,4'-di(5-nonyl)-2,2'-bipyridine (81.6 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for 7 hours. The contents of the tube had become solid. The tube was opened and the contents dissolved in THF. Conversion of the monomer was 84%. $M_n$=8,520; $M_w/M_n$=1.49.

Miscellaneous Zero Valent Metals

Example 31
Bulk Polymerization of Styrene Using $Cr^0$

Chromium (5.2 mg), 2,2'-bipyridine (46.9 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for seven hours. The contents of the tube had become solid. The tube was opened and the contents dissolved in THF. Conversion of the monomer was 93%. $M_n$=77,500; $M_w/M_n$=2.25.

Example 32
Bulk Polymerization of Styrene Using $Sm^0$

Samarium (15.0 mg), 2,2'-bipyridine (46.9 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for twelve hours. The contents of the tube had become solid. The tube was opened and the contents dissolved in THF. Conversion of the monomer was 84%. $M_n$=39,800; $M_w/M_n$=2.51.

Example 33
Bulk Polymerization of Styrene Using $Ni^0$

Nickel (5.9 mg), 2,2'-bipyridine (46.9 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for three hours. The contents of the tube had become solid. The tube was opened and the contents dissolved in THF. Conversion of the monomer was 89%. $M_n$92,900; $M_w/M_n$=2.34.

Example 34
Bulk Polymerization of Styrene Using $MnO_2$

Manganese oxide (8.7 mg), 2,2'-bipyridine (46.9 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for fourteen hours. The tube was opened and the contents dissolved in THF. Conversion of the monomer was 21%. $M_n$=31,800; $M_w/M_n$=3.14.

Example 35
Bulk Polymerization of Styrene Using $Mg^0$

Magnesium (2.4 mg), 2,2'-bipyridine (46.9 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for fourteen hours. The contents of the tube had become viscous. The tube was opened and the contents dissolved in THF. Conversion of the monomer was 50%. $M_n$=18,300; $M_w/M_n$=1.81.

Example 36
Bulk Polymerization of Styrene Using $Ag^0$

Silver (10.8 mg), 2,2'-bipyridine (46.9 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for three hours. The contents of the tube had become solid. The tube was opened and the contents dissolved in THF. Conversion of the monomer was 81%. $M_n$=25,600; $M_w/M_n$=2.41.

Example 37
Bulk Polymerization of Styrene using $Ru^0$

Ruthenium (10.1 mg), triphenyl phosphine (78.7 mg), styrene (1.14 ml) and 1-phenylethyl bromide (13.6 μL) were charged to a dry glass tube. A stir bar was added and the contents of the tube were degassed by freeze-pump-thaw (3×). The tube was then sealed under vacuum and the tube placed in an oil bath thermostatted at 110° C. for twelve hours. The contents of the tube had become solid. The tube was opened and the contents dissolved in THF. Conversion of the monomer was 97%. $M_n$=183,500; $M_w/M_n$=1.92.

Example 38
Bulk Polymerization of Styrene Using $Mn^0$

Manganese (5.5 mg), 2,2'-bipyridine (46.9 mg), styrene (1.14 ml) and p-toluenesulfonyl chloride (19 mg) were charged to a dry glass tube. A stir bar was added and the contents of the tube were degassed by freeze-pump-thaw (3×). The tube was then sealed under vacuum and the tube placed in an oil bath thermostatted at 110° C. for twelve hours. The contents of the tube had become solid. The tube was opened and the contents dissolved in THF. Conversion of the monomer was 95%. $M_n$=15,400; $M_w/M_n$=2.37.
In the Presence of Air/inhibitor

Example 39
Bulk Polymerization of Styrene/1-phenylethylbromide/ $CuBr_2/Cu(0)$ in the Presence of Air and Inhibitor To a sample vial (approx. 7 mL in volume) was added Cu(0) (33 mg; 0.52 mmol), $CuBr_2$ (12 mg; 0.054 mmol), 4,4'-di(5-nonyl)-2,2'-bipyridine (107 mg; 0.262 mmol), 1-phenylethylbromide (71.6 μL; 0.525 mmol), and styrene (6 mL; 52.4 mmol) followed by 0.6 mL of chlorobenzene as an internal reference. All manipulations were performed in air. The styrene was unpurified and contained inhibitor (10–15 ppm 4-tert-butylcatechol). The sample vial was charged with a stir bar and then fitted with a rubber septum. The vial was then immersed in an oil bath and held by a thermostat at 110 C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(SEC) | $M_n$(th) | $M_w/M_n$ | $ln([M]_o/[M]_t)$ |
|---|---|---|---|---|---|
| 30 | 15 | 1970 | 1589 | 1.22 | 0.163 |
| 50 | 28.5 | 3290 | 3018 | 1.17 | 0.335 |
| 65 | 33 | 4350 | 3495 | 1.13 | 0.400 |
| 80 | 42 | 5350 | 4448 | 1.10 | 0.545 |
| 90 | 51 | 6300 | 5401 | 1.10 | 0.713 |
| 105 | 64 | 7280 | 6778 | 1.14 | 1.022 |
| 130 | 82 | 9160 | 8684 | 1.17 | 1.715 |

Example 40
Bulk polymerization of Methyl Acrylate/methyl 2-bromopropionate/$CuBr_2$/Cu(0) in the Presence of Air and Inhibitor To a sample vial (approx. 7 mL in volume) was added Cu(0) (21 mg; 0.33 mmol), $CuBr_2$ (7.4 mg; 0.033 mmol), 4,4'-di(5-nonyl)-2,2'-bipyridine (68 mg; 0.166 mmol), methyl 2-bromopropionate (37 μL; 0.33 mmol) and methyl acrylate (6 mL; 66.6 mmol) followed by 0.6 mL of chlorobenzene as an internal reference. All manipulations were performed in air. The methyl acrylate was unpurified and contained stabilizer (200 ppm hydroquinone monomethyl ether). The sample vial was charged with a stir bar and then fitted with a rubber septum. The vial was then immersed in an oil bath and held by a thermostat at 80° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(SEC) | $M_n$(th) | $M_w/M_n$ | $ln([M]_o/[M]_t)$ |
|---|---|---|---|---|---|
| 75 | 10 | 4640 | 1740 | 1.51 | 0.105 |
| 95 | 33 | 7760 | 5742 | 1.42 | 0.400 |
| 105 | 44 | 9500 | 7656 | 1.36 | 0.580 |
| 115 | 55 | 10570 | 9570 | 1.32 | 0.799 |
| 140 | 74 | 12940 | 12876 | 1.26 | 1.347 |

Example 41
Bulk Polymerization of Styrene/1-phenylethylbromide/ $CuBr_2/Cu(0)$ in the Presence of Air and Inhibitor with 1 Micron Copper Powder To a sample vial (approx. 7 mL in volume) was added Cu(0) (1 micron copper powder) (33 mg; 0.52 mmol), $CuBr_2$ (12 mg; 0.054 mmol), 4,4'-di(5-nonyl)-2,2'-bipyridine (107 mg; 0.262 mmol), 1-phenylethylbromide (71.6 μL; 0.525 mmol), and styrene (6 mL; 52.4 mmol) followed by 0.6 mL of chlorobenzene as an internal reference. All manipulations were performed in air. The styrene was unpurified and contained inhibitor (10–15 ppm 4-tert-butylcatechol). The sample vial was charged with a stir bar and then fitted with a rubber septum. The vial was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % conversion | $M_n$(SEC) | $M_n$(th) | $M_w/M_n$ | $ln([M]_o/[M]_t)$ |
|---|---|---|---|---|---|
| 10 | 16 | 2350 | 1694 | 1.41 | 0.174 |
| 20 | 32 | 4670 | 3389 | 1.23 | 0.386 |
| 35 | 61 | 8550 | 6460 | 1.27 | 0.942 |
| 50 | 76 | 10900 | 8048 | 1.42 | 1.427 |
| 70 | 85 | 11700 | 9002 | 1.53 | 1.897 |

Example 42
Bulk Polymerization of Styrene/1-phenylethylbromide/ $CuBr_2/Cu(0)$ in the Presence of Air and Inhibitor with a Reduced Amount of 1 Micron Copper Powder To a sample vial (approx. 7 mL in volume) was added Cu(0) (1 micron copper powder) (20 mg; 0.32 mmol), $CuBr_2$ (12 mg; 0.054 mmol), 4,4'-di(5-nonyl)-2,2'-bipyridine (107 mg; 0.262 mmol), 1-phenylethylbromide (71.6 μL; 0.525 mmol), and styrene (6 mL; 52.4 mmol) followed by 0.6 mL of chlorobenzene as an internal reference. All manipulations were performed in air. The styrene was unpurified and contained inhibitor (10–15 ppm 4-tert-butylcatechol). The sample vial was charged with a stir bar and then fitted with a rubber septum. The vial was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % conversion | $M_n$(SEC) | $M_n$(th) | $M_w/M_n$ | $ln([M]_o/[M]_t)$ |
|---|---|---|---|---|---|
| 10 | 14 | 2000 | 1483 | 1.45 | 0.151 |
| 27 | 33 | 4450 | 3495 | 1.22 | 0.400 |
| 45 | 52 | 7170 | 5507 | 1.16 | 0.734 |
| 60 | 55 | 7830 | 5825 | 1.15 | 0.799 |
| 80 | 57 | 7900 | 6036 | 1.15 | 0.844 |
| 120 | 58 | 8150 | 6142 | 1.14 | 0.868 |

Example 43

Bulk Polymerization of Styrene 1-phenylethylbromide/ CuBr$_2$/Cu(0) in the Presence of Air and Inhibitor with −150 Mesh Copper Powder To a sample vial (approx. 7 mL in volume) was added Cu(0) (−150 mesh copper powder) (33 mg; 0.52 mmol), CuBr$_2$ (12 mg; 0.054 mmol), 4,4'-di(5-nonyl)-2,2'-bipyridine (107 mg; 0.262 mmol), 1-phenylethylbromide (71.6 μL; 0.525 mmol), and styrene (6 mL; 52.4 mmol) followed by 0.6 mL of chlorobenzene as an internal reference. All manipulations were performed in air. The styrene was unpurified and contained inhibitor (10–15 ppm 4-tert-butylcatechol). The sample vial was charged with a stir bar and then fitted with a rubber septum. The vial was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % conversion | M$_n$(SEC) | M$_n$(th) | M$_w$/M$_n$ | ln([M]$_0$/[M]$_t$) |
|---|---|---|---|---|---|
| 53 | 21 | 2850 | 2224 | 1.21 | 0.236 |
| 115 | 54 | 6860 | 5719 | 1.09 | 0.777 |
| 145 | 60 | 7450 | 6354 | 1.09 | 0.916 |
| 235 | 67 | 8080 | 7095 | 1.09 | 1.109 |
| 960 | 98 | 7680 | 10378 | 1.12 | 3.912 |

Example 44

Bulk Polymerization of Methyl Acrylate/methyl 2-bromopropionate/Cu(OTf)$_2$/Cu(0) in the Presence of Air and Inhibitor with Triamine Ligand To a sample vial (approx. 7 mL in volume) was added Cu(0) (21 mg; 0.33 mmol), Cu(OTf)$_2$ (12 mg; 0.033 mmol), N,N,N',N',N"-Pentamethyldiethylenetriamine (14 μL; 0.067 mmol), methyl 2-bromopropionate (37 μL; 0.33 mmol) and methyl acrylate (6 mL; 66.6 mmol) followed by 0.6 mL of chlorobenzene as an internal reference. All manipulations were performed in air. The methyl acrylate was unpurified and contained stabilizer (200 ppm hydroquinone monomethyl ether). The sample vial was charged with a stir bar and then fitted with a rubber septum. The vial was then immersed in an oil bath and held by a thermostat at 80° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % conversion | M$_n$(SEC) | M$_n$(th) | M$_w$/M$_n$ | ln([M]$_0$/[M]$_t$) |
|---|---|---|---|---|---|
| 15 | 14 | 4210 | 2436 | 1.69 | 0.151 |
| 30 | 26 | 5060 | 4524 | 1.44 | 0.301 |
| 45 | 41 | 5470 | 7134 | 1.28 | 0.528 |
| 60 | 50 | 6650 | 8700 | 1.21 | 0.693 |
| 75 | 58 | 6910 | 10092 | 1.28 | 0.868 |
| 90 | 70 | 8190 | 12180 | 1.31 | 1.204 |
| 105 | 79 | 9130 | 13746 | 1.28 | 1.561 |
| 140 | 87 | 10030 | 15138 | 1.14 | 2.040 |

Example 45

Bulk Polymerization of Methyl Methacrylate/Tosyl Chloride/CuBr$_2$/Cu(0) in the Presence of Air To a sample vial (approx. 7 mL in volume) was added Cu(0) (9.0 mg; 0.14 mmol), CuBr$_2$ (6.3 mg; 0.028 mmol), 4,4'-di(5-nonyl)-2,2'-bipyridine (28.6 mg; 0.07 mmol), tosyl chloride (26.7 mg; 0.14 mmol), o-xylene (3 ml) and methyl methacrylate (3 mL; 28.1 mmol) followed by 0.6 mL of chlorobenzene as an internal reference. All manipulations were performed in air. The sample vial was charged with a stir bar and then fitted with a rubber septum. The vial was then immersed in an oil bath and held by a thermostat at 90° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | M$_n$(th) | M$_n$(SEC) | M$_w$/M$_n$ |
|---|---|---|---|---|
| 60 | 20 | 4,200 | 6,300 | 1.31 |
| 90 | 35 | 7,200 | 10,000 | 1.17 |
| 125 | 51 | 10,400 | 13,600 | 1.16 |
| 145 | 54 | 11,000 | 15,500 | 1.16 |
| 170 | 63 | 12,750 | 17,300 | 1.15 |
| 190 | 68 | 13,900 | 18,700 | 1.15 |
| 220 | 74 | 15,000 | 20,000 | 1.15 |
| 250 | 81 | 16,500 | 21,200 | 1.16 |

Example 46

Bulk Polymerization of Methyl Methacrylate/ Bromopropiononitrile/CuBr$_2$/Cu(0) in the Presence of Air To a sample vial (approx. 7 mL in volume) was added Cu(0) (9.0 mg; 0.14 mmol), CuBr$_2$ (6.3 mg; 0.028 mmol), 4,4'-di(5-nonyl)-2,2'-bipyridine (28.6 mg; 0.07 mmol), bromopropionitrile (12.1 μL, 18.8 mg; 0.14 mmol), o-xylene (3 ml) and methyl methacrylate (3 mL; 28.1 mmol) followed by 0.6 mL of chlorobenzene as an internal reference. All manipulations were performed in air. The sample vial was charged with a stir bar and then fitted with a rubber septum. The vial was then immersed in an oil bath and held by a thermostat at 90° C. with rigorous stirring. At various times, samples were taken via syringe and quenched with THF. The volume lost by sample removal was replaced with argon. The samples were used to monitor monomer conversion relative to the internal references (GC) and molecular weight (SEC).

| Time (min) | % Conversion | M$_n$(th) | M$_n$(SEC) | M$_w$/M$_n$ |
|---|---|---|---|---|
| 60 | 62 | 12,600 | 16,500 | 1.20 |
| 80 | 71 | 14,400 | 18,600 | 1.24 |
| 100 | 78 | 15,600 | 20,200 | 1.27 |
| 135 | 85 | 17,000 | 20,300 | 1.31 |

Example 47

Bulk Polymerization of Methyl Methacrylate/Ethyl 2-bromoisobutyrate/CuBr$_2$/Cu(0) in the Presence of Air To a sample vial (approx. 7 mL in volume) was added Cu(0) (9.0 mg; 0.14 mmol), CuBr$_2$ (6.3 mg; 0.028 mmol), 4,4'-di(5-nonyl)-2,2'-bipyridine (28.6 mg; 0.07 mmol), ethyl 2-bromoisobutyrate (20.5 μL, 27.3 mg; 0.14 mmol), o-xylene (3 ml) and methyl methacrylate (3 mL; 28.1 mmol) followed by 0.6 mL of chlorobenzene as an internal reference. All manipulations were performed in air. The sample vial was charged with a stir bar and then fitted with a rubber septum. The vial was then immersed in an oil bath and held by a thermostat at 90° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(th) | $M_n$(SEC) | $M_w/M_n$ |
|---|---|---|---|---|
| 40 | 32 | 6,580 | 8,600 | 1.21 |
| 60 | 54 | 11,000 | 13,000 | 1.24 |
| 80 | 69 | 13,900 | 16,100 | 1.27 |
| 110 | 83 | 16,800 | 19,600 | 1.32 |
| 140 | 89 | 18,000 | 20,600 | 1.42 |

Example 48
Bulk Polymerization of Methyl Methacrylate/Tosyl Chloride/CuBr in the Presence of Air To a sample vial (approx. 7 mL in volume) was added CuBr (40.7 mg; 0.28 mmol), 4,4'-di(5-nonyl)-2,2'-bipyridine (228 mg; 0.56 mmol), tosyl chloride (26.7 mg; 0.14 mmol), o-xylene (3 ml) and methyl methacrylate (3 mL; 28.1 mmol) followed by 0.6 mL of chlorobenzene as an internal reference. All manipulations were performed in air. The sample vial was charged with a stir bar and then fitted with a rubber septum. The vial was then immersed in an oil bath and held by a thermostat at 90° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (h) | % Conversion | $M_n$(th) | $M_n$(SEC) | $M_w/M_n$ |
|---|---|---|---|---|
| 1.0 | 32 | 6,600 | 9,300 | 1.09 |
| 2.0 | 48 | 9,800 | 13,100 | 1.10 |
| 3.8 | 63 | 12,800 | 16,600 | 1.12 |
| 6.0 | 78 | 15,800 | 18,500 | 1.15 |
| 8.0 | 84 | 17,000 | 20,300 | 1.13 |
| 11.0 | 89 | 17,900 | 20,400 | 1.16 |

Example 49
Bulk Polymerization of Styrene/1-phenylethylbromide/FeBr$_3$/Fe(0) in the Presence of Air To a sample vial (approx. 7 mL in volume) was added Fe(0) (49.1 mg; 0.88 mmol), FeBr$_3$ (26 mg; 0.088 mmol), 4,4'-di(5-nonyl)-2,2'-bipyridine (1077 mg; 0.264 mmol), 1-phenylethylbromide (60 µL; 0.44 mmol), and styrene (5 mL; 45.4 mmol) followed by 1.0 mL of chlorobenzene as an internal reference. All manipulations were performed in air. The styrene was previously distilled from calcium hydride. The sample vial was charged with a stir bar and then fitted with a rubber septum. The vial was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (h) | % Conversion | $M_n$(th) | $M_n$(SEC) | $M_w/M_n$ |
|---|---|---|---|---|
| 2.5 | 0 | — | — | — |
| 3.5 | 27 | 3,000 | 3,480 | 1.34 |
| 5.0 | 70 | 7,460 | 7,580 | 1.15 |
| 6.5 | 86 | 9,100 | 8,690 | 1.16 |

Example 50
Bulk Polymerization of Styrene/1-phenylethylbromide/FeBr$_3$/Fe(0) in the Presence of Air and Inhibitor To a sample vial (approx. 7 mL in volume) was added Fe(0) (49.1 mg; 0.88 mmol), FeBr$_3$ (26 mg; 0.088 mmol), 4,4'-di(5-nonyl)-2,2'-bipyridine (1077 mg; 0.264 mmol), 1-phenylethylbromide (60 mL; 0.44 mmol), and styrene (5 mL; 45.4 mmol) followed by 1.0 mL of chlorobenzene as an internal reference. All manipulations were performed in air. The styrene was unpurified and contained inhibitor (10–15 ppm 4-tert-butylcatechol). The sample vial was charged with a stir bar and then fitted with a rubber septum. The vial was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (h) | % Conversion | $M_n$(th) | $M_n$(SEC) | $M_w/M_n$ |
|---|---|---|---|---|
| 3 | 0 | — | — | — |
| 4 | 18 | 2,100 | 3,600 | 1.47 |
| 5 | 41 | 4,450 | 6,500 | 1.27 |
| 6 | 64 | 6,800 | 9,800 | 1.16 |
| 7 | 81 | 8,600 | 11,700 | 1.16 |

Preparation of R-ONR$_2$

Example 51
Coupling of 1-Phenylethyl Radical with TEMPO; Preparation of 1-(2,2,6,6-Tetramethlpiperidinyloxy)-1-phenylethane To a reaction tube was added a stir bar, Cu(0) (0.8 mmol, 0.051 g), Cu(OTf)$_2$ (3 mg; 0.008 mmol), 4,4'-di(5-nonyl)-2,2'-bipyridine (14 mg; 0.033 mmol), TEMPO (0.23 g; 1.47 mmol) and 1.0 mL of benzene. The tube was frozen in liquid nitrogen and then 1-Phenylethylbromide (100 µL; 0.733 mmol), was added via syringe. The solution was then degassed by three freeze-vacuum-thaw cycles and sealed under vacuum. The tube was then immersed in an oil bath and held by a thermostat at 90° C. with rigorous stirring. The tube was heated for 2 hours and then the tube was broken and the contents were loaded on a short plug of alumina and eluted with THF. The volatiles were removed on a rotary evaporator leaving a viscous orange liquid. This orange liquid was loaded on an alumina column and was eluted with a 9:1 hexanes:CH$_2$Cl$_2$ eluent mixture. 1-(2,2,6,6-Tetramethlpiperindinyloxy)-1-phenylethane eluted as a colorless fraction before the orange fraction of excess TEMPO. Solvent was removed resulting in 0.172 g (69%) of 1-(2,2,6,6-Tetramethlpiperidinyloxy)-1-phenylethane. Product was characterized by comparison of the NMR spectrum with that in the literature.

Other Alkyl Halides Used to Prepare Alkoxy Amines

Reaction conditions were similar as for 1-phenylethyl bromide but with different alkyl halide. Each reaction showed 100% conversion of the starting alkyl halide and little to no side-products (due to radical coupling/disproportionation reactions between alkyl radicals) were observed in the proton NMR spectra (prior to isolation).

Coupling of methyl-2-bromopropionate with TEMPO: (CDCl$_3$) δ: 4.33 ppm (q, 1H, $^3J_{HH}$=7 Hz); 3.27 ppm (s, 3H); 1.44, 1.12, 1.02 ppm (Br, 18H); 1.40 ppm (d, 3H, $^3J_{HH}$=7 Hz).

Coupling of 2-bromopropionitrile with TEMPO: (CDCl$_3$) δ: 4.64 ppm (q, 1H, $^3J_{HH}$=7 Hz); 1.56 (d, 3H, $^3J_{HH}$=7 Hz), 1.60–1.30 ppm (m, 2H); 1.50 ppm (m, 4H); 1.34, 1.16, 1.11, 1.10 ppm (each as, each 3H).

Coupling of ethyl-2-bromoisobutyrate with TEMPO: (CDCl$_3$) δ: 4.17 ppm (q, 2H, $^3J_{HH}$=7 Hz); 1.61–1.36 ppm (m, 4H); 1.48 ppm (s, 6H); 1.35–1.21 ppm (m, 2H); 1.29 ppm (t, 3H, $^3J_{HH}$=7 Hz); 1.16 ppm (s, 6H); 1.02 ppm (s, 6H).
Coupling Reactions

Example 52
Coupling of 1-Phenylethyl Radicals

To a reaction tube was added Cu(OTf)$_2$ (3 mg; 0.008 mmol), 4,4'-di(5-nonyl)-2,2'-bipyridine (14 mg; 0.033 mmol), Cu(0) (49 mg; 0.770 mmol), 1-Phenylethylbromide (100 μL; 0.733 mmol), and 1 mL of benzene-d$_6$. The reaction solution was degassed by three freeze-vacuum-thaw cycles and sealed under vacuum. The tube was then immersed in an oil bath and held by a thermostat at 90° C. with rigorous stirring. The tube was heated for 2 hours and then the tube was broken and the contents were loaded on a short plug of alumina and eluted with 0.5 mL of benzene-d$_6$. The NMR spectrum was recorded. Complete conversion of 1-Phenylethylbromide was observed and 90% of the product mixture was the coupling product. The other 10% consisted of styrene and ethylbenzene present as disproportionation products.

Example 53
Coupling of Bromine Terminated Polystyrene Chains (pS-Br) with Cu(OTf)$_2$/Cu(0)/dNbpy To a reaction tube was added bromine-terminated polystyrene (pS-Br; M$_n$=1040; M$_w$/M$_n$=1.12) formed from the ATRP of styrene/1-Phenylethylbromide (25 mg; 0.024 mmol), Cu(OTf)$_2$ (2.2 mg; 0.006 mmol), dNbpy (10 mg; 0.024 mmol), Cu(0) (2.3 mg; 0.036 mmol) and 1.5 mL of benzene. A stir bar was added, and the tube was degassed by three freeze-vacuum-thaw cycles and sealed under vacuum. The tube was then immersed in an oil bath and held by a thermostat at 90° C. with rigorous stirring. The tube was heated for 2 hours and then the tube was broken and the contents were loaded on a short plug of alumina and eluted with THF. The volatiles were removed on a rotary evaporator and the resulting oil was precipitated in cold methanol. The precipitate was collected by gravity filtration and was analyzed by SEC (M$_n$=2230; M$_w$/M$_n$=1.18).

Example 54
Coupling of Bromine Terminated Difunctional Polystyrene Chains (Br-pS-Br) Generated in Situ To a 10 mL Schlenk flask was added α,α'-Dibromo-p-xylene (46 mg; 0.174 mmol), Cu(OTf)$_2$ (6 mg; 0.017 mmol), dNbpy (29 mg; 0.071 mmol), Cu(0) (100 mg; 1.57 mmol), styrene (2.0 mL, 17.5 mmol) and 3.0 mL of benzene. A stir bar was added and then the solution was degassed by three freeze-vacuum-thaw cycles and put under argon. The flask was then immersed in an oil bath and held by a thermostat at 110° C. with rigorous stirring. The solution was heated for 24 hours and then the contents were loaded on a short plug of alumina and eluted with THF. The polymer was analyzed by SEC (M$_n$=36,000; M$_w$/M$_n$=3.91)

Example 55
Coupling of Bromine Terminated Difunctional Polystyrene Chains (Br-pS-Br)

A reaction tube was charged with Br-pS-Br (M$_n$=15900; M$_w$/M$_n$=1.20) (70 mg; 0.0044 mmol), Cu(OTf)$_2$ (3 mg; 0.008 mmol), 4,4'-di(5-nonyl)-2,2'-bipyridine (12 mg; 0.029 mmol), Cu(0) (copper bronze) (3 mg, 0.045 mmol) and 1 mL of benzene as solvent. The reaction solution was degassed by three freeze-vacuum-thaw cycles and sealed under vacuum. The reaction tube was then heated to 110° C. for 17 h. The tube was then broken and the contents run through a short plug of alumina and eluted with THF. The sample was analyzed by GPC: M$_n$=25,000, M$_w$/M$_n$=1.96.
Polymerization of AB* Monomers Using Zero Valent Metals

Example 56
Polymerization of BPEA

To a 5 mL round bottom flask with magnetic stir bar was added dNbpy (0.34 g, 0.83 mmol), Cu(I)Br (0.04 g, 0.272 mmol), micron mesh-Cu(0) (0.017 g, 0.27 mmol) and p-dimethoxybenzene (0.5 g) as an internal standard for GC. The flask was then fitted with a rubber septum and evacuated and backfilled with N$_2$ (3×). Degassed BPEA (27 mmol, 4.5 mL) was then added to the reaction vessel via syringe and allowed to stir at room temperature. Samples were periodically removed to monitor conversion (by $^1$H NMR, GC) and evolution of molecular weights(SEC). $^1$H NMR was performed on a 300 MHz Bruker NMR, GC was performed on a Shimadzu GC-14A. Molecular weights were determined by SEC. M$_n$=4,000; M$_w$/M$_n$=7.0

Example 57
Polymerization of BIEA

To a 5 mL round bottom flask with magnetic stir bar was added dNbpy (0.34 g, 0.83 mmol), Cu(I)Br (0.04 g, 0.272 mmol), micron mesh-Cu(0) (0.017 g, 0.27 mmol) and p-dimethoxybenzene (0.5 g) as an internal standard for GC. The flask was then fitted with a rubber septum and evacuated and backfilled with N. (3×). Degassed BIEA (27 mmol, 4.7 mL) was then added to the reaction vessel via syringe and allowed to stir at room temperature. Samples were periodically removed to monitor conversion (by $^1$H NMR, GC) and evolution of molecular weights(SEC). $^1$H NMR was performed on a 300 MHz Bruker NMR, GC was performed on a Shimadzu GC-14A. Molecular weights were determined by SEC. M$_n$=2,700, M$_w$/M$_n$=3.25

Example 58
Polymerization of BPEM

To a 5 mL round bottom flask with magnetic stir bar was added dNbpy (0.34 g, 0.83 mmol), Cu(I)Br (0.04 g, 0.272 mmol), micron mesh-Cu(0) (0.017 g, 0.27 mmol) and p-dimethoxybenzene (0.5 g) as an internal standard for GC. The flask was then fitted with a rubber septum and evacuated and backfilled with N$_2$ (3×). Degassed BPEM (27 mmol, 4.75 mL) was then added to the reaction vessel via syringe and allowed to stir at room temperature. Samples were periodically removed to monitor conversion (by $^1$H NMR, GC) and evolution of molecular weights(SEC). $^1$H NMR was performed on a 300 MHz Bruker NMR, GC was performed on a Shimadzu GC-14A. Molecular weights were determined by SEC. M$_n$=6800; M$_w$/M$_n$=3.0.

Example 59
Polymerization of BIEM

To a 25 mL round bottom flask with magnetic stir bar was added, dNbpy (0.059 g, 0.163 mmol), Cu(I)Br(0.0083 g, 0.054 mmol), Cu(0)-turning (0.54 g) and p-dimethoxybenzene (0.5 g). The flask was then fitted with a rubber septum and evacuated and backfilled with $N_2$ (3×). Dry, degassed benzene(5 mL) and degassed BIEM (27 mmol, 5.3 mL) were then added via syringe and stirred at room temperature. $M_n$=6,300, $M_w/M_n$=1.5.

New Metal Centers

Iron (II) $X_2$

Styrene

Example 60
Bulk Polymerization Using $FeBr_2$/dNbpy

The following reagents were transferred into glass tubes purged with argon: 19.0 mg (8.73×10$^{-2}$ mmol) of $FeBr_2$, 1.0 ml (8.73 mmol) of styrene, 12.0 μl (8.73×10$^{-2}$ mmol) of 1-phenylethyl bromide and 71.2 mg (17.5×10$^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 110° C. and were removed from the oil bath at timed intervals.

| Sample | Time (hr) | Conv. (%) | Mn (th.) | Mn (GPC) | Mw/Mn |
|---|---|---|---|---|---|
| 1 | 3.0 | 13.9 | 1,400 | 1,600 | 1.25 |
| 2 | 6.8 | 26.3 | 2,700 | 2,700 | 1.20 |
| 3 | 12.0 | 37.8 | 3,900 | 4,200 | 1.16 |
| 4 | 21.0 | 64.0 | 6,700 | 6,500 | 1.27 |

MMA

Example 61
Solution Polymerization with $FeBr_2$/4,4'-di(5-nonyl)-2,2'-bipyridine/p-toluenesulfonyl chloride 62.5 mg (0.29 mmol) $FeBr_2$, 4.5 ml(42.1 mmol) methyl methacrylate, 118.3 mg (0.29 mmol) 4,4'-di(5-nonyl)-2,2'-bipyridine, and 4.0 ml p-xylene were added to a dry round-bottomed flask under an argon atmosphere. 55.3 mg (0.29 mmol) p-toluenesulfonyl chloride in 0.5 ml methyl methacrylate was added to the flask which was then immersed in an oil bath thermostated at 90° C. A positive argon pressure was maintained throughout the reaction and samples were withdrawn at timed intervals.

| Sample | Time (h) | Conversion (%) | Mn, Cal | Mn, SEC | Mw/Mn |
|---|---|---|---|---|---|
| 1 | 0.75 | 21.2 | 3,400 | 5,400 | 1.27 |
| 2 | 1.8 | 43.6 | 7,100 | 9,400 | 1.25 |
| 3 | 3.2 | 67.5 | 11,000 | 13,100 | 1.25 |
| 4 | 4.21 | 77.1 | 12,500 | 15,100 | 1.25 |
| 5 | 5.3 | 84.4 | 13,700 | 16,300 | 1.25 |
| 6 | 6.3 | 87.7 | 14,200 | 15,700 | 1.29 |

Example 62
Solution Polymerization with $FeBr_2$/4,4'-di(5-nonyl)-2,2'-bipyridine/methansulfonyl chloride 62.5 mg (0.29 mmol) $FeBr_2$, 4.5 ml(42.1 mmol) methyl methacrylate, 118.3 mg (0.29 mmol) 4,4'-di(5-nonyl)-2,2'-bipyridine, and 4.0 ml p-xylene were added to a dry round-botttomed flask under an argon atmosphere. 33.2 mg (0.29 mmol) methanesulfonyl chloride in 0.5 ml methyl methacrylate was added to the flask which was then immersed in an oil bath thermostated at 90° C. A positive argon pressure was maintained throughout the reaction and samples were withdrawn at timed intervals.

| Sample | Time (h) | Conversion (%) | Mn, Cal | Mn, SEC | Mw/Mn |
|---|---|---|---|---|---|
| 1 | 0.8 | 25.0 | 4,000 | 5,200 | 1.31 |
| 2 | 1.8 | 41.0 | 6,600 | 8,400 | 1.25 |
| 3 | 3.2 | 57.6 | 9,300 | 11,100 | 1.24 |
| 4 | 4.2 | 66.9 | 10,800 | 11,800 | 1.25 |
| 5 | 5.3 | 73.4 | 11,900 | 13,500 | 1.24 |
| 6 | 6.3 | 76.8 | 12,400 | 13,600 | 1.25 |
| 7 | 8.5 | 81.9 | 13,300 | 13,600 | 1.31 |

Example 63
Solution Polymerization with $FeBr_2$/4,4'-di(5-nonyl)-2,2'-bipyridine ethyl 2-bromoisobutyrate 62.5 mg (0.29 mmol) $FeBr_2$, 4.5 ml(42.1 mmol) methyl methacrylate, 118.3 mg (0.29 mmol) 4,4'-di(5-nonyl)-2,2'-bipyridine, and 4.0 ml p-xylene were added to a dry round-botttomed flask under an argon atmosphere. 42.6 ,l (0.29 mmol) ethyl 2-bromoisobutyrate in 0.5 ml methyl methacrylate was added to the flask which was then immersed in an oil bath thermostated at 90° C. A positive argon pressure was maintained throughout the reaction and samples were withdrawn at timed intervals.

| Sample | Time (h) | Conversion (%) | Mn, Cal | Mn, SEC | Mw/Mn |
|---|---|---|---|---|---|
| 1 | 0.3 | 24.0 | 3,900 | 7,500 | 1.39 |
| 2 | 0.9 | 45.4 | 7,300 | 10,200 | 1.34 |
| 3 | 1.2 | 56.8 | 9,200 | 11,100 | 1.34 |
| 4 | 1.8 | 68.5 | 11,100 | 11,900 | 1.33 |
| 5 | 2.7 | 80.0 | 13,000 | 14,100 | 1.31 |
| 6 | 3.5 | 85.6 | 13,900 | 13,300 | 1.32 |
| 7 | 4.2 | 87.3 | 14,100 | 13,600 | 1.35 |
| 8 | 4.3 | 89.0 | 14,400 | 13,600 | 1.34 |

Example 64
Solution Polymerization with $FeBr_2$/4,4'-di(5-nonyl)-2,2'-bipyridine/2-bromopropionitrile 62.5 mg (0.29 mmol) $FeBr_2$, 4.5 ml(42.1 mmol) methyl methacrylate, 118.3 mg (0.29 mmol) 4,4'-di(5-nonyl)-2,2'-bipyridine, and 4.0 ml p-xylene were added to a -bromopropionitrile in 0.5 ml methyl methacrylate was added to the flask which was then immersed in an oil bath thermostated at 90° C. A positive argon pressure was maintained throughout the reaction and samples were withdrawn at timed intervals.

| Sample | Time (h) | Conversion (%) | Mn, Cal | Mn, SEC | Mw/Mn |
|---|---|---|---|---|---|
| 1 | 0.3 | 21.1 | 3,40 | 5,000 | 1.38 |
| 2 | 0.9 | 39.6 | 6,400 | 7,700 | 1.25 |
| 3 | 1.2 | 48.6 | 7,800 | 8,900 | 1.23 |
| 4 | 1.9 | 61.5 | 9,900 | 10,500 | 1.20 |
| 5 | 2.7 | 73.1 | 11,800 | 11,600 | 1.20 |
| 6 | 3.5 | 80.3 | 13,000 | 12,600 | 1.21 |
| 7 | 4.3 | 86.2 | 13,900 | 12,700 | 1.23 |
| 8 | 6.0 | 91.0 | 14,700 | 12,600 | 1.28 |

Example 65
Solution Polymerization with FeBr$_2$/4,4'-di(5-nonyl)-2,2'-bipyridine/methyl a-bromophenylacetate 62.5 mg (0.29 mmol) FeBr$_2$/4.5 ml(42.1 mmol) methyl methacrylate, 118.3 mg (0.29 mmol) 4,4'-di(5-nonyl)-2,2'-bipyridine, and 4.0 ml p-xylene were added to a dry round-botttomed flask under an argon atmosphere. 66.4 mg (0.29 mmol) methyl-bromophenylacetate in 0.5 ml methyl methacrylate was added to the flask which was then immersed in an oil bath thermostated at 90° C. A positive argon pressure was maintained throughout the reaction and samples were withdrawn at timed intervals.

| Sample | Time (h) | Conversion (%) | Mn, Cal | Mn, SEC | Mw/Mn |
|---|---|---|---|---|---|
| 1 | 0.3 | 4.5 | 700 | 1,000 | 1.28 |
| 2 | 0.7 | 8.2 | 1,300 | 1,200 | 1.26 |
| 3 | 1.2 | 11.3 | 1,800 | 1,700 | 1.25 |
| 4 | 1.8 | 17.3 | 2,800 | 2,400 | 1.21 |
| 5 | 2.6 | 24.5 | 4,000 | 3,300 | 1.18 |
| 6 | 4.0 | 35.2 | 5,700 | 5,500 | 1.14 |
| 7 | 8.5 | 61.8 | 10,000 | 8,100 | 1.16 |
| 8 | 10.8 | 70.6 | 11,400 | 8,500 | 1.19 |
| 9 | 18.3 | 75.2 | 12,200 | 9,000 | 1.27 |

Example 66
Solution Polymerization with FeBr$_2$/4,4'-di(5-nonyl)-2,2'-bipyridine/bromodiphenylmethane 62.5 mg (0.29 mmol) FeBr$_2$, 4.5 ml(42.1 mmol) methyl methacrylate, 118.3 mg (0.29 mmol) 4,4'-di(5-nonyl)-2,2'-bipyridine, and 4.0 ml p-xylene were added to a dry round-botttomed flask under an argon atmosphere. 71.7 mg (0.29 mmol) bromodiphenylmethane in 0.5 ml methyl methacrylate was added to the flask which was then immersed in an oil bath thermostated at 90° C. A positive argon pressure was maintained throughout the reaction and samples were withdrawn at timed intervals.

| Sample | Time (h) | Conversion (%) | Mn, Cal | Mn, SEC | Mw/Mn |
|---|---|---|---|---|---|
| 1 | 1.0 | 8.5 | 1,400 | 2,500 | 1.21 |
| 2 | 3.7 | 33.8 | 5,500 | 8,900 | 1.09 |
| 3 | 5.8 | 47.3 | 7,600 | 12,400 | 1.11 |
| 4 | 8.1 | 57.4 | 9,300 | 14,500 | 1.15 |
| 5 | 10.0 | 64.7 | 10,500 | 15,500 | 1.18 |
| 6 | 12.0 | 69.7 | 11,300 | 16,600 | 1.19 |

Manganese (II) X$_2$
Styrene

Example 67
Heterogeneous ATRP of Styrene Using MnCl$_2$ as Catalyst

The following amounts of reagents were weighed into a glass tube under ambient temperature: 12 mg (8.15×10$^{-2}$ mmol) of MnCl$_2$, 1.00 mL (0.909 g, 8.73 mmol) of deinhibited styrene, 28 mg (0.175 mmol) 2,2'-bipyridine, and 10 mL (8.8×10$^{-2}$ mmol) 1-phenylethyl chloride. Two "freeze-pump-thaw" cycles were performed on the contents of the tube to ensure that oxygen was removed from the polymerization solution. The tube was sealed under vacuum then placed in an oil bath thermostated at 90° C. After 7 h the tube was broken, and the contents were dissolved in 10 mL of THF. Conversion of the monomer, measured using GC was 71%, and the molecular weight and polydispersity measured by GPC were M$_n$=7,300, and M$_w$/M$_n$=1.55.

Example 68
Homogeneneous ATRP of Styrene Using MnCl$_2$ as catalyst

The following amounts of reagents were weighed into a glass tube under ambient temperature: 12 mg (8.15×10$^{-2}$ mmol) of MnCl$_2$, 1.00 mL (0.909 g, 8.73 mmol) of deinhibited styrene, 60 mg (0.175 mmol) 4,4'-di-(5-nonyl)-2,2'-bipyridine, and 10 mL (8.8×10$^{-2}$ mmol) 1-phenylethyl chloride. Two "freeze-pump-thaw" cycles were performed on the contents of the tube in order to insure that oxygen was removed from the polymerization solution. The tube was sealed under vacuum, then placed in an oil bath thermostated at 90° C. After 12 h the tube was broken, and the contents were dissolved in 10 mL of THF. Conversion of the monomer, measured using GC was 85%, and the molecular weight and polydispersity measured by GPC were M$_n$=8,300, and M$_w$/M$_n$=1.45.

Methyl Acrylate

Example 69
Heterogeneous ATRP of Methyl Acrylate Using MnCl$_2$ as Catalyst

The following amounts of reagents were weighed into a glass tube under ambient temperature: 12 mg (8.15×10$^{-2}$ mmol) of MnCl$_2$, 1.00 mL (0.956 g, 8.88 mmol) of deinhibited methyl acrylate, 28 mg (0.175 mmol) 2,2'-bipyridine, and 11 mL (8.8×10$^{-2}$ mmol) methyl 2-chloropropionate. Two "freeze-pump-thaw" cycles were performed on the contents of tube to insure that oxygen was removed from the polymerization solution. The tube was sealed under vacuum then placed in an oil bath thermostated at 90° C. After 7 h the tube was broken, and the contents were dissolved in 10 mL of THF. Conversion of the monomer, measured using GC was 81%, and the molecular weight and polydispersity measured by GPC were M$_n$=8,100, and M$_w$/M$_n$=2.01.

Example 70
Homogeneneous ATRP of Methyl Acrylate Using MnCl$_2$ as Catalyst

The following amounts of reagents were weighed into a glass tube under ambient temperature: 12 mg (8.15×10$^{-2}$ mmol) of MnCl$_2$, 1.00 mL (0.956 g, 8.88 mmol) of deinhibited methyl acrylate, 60 mg (0.175 mmol) 4,4'-di-(5-nonyl)-2,2'-bipyridine, and 11 mL (8.8×10$^{-2}$ mmol) methyl 2-chloropropionate. Two "freeze-pump-thaw" cycles were performed on the contents of the tube in order to insure that oxygen was removed from the polymerization solution. The tube was sealed under vacuum, then placed in an oil bath thermostated at 90° C. After 12 h the tube was broken, and the contents were dissolved in 10 mL of THF. Conversion of the monomer, measured using GC was 98%, and the molecular weight and polydispersity measured by GPC were M$_n$=10,600, and M$_w$/M$_n$=1.95.

Methyl Methacrylate

Example 71
Heterogeneous ATRP of Methyl Methacrylate Using MnCl$_2$ as Catalyst The following amounts of reagents were weighed into a glass tube under ambient temperature: 12 mg (8.15×10$^{-2}$ mmol) of MnCl$_2$, 1.00 mL (0.936 g, 8.87 mmol) of deinhibited methyl acrylate, 28 mg (0.175 mmol) 2,2'-bipyridine, and 19 mg (8.8×10$^{-2}$ mmol) toluenesulfonyl chloride. Two "freeze-pump-thaw" cycles were performed on the contents of tube to insure that oxygen was removed from the polymerization solution. The tube was sealed under vacuum then placed in an oil bath thermostated at 90° C. After 7 h the tube was broken, and the contents were

Example 72
Homogeneneous ATRP of Methyl Methacrylate Using MnCl$_2$ as Catalyst The following amounts of reagents were weighed into a glass tube under ambient temperature: 12 mg (8.15×10$^2$ mmol) of MnCl$_2$, 1.00 mL (0.936 g, 8.87 mmol) of deinhibited methyl acrylate, 60 mg (0.175 mmol) 4,4'-di-(5-nonyl)-2,2'-bipyridine, and 19 mg (8.8×10$^{-2}$ mmol) toluenesulfonyl chloride. Two "freeze-pump-thaw" cycles were performed on the contents of the tube in order to insure that oxygen was removed from the polymerization solution. The tube was sealed under vacuum then placed in an oil bath thermostated at 90° C. After 12 h the tube was broken, and the contents were dissolved in 10 mL of THF. Percent conversion of the sample, measured using GC was 98%, and the molecular weight and polydispersity measured by GPC were M$_n$=9,900, and M$_w$/M$_n$=1.57.

CrCl$_2$ Catalysts

Example 73
Homogeneneous ATRP of Styrene Using CrCl$_2$ as Catalyst

The following amounts of reagents were weighed into a glass tube under ambient temperature: 12mg (8.37×10$^{-2}$ mmol) of CrCl$_2$, 1.00 mL (0.909 g, 8.73 mmol) of deinhibited styrene, 60 mg (0.175 mmol) 4,4'-di-(5-nonyl)-2,2'-bipyridine, and 10 mL (8.8×10$^{-2}$ mmol) l-phenylethyl chloride. Two "freeze-pump-thaw" cycles were performed on the content of the tube to insure that oxygen was removed from the polymerization solution. The tube was sealed under vacuum then placed in an oil bath thermostated at 90° C. After 3 h the tube was broken, and the contents were dissolved in 10 mL of THF. Conversion of the monomer, measured using GC was 98%, and the molecular weight and polydispersity measured by GPC were M$_n$=30,200, and M$_w$/M$_n$=1.78.

Example 74
Homogeneneous ATRP of Methyl Acrylate Using CrCl$_2$ as Catalyst

The following amounts of reagents were weighed into glass tube under ambient temperature: 12 mg (8.37×10$^{-2}$ mmol) of CrCl$_2$, 1.00 mL (0.956 g, 8.88 mmol) of deinhibited methyl acrylate, 60 mg (0.175 mmol) 4,4'-di-(5-nonyl)-2,2'-bipyridine, and 11 mL (8.8×10$^{-2}$ mmol) methyl 2-chloropropionate. Two "freeze-pump-thaw" cycles were performed on the contents of the tube to insure that oxygen was removed from the polymerization solution. The tube was sealed under vacuum then placed in an oil bath thermostated at 90° C. After 3 h the tube was broken, and the contents were dissolved in 10 mL of THF. Conversion of the monomer, measured using GC was 100%, and the molecular weight and polydispersity measured by GPC were M$_n$=41,6000, and M$_w$/M$_n$=2.01.

Example 75
Homogeneneous ATRP of Methyl Methacrylate Using CrCl$_2$ as Catalyst The following amounts of reagents were weighed into a glass tube under ambient temperature: 12 mg (8.37×10$^{-2}$ mmol) of CrCl$_2$, 1.00 mL (0.936 g, 8.87 mmol) of deinhibited methyl acrylate, 60 mg (0.175 mmol) 4,4'-di-(5-nonyl)-2,2'-bipyridine, and 19 mg (8.8×10$^{-2}$ mmol) toluenesulfonyl chloride. Two "freeze-pump-thaw" cycles were performed on the contents of the tube to insure that oxygen was removed from the polymerization solution. The tube was sealed under vacuum then placed in an oil bath thermostated at 90° C. After 3 h the tube was broken, and the contents were dissolved in 10 mL of THF. Conversion of the monomer, measured using GC was 99%, and the molecular weight and polydispersity measured by GPC were M$_n$=38,500, and M$_w$/M$_n$=2.10.

M$_n$Cl$_2$/CrCl$_3$ Co-Catalysts

Example 76
Homogeneneous ATRP of Styrene Using MnCl$_2$/CrCl$_3$ as Catalyst The following amounts of reagents were weighed into a glass tube under ambient temperature: 12 mg (8.15×10$^2$ mmol) of MnCl$_2$, 2 mg (10$^{-2}$ mmol) CrCl$_3$, 1.00 mL (0.909 g, 8.73 mmol) of deinhibited styrene, 60 mg (0.175 mmol) 4,4'-di-(5-nonyl)-2,2'-bipyridine, and 10 mL (8.8×10$^{-2}$ mmol) phenylethyl chloride. Two "freeze-pump-thaw" cycles were performed on the contents of the tube in order to insure that oxygen was removed from the polymerization solution. The tube was sealed under vacuum then placed in an oil bath thermostated at 90° C. After 7 h the tube was broken, and the contents were dissolved in 10 mL of THF. Conversion of the monomer, measured using GC was 82%, and the molecular weight and polydispersity measured by GPC were M$_n$=8,300, and M$_w$/M$_n$=1.48.

Example 77
Homogeneneous ATRP of Methyl Acrylate Using MnCl$_2$/CrCl$_3$ as Catalyst The following amounts of reagents were weighed into a glass tube under ambient temperature: 12 mg (8.15×10$^2$ mmol) of MnCl$_2$, 2 mg (10.2 mmol) CrCl$_3$, 1.00 mL (0.956 g, 8.88 mmol) of deinhibited methyl acrylate, 60 mg (0.175 mmol) 4,4'-di-(5-nonyl)-2,2'-bipyridine, and 11 mL (8.8×10$^{-2}$ mmol) methyl 2-chloropropionate. Two "freeze-pump-thaw" cycles were performed on the contents of the tube in order to insure that oxygen was removed from the polymerization solution. The tube was sealed under vacuum then placed in an oil bath thermostated at 90° C. After 7 h the tube was broken, and the contents were dissolved in 10 mL of THF. Conversion of the monomer, measured using GC was 97%, and the molecular weight and polydispersity measured by GPC were M$_n$=10,200, and M$_w$/M$_n$=1.92.

Example 78
Homogeneneous ATRP of Methyl Methacrylate Using MnCl$_2$/CrCl$_3$ as Catalyst The following amounts of reagents were weighed into glass tube under ambient temperature: 12 mg (8.15×10$^{-2}$ mmol) of MnCl$_2$, 2 mg (10$^{-2}$ mmol) CrCl$_3$, 1.00 mL (0.936 g, 8.87 mmol) of deinhibited methyl acrylate, 60 mg (0.175 mmol) 4,4'-di-(5-nonyl)-2,2'-bipyridine [4,4'-di(5-nonyl)-2,2'-bipyridine], and 19 mg (8.8×10$^{-2}$ mmol) toluenesulphonyl chloride. Two "freeze-pump-thaw" cycles were performed on the contents of the tube to insure that oxygen was removed from the polymerization solution. The tube was sealed under vacuum then placed in an oil bath thermostated at 90° C. After 7 h the tube was broken, and the content were dissolved in 10 mL of THF. Conversion of the monomer, measured using GC was 98%, and the molecular weight and polydispersity measured by GPC were M$_n$=9,900, and M$_w$/M$_n$=1.59.

MnCl$_2$/CuCl$_2$ Co-Catalysts

Example 79
Homogeneneous ATRP of Styrene Using $MnCl_2/CuCl_2$ as Catalyst

The following amounts of reagents were weighed into a glass tube under ambient temperature: 12 mg ($8.15 \times 10^{-2}$ mmol) of $MnCl_2$, 2 mg ($10^{-2}$ mmol) $CuCl_2$, 1.00 mL (0.909 g, 8.73 m deinhibited styrene, 60 mg (0.175 mmol) 4,4'-di-(5-nonyl)-2,2'-bipyridine, and 10 mL ($8.8 \times 10^{-2}$ mmol) 1-phenylethyl chloride. Two "freeze-pump-thaw" cycles were performed on the content of tube to insure that oxygen was removed from the polymerization solution. The tube was sealed under vacuum then placed in an oil bath thermostated at 90° C. After 12 h the tube was broken, and the contents were dissolved in 10 mL of THF. Conversion of the monomer, measured using GC was 52%, and the molecular weight and polydispersity measured by GPC were $M_n$=5, 300, and $M_w/M_n$=1.28.

Example 80
Homogeneneous ATRP of Methyl Acrylate Using $MnCl_2/CuCl_2$ as Catalyst The following amounts of reagents were weighed into glass tube under ambient temperature: 12 mg ($8.15 \times 10^{-2}$ mmol) of $MnCl_2$, 2 mg ($10^{-2}$ mmol) $CuCl_2$, 1.00 mL (0.956 g, 8.88 mmol) of deinhibited methyl acrylate, 60 mg (0.175 mmol) 4,4'-di-(5-nonyl)-2,2'-bipyridine, and 11 mL ($8.8 \times 10^{-2}$ mmol) methyl 2-chloropropionate. Two "freeze-pump-thaw" cycles were performed on the contents of the tube to insure that oxygen was removed from the polymerization solution. The tube was sealed under vacuum then placed in an oil bath thermostated at 90° C. After 12 h the tube was broken, and the content were dissolved in 10 mL of THF. Conversion of the monomer, measured using GC was 77%, and the molecular weight and polydispersity measured by GPC were $M_n$=7,200, and $M_w/M_n$=1.72.

Example 81
Homogeneneous ATRP of Methyl Methacrylate Using $MnCl_2/CuCl_2$ as Catalyst The following amounts of reagents were weighed into a glass tube under ambient temperature: 12 mg ($8.15 \times 10^2$ mmol) of $MnCl_2$, 2 mg ($10^{-2}$ mmol) $CuCl_2$, 1.00 mL (0.936 g, 8.87 mmol) of deinhibited methyl acrylate, 60 mg (0.175 mmol) 4,4'-di-(5-nonyl)-2,2'-bipyridine, and 19 mg ($8.8 \times 10^{-2}$ mmol) toluenesulfonyl chloride. Two "freeze-pump-thaw" cycles were performed on the contents of the tube to insure that oxygen was removed from the polymerization solution. The tube was sealed under vacuum then placed in an oil bath thermostated at 90° C. After 12 h the tube was broken, and the contents were dissolved in 10 mL of THF. Conversion of the monomer, measured using GC was 78%, and the molecular weight and polydispersity measured by GPC were $M_n$=8,200, and $M_w/M_n$=1.37.

New Ligands
Copper (I)
N,N,N',N',N''-Pentamethyldiethylenetriamine

Example 82
Bulk Polymerization of Styrene with CuBr/N,N,N',N',N''-Pentamethyldiethylenetriamine (PMDETA)/1-Phenylethyl bromide The following amounts of reagents were weighed into a glass tube under ambient temperature: 13 mg ($9.06 \times 10^{-2}$ mmol) of CuBr, 9.5 µl ($9.06 \times 10^{-2}$ mmol) PMDETA, 12.4 µl ($9.06 \times 10^{-2}$ mmol) (1-bromoethyl)benzene and 1.00 mL (8.73 mmol) of styrene. Three "freeze-pump-thaw" cycles were performed on the contents of the tube to insure that oxygen was removed from the polymerization solution. The tube was sealed under vacuum and placed in an oil bath thermostated at 90° C. At the timed interval, polymerization was stopped by cooling the tubes into ice. Afterward, the tube was opened and the contents dissolved in THF.

| Sample | Time (h) | Conversion (%) | Mn, Cal | Mn, SEC | Mw/Mn |
|---|---|---|---|---|---|
| 1 | 0.75 | 32 | 3200 | 3060 | 1.47 |
| 2 | 1.40 | 40 | 4000 | 4090 | 1.40 |
| 3 | 2.53 | 48 | 4750 | 4220 | 1.33 |
| 4 | 3.50 | 56 | 5600 | 5300 | 1.27 |
| 6 | 5.30 | 78 | 7800 | 7340 | 1.35 |

Example 83
Bulk Polymerization of Methyl Acrylate with CuBr/N,N,N',N',N''-Pentamethyldiethylenetriamine (PMDETA)/Ethyl 2-Bromopropionate The following amounts of reagents were weighed into a glass tube under ambient temperature: 6.8 mg ($4.78 \times 10^{-2}$ mmol) of CuBr, 10 µl ($4.78 \times 10^{-2}$ mmol) PMDETA, 6.2 µl ($4.78 \times 10^{-2}$ mmol) ethyl 2-bromopropionate and 1.00 mL (11.1 mmol) of methyl acrylate. Three "freeze-pump-thaw" cycles were performed on the contents of the tube to insure that oxygen was removed from the polymerization solution. The tube was sealed under vacuum and placed in an oil bath thermostated at 90° C. At the timed interval, polymerization was stopped by cooling the tubes into ice. Afterward, the tube was opened and the contents dissolved in THF.

| Sample | Time (h) | Conversion (%) | Mn, Cal | Mn, SEC | Mw/Mn |
|---|---|---|---|---|---|
| 1 | 2.0 | 61 | 12300 | 11700 | 1.13 |
| 2 | 3.0 | 76 | 15200 | 14000 | 1.13 |
| 3 | 4.7 | 91 | 18200 | 18100 | 1.20 |

Example 84
Solution Polymerization of Methyl Methacrylate with CuBr/N,N,N',N',N''-Pentamethyldiethylenetriamine (PMDETA)/Diethyl 2-Bromo-2-Methylmalonate The following amounts of reagents were weighed into a glass tube under ambient temperature: 3.3 mg ($2.3 \times 10^{-2}$ mmol) of CuBr, 4.9 µl ($2.3 \times 10^{-2}$ mmol) PMDETA, 8.9 µl ($4.7 \times 10^{-2}$ mmol) diethyl 2-bromo-2-methylmalonate, 1.00 mL (9.35 mmol) of methyl acrylate and 1.00 ml of anisole. Three "freeze-pump-thaw" cycles were performed on the contents of the tube to insure that oxygen was removed from the polymerization solution. The tube was sealed under vacuum and placed in an oil bath thermostated at 90° C. After 0.5 h the tube was broken, and the contents were dissolved in 5 mL of THF. Conversion of the monomer was measured using GC, and the molecular weight and polydispersity were measured by GPC. Conversion was 30%, $M_n$=8230 and $M_w/M_n$=1.23.

1,1,4,7,10,10-Hexamethyltriethylenetetramine

Example 85
Bulk Polymerization of Styrene with CuBr/1,1,4,7,10,10-Hexamethyltriethylenetetramine (HMTETA)/1-Phenylethyl bromide The following amounts of reagents were weighed into a glass tube under ambient temperature: 13 mg ($9.06 \times 10^{-2}$ mmol) of CuBr, 24.8 µl ($9.06 \times 10^2$ mmol) HMTETA, 12.4 µl (9.06×10² mmol) (1-bromoethyl)benzene and 1.00 mL (8.73 mmol) of styrene. Three "freeze-pump-thaw" cycles were performed on the contents of the tube to insure that oxygen was removed from the polymerization solution. The tube was sealed under vacuum and placed in an oil bath thermostated at 90° C. After 2.0 h the tube was broken, and the contents were dissolved in 10 mL of THF. Conversion of the monomer was measured using GC, and the molecular weight and polydispersity were measured by GPC. Conversion was 65%, $M_n$=5590 and $M_w/M_n$=1.23.

Example 86
Bulk Polymerization of Methyl Acrylate with CuBr/1,1,4,7,10,10-Hexamethyltriethylenetetramine (HMTETA)/Ethyl 2-Bromopropionate The following amounts of reagents were weighed into a glass tube under ambient temperature: 6.8 mg ($4.78×10^{-2}$ mmol) of CuBr, 13 µl ($4.78×10^{-2}$ mmol) HMTETA, 6.2 µl ($4.78×10^{-2}$ mmol) ethyl 2-bromopropionate and 1.00 mL (11.1 mmol) of methyl acrylate. Three "freeze-pump-thaw" cycles were performed on the contents of the tube to insure that oxygen was removed from the polymerization solution. The tube was sealed under vacuum and placed in an oil bath thermostated at 90° C. After 1.6 h the tube was broken, and the contents were dissolved in 5 mL of THF. Conversion of the monomer was measured using GC, and the molecular weight and polydispersity were measured by GPC. Conversion was 49%, $M_n$=9150 and $M_w/M_n$=1.24.

Example 87
Solution Polymerization of Methyl Methacrylate with CuBr/1,1,4,7,10,10-Hexamethyltriethylenetetramine (HMTETA)/Ethyl 2-Bromoisobutyrate The following amounts of reagents were weighed into a glass tube under ambient temperature: 3.3 mg ($2.3×10^2$ mmol) of CuBr, 6.4 µl ($2.3×10^2$ mmol) HMTETA, 6.1 µl ($4.7×10^{-2}$ mmol) ethyl 2-bromoisobutyrate, 1.00 mL (9.35 mmol) of methyl acrylate and 1.00 ml of anisole. Three "freeze-pump-thaw" cycles were performed on the contents of the tube to insure that oxygen was removed from the polymerization solution. The tube was sealed under vacuum and placed in an oil bath thermostated at 90° C. After 1.6 h the tube was broken, and the contents were dissolved in 5 mL of THF. Conversion of the monomer was measured using GC, and the molecular weight and polydispersity were measured by GPC. Conversion was 55%, $M_n$=12900 and $M_w/M_n$=1.38.

1,4,8,11-Tetramethyl-1,4,8,11-Tetraazacyclotetradecane

Example 88
Bulk Polymerization of Styrene with CuBr/1,4,8,11-Tetramethyl-1,4,8,11-Tetraazacyclotetradecane (TMTACTD)/1-Phenylethyl Bromide The following amounts of reagents were weighed into a glass tube under ambient temperature: 13 mg ($9.06×10^{-2}$ mmol) of CuBr, 23.3 mg ($9.06×10^{-2}$ mmol) TMTACTD, 12.4 µl ($9.06×10^{-2}$ mmol) (1-bromoethyl)benzene and 1.00 mL (8.73 mmol) of styrene. Three "freeze-pump-thaw" cycles were performed on the contents of the tube to insure that oxygen was removed from the polymerization solution. The tube was sealed under vacuum and placed in an oil bath thermostated at 110° C. After 2.0 h the tube was broken, and the contents were dissolved in 10 mL of THF. Conversion of the monomer was measured using GC, and the molecular weight and polydispersity were measured by GPC. Conversion was 47%, $M_n$=4780 and $M_w/M_n$=1.72.

8-Hydroxyquinoline

Example 89
ATRP of Styrene Using CuBr/Bipy/8-Hydroxyquinoline

The following amounts of reagents were weighed into a glass tube under ambient temperature: 12 mg ($8.15×10^{-2}$ mmol) of CuBr, 1.00 mL (0.909 g, 8.73 mmol) of deinhibited styrene, 14 mg (0.08 mmol) 2,2'-bipyridine, 12 mg (0.08 mmol) 8-hydroxyquinoline, and 12 mL ($8.8×10^{-2}$ mmol) 1-phenylethyl bromide. Two "freeze-pump-thaw" cycles were performed on the contents of the tube to ensure that oxygen was removed from the polymerization solution. The tube was sealed under vacuum and then placed in an oil bath thermostated at 90° C. After 7 h the tube was broken, and the contents were dissolved in 10 mL of THF. Conversion of the monomer, as measured using GC, was 28%, and the molecular weight and polydispersity (GPC) were $M_n$=3,200, and $M_w/M_n$=1.21.

Example 90
ATRP of Methyl Acrylate Using CuBr/Bipy/8-Hydroxyquinoline

The following amounts of reagents were weighed into a glass tube under ambient temperature: 12 mg ($8.15×10^{-2}$ mmol) of CuBr, 1.00 mL (0.956 g, 8.88 mmol) of deinhibited methyl acrylate, 14 mg (0.08 mmol) 2,2'-bipyridine, 12 mg (0.08 mmol) 8-hydroxy quinoline, and 12 mL ($8.8×10^{-2}$ mmol) methyl 2-bromopropionate. Two "freeze-pump-thaw" cycles were performed on the contents of the tube to ensure that oxygen was removed from the polymerization solution. The tube was sealed under vacuum and placed in an oil bath thermostated at 90° C. After 4 h the tube was broken, and the contents were dissolved in 10 mL of THF. Conversion of the monomer, as determined by GC was 50%, and the molecular weight and polydispersity, measured by GPC, were $M_n$=5,200 and $M_w/M_n$=1.25.

Example 91
ATRP of Methyl Methacrylate Using CuBr/Bipy/8-Hydroxyquinoline

The following amounts of reagents were weighed into glass tube under ambient temperature: 12 mg ($8.15×10^{-2}$ mmol) of CuBr, 1.00 mL (0.936 g, 8.87 mmol) of deinhibited methyl acrylate, 14 mg (0.08 mmol) 2,2'-bipyridine, 12 mg (0.08 mmol) 8-hydroxy quinoline, and 19 mg ($8.8×10^{-2}$ mmol) p-toluenesulfonyl chloride. Two "freeze-pump-thaw" cycles were performed on the contents of the tube to ensure that oxygen was removed from the polymerization solution. The tube was sealed under vacuum and placed in an oil bath thermostated at 90° C. After 4 h the tube was broken, and the contents were dissolved in 10 mL of THF. Conversion of the monomer, as determined by GC was 75%, and the molecular weight and polydispersity, measured by GPC, were $M_n$=7,800, and $M_w/M_n$=1.29.

Example 92
Bulk Polymerization of Methyl Acrylate/methyl 2-bromopropionate/Cu(OTf)₂/Cu(0) with 8-Hydroxyquinoline, Aluminum Salt A 10 mL Schlenk flask was charged with Cu(0) (2 mg; 0.032 mmol), Cu(OTf)₂ (12 mg; 0.033 mmol), 8-Hydroxyquinoline, aluminum salt, (11 mg; 0.022 mmol), methyl 2-bromopropionate (37 mL; 0.33 mmol) and methyl acrylate (6 mL; 66.6 mmol) followed by 0.6 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 80° C.

with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | $M_n$(SEC) | $M_w$(th) | $M_w/M_n$ |
|---|---|---|---|---|
| 15 | 3 | — | 522 | — |
| 45 | 30 | 10200 | 5220 | 1.91 |
| 60 | 44 | 11800 | 7656 | 1.93 |
| 90 | 67 | 13700 | 11658 | 1.84 |
| 110 | 77 | 14700 | 13398 | 1.84 |

Tetramethylethylenediamine

Example 93
Bulk Polymerization by ATRP Using CuBr/tetramethylethylenediamine To a dry schlenk flask under argon, CuBr (127.1 mg, 0.874 mmol), tetramethylethylenedamine (264 µL, 1.75 mmol), degassed styrene (10.0 ml, 87.4 mmol) and 1-phenylethyl bromide (119.3 µL, 0.874 mmol) were added. The solution was allowed to stir at room temperature until it became homogeneous and then transferred to dry glass tubes under argon. Three freeze-pump-thaw cycles were performed, the tubes were sealed under vacuum, and then placed in an oil bath thermostated at the desired temperature. Tubes were removed at timed intervals and the polymerization quenched by cooling the tubes in ice. Afterward, the tubes were opened and the contents dissolved in THF.

| Sample | Time (h) | Conversion (%) | $M_n$, Cal | $M_n$, SEC | $M_w/M_n$ |
|---|---|---|---|---|---|
| 1 | 1 | 6.1 | 610 | 1,100 | 1.95 |
| 2 | 2 | 24.5 | 2500 | 2,800 | 1.62 |
| 3 | 3.1 | 35.9 | 3600 | 4,000 | 1.53 |
| 4 | 5.1 | 54.4 | 5400 | 6,800 | 1.50 |
| 5 | 6.8 | 76.7 | 7700 | 9,100 | 1.57 |

Example 94
Bulk Polymerization by ATRP Using CuBr Tetramethylethylenediamine To a dry schlenk flask under argon, CuBr (71.3 mg, 0.49 mmol), tetramethylethylenediamine (148 uL, 0.98 mmol), degassed methyl acrylate (10.0 ml, 111.2 mmol) and ethyl 2-bromopropionate (63.6 uL, 0.49 mmol) were added. The solution was allowed to stir at room temperature until it became homogeneous and then transferred to dry glass tubes under argon. Three freeze-pump-thaw cycles were performed, the tubes were sealed under vacuum, and then placed in an oil bath thermostated at the desired temperature. Tubes were removed at timed intervals and the polymerization quenched by cooling the tubes in ice. Afterward, the tubes were opened and the contents dissolved in THF.

| Sample | Time (h) | Conversion (%) | $M_n$, Cal | $M_n$, SEC | $M_w/M_n$ |
|---|---|---|---|---|---|
| 1 | 1.0 | 21.3 | 4,300 | 4,600 | 1.55 |
| 2 | 2.0 | 55.5 | 11,100 | 11,200 | 1.31 |
| 3 | 2.6 | 74.6 | 14,900 | 14,100 | 1.37 |
| 4 | 3.3 | 83.2 | 16,600 | 15,400 | 1.39 |
| 5 | 4.6 | 91.9 | 18,400 | 17,100 | 1.51 |

Example 95

34.0 mg (0.234 mmol) CuBr, 5.0 ml (46.8 mmol) methyl methacrylate, 70.6 µl (0.468 mmol) tetramethylethylenediamine, and 5.0 ml anisole were added to a dry round-botttomed flask under an argon atmosphere. After the mixture was stirred until homogeneous, 34.3 µl (0.234 mmol) ethyl 2-bromoisobutyrate was added to the flask which was then immersed in an oil bath thermostated at the desired temperature. A positive argon pressure was maintained throughout the reaction and samples were withdrawn at timed intervals.

| Sample | Time (h) | Conversion (%) | $M_n$, Cal | $M_n$, SEC | $M_w/M_n$ |
|---|---|---|---|---|---|
| 1 | 0.4 | 7.4 | 1,500 | 4,300 | 1.33 |
| 2 | 1.0 | 28.2 | 5,600 | 8000 | 1.27 |
| 3 | 1.6 | 49.0 | 9,800 | 10,700 | 1.26 |
| 4 | 2.2 | 61.9 | 12,400 | 13,100 | 1.30 |
| 5 | 3.0 | 76.7 | 15,300 | 15,600 | 1.29 |
| 6 | 3.4 | 80.4 | 16,100 | 15,900 | 1.37 |
| 7 | 4.1 | 85.9 | 17,200 | 18,300 | 1.35 |
| 8 | 5.0 | 88.9 | 17,800 | 17,300 | 1.42 |
| 9 | 5.8 | 91.1 | 18,200 | 17,800 | 1.46 |

Iron (II) NR$_3$ Ligands

Example 96
Bulk Polymerization Using FeBr$_2$/4,4'-di(5-nonyl)-2,2'-bipyridine/NBu$_3$ The following reagents were transferred into glass tubes purged with argon: 19.0 mg ($8.73 \times 10^{-2}$ mmol) of FeBr$_2$, 1.0 ml (8.73 mmol) of styrene, 12.0 ml ($8.73 \times 10^{-2}$ mmol) of 1-phenylethyl bromide, 35.6 mg ($8.73 \times 10^{-2}$ mmol) of 4,4'-di(5-nonyl)-2,2'-bipyridine and 21.0 ml ($8.73 \times 10^{-2}$ mmol) of tri(n-butyl)amine. Each tube was degassed three times by "freeze-pump-thaw" cycles and sealed under vacuum. The tubes were placed in an oil bath thermostated at 110 µC and were removed from the oil bath at timed intervals.

| Sample | Time (h) | Conversion (%) | $M_n$, (th.) | $M_n$, (GPC) | $M_w/M_n$ |
|---|---|---|---|---|---|
| 1 | 1.5 | 30.7 | 3,200 | 3,200 | 1.15 |
| 2 | 3.0 | 48.5 | 5,000 | 5,100 | 1.11 |
| 3 | 5.0 | 67.2 | 7,000 | 7,200 | 1.13 |
| 4 | 8.0 | 87.1 | 9,100 | 9,800 | 1.20 |

Example 97
Solution Polymerization of FeBr$_2$/NBu$_3$

The following reagents were transferred into a 25 ml schlenk flask equipped with a magnetic stir bar under an argon atmosphere: 95.0 mg (0.436 mmol) of FeBr$_2$, 5.0 ml (43.6 mmol) of styrene, 60.0 ml (0.436 mmol) of 1-phenylethyl bromide, 310 ml (1.3 mmol) of tri(n-butyl) amine and 5.0 ml o-xylene. The solution was stirred at room temperature for 20 minutes and then the flask was put into an oil bath thermostated at 110° C. A positive argon pressure was maintained throughout the reaction and samples were withdrawn at time intervals. The polymerization solution was heterogeneous.

| Sample | Time (h) | Conversion (%) | $M_n$, (th.) | $M_n$, (GPC) | $M_w/M_n$ |
|---|---|---|---|---|---|
| 1 | 2.0 | 26.3 | 2,700 | 3,100 | 1.43 |
| 2 | 5.0 | 42.8 | 4,400 | 4,300 | 1.19 |
| 3 | 15.0 | 62.8 | 6,500 | 5,900 | 1.16 |
| 4 | 24.0 | 69.3 | 7,200 | 7,200 | 1.17 |

Example 98

Bulk Polymerization of Styrene with FeBr2/N(n-Octyl)3/1-phenylethylbromide

A dry round-bottomed flask was charged with $FeBr_2$ (95.0 mg, 0.436 mmol). The flask was sealed with a rubber septum and was cycled between vacuum and argon three times to remove the oxygen. Degassed styrene (10.0 ml, 87.3 mmol), $N(n\text{-Octyl})_3$ (0.38 ml, 0.87 mmol) and 1-phenylethyl bromide (0.06 ml, 0.436 mmol) were added using degassed syringes and stainless steel needles. The flask was immersed in an oil bath held by a thermostat at 110° C. At the timed intervals, a sample was withdrawn from the flask using a degassed syringe and added to THF.

| Sample | Time (h) | Conversion (%) | $M_n$, Cal | $M_n$, SEC | $M_w/M_n$ |
|---|---|---|---|---|---|
| 1 | 1.0 | 20 | 4100 | 4700 | 1.35 |
| 2 | 2.0 | 29 | 6000 | 6700 | 1.29 |
| 3 | 3.0 | 36 | 7500 | 8200 | 1.27 |
| 4 | 4.0 | 42 | 8800 | 9100 | 1.27 |
| 5 | 5.0 | 51 | 10500 | 11300 | 1.26 |
| 6 | 6.0 | 54 | 11300 | 12700 | 1.27 |
| 7 | 9.0 | 63 | 13200 | 15800 | 1.26 |

Example 99

Solution Polymerization of Styrene with FeBr2/N(n-Octyl)3/Tetrabutylammonium bromide/1-phenylethylbromide A dry round-bottomed flask was charged with $FeBr_2$ (95.0 mg, 0.436 mmol) and $N(n\text{-Bu})_4Br$ (70.0 mg, 0.22 mmol). The flask was sealed with a rubber septum and was cycled between vacuum and argon three times to remove the oxygen. Degassed styrene (5.0 ml, 43.6 mmol), $N(n\text{-Octyl})_3$ (0.38 ml, 0.87 mmol), 1-phenylethylbromide (0.06 ml, 0.436 mmol) and o-xylene (5.0 ml) were added using degassed syringes and stainless steel needles. The flask was immersed in an oil bath held by a thermostat at 110° C. At the timed intervals, a sample was withdrawn from the flask using a degassed syringe and added to THF.

| Sample | Time (h) | Conversion (%) | $M_n$, Cal | $M_n$, SEC | $M_w/M_n$ |
|---|---|---|---|---|---|
| 1 | 1.0 | 27 | 2800 | 2700 | 1.20 |
| 2 | 2.0 | 35 | 3600 | 3700 | 1.18 |
| 3 | 4.0 | 44 | 4600 | 4700 | 1.16 |
| 4 | 6.0 | 49 | 5100 | 5500 | 1.14 |
| 5 | 8.0 | 53 | 5600 | 6100 | 1,15 |
| 6 | 11.0 | 57 | 6000 | 7000 | 1.14 |

Example 100

Solution Polymerization Using $FeBr_2/NBu_3$/p-toluenesulfonyl chloride 34.0 mg (0.18 mmol) of $FeBr_2$, 5.0 ml (53.5 mmol) of methyl methacrylate, 112 ml (0.53 mmol) of tri(n-butyl) amine and 4.0 ml o-xylene were transferred into a 25 ml schlenk flask equipped with a magnetic stir bar under an argon atmosphere. The solution was stirred at room temperature for 20 minutes, and 30 mg (0.18 mmol) of p-toluenesulfonyl chloride in 1.0 ml of o-xylene was added to the flask. The flask was put into an oil bath thermostated at 80° C. A positive argon pressure was maintained throughout the reaction and samples were withdrawn at time intervals. The polymerization solution was heterogeneous.

| Sample | Time (hr) | Conv. (%) | $M_n$ (th.) | $M_n$ (GPC) | $M_w/M_n$ |
|---|---|---|---|---|---|
| 1 | 0.5 | 18.0 | 5,400 | 5,600 | 1.71 |
| 2 | 1.0 | 33.3 | 10,000 | 12,400 | 1.66 |
| 3 | 2.0 | 49.4 | 14,800 | 17,500 | 1.69 |
| 4 | 3.0 | 58.3 | 17,500 | 19,000 | 1.69 |
| 5 | 4.0 | 67.7 | 20,300 | 21,300 | 1.69 |
| 6 | 5.0 | 77.9 | 23,400 | 25,600 | 1.60 |

Example 101

Solution Polymerization Using $FeBr_2$/4,4'-di(5-nonyl)-2,2'-bipyridine/$NBu_3$/p-toluenesulfonyl chloride 34.0 mg (0.18 mmol) of $FeBr_2$, 5.0 ml (53.5 mmol) of methyl methacrylate, 37 ml (0.18 mmol) of tri(n-butyl) amine, 64.0 mg (0.18 mmol) 4,4'-di(5-nonyl)-2,2'-bipyridine and 4.0 ml o-xylene were transferred into a 25 ml schlenk flask equipped with a magnetic stir bar under an argon atmosphere. The solution was stirred at room temperature for 20 minutes, and 30 mg (0.18 mmol) of p-toluenesulfonyl chloride in 1.0 ml of o-xylene was added to the flask. The flask was put into an oil bath thermostated at 80° C. A positive argon pressure was maintained throughout the reaction and samples were withdrawn at time intervals. The polymerization solution was homogeneous.

| Sample | Time (hr) | Conv. (%) | $M_n$ (th.) | $M_n$ (GPC) | $M_w/M_n$ |
|---|---|---|---|---|---|
| 1 | 1.0 | 15.0 | 7,500 | 7,400 | 1.28 |
| 2 | 2.0 | 31.3 | 9,400 | 11,600 | 1.36 |
| 3 | 4.5 | 51.2 | 15,400 | 17,900 | 1.38 |
| 4 | 8.0 | 67.8 | 20,300 | 19,900 | 1.38 |
| 5 | 24.0 | 88.5 | 26,600 | 27,100 | 1.33 |

Example 102

Solution Polymerization of MMA with $FeBr_2/N(n\text{-Octyl})_3$/p-toluenesulfonyl chloride A dry round-bottomed flask was charged with $FeBr_2$ (34.0 mg, 0.16 mmol). The flask was sealed with a rubber septum and was cycled between vacuum and argon three times to remove the oxygen. Degassed methyl methacrylate (5.0 ml, 46.7 mmol), o-xylene (4.0 ml) and $N(n\text{-Octyl})_3$ (0.14 ml, 0.32 mmol) were added using degassed syringes and stainless steel capillaries. The o-toluenesulfonyl chloride (30.0 mg, 0.16 mmol) was added as a solution in o-xylene (1.0 ml) and the flask was immersed in an oil bath held by a thermostat at 80° C. At the timed intervals, a sample was withdrawn from the flask using a degassed syringe and added to THF.

| Sample | Time (h) | Conversion (%) | $M_n$, Cal | $M_n$, SEC | $M_w/M_n$ |
|---|---|---|---|---|---|
| 1 | 1.0 | 22 | 6450 | 7000 | 1.45 |
| 2 | 2.0 | 35 | 10400 | 15000 | 1.43 |
| 3 | 3.0 | 47 | 14000 | 18800 | 1.46 |
| 4 | 4.0 | 53 | 16000 | 21100 | 1.48 |
| 5 | 5.5 | 61 | 18300 | 23500 | 1.46 |
| 6 | 7.0 | 66 | 19900 | 25300 | 1.44 |
| 7 | 10.0 | 75 | 22400 | 27300 | 1.40 |

Example 103
Solution Polymerization of MMA with $FeBr_2/N(n\text{-}Octyl)_3/$p-toluenesulfonyl chloride A dry round-bottomed flask was charged with $FeBr_2$ (34.0 mg, 0.16 mmol) and $N(n\text{-}Bu)_4Br$ (17.0 mg, 0.5 mmol). The flask was sealed with a rubber septum and was cycled between vacuum and argon three times to remove the oxygen. Degassed methyl methacrylate (5.0 ml, 46.7 mmol), o-xylene (4.0 ml) and $N(n\text{-}Octyl)_3$ (0.14 ml, 0.32 mmol) were added using degassed syringes and stainless steel capillaries. The o-toluenesulfonyl chloride (30.0 mg, 0.16 mmol) was added as a solution in o-xylene (1.0 ml) and the flask was immersed in an oil bath held by a thermostat at 80° C. At the timed intervals, a sample was withdrawn from the flask using a degassed syringe and added to THF.

| Sample | Time (h) | Conversion (%) | $M_n$, Cal | $M_n$, SEC | $M_w/M_n$ |
|---|---|---|---|---|---|
| 1 | 1.0 | 17 | 5000 | 6900 | 1.43 |
| 2 | 2.0 | 28 | 8400 | 11900 | 1.43 |
| 3 | 3.0 | 37 | 11100 | 15400 | 1.42 |
| 4 | 4.5 | 47 | 14200 | 19100 | 1.40 |
| 5 | 6.0 | 59 | 17500 | 22500 | 1.37 |
| 6 | 8.8 | 70 | 21100 | 25600 | 1.37 |
| 7 | 10.0 | 74 | 22300 | 26100 | 1.37 |

Example 104
Solution Polymerization of MMA with $FeBr2/FeBr_3/N(n\text{-}Octyl)_3$/p-toluenesulfonyl chloride A dry round-bottomed flask was charged with $FeBr_2$ (34.0 mg, 0.16 mmol) and $FeBr_3$ (4.7 mg, 0.016 mmol). The flask was sealed with a rubber septum and was cycled between vacuum and argon three times to remove the oxygen. Degassed methyl methacrylate (5.0 ml, 46.7 mmol), o-xylene (4.0 ml) and $N(n\text{-}Octyl)_3$ (0.14 ml, 0.32 mmol) were added using degassed syringes and stainless steel capillaries. The o-toluenesulfonyl chloride (30.0 mg, 0.16 mmol) was added as a solution in o-xylene (1.0 ml) and the flask was immersed in an oil bath held by a thermostat at 80° C. At the timed intervals, a sample was withdrawn from the flask using a degassed syringe and added to THF.

| Sample | Time (h) | Conversion (%) | $M_n$, Cal | $M_n$, SEC | $M_w/M_n$ |
|---|---|---|---|---|---|
| 1 | 1.0 | 14 | 4100 | 4700 | 1.43 |
| 2 | 2.0 | 27 | 8100 | 9700 | 1.40 |
| 3 | 3.0 | 39 | 11600 | 13000 | 1.46 |
| 4 | 4.5 | 49 | 14700 | 16200 | 1.46 |
| 5 | 6.0 | 57 | 17100 | 18700 | 1.45 |
| 6 | 12.0 | 71 | 21200 | 23300 | 1.44 |
| 7 | 29.0 | 86 | 25800 | 26900 | 1.42 |

$PR_3$ Ligands

Example 105
Bulk Polymerization Using $FeBr_2/PBu_3$

The following reagents were transferred into glass tubes purged with argon: 9.5 mg ($4.36\times10^{-2}$ mmol) of $FeBr_2$, 1.0 ml (8.73 mmol) of styrene, 6.0 ml ($4.36\times10^{-2}$ mmol) of 1-phenylethyl bromide and 32.4 ml ($13.1\times10^{-2}$ mmol) of tri(n-butyl)phosphine. Each tube was degassed three times by "freeze-pump-thaw" cycles and sealed under vacuum. The tubes were placed in an oil bath thermostated at 110° C. and were removed from the oil bath at timed intervals.

| Sample | Time (hr) | Conv. (%) | $M_n$ (th.) | $M_n$ (GPC) | $M_w/M_n$ |
|---|---|---|---|---|---|
| 1 | 1.0 | 25.6 | 5,300 | 4,700 | 1.55 |
| 2 | 2.0 | 41.5 | 8,600 | 9,600 | 1.30 |
| 3 | 3.0 | 59.6 | 12,400 | 13,200 | 1.43 |
| 4 | 4.0 | 69.4 | 14,400 | 15,800 | 1.40 |

Example 106
Bulk Polymerization Using $FeBr_2$/4,4'-di(5-nonyl)-2,2'-bipyridine/$PBu_3$ The following reagents were transferred into glass tubes purged with argon: 19.0 mg ($8.73\times10^{-2}$ mmol) of $FeBr_2$, 1.0 ml (8.73 mmol) of styrene, 12.0 ml ($8.73\times10^{-2}$ mmol) of 1-phenylethyl bromide, 35.6 mg ($8.73\times10^{-2}$ mmol) of 4,4'-di(5-nonyl)-2,2'-bipyridine and 21.6 ml ($8.73\times10^{-2}$ mmol) of tri(n-butyl)phosphine. Each tube was degassed three times by "freeze-pump-thaw" cycles and sealed under vacuum. The tubes were placed in an oil bath thermostated at 110° C. and were removed from the oil bath at timed intervals.

| Sample | Time (hr) | Conv. (%) | $M_n$ (th.) | $M_n$ (GPC) | $M_w/M_n$ |
|---|---|---|---|---|---|
| 1 | 1.0 | 28.9 | 3,000 | 2,100 | 1.34 |
| 2 | 2.0 | 39.3 | 4,100 | 4,600 | 1.15 |
| 3 | 3.0 | 59.8 | 6,200 | 6,400 | 1.12 |
| 4 | 4.0 | 68.4 | 7,100 | 7,900 | 1.12 |
| 5 | 5.0 | 82.1 | 8,500 | 9,600 | 1.13 |

Miscellaneous Ligands

Example 107

The following reagents were transferred into a glass tube purged with argon: 19.0 mg ($8.73\times10^{-2}$ mmol) of $FeBr_2$, 1.0 ml (8.73 mmol) of styrene, 12.0 ml ($8.73\times10^{-2}$ mmol) of 1-phenylethyl bromide and 26.4 uL tetramethylethylenediamine, ($17.5\times10^{-2}$ mmol). Each tube was degassed three times by "freeze-pump-thaw" cycles and sealed under vacuum. The tube was placed in an oil bath thermostated at 110° C. and was removed from the oil bath after 6.0 h. The conversion was 61% as determined by gas chromatography. $M_{n,theory}$=6,300; $M_{n,GPC}$=7,500; $M_w/M_n$=1.6.

Mixed Ligands

Mixed dNbpy/DMAEMAE, dNbpy/TMEDA, and dNbpy/TEEDA

DMAEMAE=2-{[2-(dimethylamino)ethyl]-methylamino}ethanol, TMEDA=N,N,N',N'-tetramethylethylene diamine TEEDA=N,N,N',N'-tetraethylethylenediamine

Example 108
Bulk Polymerization of Styrene/1-Phenylethyl Bromide/CuBr

A dry long glass-tube was charged with CuBr (13 mg, 0.09 mmol), 4,4'-di(5-nonyl)-2,2'-bipyridine (37.2 mg, 0.009 mmol), 2-{[2-(dimethylamino)ethyl]-methylamino}ethanol (14.7 l, 0.09 mmol), 1-phenylethyl bromide (12.4 l, 0.09 mmol), styrene (1 ml, 8.7 mmol), and a magnetic stir bar. The glass tube was degassed by three freeze-pump-thaw cycles and was then sealed by flame. The glass tube was immersed in an oil bath thermostated at 110° C. At certain time, the glass tube was taken out and broken. The sample was dissolved in THF to measure conversion (GC) and molecular weight (SEC).

| Ligand | Time (h) | Conversion (%) | $M_{n,th}$ | $M_{n,SEC}$ | $M_w/M_n$ |
|---|---|---|---|---|---|
| DMAEMAE/dNbpy | 3 | 68.2% | 6820 | 5530 | 1.13 |
| TMEDA/dNbpy | 5.08 | 58.4% | 5840 | 5040 | 1.10 |

| Ligand | Time (h) | Conversion (%) | $M_{n,th}$ | $M_{n,SEC}$ | $M_w/M_n$ |
|---|---|---|---|---|---|
| DMAEMAE/dTbpy | 1.07 | 15.7 | 1570 | 1460 | 1.23 |
| DMAEMAE/dTbpy | 2.01 | 33.8 | 3380 | 3290 | 1.11 |
| DMAEMAE/dTbpy | 3 | 52.2 | 5220 | 4680 | 1.11 |
| DMAEMAE/dTbpy | 4 | 56.6 | 5660 | 4952 | 1.13 |
| DMAEMAE/dTbpy | 4.88 | 77.3 | 7730 | 6190 | 1.18 |
| DMAEMAE/dTbpy | 5.67 | 92.1 | 9210 | 7810 | 1.43 |

Effect of Ligand
ABC* Polymerizations

Example 109
Use of 4,4'-di(5-nonyl)-2,2'-bipyridine/CuBr

To a 10 ml round bottom flask with a stir bar, 4,4'-di(5-nonyl)-2,2'-bipyridine (244.8 mg, 0.6 mmol) and CuBr (43.6 mg, 0.3 mmol) were added and sealed with a rubber septum. The contents of the flask were degassed by applying a vacuum and backfilling with nitrogen (3×). Degassed 2-(2-bromopropionyloxy)ethyl acrylate (5.0 ml, 30.9 mmol) was added via syringe. The reaction mixture was stirred in a 100° C. oil bath. After 4 days, no polymer was obtained and the reaction mixture had turned from dark red to dark green.

Example 110
Use of Bipy/CuBr, 100° C.

To a 10 ml round bottom flask with a stir bar, bipyridine (173.9 mg, 1.11 mmol), CuBr (53.8 mg, 0.37 mmol) and dimethoxybenzene (600 mg) were added and sealed with a rubber septum. The contents of the flask were degassed by applying a vacuum and backfilling with nitrogen (3×). Degassed 2-(2-bromopropionyloxy)ethyl acrylate (6.0 ml, 37.1 mmol) was added via syringe. The reaction mixture was stirred in a 100° C. oil bath. Samples were taken at various intervals to monitor conversion and molecular weight. C is a measure of the degree of branching; for a perfect system, C=0.63 at conversion=1.0.

| Time (h) | Conversion(GC, %) | $M_{n,SEC}$ | $M_w/M_n$ | $C/(C + C^*)$ |
|---|---|---|---|---|
| 0.5 | >99 | 5,400 | 1.98 | |
| 1.0 | >99 | 5,300 | 1.99 | |
| 2.5 | >99 | 7,900 | 1.55 | .361 |

Example 111
Use of Bipy/CuBr/80° C.

To a 10 ml round bottom flask with a stir bar, bipyridine (173.9 mg, 1.11 mmol), CuBr (53.8 mg, 0.37 mmol) and dimethoxybenzene (600 mg) were added and sealed with a rubber septum. The contents of the flask were degassed by applying a vacuum and backfilling with nitrogen (3×). Degassed 2-(2-bromopropionyloxy)ethyl acrylate (6.0 ml, 37.1 mmol) was added via syringe. The reaction mixture was stirred in a 80° C. oil bath. Samples were taken at various intervals to monitor conversion and molecular weight. C is a measure of the degree of branching; for a perfect system, C=0.63 at conversion=1.0.

| Time (h) | Conversion(GC, %) | $M_{n,SEC}$ | $M_w/M_n$ | $C/(C + C^*)$ |
|---|---|---|---|---|
| 0.5 | 98 | 7.800 | 1.75 | 0.238 |
| 1.0 | >99 | 9,000 | 1.68 | 0.277 |
| 2.5 | >99 | 8.200 | 1.76 | 0.268 |

Example 112
Use of Bipy/CuBr, 50° C.

To a 10 ml round bottom flask with a stir bar, bipyridine (173.9 mg, 1.11 mmol), CuBr (53.8 mg, 0.37 mmol) and dimethoxybenzene (600 mg) were added and sealed with a rubber septum. The contents of the flask were degassed by applying a vacuum and backfilling with nitrogen (3×). Degassed 2-(2-bromopropionyloxy)ethyl acrylate (6.0 ml, 37.1 mmol) was added via syringe. The reaction mixture was stirred in a 50° C. oil bath. Samples were taken at various intervals to monitor conversion and molecular weight. C. is a measure of the degree of branching; for a perfect system, C.=0.63 at conversion=1.0.

| Time (h) | Conversion(GC, %) | $M_{n,SEC}$ | $M_w/M_n$ | $C/(C + C^*)$ |
|---|---|---|---|---|
| 0.5 | 5.7 | 2,400 | 5.48 | |
| 1.0 | 31.0 | 13,700 | 10.2 | |
| 1.5 | 45.5 | 23,200 | 2.57 | 0.277 |
| 2.0 | 55.1 | 27,700 | 2.87 | |

Example 113
Use of dTbpy/CuBr, 50° C.

To a 10 ml round bottom flask with a stir bar, 4,4'-di(t-butyl)-4,4'-bipyridine (223.5 mg, 0.834 mmol), CuBr (40.4 mg, 0.278 mmol) and dimethoxybenzene (500 mg) were added and sealed with a rubber septum. The contents of the flask were degassed by applying a vacuum and backfilling with nitrogen (3×). Degassed 2-(2-bromopropionyloxy) ethyl acrylate (4.5 ml, 27.8 mmol) was added via syringe. The reaction mixture was stirred in a 50° C. oil bath. Samples were taken at various intervals to monitor conversion and molecular weight. C. is a measure of the degree of branching; for a perfect system, C.=0.63 at conversion=1.0.

| Time (h) | Conversion(GC, %) | $M_{n,SEC}$ | $M_w/M_n$ | $C/(C + C^*)$ |
|---|---|---|---|---|
| 0.5 | 1.0 | 200 | 1.37 | 0.142 |
| 1.0 | 2.5 | 220 | 1.49 | 0.143 |
| 1.5 | 4.7 | 250 | 1.89 | 0.192 |
| 2.0 | 18.2 | 380 | 4.85 | 0.272 |

-continued

| Time (h) | Conversion(GC, %) | $M_{n,SEC}$ | $M_w/M_n$ | C/(C + C*) |
|---|---|---|---|---|
| 3.0 | 56.3 | 820 | 6.55 | 0.501 |
| 4.0 | 85.3 | 1560 | 6.31 | 0.387 |
| 5.0 | 95.2 | 2050 | 6.33 | 0.420 |
| 6.0 | >99 | 2050 | 6.89 | 0.430 |

Counter Ions (Cu−/)
Comparison Polymerizations

Example 114
Polymerization of Methyl Acrylate by ATRP Using CuBr

Stock solutions were prepared with methyl acrylate (8.0 ml), CuBr (1.3 mg), 4,4'-di(5-nonyl)-2,2'-bipyridine (7.3 mg), and methyl 2-bromopropionate (21.2 uL). These stock solutions were transferred to glass tubes and degassed by freeze-pump-thaw. The tubes were then sealed under vacuum and heated in a 90° C. oil bath. The tubes were removed at various intervals and analyzed for conversion (GC) and molecular weight (SEC).

| Time (hr) | Conversion (%) | In [M]o/[M] | $M_n$ | $M_w/M_n$ | $M_{n\,theo}$ |
|---|---|---|---|---|---|
| 1.07 | 18.4 | 0.20 | 8,200 | 1.39 | |
| 3.07 | 43.2 | 0.57 | 14,200 | 1.17 | |
| 5.60 | 84.2 | 1.84 | 26,200 | 1.14 | |
| 8.65 | 96.3 | 3.30 | 28,000 | 1.20 | 38,500 |

$PF_6^-$
Styrene

Example 115
Initiated with Benzyl Thiocyanate

Stock solutions were prepared and subsequently distributed to glass tubes which were degassed three times by the freeze-thaw method and sealed under vacuum. Stock solutions consisted of previously degassed monomer, CuPF6, 4,4'-di(5-nonyl)-2,2'-bipyridine, and initiator. The solution containing styrene (8 ml, 88.9 mmol), CuPF6 (0.26 g, 0.7 mmol), and 4,4'-di(5-nonyl)-2,2'-bipyridine (0.5704 g, 1.4 mmol) was stirred until homogeneous after which benzyl thiocyanate (0.175 mmol) was added and the solution transferred to the tubes. The tubes were places in an oil bath thermostated at 100° C.

| Time (hr) | Conversion (%) | In [M]$_o$/[M] | Mn | $M_w/M_n$ | $M_n$ theo |
|---|---|---|---|---|---|
| 0.45 | 22.1 | 0.25 | 54,600 | 2.16 | |
| 1.60 | 26.2 | 0.30 | 60,800 | 1.91 | |
| 3.80 | 43.7 | 0.57 | 46,400 | 2.13 | |
| 5.95 | 51.7 | 0.73 | 40,100 | 2.41 | |
| 7.90 | 69.3 | 1.18 | 48,000 | 2.34 | |
| 10.00 | 89.5 | 2.26 | 53,000 | 2.57 | 35,800 |

Example 116
Initiated with 1-Phenylethyl Chloride

Stock solutions were prepared and subsequently distributed to glass tubes which were degassed three times by the freeze-thaw method and sealed under vacuum. Stock solutions consisted of previously degassed-monomer, CuPF6, 4,4'-di(5-nonyl)-2,2'-bipyridine, and initiator. The solution containing styrene (8 ml, 88.9 mmol), CuPF$_6$ (0.26 g, 0.7 mmol), and 4,4'-di(5-nonyl)-2,2'-bipyridine (0.5704 g, 1.4 mmol) was stirred until homogeneous after which 1-phenylethyl chloride (0.175 mmol) was added and the solution transferred to the tubes. The tubes were places in an oil bath thermostated at 100° C.

| Time (hr) | Conversion (%) | In [M]$_o$/[M] | $M_n$ | $M_w/M_n$ | $M_n$ theo |
|---|---|---|---|---|---|
| 0.45 | 26.5 | 0.31 | 5,700 | 1.62 | |
| 1.48 | 30.6 | 0.37 | 10,300 | 1.36 | |
| 3.55 | 60.3 | 0.92 | 22,000 | 1.24 | |
| 5.40 | 77.4 | 1.49 | 28,500 | 1.29 | |
| 7.50 | 79.3 | 1.58 | 33,700 | 1.23 | |
| 9.77 | 97.0 | 3.50 | 37,800 | 1.36 | 38,800 |

Example 117
Initiated with 1-Phenylethyl Bromide

Stock solutions were prepared and subsequently distributed to glass tubes which were degassed three times by the freeze-thaw method and sealed under vacuum. Stock solutions consisted of previously degassed monomer, CuPF$_6$, 4,4'-di(5-nonyl)-2,2'-bipyridine, and initiator. The solution containing styrene (8 ml, 88.9 mmol), CuPF$_6$ (0.26 g, 0.7 mmol), and 4,4'-di(5-nonyl)-2,2'-bipyridine (0.5704 g, 1.4 mmol) was stirred until homogeneous after which 1-phenylethyl bromide (0.175 mmol) was added and the solution transferred to the tubes. The tubes were places in an oil bath thermostated at 100° C.

| Time (hr) | Conversion (%) | In [M]$_o$/[M] | $M_n$ | $M_w/M_n$ | $M_n$ theo |
|---|---|---|---|---|---|
| 0.52 | 28.6 | 0.34 | 15,800 | 1.31 | |
| 1.53 | 44.2 | 0.58 | 29,000 | 1.66 | |
| 2.47 | 51.1 | 0.72 | 37,100 | 1.87 | |
| 3.50 | 70.1 | 1.21 | 46,500 | 2.51 | |
| 4.57 | 63.4 | 1.01 | 41,800 | 2.13 | |
| 5.68 | 83.5 | 1.80 | 52,100 | 2.83 | 33,400 |

Example 118
Initiated with Methyl 2-Iodopropionate

Stock solutions were prepared and subsequently distributed to glass tubes which were degassed three times by the freeze-thaw method and sealed under vacuum. Stock solutions consisted of previously degassed monomer, CuPF$_6$, 4,4'-di(5-nonyl)-2,2'-bipyridine, and initiator. The solution containing styrene (8 ml, 88.9 mmol), CuPF$_6$ (0.26 g, 0.7 mmol), and 4,4'-di(5-nonyl)-2,2'-bipyridine (0.5704 g, 1.4 mmol) was stirred until homogeneous after which methyl 2-iodopropionate (0.175 mmol) was added and the solution transferred to the tubes. The tubes were places in an oil bath thermostated at 100° C.

| Time (hr) | Conversion (%) | In [M]o/[M] | Mn | $M_w/M_n$ | Mn theo |
|---|---|---|---|---|---|
| 0.58 | 27.2 | 0.32 | 19,600 | 2.79 | |
| 1.55 | 36.8 | 0.46 | 22,900 | 3.69 | |
| 3.60 | 52.0 | 0.73 | 38,800 | 3.33 | |
| 5.63 | 58.2 | 0.87 | 46,100 | 3.31 | |
| 7.58 | 58.7 | 0.88 | 38,200 | 3.91 | 23,500 |

Methyl Acrylate

Example 119
Initiated with Benzyl Thiocyanate

Stock solutions were prepared with methyl acrylate (8.0 ml), CuPF$_6$(330.7 mg), 4,4'-di(5-nonyl)-2,2'-bipyridine (725.4 mg), and benzyl thiocyanate (28.5 mg). These stock solutions were transferred to glass tubes and degassed by freeze-pump-thaw. The tubes were then sealed under vacuum and heated in a 90° C. oil bath. The tubes were removed at various intervals and analyzed for conversion (GC) and molecular weight (SEC).

| Time (hr) | Conversion (%) | ln $[M]_o/[M]$ | $M_n$ | $M_w/M_n$ | $M_n$ theo |
|---|---|---|---|---|---|
| 0.52 | 27.3 | 0.32 | 18,700 | 1.84 | |
| 1.53 | 56.6 | 0.83 | 20,900 | 2.12 | |
| 2.63 | 72.5 | 1.29 | 16,300 | 2.20 | |
| 3.50 | 94.7 | 2.94 | 25,800 | 2.66 | |
| 4.57 | 88.3 | 2.14 | 13,000 | 2.64 | |
| 5.68 | 94.2 | 2.84 | 12,100 | 3.06 | 37,700 |

Example 120
Initiated with Methyl 2-Chloropropionate

Stock solutions were prepared with methyl acrylate (8.0 ml), $CuPF_6$ (330.7 mg), 4,4'-di(5-nonyl)-2,2'-bipyridine (725.4 mg), and methyl 2-chloropropionate (21.2 uL). These stock solutions were transferred to glass tubes and degassed by freeze-pump-thaw. The tubes were then sealed under vacuum and heated in a 90° C. oil bath. The tubes were removed at various intervals and analyzed for conversion (GC) and molecular weight (SEC).

| Time (hr) | Conversion (%) | ln $[M]_o/[M]$ | Mn | $M_w/M_n$ | Mn theo |
|---|---|---|---|---|---|
| 0.33 | 53.0 | 0.76 | 38,200 | 1.34 | |
| 0.70 | 90.6 | 2.37 | 36,400 | 1.99 | |
| 1.25 | >99 | 4.61 | 41,200 | 2.22 | 40,000 |

Example 121
Initiated with Methyl 2-Bromopropionate

Stock solutions were prepared with methyl acrylate (8.0 ml), $CuPF_6$ (167.2 mg), 4,4'-di(5-nonyl)-2,2'-bipyridine (363.1 mg), and methyl 2-bromopropionate (21.3 uL). Upon addition of the methyl 2-bromopropionate, the reaction became exothermic and the contents of the flask became solid within ten minutes. The contents were analyzed for molecular weight (SEC), Final $M_n$=61,500, $M_w/M_n$=1.62.

Example 122
Initiated with Methyl 2-iodopropionate

Stock solutions were prepared with methyl acrylate (8.0 ml), $CuPF_6$ (167.2 mg), 4,4'-di(5-nonyl)-2,2'-bipyridine (363.1 mg), and methyl 2-iodopropionate (54.3 uL). Upon addition of the methyl 2-iodopropionate, the reaction became exothermic and the contents of the flask became solid within ten minutes. The contents were analyzed for molecular weight (SEC), Final $M_n$=42,000, $M_w/M_n$=1.75.

Example 123
Polymerization with $CuPF_6/CuBr$

Stock solutions were prepared with methyl acrylate (8.0 ml), $CuPF_6$ (33.1 mg), 4,4'-di(5-nonyl)-2,2'-bipyridine (81.4 mg), copper (I) bromide (1.3 mg) and methyl 2-bromopropionate (22.3 μL). These stock solutions were transferred to glass tubes and degassed by freeze-pump-thaw. The tubes were then sealed under vacuum and heated in a 90° C. oil bath. The tubes were removed at various intervals and analyzed for conversion (GC) and molecular weight (SEC).

| Time (hr) | Conversion (%) | ln $[M]_o/[M]$ | $M_n$ | $M_w/M_n$ | $M_n$ theo |
|---|---|---|---|---|---|
| 0.38 | 52.7 | 0.75 | 8,600 | 1.62 | |
| 0.75 | 61.2 | 0.95 | 19,200 | 1.34 | |
| 1.08 | 96.0 | 3.21 | 33,300 | 1.28 | |
| 1.57 | 97.5 | 3.69 | 34,200 | 1.27 | |
| 2.03 | 98.4 | 4.12 | 34,100 | 1.32 | |
| 2.40 | 98.6 | 4.26 | 34,800 | 1.35 | 39,400 |

Example 124
Polymerization with $CuPF_6/CuBr_2$

Stock solutions were prepared with methyl acrylate (8.0 ml), $CuPF_6$ (33.1 mg), 4,4'-di(5-nonyl)-2,2'-bipyridine (81.4 mg), copper (II) bromide (2.0 mg) and methyl 2-bromopropionate (22.3 μL). These stock solutions were transferred to glass tubes and degassed by freeze-pump-thaw. The tubes were then sealed under vacuum and heated in a 90° C. oil bath. The tubes were removed at various intervals and analyzed for conversion (GC) and molecular weight (SEC).

| Time (hr) | Conversion (%) | ln $[M]_o/[M]$ | Mn | $M_w/M_n$ | $M_n$ theo |
|---|---|---|---|---|---|
| 0.17 | 4.9 | 0.05 | 0 | | |
| 0.33 | 8.1 | 0.08 | 4,60 | 2.16 | |
| 0.50 | 17.0 | 0.19 | 4,700 | 1.41 | |
| 0.67 | 6.4 | 0.06 | 6,900 | 1.29 | |
| 0.83 | 26.1 | 0.30 | 9,500 | 1.20 | 10,500 |

Methyl Methacrylate

Example 125
Initiated with P-toluenesulfonyl Chloride

Stock solutions were prepared with methyl methacrylate (8.0 ml), $CuPF_6$ (39.0 mg), 4,4'-di(5-nonyl)-2,2'-bipyridine (152.6 mg), and p-toluenesulfonyl chloride (71.3 mg). These stock solutions were transferred to glass tubes and degassed by freeze-pump-thaw. The tubes were then sealed under vacuum and heated in a 90° C. oil bath. The tubes were removed at various intervals and analyzed for conversion (GC) and molecular weight (SEC).

| Time (hr) | Conversion (%) | ln $[M]_o/[M]$ | $M_n$ | $M_w/M_n$ | $M_n$ theo |
|---|---|---|---|---|---|
| 0.50 | 46.7 | 0.27 | 11,500 | 1.35 | |
| 1.05 | 62.1 | 0.42 | 17,100 | 1.19 | |
| 1.50 | 72.0 | 0.55 | 22,300 | 1.11 | |
| 2.00 | 77.9 | 0.66 | 22,400 | 1.17 | |
| 2.50 | 88.7 | 0.95 | 26,100 | 1.16 | 19,000 |

Carboxylates ($RCOO^-$)

Example 126
Comparative Polymerization Using CuBr/4,4'-di(5-nonyl)-2,2'-bipyridine The following reagents were transferred into glass tubes purged with argon: 12.6 mg ($8.73 \times 10^{-2}$ mmol) of CuBr, 1.0 ml (8.73 mmol) of styrene, 12.0 ml ($8.73 \times 10^{-2}$ mmol) of 1-phenylethyl bromide and 71.2 mg ($17.5 \times 10^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

$M_w/M_n M_n [M]_o$

| Sample | Time (hr) | Conversion (%) | $M_n$(th.) | $M_n$(GPC) | $M_w/M_n$ |
|---|---|---|---|---|---|
| 1 | 1.5 | 11.4 | 1,200 | 2,200 | 1.13 |
| 2 | 3.0 | 31.2 | 3,200 | 3,100 | 1.15 |
| 3 | 4.5 | 43.3 | 4,500 | 4,000 | 1.15 |
| 4 | 6.0 | 48.2 | 5,000 | 5,000 | 1.10 |

Acetate

Example 127
Bulk Polymerization of Styrene Using Two 4,4'-di(5-nonyl)-2,2'-bipyridine/CuOAc The following reagents were transferred into glass tubes purged with argon: 10.7 mg ($8.73 \times 10^{-2}$ mmol) of CuOAc, 1.0 ml (8.73 mmol) of styrene, 12.0 ml ($8.73 \times 10^{-2}$ mmol) of 1-phenylethyl bromide and 71.2 mg ($17.5 \times 10^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

| Sample | Time (hr) | Conversion (%) | $M_n$(th.) | $M_n$\(GPC) | $M_w/M_n$ |
|---|---|---|---|---|---|
| 1 | 1.0 | 37.1 | 3,900 | 5,500 | 1.34 |
| 2 | 2.0 | 57.6 | 6,000 | 10,100 | 1.20 |
| 3 | 3.0 | 83.3 | 8,700 | 13,500 | 1.49 |

Example 128
Bulk Polymerization of Styrene Using One 4,4'-di(5-nonyl)-2,2'-bipyridine/CuOAc The following reagents were transferred into glass tubes purged with argon: 10.7 mg ($8.73 \times 10^{-2}$ mmol) of CuOAc, 1.0 ml (8.73 mmol) of styrene, 12.0 ml ($8.73 \times 10^{-2}$ mmol) of 1-phenylethyl bromide and 35.6 mg ($8.73 \times 10^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

| Sample | Time (hr) | Conversion (%) | $M_n$(th) | $M_n$(SEC) | $M_w/M_n$ |
|---|---|---|---|---|---|
| 1 | 1.0 | 26.4 | 2,700 | 3,300 | 1.54 |
| 2 | 2.0 | 52.8 | 5,500 | 7,200 | 1.24 |
| 3 | 3.0 | 74.0 | 7,700 | 8,500 | 1.33 |
| 4 | 4.0 | 92.8 | 9,700 | 11,500 | 1.44 |

Example 129
Bulk Polymerization of Styrene Using 0.5 CuBr/2 4,4'-di(5-nonyl)-2,2'-bipyridine/0.5CuOAc The following reagents were transferred into glass tubes purged with argon: 5.5 mg ($4.36 \times 10^{-2}$ mmol) of CuOAc, 6.3 mg ($4.36 \times 10^{-2}$ mmol) of CuBr, 1.0 ml (8.73 mmol) of styrene, 12.0 ml ($8.73 \times 10^{-2}$ mmol) of 1-phenylethyl bromide and 71.2 mg ($17.5 \times 10^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

| Sample | Time (hr) | Conversion (%) | $M_n$(th.) | $M_n$(GPC) | $M_w/M_n$ |
|---|---|---|---|---|---|
| 1 | 1.0 | 16.8 | 1,700 | 2,500 | 1.23 |
| 2 | 2.0 | 32.4 | 3,400 | 4,500 | 1.15 |
| 3 | 3.0 | 50.7 | 5,300 | 6,300 | 1.14 |
| 4 | 4.0 | 58.9 | 6,100 | 7,900 | 1.24 |

Example 130
Bulk Polymerization of Styrene Using $0.1 CuBr_2/2.2$ 4,4'-di(5-nonyl)-2,2'-bipyridine/CuOAc The following reagents were transferred into glass tubes purged with argon: 10.7 mg (8.733 $10^{-2}$ mmol) of CuOAc, 2.0 mg ($0.87 \times 10^{-2}$ mmol) of $CuBr_2$, 1.0 ml (8.73 mmol) of styrene, 12.0 ml ($8.73 \times 10^{-2}$ mmol ) of 1-phenylethyl bromide and 78.3 mg ($19.2 \times 10^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

| Sample | Time (hr) | Conversion (%) | $M_n$(th.) | $M_n$(GPC) | $M_w/M_n$ |
|---|---|---|---|---|---|
| 1 | 1.0 | 27.5 | 2,900 | 3,200 | 1.34 |
| 2 | 2.0 | 46.6 | 4,800 | 6,200 | 1.18 |
| 3 | 3.0 | 66.5 | 6,900 | 8,700 | 1.18 |
| 4 | 5.0 | 90.3 | 9,400 | 11,500 | 1.24 |

2-Thiophenecarboxylate
Copper (I) 2-thiophenecarboxylate (CuTc) was prepared according to G. D. Allred, L. S. Liebeskind *J. Amer. Chem. Soc.* (1996) 118, 2748

Example 131
Bulk Polymerization of Styrene Using Two 4,4'-di(5-nonyl)-2,2'-bipyridine/CuTc The following reagents were transferred into glass tubes purged with argon: 16.6 mg ($8.73 \times 10^{-2}$ mmol) of copper (I) 2-thiophenecarboxylate (CuTC), 1.0 ml (8.73 mmol) of styrene, 12.0 ml ($8.73 \times 10^{-2}$ mmol ) of 1-phenylethyl bromide and 71.2 mg ($17.5 \times 10^{-2}$ mmol) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

| Sample | Time (hr) | Conversion (%) | $M_n$(th.) | $M_n$(GPC) | $M_w/M_n$ |
|---|---|---|---|---|---|
| 1 | 1.0 | 22.7 | 2,400 | 2,600 | 1.56 |
| 2 | 2.0 | 35.5 | 3,700 | 5,000 | 1.21 |
| 3 | 4.0 | 44.8 | 4,700 | 7,400 | 1.18 |
| 4 | 6.0 | 58.0 | 6,000 | 9,300 | 1.20 |

Example 132
Bulk Polymerization of Styrene Using 4,4'-di(5-nonyl)-2,2'-bipyridine/CuTc The following reagents were transferred into glass tubes purged with argon: 16.6 mg ($8.73 \times 10^{-2}$ mmol) of copper (I) 2-thiophenecarboxylate, 1.0 ml (8.73 mmol) of styrene, 12.0 ml ($8.73 \times 10^{-2}$ mmol) of 1-phenylethyl bromide and 35.6 mg ($8.73 \times 10^{-2}$ mmol ) of 4,4'-di(5-nonyl)-2,2'-bipyridine. Each tube was degassed three times by "freeze-pump-thaw" cycles and sealed under vacuum. The tubes were placed in an oil bath thermostated at 90° C. and were removed from the oil bath at timed intervals.

| Sample | Time (hr) | Conversion (%) | $M_n$(th.) | $M_n$(GPC) | $M_w/M_n$ |
|---|---|---|---|---|---|
| 1 | 1.0 | 20.0 | 2,100 | 3,500 | 1.33 |
| 2 | 2.0 | 35.0 | 3,600 | 5,100 | 1.23 |
| 3 | 4.0 | 51.9 | 5,400 | 7,400 | 1.18 |
| 4 | 6.0 | 67.0 | 7,000 | 9,900 | 1.23 |

Triflate

Example 133

Bulk Polymerization of Styrene/1-phenylethylbromide/Cu (OTf)$_2$/Cu(0) with bpy

A 10 mL Schlenk flask was charged with Cu(0) (28 mg; 0.44 mmol), Cu(OTf)$_2$(16 mg; 0.044 mmol), 2,2'-bipyridine (34 mg; 0.22 mmol), 1-phenylethylbromide (60 mL; 0.44 mmol), and styrene (5 mL; 43.7 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | $M_n$(SEC) | $M_n$(th) | $M_w/M_n$ | $\ln([M]_o/[M]_t)$ |
|---|---|---|---|---|---|
| 10 | 6 | 2020 | 635 | 1.71 | 0.062 |
| 23 | 24 | 4068 | 2542 | 1.41 | 0.274 |
| 40 | 35 | 5651 | 3707 | 1.36 | 0.431 |
| 55 | 39 | 6370 | 4130 | 1.33 | 0.494 |
| 80 | 45 | 6838 | 4766 | 1.37 | 0.598 |
| 95 | 47 | 7065 | 4977 | 1.37 | 0.635 |
| 120 | 50 | 7400 | 5295 | 1.39 | 0.693 |
| 150 | 54 | 7474 | 5719 | 1.42 | 0.777 |

Example 134

Bulk Polymerization of Styrene 1-phenylethylbromide/Cu (OTf)$_2$/Cu(0) with dTbpy A 10 mL Schlenk flask was charged with Cu(0) (20 mg; 0.31 mmol), Cu(OTf)$_2$(16 mg; 0.044 mmol), 4,4'-di(5-tert-butyl)-2,2'-bipyridine (59 mg; 0.22 mmol), 1-phenylethylbromide (60 mL; 0.44 mmol), and styrene (5 mL; 43.7 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | $M_n$(SEC) | $M_n$(th) | $M_w/M_n$ | $\ln([M]_o/[M]_t)$ |
|---|---|---|---|---|---|
| 10 | 26 | 4664 | 2753 | 1.2 | 0.301 |
| 20 | 33 | 6413 | 3495 | 1.2 | 0.400 |
| 30 | 38 | 7534 | 4024 | 1.19 | 0.478 |
| 45 | 42 | 7852 | 4448 | 1.24 | 0.545 |
| 60 | 42 | 7752 | 4448 | 1.28 | 0.545 |
| 90 | 43 | 7719 | 4554 | 1.3 | 0.562 |

Example 135

Bulk Polymerization of Styrene/1-phenylethylbromide/Cu (OTf)$_2$/Cu(0) with dNbpy A 10 mL Schlenk flask was charged with Cu(0) (28 mg; 0.44 mmol), Cu(OTf)$_2$(16 mg; 0.044 mmol), 4,4'-di(5-nonyl)-2,2'-bipyridine (88 mg; 0.22 mmol), 1-phenylethylbromide (60 mL; 0.44 mmol), and styrene (5 mL; 43.7 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | $M_n$(SEC) | $M_n$(th) | $M_w/M_n$ | $\ln([M]_o/[M]_t)$ |
|---|---|---|---|---|---|
| 10 | 24 | 4110 | 2542 | 1.4 | 0.274 |
| 20 | 38 | 7560 | 4024 | 1.32 | 0.478 |
| 30 | 46 | 9790 | 4871 | 1.34 | 0.616 |
| 40 | 53 | 10670 | 5613 | 1.44 | 0.755 |
| 50 | 57 | 11580 | 6036 | 1.49 | 0.844 |
| 66 | 61 | 11990 | 6460 | 1.59 | 0.942 |

Example 136

Bulk Polymerization of Methyl Acrylate methyl 2-bromopropionate/Cu(OTf)$_2$/Cu(0) with bpy A 10 mL Schlenk flask was charged with Cu(0) (2 mg; 0.032 mmol), Cu(OTf)$_2$ (12 mg; 0.033 mmol), 2,2'-bipyridine (48 mg; 0.31 mmol), methyl 2-bromopropionate (37 mL; 0.33 mmol) and methyl acrylate (6 mL; 66.6 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 80° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | $M_n$(SEC) | $M_n$(th) | $M_w/M_n$ | $\ln([M]_0/[M]_t)$ |
|---|---|---|---|---|---|
| 10 | 11 | 5680 | 1914 | 1.52 | 0.117 |
| 20 | 17 | 5690 | 2958 | 1.53 | 0.186 |
| 30 | 30 | 6560 | 5220 | 1.48 | 0.357 |
| 40 | 35 | 9170 | 6090 | 1.34 | 0.431 |
| 50 | 45 | 10230 | 7830 | 1.3 | 0.598 |
| 60 | 52 | 11120 | 9048 | 1.27 | 0.734 |

Example 137

Bulk Polymerization of Methyl Acrylate/methyl 2-bromopropionate/Cu(OTf)$_2$/Cu(0) with dTbpy

A 10 mL Schlenk flask was charged with Cu(0) (2 mg; 0.032 mmol), Cu(OTf)$_2$ (12 mg; 0.033 mmol), 4,4'-di(5-tert-butyl)-2,2'-bipyridine (36 mg; 0.13 mmol), methyl 2-bromopropionate (37 mL; 0.33 mmol) and methyl acrylate (6 mL; 66.6 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 80° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(SEC) | $M_n$(th) | $M_w/M_n$ | $\ln([M]_0/[M]_t)$ |
|---|---|---|---|---|---|
| 10 | 39 | 7910 | 6786 | 1.68 | 0.494 |
| 20 | 58 | 9240 | 10092 | 1.45 | 0.868 |
| 30 | 66 | 11080 | 11484 | 1.33 | 1.079 |
| 40 | 73 | 12320 | 12702 | 1.26 | 1.309 |

Example 138

Bulk Polymerization of Methyl Acrylate/methyl 2-bromopropionate/Cu(OTf)$_2$/Cu(0) with dNbpy

A 10 mL Schlenk flask was charged with Cu(0) (2 mg; 0.032 mmol), Cu(OTf)2 (12 mg; 0.033 mmol), 4,4'-di(5-nonyl)-2,2-bipyridine (54 mg; 0.13 mmol), methyl 2-bromopropionate (37 mL; 0.33 mmol) and methyl acrylate (6 mL; 66.6 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 80 C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(SEC) | $M_n$(th) | $M_w/M_n$ | $\ln([M]_0/[M]_t)$ |
|---|---|---|---|---|---|
| 62 | 1 | 14530 | 174 | 1.59 | 0.010 |
| 70 | 14 | 13790 | 2436 | 1.6 | 0.151 |
| 80 | 44 | 12640 | 7656 | 1.65 | 0.580 |
| 91 | 49 | 11470 | 8526 | 1.7 | 0.673 |
| 105 | 59 | 12060 | 10266 | 1.61 | 0.892 |
| 115 | 71 | 12090 | 12354 | 1.54 | 1.238 |

Example 139

Bulk Polymerization of Methyl Acrylate/methyl 2-bromopropionate/Cu(OTf)$_2$/Cu(0) with triamine ligand

A 10 mL Schlenk flask was charged with Cu(0) (2 mg; 0.032 mmol), Be Cu(OTf)$_2$ (12 mg; 0.033 mmol), N,N,N',N',N"-Pentamethyldiethylenetriamine (14 mL; 0.067 mmol), methyl 2-bromopropionate (37 mL; 0.33 mmol) and methyl acrylate (6 mL; 66.6 mmol) followed by 0.6 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 80° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(SEC) | $M_n$(th) | $M_w/M_n$ | $\ln([M]_0/[M]_t)$ |
|---|---|---|---|---|---|
| 0.67 | 33 | 6170 | 5742 | 1.1 | 0.400 |
| 1.72 | 55 | 9330 | 9570 | 1.07 | 0.799 |
| 1.92 | 58 | 9730 | 10092 | 1.07 | 0.868 |
| 2.25 | 61 | 9980 | 10614 | 1.07 | 0.942 |
| 2.67 | 62 | 10340 | 10788 | 1.07 | 0.968 |
| 3.5 | 70 | 11020 | 12180 | 1.09 | 1.204 |
| 4.5 | 77 | 11417 | 13398 | 1.07 | 1.470 |

Example 140

Bulk Polymerization of Styrene/1-phenylethylbromide/Cu (OTf)$_2$/Cu(0) with triamine ligand

A 10 mL Schlenk flask was charged with Cu(0) (8.3 mg; 0.13 mmol), Cu(OTf)$_2$ (16 mg; 0.044 mmol), N,N,N',N',N"-Pentamethyldiethylenetriamine (18 mL; 0.087 mmol), 1-phenylethylbromide (60 mL; 0.44 mmol), and styrene (5 mL; 43.7 mmol) followed by 0.5 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 110° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| Time (min) | % Conversion | $M_n$(SEC) | $M_n$(th) | $M_w/M_n$ | $\ln([M]_o/[M]_t)$ |
|---|---|---|---|---|---|
| 25 | 25 | 3300 | 2648 | 1.13 | 0.288 |
| 60 | 39 | 5130 | 4130 | 1.11 | 0.494 |
| 95 | 48 | 6590 | 5083 | 1.11 | 0.654 |
| 120 | 53 | 7180 | 5613 | 1.14 | 0.755 |
| 135 | 57 | 7880 | 6036 | 1.14 | 0.844 |
| 230 | 64 | 8720 | 6778 | 1.18 | 1.022 |

R-X/CuY

Example 141
Solution Polymerization of Methyl Methacrylate/1-Phenylethyl Chloride/CuCl A dry round-bottomed flask was charged with CuCl (23.2 mg; 0.234 mmol), 4,4'-di(5-nonyl)-2,2'-bipyridine (190.9 mg; 0.468 mmol) and diphenyl ether (10.0 ml). The flask was sealed with a rubber septum and was cycled between vacuum and argon three times to remove the oxygen. Degassed methyl methacrylate (10.0 ml; 93.6 mmol) was added using degassed syringes and stainless steel needles. The 1-phenylethyl chloride (62 mL; 0.468 mmol) was added and the flask was immersed in an oil bath held by a thermostat at 90° C. At various times samples were taken via syringe to monitor conversion (GC) and molecular weight (SEC).

| Time (h) | Conversion (%) | $M_{n.\,th}$ | $M_{n.\,SEC}$ | $M_w/M_n$ |
|---|---|---|---|---|
| 1.0 | 31 | 6200 | 26400 | 3.34 |
| 2.0 | 59 | 11800 | 33100 | 3.20 |
| 3.0 | 62 | 12400 | 35000 | 2.80 |
| 4.0 | 77 | 15400 | 38400 | 2.40 |
| 20.0 | 95 | 19000 | 32200 | 2.60 |

Example 142
Solution Polymerization of Methyl Methacrylate/1-Phenylethyl Chloride/CuBr A dry round-bottomed flask was charged with CuBr (34.0 mg; 0.234 mmol), 4,4'-di(5-nonyl)-2,2'-bipyridine (190.9 mg; 0.468 mmol) and diphenyl ether (10.0 ml). The flask was sealed with a rubber septum and was cycled between vacuum and argon three times to remove the oxygen. Degassed methyl methacrylate (10.0 ml; 93.6 mmol) was added using degassed syringes and stainless steel needles. The 1-phenylethyl chloride (62 mL; 0.468 mmol) was added and the flask was immersed in an oil bath held by a thermostat at 90° C. At various times samples were taken via syringe to monitor conversion (GC) and molecular weight (SEC).

| Time (h) | Conversion (%) | $M_{n.\,th}$ | $M_{n.\,SEC}$ | $M_w/M_n$ |
|---|---|---|---|---|
| 1.0 | 28 | 5600 | 96000 | 2.95 |
| 2.0 | 53 | 10600 | 105000 | 2.77 |
| 3.0 | 62 | 12400 | 98000 | 2.95 |
| 16.0 | 93 | 18600 | 76000 | 3.22 |

Example 143
Solution Polymerization of Methyl Methacrylate/1-Phenylethyl Bromide/CuCl A dry round-bottomed flask was charged with CuCl (23.2 mg; 0.234 mmol), 4,4'-di(5-nonyl)-2,2'-bipyridine (190.9 mg; 0.468 mmol) and diphenyl ether (10.0 ml). The flask was sealed with a rubber septum and was cycled between vacuum and argon three times to remove the oxygen. Degassed methyl methacrylate (10.0 ml; 93.6 mmol) was added using degassed syringes and stainless steel needles. The 1-phenylethyl bromide (64 mL; 0.468 mmol) was added and the flask was immersed in an oil bath held by a thermostat at 90° C. At various times samples were taken via syringe to monitor conversion (GC) and molecular weight (SEC).

| Time (h) | Conversion (%) | $M_{n.\,th}$ | $M_{n.\,SEC}$ | $M_w/M_n$ |
|---|---|---|---|---|
| 1.0 | 55 | 11000 | 15800 | 1.31 |
| 2.0 | 63 | 12600 | 18600 | 1.30 |
| 3.0 | 72 | 14400 | 21000 | 1.29 |
| 21.0 | 97 | 19400 | 22200 | 1.28 |

Example 144
Solution Polymerization of Methyl Methacrylate/methyl 2-bromopropionate/CuCl (MMA/MeBrP/CuCl/dNbipy)

A dry Schlenk flask with magnetic stirring bar was charged with CuCl (13.8 mg; 0.139 mmol), 4,4-di(5-nonyl)-2,2-bipyridine (114.4 mg; 0.280 mmol), diphenyl ether (5.0 ml) and methyl methacrylate (5.0 ml; 46.74 mmol). The flask was sealed with a rubber septum and the solution degassed by repeated freeze-pump-thaw cycles, then placed under an argon atmosphere. The methyl 2-bromopropionate (10.4 mL; 0.0935 mmol) was added and the flask was immersed in an oil bath held by a thermostat at 90° C. At various times samples were taken via syringe to monitor conversion (GC) and molecular weight (SEC).

| Time (h) | Conversion (%) | $M_n$(theor) | $M_n$(SEC) | $M_w/M_n$ |
|---|---|---|---|---|
| 0.5 | 18 | 8750 | 12,300 | 1.47 |
| 1 | 42 | 21,000 | 19,300 | 1.33 |
| 1.5 | 55 | 27,500 | 18,800 | 1.27 |
| 2 | 68 | 33,900 | 25,200 | 1.25 |
| 4 | 78 | 38,800 | 31,400 | 1.22 |
| 24 | 93 | 46,500 | 35,400 | 1.21 |

Example 145
Solution Polymerization of Methyl Methacrylate/ethyl 2-bromoisobutyrate/CuCl (MMA/Et-2Br-iB/CuCl/dNbipy)

A dry Schlenk flask with magnetic stirring bar was charged with CuCl (23.4 mg; 0.23 mmol), 4,4-di(5-nonyl)-2,2-bipyridine (190.9 mg; 0.47 mmol), diphenyl ether (5.0 ml) and methyl methacrylate (5.0 ml; 46.74 mmol). The flask was sealed with a rubber septum and the solution degassed by repeated freeze-pump-thaw cycles, then placed under an argon atmosphere. The ethyl 2-bromoisobutyrate (34 mL; 0.23 mmol) was added over 5 min. and the flask was immersed in an oil bath held by a thermostat at 90° C. At various times samples were taken via syringe to monitor conversion (GC) and molecular weight (SEC).

| Time (h) | Conversion (%) | Mn (theor) | Mn (SEC) | Mw/Mn |
|---|---|---|---|---|
| 0.5 | 32 | 6,480 | 7,300 | 1.27 |
| 1 | 53 | 10,700 | 9,300 | 1.24 |

-continued

| Time (h) | Conversion (%) | Mn (theor) | Mn (SEC) | Mw/Mn |
|---|---|---|---|---|
| 3 | 66 | 13,100 | 11,600 | 1.21 |
| 5 | 77 | 15,400 | 15,000 | 1.16 |

Effect of Solvent on ATRP
ATRP in Ethylene Carbonate

Example 146
Solution Polymerization of n-Butyl Acrylate in Diphenyl Ether (Initiator=1-Phenylethyl Bromide)

A dry round-bottomed flask was charged with CuBr (0.250 g; $1.74 \times 10^{-3}$ mol), 2,2'-bipyridyl (0.816 g; $5.23 \times 10^{-3}$ mol) and diphenyl ether (10.0 ml). The flask was sealed with a rubber septum and was cycled between vacuum and argon three times to remove the oxygen. Degassed n-butyl acrylate (10.0 ml; $6.98 \times 10^{-2}$ mol) was added using degassed syringes and stainless steel needles. The 1-phenylethyl bromide (0.238 ml; $1.74 \times 10^{-3}$ mol) was added and the flask was immersed in an oil bath held by a thermostat at 100° C. After 65 min, the conversion of n-butyl acrylate was 42%. After 480 min, the conversion was 95%, and the produced poly (n-butyl acrylate) had $M_n=5100$ and $M_w/M_n=1.87$.

Example 147
Solution Polymerization of n-Butyl Acrylate in Benzene (Initiator=1-Phenylethyl Bromide)

A dry round-bottomed flask was charged with CuBr (0.250 g; $1.74 \times 10^{-3}$ mol) and 2,2'-bipyridyl (0.816 g; $5.23 \times 10^{-3}$ mol). The flask was sealed with a rubber septum and was cycled between vacuum and argon three times to remove the oxygen. Degassed n-butyl acrylate (10.0 ml; $6.98 \times 10^{-2}$ mol) and anhydrous benzene (10.0 ml) was added using degassed syringes and stainless steel needles. The methyl 2-bromopropionate (0.194 ml; $1.74 \times 10^{-3}$ mol) was added and the flask was immersed in an oil bath held by a thermostat at 80° C. After 100 min, the conversion of n-butyl acrylate was 9%. After 4380 min, the conversion was 72%, and the produced poly(n-butyl acrylate) had $M_n=9100$ and $M_w/M_n=2.42$.

Example 148
Solution Polymerization of n-Butyl Acrylate in Propylene Carbonate (Initiator=1-Phenylethyl Bromide)

A dry round-bottomed flask was charged with CuBr (0.250 g; $1.74 \times 10^{-3}$ mol), 2,2'-bipyridyl (0.816 g; $5.23 \times 10^{-3}$ mol) and propylene carbonate (10.0 ml). The flask was sealed with a rubber septum and was cycled between vacuum and argon three times to remove the oxygen. Degassed n-butyl acrylate (10.0 ml; $6.98 \times 10^{-2}$ mol) was added using degassed syringes and stainless steel needles. The 1-phenylethyl bromide (0.238 ml; $1.74 \times 10^{-3}$ mol) was added and the flask was immersed in an oil bath held by a thermostat at 100° C. After 60 min, the conversion of n-butyl acrylate was 49%. After 480 min, the conversion was 94%, and the produced poly(n-butyl acrylate) had $M_n=4700$ and $M_w/M_n=1.27$.

Example 149
Solution Polymerization of n-Butyl Acrylate in Ethylene Carbonate (Initiator=Methyl 2-Bromopropionate)

A dry round-bottomed flask was charged with CuBr (0.250 g; $1.74 \times 10^{-3}$ mol), 2,2'-bipyridyl (0.816 g; $5.23 \times 10^{-3}$ mol) and ethylene carbonate (10.0 g). The flask was sealed with a rubber septum and was heated to melt the ethylene carbonate, and was cycled between vacuum and argon three times to remove the oxygen. Degassed n-butyl acrylate (10.0 ml; $6.98 \times 10^{-2}$ mol) was added using degassed syringes and stainless steel needles. The methyl 2-bromopropionate (0.194 ml; $1.74 \times 10^{-3}$ mol) was added and the flask was immersed in an oil bath held by a thermostat at 100° C. After 60 min, the conversion of n-butyl acrylate was 97%, and the produced poly(n-butyl acrylate) had $M_n=5400$ and $M_w/M_n=1.23$.

Example 150
Solution Polymerization of n-Butyl Acrylate in Ethylene Carbonate (Initiator=1-Phenylethyl Bromide)

A dry round-bottomed flask was charged with CuBr (0.250 g; $1.74 \times 10^{-3}$ mol), 2,2'-bipyridyl (0.816 g; $5.23 \times 10^{-3}$ mol) and ethylene carbonate (10.0 g) flask was sealed with a rubber septum and was heated to melt the ethylene carbonate, and was cycled between vacuum and argon three times to remove the oxygen. Degassed n-butyl acrylate (10.0 ml; $6.98 \times 10^{-2}$ mol) was added using degassed syringes and stainless steel needles. The), 1-phenylethyl bromide (0.238 ml; $1.74 \times 10_{-3}$ mol) was added and the flask was immersed in an oil bath held by a thermostat at 100° C. After 60 min, the conversion of n-butyl acrylate was 99%, and the produced poly(n-butyl acrylate) had $M_n=5000$ and $M_w/M_n=1.36$.

ATRP in DMF

Example 151
Polymerization of Methyl Acrylate in DMF/Methyl-2-bromopropionate/CuBr A glass tube was charged with CuBr (0.0136 g; 0.1 mmol), 1,1,4,7,10,10-hexamethyltriethylene tetraamine (0.026 mL; 0.1 mmol), methyl bromopropionate (0.011 mL; 0.1 mmol), methyl acrylate (1.0 mL; 11.1 mmol), and DMF (1.0 mL), The tube was immediately frozen in liquid nitrogen and placed under vacuum. Oxygen was removed using three freeze-pump-thaw cycles. The tube was sealed under vacuum and placed in a thermostated oil bath at 90° C. After 20 hours, the tube was frozen in liquid nitrogen and broken open. The contents were analyzed for conversion ($^1$H NMR) and molecular weight (SEC). Conversion: >95% $M_n$(theo)= 10,000; $M_n$ ($SEC_{DMF}$)=38,000; $M_w/M_n$ ($SEC_{DMF}$)=1.18

Example 152
Solution Polymerization of 2-Hydroxyethyl Methacrylate/Ethyl-2-Bromoisobutyrate/CuBr/CuBr$_2$ A round-bottomed flask was charged with CuBr (0.0245 g; 0.17 mmol), CuBr$_2$ (0.0049 g; 0.02 mmol) and 2,2'-bipyridine (0.0679 g; 0.4 mmol). The flask was cycled between vacuum and argon three times to remove oxygen. 2-Hydroxyethyl methacrylate (4.2 mL; 30.1 mmol) and DMF (16.8 mL) were sparged for 45 minutes before addition to the flask via degassed syringes and the solution was stirred for 30 minutes to dissolve CuBr$_2$. To each of six tubes was added Ethyl-2-Bromoisobutyrate (1.8 L; 0.01 mmol) and 3 mL of the stock solution. Each tube was immediately frozen and placed under vacuum. Oxygen was removed using five freeze-pump-thaw cycles. At intervals timed from the end of the final thaw, tubes were frozen in liquid nitrogen and broken open. The contents were analyzed for conversion (GC) and molecular weight (SEC). $M_n$ (theo)=52,000

| Time (h) | Conversion (%) | $M_n(SEC_{DMF})$ | $M_w/M_n$ |
|---|---|---|---|
| 2 | 4 | 19,500 | 1.18 |
| 5.75 | 21 | 29,700 | 1.3 |
| 14 | 37 | 41,700 | 1.39 |
| 31.1 | 45 | 50,200 | 1.5 |
| 64.6 | 58 | 59,500 | 1.7 |
| 135.7 | 71 | 67,100 | 1.78 |

Effect of Transition Metal on Conventional Free Radical Polymerization
Acrylonitrile

Example 153
Polymerization of Acrylonitrile with AIBN 25.0 g (0.284 mol) of ethylene carbonate and 0.0249 g ($1.52 \times 10^{-4}$ mol) AIBN were put into a schlenk flask under argon. 10.0 ml (0.152 mol) of degassed acrylonitrile was added to the flask via syringe and then the flask was placed into an oil bath thermostated at 64° C. 4 ml samples were removed at certain time intervals. 3 ml of the sample was dissolved in 6 ml THF for GC analysis and 1 ml in DMF for GPC measurement. The conversion was determined with GC and the molecular weight and molecular weight distribution were obtained from GPC using polystyrene standards.

| Time (hour) | Conversion (%) | $\ln([M]_o/[M])$ | $M_n(GPC)$ | $M_w/M_n$ |
|---|---|---|---|---|
| 0.75 | 86.1 | 0.09 | 178,700 | 3.47 |
| 1.5 | 22.0 | 0.25 | 425,200 | 1.54 |
| 3.25 | 62.5 | 0.98 | 495,300 | 1.53 |

Example 154
Polymerization of Acrylonitrile with AIBN, and CuBr/Bipyridine 25.0 g (0.284 mol) of ethylene carbonate, 0.0249 g ($1.52 \times 10^{-4}$ mol) AIBN, 0.0434 g, ($3.04 \times 10^{-4}$ mol) CuBr and 0.0949 g ($6.08 \times 10^{-4}$ mol) 2,2'-bipyridine were put into a schlenk flask under argon. 10.0 ml ((0.152 mol) of degassed acrylonitrile was added to the flask via syringe and the flask was then placed into an oil bath thermostated at 64° C. 4 ml samples were taken at certain time intervals. 3 ml of the sample dissolved in 6 ml THF for GC and 1 ml in DMF for GPC measurement. The conversion was determined with GC and the molecular weight and molecular weight distribution were obtained from GPC using polystyrene standards.

| Time (hour) | Conversion (%) | $\ln([M]_o/[M])$ | $M_n(GPC)$ | $M_w/M_n$ |
|---|---|---|---|---|
| 1 | 3.4 | 0.04 | NA | NA |
| 3 | 6.5 | 0.07 | 60,200 | 1.53 |
| 5 | 12.6 | 0.13 | 69,800 | 1.46 |
| 8 | 16.3 | 0.18 | 86,900 | 1.33 |
| 10 | 28.3 | 0.33 | 74,400 | 1.51 |
| 21.5 | 42.1 | 0.55 | 79,700 | 1.58 |
| 46 | 54.0 | 0.78 | 80,400 | 1.58 |

Methyl Acrylate

Example 155
Polymerization of Methyl Acrylate with AIBN 0.0728 g ($4.43 \times 10^{-4}$ mol) AIBN were put into a schlenk flask under argon. 10 ml degassed toluene and 4 ml ($4.43 \times 10^{-2}$ mol) degassed methyl acrylate were added to the flask via syringe and the flask was then placed into an oil bath thermostated at 50° C. 0.5 ml samples were taken at certain time intervals and dissolved in 1 ml THF. The conversion was determined with GC and the molecular weight and molecular weight distribution were obtained from GPC using polystyrene standards.

| Time (hour) | Conversion (%) | $\ln([M]_o/[M])$ | $M_n(GPC)$ | $M_w/M_n$ |
|---|---|---|---|---|
| 1.0 | 33.7 | 0.41 | $1.00 \times 10^5$ | 2.48 |
| 1.5 | 49.4 | 0.68 | 75,500 | 2.80 |
| 2.0 | 55.2 | 0.80 | 71,700 | 2.89 |
| 3.25 | 71.4 | 1.25 | 42,900 | 3.73 |
| 5.0 | 76.9 | 1.46 | 31,900 | 4.20 |

Example 156
Polymerization of Methyl Acrylate with AIBN and CuBr/Bipyridine 0.0728 g ($4.43 \times 10^{-4}$ mol) AIBN, 0.1274 g ($8.87 \times 10^{-4}$ mol) CuBr and 4,4'-di(5-nonyl)-2,2'-bipyridine ($1.77 \times 10^{-3}$ mol) were added to a schlenk flask under argon. 10 ml degassed toluene and 4 ml ($4.43 \times 10^{-2}$ mol) degassed methyl acrylate were added to the flask via syringe and the flask was then placed into an oil bath thermostated at 50° C. 0.5 ml samples were removed at certain time intervals and dissolved in 1 ml THF. The conversion was determined with GC and the molecular weight and molecular weight distribution were obtained from GPC using polystyrene standards.

| Time (hour) | Conversion (%) | $\ln([M]_o/[M])$ | $M_n(GPC)$ | $M_w/M_n$ |
|---|---|---|---|---|
| 3.833 | 7.3 | 0.08 | 21,800 | 1.36 |
| 6.333 | 20.0 | 0.22 | 34,400 | 1.51 |
| 9.000 | 31.1 | 0.37 | 36,000 | 1.62 |
| 18.10 | 59.1 | 0.90 | 30,300 | 1.93 |
| 28.25 | 74.5 | 1.36 | 21,800 | 2.22 |
| 45.42 | 86.4 | 2.00 | 18,207 | 2.37 |

Example 157
Solution Polymerization of MA/AIBN

To a 10 mL Schlenk flask was added AIBN (5.5 mg; 0.034 mmol), methyl acrylate (3 mL; 33.3 mmol), 3 mL of toluene and 0.6 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 60° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | Mn SEC | Mw/Mn | $\ln([M]o/[M]t)$ |
|---|---|---|---|---|
| 15 | 22 | 420900 | 1.63 | 0.248 |
| 30 | 45 | 273900 | 1.84 | 0.598 |

-continued

| time (min) | % conversion | Mn SEC | Mw/Mn | ln([M]o/[M]t) |
|---|---|---|---|---|
| 45 | 50 | 266100 | 1.82 | 0.693 |
| 60 | 55 | 299500 | 1.69 | 0.799 |

Example 158

Solution Polymerization of MA/AIBN with Cu(I) (via Cu(II)+Cu(0))

To a 10 mL Schlenk flask was added AIBN (5.8 mg; 0.035 mmol), Cu(OTf)$_2$ (12 mg; 0.033 mmol), Cu(0) (2 mg; 0.033 mmol), 4,4'-di(5-tert-butyl)-2,2'-bipyridine (18 mg; 0.067 mmol), methyl acrylate (3 mL; 33.3 mmol), 3 mL of toluene and 0.6 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 60° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | Mn SEC | Mw/Mn | ln([M]o/[M]t) |
|---|---|---|---|---|
| 70 | 12 | 220000 | 1.9 | 0.128 |
| 95 | 18 | 220000 | 1.8 | 0.198 |
| 120 | 23 | 212000 | 1.8 | 0.261 |
| 170 | 34 | 177000 | 1.9 | 0.416 |

Example 159

Solution Polymerization of MA/AIBN with [Cu(I)OTf]$_2$C$_6$H$_6$

To a 10 mL Schlenk flask was added AIBN (6.0 mg; 0.037 mmol), [Cu(I)OTf]$_2$C$_6$H$_6$ (8 mg; 0.016 mmol), 4,4'-di(5-tert-butyl)-2,2'-bipyridine (17 mg; 0.064 mmol), methyl acrylate (3 mL; 33.3 mmol), 3 mL of toluene and 0.6 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 60° C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time (min) | % conversion | Mn SEC | Mw/Mn | ln([M]o/[M]t) |
|---|---|---|---|---|
| 95 | 18 | 199000 | 1.73 | 0.198 |
| 150 | 30 | 180000 | 1.72 | 0.357 |
| 225 | 35 | 164000 | 1.79 | 0.431 |
| 275 | 54 | 124000 | 2.02 | 0.777 |

Example 160

Solution Polymerization of MA/AIBN with Cu(II)

To a 10 mL Schlenk flask was added AIBN (5.0 mg; 0.031 mmol), Cu(OTf)$_2$ (6 mg; 0.017 mmol), 4,4'-di(5-tert-butyl)-2,2'-bipyridine (9 mg; 0.033 mmol), methyl acrylate (3 mL; 33.3 mmol), 3 mL of toluene and 0.6 mL of chlorobenzene as an internal reference. The reaction flask was charged with a stir bar and then fitted with a rubber septum. The reaction solution was then put through freeze-vacuum-thaw cycles three times to remove dissolved gasses and then put under an argon atmosphere. The flask was then immersed in an oil bath and held by a thermostat at 60 C. with rigorous stirring. At various times, samples were taken via syringe and quenched with THF. The volume lost by sample removal was replaced with argon. The samples were used to monitor monomer conversion relative to the internal reference (GC) and molecular weight (SEC).

| time | % conversion | Mn | Mw/Mn | ln([M]o/[M]t) |
|---|---|---|---|---|
| 20 | 15 | 327000 | 1.69 | 0.163 |
| 30 | 33 | 257000 | 1.71 | 0.400 |
| 40 | 42 | 203000 | 1.98 | 0.545 |
| 50 | 53 | 219000 | 1.89 | 0.755 |
| 60 | 65 | 227000 | 1.86 | 1.050 |

Reverse ATRP

Styrene

Example 161

Bulk Polymerization of Styrene by Reverse ATRP

Tubes were prepared in the following manner. CuBr$_2$ (11.2 mg, 0.05 mmol) and 4,4'-di-(5-nonyl)-2,2'-bipyridine (40.8 mg, 0.1 mmol) were added to a dry glass tube. A 1.0 ml solution of AIBN (0.057 M) in styrene was added to the tube. The contents of the tube were degassed by the "freeze-pump-thaw" method and then sealed under vacuum. The tubes were then placed in a 50° C. oil bath until a homogeneous solution was obtained (30 min.). The tubes were then placed in a 110° C. oil bath and removed at various time intervals. Conversion was determined by GC, and molecular weights were determined by SEC analysis.

| Sample | Time (h) | Conversion (%) | M$_n$, Cal | M$_n$, SEC | M$_w$/M$_n$ |
|---|---|---|---|---|---|
| 1 | 1.0 | 18.9 | 1,500 | 2,100 | 1.13 |
| 2 | 2.0 | 35.9 | 2,900 | 3,900 | 1.09 |
| 3 | 4.5 | 55.7 | 4,500 | 5,300 | 1.08 |
| 4 | 7.0 | 72.6 | 5,800 | 7,300 | 1.09 |

Methyl Acrylate

Example 162

Solution Polymerization of Methyl Acrylate by Reverse ATRP

To a 25 ml round bottom flask, with a magnetic stir bar, CuBr$_2$ (50.2 mg, 0.225 mmol) and 4,4'-di-(5-nonyl)-2,2'-bipyridine (183.6 mg, 0.45 mmol) were added. The flask was sealed with a rubber septum and the contents degassed by applying a vacuum and backfilling with argon. Degassed methyl acrylate (4.5 ml) and anisole (5.0 ml) were added via syringe. The contents were placed in an oil bath at 110° C. and stirred until the contents dissolved. AIBN (44.3 mg, 0.27 mmol) was then added as a solution in a small amount of methyl acrylate (0.5 ml). The reaction mixture was stirred at 110° C. and samples were taken at various time intervals to monitor conversion (GC) and molecular weight (SEC).

| Sample | Time (h) | Conversion (%) | $M_n$, Cal | $M_n$, SEC | $M_w/M_n$ |
|---|---|---|---|---|---|
| 1 | 1.0 | 34.0 | 3,000 | 3,100 | 1.15 |
| 2 | 2.0 | 52.0 | 4,700 | 5,300 | 1.10 |
| 3 | 3.0 | 68.9 | 6,200 | 6,500 | 1.09 |
| 4 | 4.0 | 76.2 | 6,800 | 6,900 | 1.09 |
| 5 | 5.3 | 83.2 | 7,400 | 7,600 | 1.09 |
| 6 | 6.8 | 87.4 | 7,800 | 7,800 | 1.10 |
| 7 | 10.2 | 89.6 | 8,000 | 8,300 | 1.11 |

Methyl Methacrylate

Example 163

Solution Polymerization of Methyl Methacrylate by Reverse ATRP

To a 25 ml round bottom flask, with a magnetic stir bar, $CuBr_2$ (25.7 mg, 0.115 mmol) and 4,4'-di-(5-nonyl)-2,2'-bipyridine (93.8 mg, 0.23 mmol) were added. The flask was sealed with a rubber septum and the contents degassed by applying a vacuum and backfilling with argon. Degassed methyl methacrylate (4.5 ml) and anisole (5.0 ml) were added via syringe. The contents were placed in an oil bath at 90° C. and stirred until the contents dissolved. AIBN (19.7 mg, 0.12 mmol) was then added as a solution in a small amount of methyl methacrylate (0.5 ml). The reaction mixture was stirred at 90° C. and samples were taken at various time intervals to monitor conversion (GC) and molecular weight (SEC).

| Sample | Time (h) | Conversion (%) | $M_n$, Cal | $M_n$, SEC | $M_w/M_n$ |
|---|---|---|---|---|---|
| 1 | 1.48 | 17.6 | 3,500 | 2,600 | 1.12 |
| 2 | 2.12 | 30.4 | 6,100 | 8,700 | 1.07 |
| 3 | 2.75 | 45.4 | 9,100 | 12,500 | 1.10 |
| 4 | 3.27 | 56.3 | 11,300 | 13,700 | 1.14 |
| 5 | 3.83 | 62.7 | 12,500 | 15,200 | 1.15 |
| 6 | 4.42 | 66.1 | 13,200 | 16,500 | 1.17 |
| 7 | 5.50 | 74.0 | 14,800 | 17,600 | 1.20 |

Acrylonitrile

Example 164

Polymerization of Acrylonitrile with AIBN, and $CuBr_2$/Bipyridine 25.0 g (0.284 mol) of ethylene carbonate, 0.0249 g ($1.52 \times 10^{-4}$ mol) AIBN, 0.06107 g ($2.73 \times 10^{-4}$ mol) $CuBr_2$ and 0.0949 g ($5.47 \times 10^{-4}$ mol) 2,2'-bipyridine were added to a schlenk flask under argon. 10.0 ml (0.152 mol) degassed acrylonitrile was added to the flask via syringe and the flask was then placed into an oil bath thermostated at 64° C. 4 ml samples were removed at certain time intervals. 3 ml of the sample was dissolved in 6 ml of THF for GC and 1 ml in DMF for GPC measurement. Conversion was determined with GC and the molecular weight and molecular weight distribution were obtained from GPC using polystyrene standards.

| Time (hour) | Conversion (%) | $\ln([M]_o/[M])$ | $M_n$(GPC) | $M_w/M_n$ |
|---|---|---|---|---|
| 2.0 | 0 | 0 | NA | NA |
| 8.5 | 7.1 | 0.07 | 19,700 | 1.20 |
| 10 | 10.6 | 0.11 | 33,500 | 1.11 |
| 22 | 26.6 | 0.31 | 74,800 | 1.29 |
| 46 | 37.0 | 0.46 | 93,100 | 1.22 |

Acrylic Polymers by ATRP

Example 165

Homogeneous ATRP of Vinyl Acrylate

The following amounts of reagents were weighed into a glass tube under ambient temperature: 12 mg ($8.37 \times 10^{-2}$ mmol) of CuBr, 1.00 mL (0.942 g, 9.42 mmol) of vinyl acrylate, 60 mg (0.175 mmol) 4,4'-Di-(5-nonyl)-2,2'-bipyridine, and 36 mL ($27 \times 10^{-2}$ mmol) 2-methylbromopropionate. Two "freeze-pump-thaw" cycles were performed on the contents of the tube to insure that oxygen was removed from the polymerization solution. The tube was sealed under vacuum and placed in an oil bath thermostated at 60° C. After 10 h, the tube was broken, and the contents were dissolved in 10 mL of THF. Conversion of the sample was measured using GC, and the molecular weight and polydispersity were determined by GPC. Conversion was 97%, $M_n$=2800, $M_w/M_n$=1.21. The $^1$H NMR spectrum confirmed that the vinyl group remained unaffected, and that the polymerization involves acrylic unsaturation of monomer.

Example 166

Homogeneous ATRP of Allyl Acrylate

The following amounts of reagents were weighed into a glass tube under ambient temperature: 12 mg ($8.37 \times 10^{-2}$ mmol) of CuBr, 1.00 mL (1 g, 9 mmol) of allyl acrylate, 60 mg (0.175 mmol) 4,4'-Di-(5-nonyl)-2,2'-bipyridine, and 36 mL ($27 \times 10^{-2}$ mmol) methyl 2-bromopropionate. Two "freeze-pump-thaw" cycles were performed on the contents of the tube in order to insure that oxygen was removed from the polymerization solution. The tube was sealed under vacuum and placed in an oil bath thermostated at 30° C. After 15 min, the tube was broken, and the contents were dissolved in 10 mL of THF. Conversion of the monomer was measured using GC. Conversion was 97%, and the polymer was an insoluble gel.

Example 167

Homogeneous ATRP of t-Butyl Acrylate

The following amounts of reagents were weighed into glass tubes under ambient temperature: 12 mg ($8.37 \times 10^{-2}$ mmol) of CuBr, 1.00 mL (0.872 g, 6.8 mmol) of t-butyl acrylate, 60 mg (0.175 mmol) 4,4'-di-(5-nonyl)-2,2'-bipyridine, and 22 mL ($17 \times 10^{-2}$ mmol) methyl 2-bromopropionate. Two "freeze-pump-thaw" cycles were performed on the contents of each tube to insure that oxygen was removed from the polymerization solution. The tubes were sealed under vacuum and placed in an oil bath thermostated at 90° C. At various time intervals the tubes were removed from the oil bath and cooled to 0° C. to quench the polymerization. Afterwards, the individual tubes were broken, and the contents dissolved in 10 mL of THF. Conversion of the samples was measured using GC, and the molecular weight and polydispersities were measured by GPC. The resulting poly(t-butyl acrylate) was subsequently hydrolyzed in the presence of 1% of p-toluenesulfonic acid (in THF) to poly(acrylic acid).

| Time (h) | Conversion (%) | $M_n$ | $M_w/M_n$ |
|---|---|---|---|
| 3 | 27 | 11200 | 1.22 |
| 7 | 44 | 18600 | 1.21 |
| 12 | 57 | 24200 | 1.21 |
| 16 | 80 | 33500 | 1.20 |
| 20 | 98 | 41300 | 1.19 |

Example 168
Homogeneous ATRP of Isobornyl Acrylate

The following amounts of reagents were weighed into glass tubes under ambient temperature: 12 mg ($8.37 \times 10^{-2}$ mmol) of CuBr, 1.00 mL (0.986 g, 4.78 mmol) of isobornyl acrylate, 60 mg (0.175 mmol) 4,4'-di-(5-nonyl)-2,2'-bipyridine, and 27 mL ($20 \times 10^{-2}$ mmol) 2-methylbromopropionate. Two "freeze-pump-thaw" cycles were performed on the contents of each tube to insure that oxygen was removed from the polymerization solutions. Each tube was sealed under vacuum and placed in an oil bath thermostated at 90° C. At time intervals the tubes were removed from the oil bath and cooled to 0° C. in order to quench the polymerization. Afterwards, the individual tubes were broken, and the contents dissolved in 10 mL of THF. Conversion of the monomer was measured using GC, and the molecular weight and polydispersities were measured by GPC.

| Time (h) | Conversion (%) | $M_n$ | $M_w/M_n$ |
|---|---|---|---|
| 0.5 | 10 | 1000 | 1.31 |
| 1 | 28 | 1540 | 1.25 |
| 2 | 73 | 3280 | 1.21 |
| 2.5 | 81 | 3720 | 1.15 |
| 3.5 | 90 | 4310 | 1.15 |

Example 169
Copolymerization of Butyl Acrylate and 3-(Trimethoxysilyl)propyl Methacrylate The following reagents were weighed into a round bottom flask under ambient temperature: 510 mg (3.5 mmol) of CuBr, 33.2 mL (34.65 g, 8.62 mmol) of 3-(trimethoxysilyl) propyl methacrylate, 1.64 g (10.5 mmol) of 2,2'-bipyridine, 80.0 ml (71.52 g, 558 mmol) of butyl acrylate and 3.89 ml (34.9 mmol) methyl 2-bromopropionate. The flask was sealed with a rubber septum and the contents of the flask were degassed by sparging with argon. The reaction was heated to 100° C. and stirred. After 18 h the reaction was quenched by pouring into dichloromethane. Conversion of the monomer was measured using $^1$H NMR, conversion >95%. The copper was removed by passing through alumina and the solvent removed under vacuum. The $^1$H NMR spectrum confirmed that the trimethylsilyl groups remained, and that the polymerization involved only the methacrylic unsaturation of monomer. Upon exposure to air (ambient moisture), the polymer gelled as a result of reaction between the trimethylsilyl groups and water.

Example 170
Homogeneous ATRP of Glycidyl Acrylate

The following amounts of reagents were weighed into glass tubes under ambient temperature: 3 mg ($2.1 \times 10^{-2}$ mmol) of CuBr, 1.00 mL (1.1 g, 8.59 mmol) of glycidyl acrylate, 15 mg ($4.2 \times 10^{-2}$ mmol) 4,4'-di-(5-nonyl)-2,2'-bipyridine, and 5 mL ($4 \times 10^{-2}$ mmol) methyl 2-bromopropionate. Two "freeze-pump-thaw" cycles were performed on the contents of each tube to insure that oxygen was removed from the polymerization solution. Each tube was sealed under vacuum and placed in an oil bath thermostated at 90° C. At various time intervals the tubes were removed from the oil bath and cooled to 0° C. in order to quench the polymerization. Afterwards, the individual tubes were broken, and the contents were dissolved in 10 mL of THF. Conversion of the monomer was measured using GC, and the molecular weight and polydispersity were measured by GPC. A $^1$H NMR study revealed that the oxirane ring remained unchanged, and that the polymerization involved exclusively the acrylic unsaturation of the monomer.

| Time, min | Conversion, % | $M_n$ | $M_w/M_n$ |
|---|---|---|---|
| 15 | 51.5 | 13600 | 1.40 |
| 30 | 69.2 | 17890 | 1.38 |
| 45 | 82.5 | 21200 | 1.28 |
| 60 | 91.2 | 23400 | 1.21 |
| 90 | 98.0 | 25200 | 1.21 |

Water Soluble Acrylic Polymers

Example 171
Homogeneous ATRP of 2-hydroxyethyl acrylate

The following amounts of reagents were weighed into glass tubes under ambient temperature: 12 mg ($8.37 \times 10^{-2}$ mmol) of CuBr, 1.00 mL (1.01 g, 8.62 mmol) of 2-hydroxyethyl acrylate, 60 mg (0.175 mmol) 4,4'-di-(5-nonyl)-2,2'-bipyridine, and 18 mL ($14 \times 10^{-2}$ mmol) methyl 2-bromopropionate. Two "freeze-pump-thaw" cycles were performed on the contents of each tube in order to insure that oxygen was removed from the polymerization solution. Each tube was sealed under vacuum. The tubes were placed in an oil bath thermostated at 90° C. At various time intervals the tubes were removed from the oil bath and cooled to 0° C. to quench the polymerization. Afterwards, the individual tubes were broken, and the contents were dissolved in 10 mL of THF. Conversion of the monomer was measured using GC, and the molecular weight and polydispersity were measured by GPC. $^1$H NMR spectra confirmed that the hydroxyl groups remained, and the polymerization involved only acrylic unsaturation of monomer.

| Time, h | Conversion, % | $M_n$ | $M_w/M_n$ |
|---|---|---|---|
| 1 | 26.7 | 4,600 | 1.72 |
| 3 | 44.1 | 7,500 | 1.51 |
| 4 | 57.4 | 9,800 | 1.31 |
| 5 | 67.1 | 11,400 | 1.21 |
| 8 | 79.2 | 13,500 | 1.20 |
| 14 | 92.5 | 15,700 | 1.19 |

Example 172
Homogeneous ATRP of 2-hydroxyethyl acrylate

The following amounts of reagents were weighed into a glass tube under ambient temperature: 12 mg ($8.37 \times 10^{-2}$ mmol) of CuBr, 1.00 mL (1.01 g, 8.62 mmol) of 2-hydroxyethyl acrylate, 60 mg (0.175 mmol) 4,4'-di-(5-nonyl)-2,2'-bipyridine, and 6 mL ($4 \times 10^{-2}$ mmol) methyl 2-bromopropionate. Two "freeze-pump-thaw" cycles were performed on the contents of the tube to insure that oxygen was removed from the polymerization solution. The tube was sealed under vacuum and placed in an oil bath thermostated at 90° C. The tube was broken and the contents dissolved in 10 mL of THF. Conversion of the monomer was measured using GC, and the molecular weight and polydispersity were measured by GPC. Conversion was 87%, $M_n$=51400, $M_w/M_n$=1.27. The $^1$H NMR spectrum confirmed that the hydroxyl groups remained, and that the polymerization involved only the acrylic unsaturation of monomer.

Example 173
Homogeneous ATRP of 2-Hydroxyethyl Acrylate in Water

The following amounts of reagents were weighed into a glass tube under ambient temperature: 12mg (8.37×10$^{-2}$ mmol) of CuBr, 1.00 mL (1.01 g, 8.62 mmol) of 2-hydroxyethyl acrylate, 60 mg (0.175 mmol) 4,4'-di-(5-nonyl)-2,2'-bipyridine, 1 mL (1 g) H$_2$O and 18 mL (14×10$^{-2}$ mmol) methyl 2-bromopropionate. Two "freeze-pump-thaw" cycles were performed on the contents of the tube to insure that oxygen was removed from the polymerization solution. The tube was sealed under vacuum and placed in an oil bath thermostated at 90° C. After 12 h the tube were removed from the oil bath and cooled to 0° C. in order to quench the polymerization. Afterwards, the tube was broken, and the contents were dried with MgSO$_4$ and than dissolved in 10 mL of DMF. Conversion of the monomer was measured using GC, and the molecular weight and polydispersity were measured by GPC. The conversion was 87%, $M_n$=14700, $M_w/M_n$=1.34. The $^1$H NMR spectrum confirmed that the hydroxyl group remained unaffected, and the polymerization involved acrylic unsaturation of the monomer.

Example 174
Homogeneous ATRP of N-(2-Hydroxypropyl) Methacrylamide in 1-Butanol

The following amounts of reagents were weighed into a glass tube under ambient temperature: 12 mg (8.37×10$^{-2}$ mmol) of CuBr, 0.5 g (3.49 mmol) of N-(2-hydroxypropyl) methacrylamide, 20 mg (8.4×10$^{-2}$ mmol) 1,4,8,11-tetramethyl-1,4,8,11 1-tetraazocyclotetradecane, 1 mL 1-butyl alcohol and 20 mL (14×10$^{-2}$ mmol) diethyl 2-bromo-2-methylmalonate. Two "freeze-pump-thaw" cycles were performed on the contents of the tube to insure that oxygen was removed from the polymerization solution. The tube was sealed under vacuum and placed in an oil bath thermostated at 90° C. After 6 h the tube were removed from the oil bath and cooled to 0° C. in order to quench the polymerization. Afterwards, the tube was broken, and the contents were dissolved in 10 mL of DMF. Conversion of the monomer was measured using GC, and the molecular weight and polydispersity were measured by GPC. The conversion was 95%, $M_n$=21300, $M_w/M_n$=1.38. The $^1$H NMR spectrum confirmed that the polymerization involved only the methacrylamide unsaturation of the monomer.
Trimethoxy Silyl Protected HEA Example 175
Polymerization of TMS Protected 2-Hydroxyethyl Acrylate/Methyl-2-Bromopropionate/CuBr A glass tube was charged with CuBr (0.0143 g; 0.1 mmol), 4,4'-di(5-nonyl)-2,2'-bipyridine (0.0816 g; 0.2 mmol), methyl-2-bromopropionate (0.011 mL; 0.1 mmol) and TMS protected 2-hydroxyethyl acrylate (0.5 mL; 2.7 mmol). The tube was immediately frozen in liquid nitrogen and placed under vacuum. Oxygen was removed using three freeze-pump-thaw cycles. The tube was sealed under vacuum and placed in a thermostated oil bath at 90° C. After 4.5 hours, the tube was frozen in liquid nitrogen and broken open. The contents were analyzed for conversion ($^1$H NMR) and molecular weight (SEC). Conversion: >95%; $M_n$(theo)= 5,000; $M_n$(SEC)=6,000; $M_w/M_n$(SEC)=1.06
Trimethyl siloxy protected HEMA Example 176
Solution Polymerization of TMS Protected 2-Hydroxyethyl Methacrylate/Tosyl Chloride/CuBr A glass tube was charged with CuBr (0.0072 g; 0.05 mmol), 4,4'-di(5-nonyl)-2,2'-bipyridine (0.0408 g; 0.1 mmol), tosyl chloride (0.0191 g; 0.05 mmol), TMS protected 2-hydroxyethyl methacrylate (1.0 mL, 5 mmol), and diphenyl ether (1.0 mL). The tube was immediately frozen in liquid nitrogen and placed under vacuum. Oxygen was removed using three freeze-pump-thaw cycles. The tube was sealed under vacuum and placed in a thermostated oil bath at 90° C. After 36 hours, the tube was frozen in liquid nitrogen and broken open. The contents were analyzed for conversion ($^1$H NMR) and molecular weight (SEC). Conversion: 86%; $M_n$(theo)=10,000; $M_n$(SEC)=8,900; $M_w/M_n$(SEC)=1.2.

Example 177
Solution Polymerization of TMS Protected 2-Hydroxyethyl Methacrylate/Tosyl Chloride/CuBr A glass tube was charged with CuBr (0.0071 g; 0.05 mmol), 4,4'-di(5-nonyl)-2,2'-bipyridine (0.0403 g; 0.1 mmol), tosyl chloride (0.0019 g; 0.001 mmol), TMS protected 2-hydroxyethyl methacrylate (1.0 mL, 5 mmol), and diphenyl ether (1.0 mL). The tube was immediately frozen in liquid nitrogen and placed under vacuum. Oxygen was removed using three freeze-pump-thaw cycles. The tube was sealed under vacuum and placed in a thermostated oil bath at 90° C. After 48 hours, the tube was frozen in liquid nitrogen and broken open. The contents were analyzed for conversion ($^1$H NMR) and molecular weight (SEC). Conversion: >95%; $M_n$(theo)=101,000; $M_n$(SEC)=95,900; $M_w/M_n$(SEC)=1.47.

Example 178
Solution Polymerization of TMS Protected 2-Hydroxyethyl Methacrylate/Tosyl Chloride/CuBr A dry round-bottomed flask was charged with CuBr (0.0086 g; 0.06 mmol), and 4,4'-di(5-nonyl)-2,2'-bipyridine (0.0490 g; 0.12 mmol), and sealed with a rubber septa. The flask was cycled between vacuum and argon three times to remove oxygen. Tosyl chloride (0.0236 g; 0.12 mmol) and TMS protected 2-hydroxyethyl methacrylate (5.0 mL, 25 mmol) were added to a separate flask and sparged with argon for 45 minutes to remove oxygen. Diphenyl ether (5.0 mL) was also sparged with argon for 45 minutes to remove oxygen and was then added to the flask containing CuBr and ligand via degassed syringe. That flask was then placed in a thermostated oil bath at 90° C. At timed intervals, samples were taken via degassed syringe to monitor conversion (GC) and molecular weight (SEC), $M_n$(theo)=40,000.

| Time (hr.) | Conversion (%) | $M_n$(SEC) | $M_w/M_n$(SEC) |
|---|---|---|---|
| 1.0 | 20 | 12,300 | 1.25 |
| 2.17 | 32 | 17,900 | 1.2 |
| 4.5 | 45 | 23,300 | 1.16 |
| 9.7 | 51 | 27,400 | 1.17 |
| 19 | 65 | 29,000 | 1.19 |
| 47 | 77 | 30,500 | 1.24 |

Example 179
Transformation of TMS Protected Poly(2-Hydroxyethyl Methacrylate) to Poly(2-(2-Bromoisobutyryloxy) Ethyl Methacrylate)
HEMA:

Example 180
Solution Polymerization of 2-Hydroxyethyl Methacrylate/Ethyl-2-Bromoisobutyrate/CuCl/CuCl$_2$ A round-bottomed flask was charged with CuCl (0.0123 g; 0.12 mmol), CuCl$_2$ (0.0033 g; 0.02 mmol) and 2,2'-bipyridine (0.0483 g; 0.3 mmol). The flask was cycled between vacuum and argon three times to remove oxygen. 2-Hydroxyethyl methacrylate (3.0 mL; 21.5 mmol), methyl ethyl ketone (2.1 mL) and n-propanol(0.9 mL) were sparged for 45 minutes before addition to the flask via degassed syringes and the solution was stirred for 10 minutes at room temperature and 10 minutes in an oil bath thermostated at 70° C. to dissolve CuCl$_2$. Ethyl-2-bromoisobutyrate (36.3 L; 0.25 was added via degassed syringe. Samples were removed using degassed syringes at timed intervals and were analyzed for conversion (GC) and molecular weight (SEC), $M_n$(theo)=13,000.

| time (hr.) | conversion (%) | $M_n$(SEC) | $M_w/M_n$(SEC) |
|---|---|---|---|
| 0.17 | 17 | 14,800 | 1.16 |
| 0.55 | 34 | 23,800 | 1.21 |
| 2.5 | 56 | 24,400 | 1.29 |
| 5.17 | 64 | 28,300 | 1.34 |
| 10 | 72 | 31,400 | 1.33 |

ATRP in the Presence of Added Salt

Example 181
Solution Polymerization of 2-Hydroxyethyl methacrylate/Ethyl 2-Bromoisobutyrate/CuBr/(Bu)$_4$NBr A round-bottomed flask was charged with CuBr (0.0245 g; 0.17 mmol), (Bu)$_4$NBr (0.55 g; 1.7 mmol) and 2,2'-bipyridine (0.0679 g; 0.4 mmol). The flask was cycled between vacuum and argon three times to remove oxygen. 2-Hydroxyethyl methacrylate (4.2 mL; 30.1 mmol) and DMF (16.8 mL) were sparged for 45 minutes before addition to the flask via degassed syringes and this stock solution was stirred for 30 minutes to dissolve salt. To each of six tubes was added ethyl 2-bromoisobutyrate (1.8 L; 0.01 mmol) and 3 mL of the stock solution. Each tube was immediately frozen and placed under vacuum. Oxygen was removed using five freeze-pump-thaw cycles. At intervals timed from the end of the final thaw, tubes were frozen in liquid nitrogen and broke open. The contents were analyzed for conversion (GC) and molecular weight (SEC). $M_n$ (th)=52,000.

| time (hr) | conversion (%) | $M_n$(SEC$_{DMF}$) | $M_w/M_n$ |
|---|---|---|---|
| 2 | 2 | 11,000 | 1.04 |
| 6 | 0 | 16,400 | 1.12 |
| 15 | 4 | 19,800 | 1.15 |
| 24 | 8 | 28,410 | 1.24 |
| 56 | 6 | 27,360 | 1.24 |
| 120 | 12 | 32,020 | 1.31 |

2-(Dimethylamino)ethyl Methacrylate

Example 182
Solution Polymerization of 2-(Dimethylamino)ethyl Methacrylate/Ethyl 2-Bromoisobutyrate/CuBr A dry long glass-tube was charged with CuBr (6.7 mg, 0.047 mmol), ligand (0.047 mmol), ethyl 2-bromoisobutyrate (6.8 l, 0.047 mmol), 2-(dimethylamino) ethyl methacrylate (1 ml, 5.9 mmol), solvent (1 ml) and a magnetic stir bar. The glass tube was degassed by three freeze-pump-thaw cycles and was then sealed by flame. The glass tube was immersed in an oil bath thermostated at 90°C. At certain times, the glass tube was taken out and broken. The sample was dissolved in DMF to measure conversion (GC) and molecular weight (SEC).

| Temp (C) | Ligand | Time (h) | Conv. (%) | $M_{n,th}$ | $M_n$ | $M_w/M_n$ |
|---|---|---|---|---|---|---|
| 90 | bpy (2 eq.) | 1.25 | 84.7 | 16940 | 20530 | 1.55 |
| 90 | TMEDA (2 eq.) | 4.25 | 75.6 | 15120 | 18610 | 1.53 |
| 90 | PMDETA | 1 | 67.5 | 13500 | 17550 | 1.61 |
| 90 | HMTETA | 1.25 | 79.1 | 15820 | 17880 | 1.45 |

| Temp (C) | Solvent | Time (h) | Conv. (%) | $M_{n,th}$ | $M_n$ | $M_w/M_n$ |
|---|---|---|---|---|---|---|
| 90 | anisole | 1.25 | 79.1 | 15820 | 17880 | 1.45 |
| 90 | dichlorobenzene | 1.25 | 77.6 | 15520 | 15770 | 1.43 |
| 90 | BuOAc | 1.5 | 85.6 | 30820 | 25256 | 1.57 |
| 90 | ethylene carbonate | 1.0 | 62.5 | 12500 | 11490 | 1.51 |

Example 183
Solution Polymerization of 2-(Dimethylamino)ethyl Methacrylate/Ethyl 2-Bromoisobutyrate/CuBr A dry round-bottom flask was charged with CuBr (13.4 mg, 0.093 mmol), N',N,N',N',N",N"-hexamethyltriethylenetetramine (25.4 1, 0.093 mmol), 2-(dimethylamino)ethyl methacrylate (2 ml, 5.9 mmol), dichlorobenzene (2 ml) and a magnetic stir bar. The flask was degassed by three freeze-pump-thaw cycles. The flask was immersed in an oil bath thermostated at 50° C. and then bromopropionitrile (8 l, 0.093 mmol) was added dropwise. At various times, samples were taken and dissolved in DMF to measure conversion (GC) and molecular weight (SEC).

| Time (h) | Conv. (%) | Mn, th | Mn | Mw/Mn |
|---|---|---|---|---|
| 0.67 | 11.3 | 2260 | 6560 | 1.07 |
| 1.41 | 25.6 | 5120 | 8990 | 1.12 |
| 2 | 32.8 | 6560 | 11150 | 1.12 |
| 3.08 | 52.6 | 10520 | 15680 | 1.19 |
| 3.75 | 68.1 | 13620 | 18160 | 1.20 |
| 4.5 | 77.3 | 15460 | 20070 | 1.23 |
| 5.5 | 82.9 | 16580 | 21270 | 1.25 |
| 6.33 | 87.1 | 17420 | 21290 | 1.26 |

Statistical Copolymerizations (Spontaneous Gradient Copolymers)

Copolymers of Styrene and Acrylonitrile.

Example 184

6.3 ml ($5.5*10^{-2}$ mole) of styrene, 3.7 ml ($5.5*10^{-2}$ mole) of acrylonitrile, 0.1720 g of CuBr, 0.5590 g of 2,2'-bipyridine, 163 1 of 1-phenylethyl bromide and 1 g of p-dimethoxybenzene as an internal standard for GC were added to a schlenk flask under argon and the reaction mixture was heated at 80° C. Samples of the reaction mixture were withdrawn at the prescribed time intervals. The conversion of the monomers was determined by GC and from that the cumulative copolymer composition ($F_c$) was calculated. $^1$H-NMR was used to confirm the calculated composition. The molecular weights and molecular weight distributions were determined by Gel Permeation Chromatography vs. polystyrene standards.

The results are tabulated below:

| Sample | Time (hrs.) | Conversion (%) | $M_n$(GPC) | $M_w/M_n$ | $F_{cAN}$(GC) | $F_{cAN}$(NMR) |
|---|---|---|---|---|---|---|
| 1 | 1.5 | 23 | 2,000 | 1.23 | 0.48 | — |
| 2 | 2.5 | 67 | 4,000 | 1,13 | 0.50 | — |
| 3 | 3.5 | 89 | 7,300 | 1.08 | 0.49 | — |
| 4 | 5.5 | 91 | 7,800 | 1.09 | 0.48 | 0.48 |

Example 185

7.82 ml ($6.8*10^{-2}$ mole) of styrene, 2.25 ml ($3.4*10^{-2}$ mole) of acrylonitrile, 0.1720 g of CuBr, 0.5590 g of 2,2'-bipyridine, 163 l of 1-phenylethyl bromide and 1 g of p-dimethoxybenzene as an internal standard for GC were added to a schlenk flask under argon and the reaction mixture was heated at 80° C. Samples of the reaction mixture were withdrawn at the prescribed time intervals. The conversion of the monomers was determined by GC and from that the cumulative copolymer composition ($F_c$) was calculated. $^1$H-NMR was used to confirm the calculated composition. The molecular weights and molecular weight distributions were determined by Gel Permeation Chromatography vs. polystyrene standards. The results are tabulated below:

| Sample | Time (hrs.) | Conversion (%) | $M_n$(GPC) | $M_w/M_n$ | $F_{cAN}$(GC) | $F_{cAN}$(NMR) |
|---|---|---|---|---|---|---|
| 1 | 1.5 | 35 | 1,200 | 1.35 | 0.38 | — |
| 2 | 3.5 | 67 | 5,400 | 1.11 | 0.37 | — |
| 3 | 4.5 | 89 | 6,000 | 1.10 | 0.33 | — |
| 4 | 5.5 | 91 | 6,900 | 1.09 | 0.35 | 0.37 |

Example 186

5.0 ml ($4.4*10^{-2}$ mole) of styrene, 5.0 ml ($7.6*10^{-2}$ mole) of acrylonitrile, 0.0720 g of CuBr, 0.1560 g of 2,2'-bipyridine, 69 l of 1-phenylethyl bromide and 1 g of p-dimethoxybenzene as an internal standard for GC were added to a schlenk flask under argon and the reaction mixture was heated at 90° C. Samples of the reaction mixture were withdrawn at the prescribed time intervals. The conversion of the monomers was determined by GC and from that the cumulative copolymer composition ($F_c$) was calculated. The molecular weights and molecular weight distributions were determined by Gel Permeation Chromatography vs. polystyrene standards. The results are tabulated below:

| Sample | Time (hrs.) | Conversion (%) | $M_n$(GPC) | $M_w/M_n$ | $F_{cAN}$(GC) |
|---|---|---|---|---|---|
| 1 | 1.5 | 12 | 2,130 | 1.40 | 0.46 |
| 2 | 3.3 | 44 | 3,600 | 1.30 | 0.63 |
| 3 | 18.3 | 54 | 7,400 | 1.10 | 0.62 |
| 4 | 24.3 | 60 | 8,900 | 1.13 | 0.62 |
| 5 | 44.3 | 93 | 12,100 | 1.12 | 0.63 |

Example 187

6.5 ml ($5.5*10^{-2}$ mole) of styrene, 3.5 ml ($5.5*10^{-2}$ mole) of acrylonitrile, 0.0172 g of CuBr, 0.1400 g of 4, 4'-di-(5-nonyl)-2,2'-bipyridine, 16.3 l of 1-phenylethyl bromide and 1 g of p-dimethoxybenzene as an internal standard for GC were added to a schlenk flask under argon and the reaction mixture was heated at 90° C. Samples of the reaction mixture were withdrawn at the prescribed time intervals. The conversion of the monomers was determined by GC and from that the cumulative copolymer composition ($F_c$) was calculated. The molecular weights and molecular weight distributions were determined by Gel Permeation Chromatography vs. polystyrene standards. The results are tabulated below:

| Sample | Time (hrs.) | Conversion (%) | $M_n$(GPC) | $M_w/M_n$ | $F_{cAN}$(GC) |
|---|---|---|---|---|---|
| 1 | 2.5 | 19 | 8,200 | 1.31 | 0.54 |
| 2 | 4.3 | 25 | 11,000 | 1.18 | 0.42 |
| 3 | 20.0 | 40 | 25,800 | 1.09 | 0.43 |
| 4 | 27.0 | 46 | 27,300 | 1.08 | 0.42 |
| 5 | 44.0 | 52 | 36,000 | 1.11 | 0.42 |
| 6 | 53.0 | 58 | 38,900 | 1.09 | 0.44 |

Copolymers of Styrene and Butyl Acrylate

Example 188

7.65 ml ($6.7*10^{-2}$ mole) of styrene, 6.35 ml ($4.4*10^{-2}$ mole) of butyl acrylate, 0.0404 g of CuBr, 0.350 g of 4,4'-di-(5-nonyl)-2,2'-bipyridine, 30 l of methyl 2-bromopropionate and 1 ml of o-xylene as an internal standard for GC were added to a schlenk flask under argon and the reaction mixture was heated at 110° C. Samples of the reaction mixture were withdrawn at the prescribed time intervals. The conversion of the monomers was determined by GC and from that the cumulative copolymer composition ($F_c$) was calculated. $^1$H-NMR was used to confirm the calculated composition. The molecular weights and molecular weight distributions were determined by Gel Permeation Chromatography vs. polystyrene standards.

The results are tabulated below:

| sample | time (hrs.) | conversion (%) | $M_n$(GPC) | $M_w/M_n$ | $F_{cBA}$(GC) | $F_{cBA}$(NMR) |
|---|---|---|---|---|---|---|
| 1 | 1.25 | 18 | 10,800 | 1.10 | 0.22 | 0.24 |
| 2 | 2.75 | 27 | 17,600 | 1.10 | 0.39 | — |
| 3 | 4 25 | 49 | 23,500 | 1.10 | 0.32 | 0.34 |
| 4 | 5.75 | 56 | 30,000 | 1.11 | 0.43 | 0.37 |
| 5 | 8.25 | 68 | 32,100 | 1.12 | 0.35 | 0.37 |
| 6 | 12.25 | 72 | 34,300 | 1.09 | 0.35 | 0.38 |

Example 189

3.39 ml ($3*10^{-2}$ mole) of styrene, 10.61 ml ($7.4*10^{-2}$ mole) of butyl acrylate, 0.0404 g of CuBr, 0.350 g of 4,4'-di-(5-nonyl)-2,2'-bipyridine, 30 l of methyl 2-bromopropionate and 1 ml of o-xylene as an internal standard for GC were added to a schlenk flask under argon and the reaction mixture was heated at 110° C. Samples of the reaction mixture were withdrawn at the prescribed time intervals. The conversion of the monomers was determined by GC and from that the cumulative copolymer composition ($F_c$) was calculated. The molecular weights and molecular weight distributions were determined by Gel Permeation Chromatography vs. polystyrene standards. The results are tabulated below:

| sample | time (hrs.) | conversion (%) | $M_n$(GPC) | $M_w/M_n$ | $F_{cBA}$(GC) |
|---|---|---|---|---|---|
| 1 | 1 | 7.9 | 3,000 | 1.25 | 0.53 |
| 2 | 2 | 15 | 5,100 | 1.15 | 0.54 |
| 3 | 4.5 | 26 | 8,800 | 1.10 | 0.59 |
| 4 | 11 | 27 | 9,300 | 1.09 | 0.61 |
| 5 | 14 | 27 | 12,000 | 1.09 | 0.59 |

Example 190

8.33 ml ($7.3 \times 10^{-2}$ mole) of styrene, 4.62 ml ($3.2 \times 10^{-2}$ mole) of butyl acrylate, 0.0404 g of CuBr, 350 g of 4,4'-di-(5-nonyl)-2,2'-bipyridine, 30 l of methyl 2-bromopropionate and 1 ml of o-xylene as an internal standard for GC were added to a schlenk flask under argon and the reaction mixture was heated at 110° C. Samples of the reaction mixture were withdrawn at the prescribed time intervals. The conversion of the monomers was determined by GC and from that the cumulative copolymer composition ($F_c$) was calculated. The molecular weights and molecular weight distributions were determined by Gel Permeation Chromatography vs. polystyrene standards. The results are tabulated below:

| sample | time (hrs.) | conversion (%) | $M_n$(GPC) | $M_w/M_n$ | $F_{cBA}$(GC) |
|---|---|---|---|---|---|
| 1 | 1.00 | 9.6 | 3,600 | 1.29 | 0.14 |
| 2 | 2.00 | 15.0 | 5,300 | 1.18 | 0.19 |
| 3 | 4.50 | 24.0 | 8,400 | 1.13 | 0.17 |
| 4 | 10.5 | 42.0 | 16,400 | 1.12 | 0.14 |
| 5 | 13.5 | 76.0 | 23,700 | 1.11 | 0.16 |

Copolymers of Isobutene with Acrylonitrile by ATRP

Example 191

Alternating Copolymers Isobutylene/Acrylonitrile (Molar Feed 3.5:1)

To 0.11 g ($6.68 \times 10^{-4}$ mole) 2,2'bipyridine and 0.036 g ($2.34 \times 10^{-4}$ mole) CuBr at −30° C. in a glass tube, was added 1.75 mL ($2 \times 10^{-2}$ mole) isobutene, 0.5 mL ($0.55 \times 10^{-2}$ mole) acrylonitrile (AN) and 0.040 mL ($2.34 \times 10^{-4}$ mole) diethyl methyl bromomalonate under an argon atmosphere. The glass tube was sealed under vacuum and the reaction mixture warmed at 50° C. 12 hours. The reaction mixture was then dissolved in THF and conversion of AN determined by GC was 100%. The polymer was then precipitated into methanol (three times), filtered, dried at 60° C. under vacuum for 48 h and weighted. $M_w/M_n$=1.45 (Mth=3400). The % of acrylonitrile in copolymer determined by integration of methane proton —C$\underline{H}$CN and gem-dimethyl region of 1H-NMR was 51%. The glass transition temperature of product determined by DSC was 48° C.

Example 192

Copolymer IB/AN (Molar Feed 1:1)

To 0.055 g ($3.5 \times 10^{-4}$ mole) 2,2'-bipyridine and 0.017 g ($1.17 \times 10^{-4}$ mole) CuBr at −30° C. in a glass tube, was added 0.5 mL ($0.55 \times 10^{-2}$ mole) isobutene, 0.5 mL ($0.55 \times 10^{-2}$ mole) acrylonitrile and 0.016 mL ($1.17 \times 10^{-4}$ mole) diethyl methylbromomalonate under an argon atmosphere. The glass tube was sealed under vacuum and the reaction mixture warmed at 50° C. for 24 hours. The reaction mixture was then dissolved in THF and conversion of AN determined by GC was 100%. The polymer was than precipitated into methanol (three times), filtered, dried at 60° C. under vacuum for 48 h and weighted. $M_n$=6400, $M_w/M_n$=1.52 (Mth=$6500$). The % of acrylontrile in copolymer determined by integration of methine proton —C$\underline{H}$CN and gem-dimethyl region of $^1$H-NMR was 74%. The glass transition temperature of product determined by DSC was 70° C.

Copolymers of Methyl Acrylate and Vinyl Acetate

Example 193

Copolymerization of Methyl Acrylate and Vinyl Acetate by ATRP

The following amounts of reagents were weighed into a glass tube under ambient temperature: 6.2 mg (0.047 mmol) of CuBr, 21.9 mg (0.140 mmol) of 2,2'-bipyridine. 0.50 ml (5.55 mmol) of methyl acrylate, 0.50 ml (5.42 mmol) of vinyl acetate and 6.1 μL (0.047 mmol) ethyl 2-bromopropionate was added via syringe to the tubes charged with argon. Two "freeze-pump-thaw" cycles were performed on the contents of the tube to insure that oxygen was removed from the polymerization solution. The tubes were sealed under vacuum and placed in an oil bath thermostated at 110° C. At timed intervals, the tubes were taken from the oil bath and opened. The contents were dissolved in 10 mL of THF. Conversion of the monomers was measured using GC, and the molecular weight and polydispersity were obtained by GPC.

| Sample | Time (h) | Conversion (%) of MA | Conversion (%) of VAc | $M_{n,\,Cal}$ | $M_{n,\,SEC}$ | $M_w/M_n$ |
|---|---|---|---|---|---|---|
| 1 | 0.8 | 23 | 5 | 2780 | 4190 | 1.93 |
| 2 | 2.4 | 52 | 22 | 7480 | 7000 | 1.47 |
| 3 | 3.3 | 65 | 12 | 7810 | 9420 | 1.38 |
| 4 | 4.6 | 77 | 26 | 8940 | 11100 | 1.32 |
| 5 | 6.4 | 87 | 30 | 11700 | 12400 | 1.28 |

Example 194

Copolymerization of Methyl Acrylate and Vinyl Acetate by ATRP

The following amounts of reagents were weighed into a glass tube under ambient temperature: 3.98 mg (0.028 mmol) of CuBr, 22.7 mg (0.056 mmol) of 4,4'-di-(5-nonyl)-2,2'-bipyridine. 0.50 ml (5.55 mmol) of methyl acrylate, 0.51 ml of (5.55 mmol) of vinyl acetate and 24.6 μL (0.221 mmol) of methyl 2-bromopropionate was added via syringe into the tubes charged with argon. Two "freeze-pump-thaw" cycles were performed on the contents of the tube to insure that oxygen was removed from the polymerization solution. The tube was sealed under vacuum and placed in an oil bath thermostated at 110° C. After 18.7 hours, the tube was removed from the oil bath and opened. The contents were dissolved in 10 mL of THF. Conversion of the monomer was measured using GC, and the molecular weight and polydispersity were obtained by GPC. Conversion of methyl acrylate was 58.0%, and conversion of vinyl acetate was 14.0%.

The content of vinyl acetate determined by $^1$H NMR was 16.9%. $M_{th}$=1720, $M_{n\ (GPC)}$=1840, $M_w/M_n$=1.33.
Alternating Copolymer of N-Cyclohexyl Maleimide/Styrene

Example 195
General Procedure for Homogeneous ATRP of styrene/N-cyclohexyl Maleimide The following amounts of reagents were weighed into glass tube under ambient temperature: 12 mg (8.37×10$^{-2}$ mmol) of CuBr, 0.45 mL (0.41 g, 4.4 mmol) of deinhibited styrene, 0.72 g (4.4 mmol) N-cyclohexyl maleimide, 60 mg (0.175 mmol) 4,4'-di-(5-nonyl)-2,2'-bipyridine, and 12 µL (8.8×10$^{-2}$ mmol) 1-phenylethyl bromide. Two "freeze-pump-thaw" cycles were performed on the content of tube in order to ensure that oxygen was removed from the polymerization solution. The tube was sealed under vacuum and placed in an oil bath thermostated at 110° C. After 7 h the tube was broken and the contents dissolved in 10 mL of THF. Conversion of the monomer, measured using GC was 98% for both monomers, and the molecular weight and polydispersity measured by GPC were $M_n$=4700, and $M_w/M_n$=1.22. From $^1$H NMR spectrum the content of styrene in copolymer was 50%. DSC measurement showed one $T_g$=270° C. The initial temperature of decomposition of the alternating copolymer determined from TGA was 430° C.
Alternating Isobutylene/Butyl Acrylate

Example 196
Alternating Copolymers Isobutylene/butyl Acrylate (Molar Feed 3.5:1)

To 0.11 g (6.68×10-4 mole) 2,2'-bipyridine and 0.036 g (2.34×10-4 mole) CuBr at -30° C. in a glass tube, was added 1.75 mL (2×10-2 mole) isobutene, 0.5 mL (0.55× 10-2 mole) butyl acrylate (BA) and 0.040 mL (2.34×10-4 mole) diethyl methyl bromomalonate under an argon atmosphere. The glass tube was sealed under vacuum and the reaction mixture warmed to 50° C. for 12 hours. The reaction mixture was then dissolved in THF and the conversion of BA as determined by GC was 100%. The polymer was then precipitated into methanol (three times), filtered, dried at 60° C. under vacuum for 48 h and weighted. $M_n$=3180, $M_w/M_n$=1.38 ($M_{th}$=3400). The content of isobutene in the copolymer was determined by integration of C(O)OCH$_2$ from butyl acrylate and the gem-dimethyl region of the $^1$H-NMR spectrum was 49%. The $T_g$ of product, as determined by DSC, was -48° C.

Example 197
Copolymer IB/BA (Molar Feed 1:1)

To 0.055 g (3.5×10$^{-4}$ mole) 2,2'-bipyridine and 0.017 g (1.17×10$^{-4}$ mole) CuBr at -30° C. in a glass tube, were added 0.5 mL (0.55×10$^{-2}$ mole) isobutene, 0.5 mL (0.55× 10$^{-2}$ mole) butyl acrylate and 0.016 mL (1.17×10$^{-4}$ mole) diethyl methyl bromomalonate under an argon atmosphere. The glass tube was sealed under vacuum and the reaction mixture warmed to 50° C. for 12 hours. The reaction mixture was then dissolved in THF and the conversion of butyl acrylate, as determined by GC, was 100%. The polymer was than precipitated into methanol (three times), filtered, dried at 60° C. under vacuum for 48 h and weighted. The content of IB in copolymer was 28% and $M_n$=6400, $M_w/M_n$=1.52 ($M_{th}$=6500). The % of IB in copolymer was determined from integration of C(O)OCH$_2$ from butyl acrylate and the gem-dimethyl region of the $^1$H-NMR spectrum. The $T_g$ of the product, as determined by DSC, was -35° C.
Tetracopolymer

Example 198
Solution Copolymerization of 2-Hydroxylethyl Methacrylate, Butyl Acrylate, Methyl Methacrylate, and Styrene/4,4'-tert-Butyl-2,2'-Bipyridine/Cu$^0$/CuBr A dry round-bottom flask was charged with CuBr (28.7 mg, 0.2 mmol), Cu (6.5 mg, 0.1 mmol), 4,4'-tert-butyl-2,2'-bipyridine (107 mg, 0.4 mmol), butyl acrylate (0.543 ml, 3.8 mmol), 2-hydroxylethyl methacrylate (0.32 ml, 2.6 mmol), styrene (0.27 ml, 2.4 mmol), methyl methacrylate (0.13 ml, 1.2 mmol), toluene (0.5 ml) and a magnetic stir bar. The flask was sealed with a rubber septum and degassed by three freeze-pump-thaw cycles. The flask was immersed in an oil bath thermostated at 110° C. and tert-butyl 2-bromopropionate (33 l, 0.2 mmol) was added dropwise. At various times, the samples were taken and dissolved in THF to measure conversion (GC) and molecular weight (SEC).

| Ligand | Time (h) | MMA | BA | St | HEMA | $M_n$ | $M_w/M_n$ |
|---|---|---|---|---|---|---|---|
| dTbpy | 6 | 90.8 | 75.5 | 98.2 | 96.6 | 9200 | 1.43 |
| bpy | 5.25 | 98.0 | 90.2 | 99.95 | 99.3 | 10220 | 1.59 |

Example 199
Solution Copolymerization of 2-Hydroxylethyl Methacrylate, Butyl Acrylate, Methyl Methacrylate, and Styrene/2.2'-Bipyridine/Cu$^0$/CuBr A dry round-bottom flask was charged with CuBr$_2$ (22 mg, 0.1 mmol), Cu (12.7 mg, 0.2 mmol), 2,2'-bipyridine (62.7 mg, 0.4 mmol), butyl acrylate (0.543 ml, 3.8 mmol), 2-hydroxylethyl methacrylate (0.32 ml, 2.6 mmol), styrene (0.27 ml, 2.4 mmol), methyl methacrylate (0.13 ml, 1.2 mmol), toluene (0.5 ml) and a magnetic stir bar. The flask was sealed with a rubber septum and degassed by three freeze-pump-thaw cycles. The flask was immersed in an oil bath thermostated at 110 C. and tert-butyl 2-bromopropionate (33 l, 0.2 mmol) was added dropwisely. At various times, the samples were taken and dissolved in THF to measure conversion (GC) and molecular weight (SEC).

| Temp (C) | Time (h) | MMA (%) | BA (%) | St (%) | HEMA | $M_n$ | $M_w/M_n$ |
|---|---|---|---|---|---|---|---|
| 110 | 0.55 | 56.6 | 41.7 | 74.2 | 78.2 | 7413 | 1.75 |
| 110 | 1 | 75.0 | 50.3 | 87.8 | 85.3 | 7474 | 1.34 |
| 110 | 2 | 91.4 | 68.0 | 98.1 | 96.2 | 8024 | 1.74 |
| 110 | 3 | 95.2 | 75.1 | 99.4 | 98.0 | 7816 | 1.81 |
| 110 | 6.22 | 96.8 | 81.9 | 99.6 | 97.8 | 8167 | 1.97 |

Gradient Copolymers
Styrene/Acrylonitrile

Example 200

10 ml of styrene, 0.172 g of CuBr, 0.560 g of 2,2'-bipyridine and 163 l of 1-phenylethyl bromide were added under argon to a three-neck round bottom flask equipped with a condenser and a stir bar. The reaction mixture was heated at 85° C. and the second comonomer, acrylonitrile, was added via an HPLC pump with a rate of addition 0.02 ml/min. Samples of the reaction mixture were withdrawn at the prescribed time intervals. The molecular weights and molecular weight distributions were determined by Gel Permeation Chromatography vs. polystyrene standards. The polymer yield was determined gravimetrically. The cumulative copolymer composition (Fc) was determined by $^1$H-NMR. Based on the GPC and NMR results, the instantaneous copolymer composition (Fi) was calculated. The results are tabulated below.

| sample | time (hrs.) | polymer yield (g) | $M_n$ (GPC) | $M_w/M_n$ | $F_{cAN}$ (NMR) | $F_{iAN}$ |
|---|---|---|---|---|---|---|
| 1 | 0.5 | 0.24 | 1,140 | 1.45 | 0.16 | 0.16 |
| 2 | 2.2 | 0.33 | 1,900 | 1.36 | 0.19 | 0.24 |
| 3 | 3.2 | 1.71 | 2,470 | 1.30 | 0.26 | 0.42 |
| 4 | 5.2 | 6.83 | 5,800 | 1.12 | 0.36 | 0.45 |
| 5 | 6.7 | 9.91 | 8,600 | 1.13 | 0.39 | 0.46 |
| 6 | 8.2 | 12.85 | 12,300 | 1.10 | 0.47 | 0.62 |
| 7 | 9.7 | 14.57 | 15,800 | 1.10 | 0.52 | 0.68 |

Example 201

10 ml of styrene, 0.172 g of CuBr, 0.560 g of 2,2'-bipyridine and 163 l of 1-phenylethyl bromide were added under argon to a three-neck round bottom flask equipped with a condenser and a stir bar. The reaction mixture was heated at 85° C. and the second comonomer, acrylonitrile, was added via an HPLC pump with a rate of addition 0.08 ml/min. Samples of the reaction mixture were withdrawn at the prescribed time intervals. The molecular weights and molecular weight distributions were determined by Gel Permeation Chromatography vs. polystyrene standards. The polymer yield was determined gravimetrically. The cumulative copolymer composition (Fc) was determined by $^1$H-NMR. Based on the GPC and NMR results, the instantaneous copolymer composition (Fi) was calculated. The results are tabulated below.

| sample | time (hrs.) | polymer yield (g) | $M_n$ (GPC) | $M_w/M_n$ | $F_{cAN}$ (NMR) | $F_{iAN}$ |
|---|---|---|---|---|---|---|
| 1 | 1.0 | 2.00 | 1,330 | 1.35 | 0.36 | 0.36 |
| 2 | 2.0 | 3.17 | 3,400 | 1.19 | 0.41 | 0.44 |
| 3 | 3.0 | 7.31 | 5,600 | 1.11 | 0.50 | 0.59 |
| 4 | 4.5 | 11.84 | 8,200 | 1.10 | 0.53 | 0.62 |
| 5 | 5.5 | 13.97 | 11,900 | 1.09 | 0.55 | 0.69 |
| 6 | 7.5 | 22.34 | 17,600 | 1.10 | 0.63 | 0.77 |
| 7 | 9.5 | 25.54 | 20,900 | 1.10 | 0.71 | 1.00 |

Example 202

10 ml of styrene, 10 ml of diphenyl ether (solvent), 0.172 g of CuBr, 0.560 g of 2,2'-bipyridine, and 163 l of 1-phenylethyl bromide were added under argon to a three-neck round bottom flask equipped with a condenser and a stir bar. The reaction mixture was heated at 90° C. and the second comonomer, acrylonitrile, was added via an HPLC pump with a rate of addition 0.03 ml/min. Samples of the reaction mixture were withdrawn at the prescribed time intervals. The molecular weights and molecular weight distributions were determined by Gel Permeation Chromatography vs. polystyrene standards. The polymer yield was determined gravimetrically. The cumulative copolymer composition (Fc) was determined by $^1$H-NMR. Based on the GPC and NMR results, the instantaneous copolymer composition (Fi) was calculated. The results are tabulated below.

| sample | time (hrs.) | polymer yield (g) | $M_n$ (GPC) | $M_w/M_n$ | $F_{cAN}$ (NMR) | $F_{iAN}$ |
|---|---|---|---|---|---|---|
| 1 | 2.0 | 1.18 | 3,500 | 1.15 | 0.33 | 0.33 |
| 2 | 3.0 | 2.89 | 4,000 | 1.14 | 0.34 | 0.40 |
| 3 | 4.5 | 6.54 | 7,700 | 1.10 | 0.39 | 0.44 |
| 4 | 6.5 | 8.67 | 9,300 | 1.09 | 0.42 | 0.55 |
| 5 | 8.5 | 8.89 | 11,300 | 1.09 | 0.45 | 0.58 |
| 6 | 11.5 | 9.12 | 14,000 | 1.11 | 0.50 | 0.68 |
| 7 | 12.5 | 10.23 | 15,400 | 1.11 | 0.52 | 0.70 |
| 8 | 15.5 | 10.73 | 17,200 | 1.11 | 0.55 | 0.81 |
| 9 | 18.5 | 13.43 | 17,400 | 1.11 | 0.56 | 0.82 |
| 10 | 35.0 | 14.2 | 18,300 | 1.16 | 0.58 | 0.88 |

Example 203

10 ml of acrylonitrile, 10 ml of diphenyl ether (solvent), 0.172 g of CuBr, 0.560 g of 2,2'-bipyridine, and 163 l of 1-phenylethyl bromide were added under argon to a three-neck round bottom flask equipped with a condenser and a stir bar. The reaction mixture was heated at 80° C. and the second comonomer, styrene, was added via an HPLC pump with a rate of addition 0.02 ml/min. Samples of the reaction mixture were withdrawn at the prescribed time intervals. The molecular weights and molecular weight distributions were determined by Gel Permeation Chromatography vs. polystyrene standards. The polymer yield was determined gravimetrically. The cumulative copolymer composition (Fc) was determined by $^1$H-NMR. Based on the GPC and NMR results, the instantaneous copolymer composition (Fi) was calculated. The results are tabulated below.

| sample | time (hrs.) | polymer yield (g) | $M_n$(GPC) | $M_w/M_n$ | $F_{cAN}$(NMR) |
|---|---|---|---|---|---|
| 1 | 1.3 | 3.36 | 5,900 | 1.14 | 0.71 |
| 2 | 2.3 | 6.07 | 6,700 | 1.10 | 0.68 |
| 3 | 3.8 | 6.57 | 7,500 | 1.11 | 0.66 |
| 4 | 5.3 | 7.04 | 8,500 | 1.11 | 0.64 |
| 5 | 6.8 | 7.46 | 8,900 | 1.12 | 0.64 |
| 6 | 8.3 | 7.92 | 8,800 | 1.12 | 0.61 |
| 7 | 9.8 | 7.81 | 8,700 | 1.14 | 0.60 |
| 8 | 11.3 | 8.39 | 8,100 | 1.14 | 0.57 |
| 9 | 14.3 | 8.56 | 7,900 | 1.15 | 0.60 |

Styrene/Butyl Acrylate

Example 204

10 ml of styrene, 0.063 g of CuBr, 0.205 g of 2,2'-bipyridine and 64 l of ethyl-(2-bromoisobutyrate) were added under argon to a three-neck round bottom flask equipped with a condenser and a stir bar. The reaction mixture was heated at 120° C. and the second comonomer, butyl acrylate, was added via an HPLC pump with a rate of addition 0.02 ml/min (total amount added 25 ml). Samples of the reaction mixture were withdrawn at the prescribed time intervals. The molecular weights and molecular weight distributions were determined by Gel Permeation Chromatography vs. polystyrene standards. The cumulative copolymer composition (Fc) was determined by $^1$H-NMR. Based on the GPC and NMR results, the instantaneous copolymer composition (Fi) was calculated. The results are tabulated below. The final yield of the precipitated and purified polymer, as determined gravimetrically, was 8 g.

| sample | time (hrs.) | Mn(GPC) | Mw/Mn | FcBA(NMR) | FiBA |
|---|---|---|---|---|---|
| 1 | 1.0 | 4,700 | 1.18 | 0.17 | 0.17 |
| 2 | 2.5 | 9,000 | 1.18 | 0.19 | 0.21 |
| 3 | 3.5 | 12,400 | 1.23 | 0.23 | 0.34 |
| 4 | 5.0 | 19,000 | 1.24 | 0.29 | 0.41 |
| 5 | 7.5 | 27,800 | 1.41 | 0.36 | 0.52 |
| 6 | 11.3 | 29,000 | 1.50 | 0.41 | 0.65 |
| 7 | 15.0 | 34,300 | 1.50 | 0.46 | 0.94 |
| 8 | 21.5 | 45,400 | 1.59 | 0.57 | 0.95 |

Example 205

10 ml of styrene, 0.063 g of CuBr, 0.420 g of 4, 4'-di-(5-nonyl)-2,2 -bipyridine and 64 1 of ethyl-(2-bromoisobutyrate) were added under argon to a three-neck round bottom flask equipped with a condenser and a stir bar. The reaction mixture was heated at 120∞C. and the second comonomer, butyl acrylate, was added via an HPLC pump with a rate of addition 0.08 ml/min (total amount added 13 ml). Samples of the reaction mixture were withdrawn at the prescribed time intervals. The molecular weights and molecular weight distributions were determined by Gel Permeation Chromatography vs. polystyrene standards. The polymer yield was determined gravimetrically. The cumulative copolymer composition (Fc) was determined by $^1$H-NMR. Based on the GPC and NMR results, the instantaneous copolymer composition (Fi) was calculated. The results are tabulated below.

| sample | time (hrs.) | polymer yield (g) | $M_n$(GPC) | $M_w/M_n$ | $F_{cBA}$(NMR) | $F_{iBA}$ |
|---|---|---|---|---|---|---|
| 1 | 0.9 | 1.41 | 3,600 | 1.17 | 0.15 | 0.15 |
| 2 | 2.5 | 2.51 | 6,700 | 1.10 | 0.20 | 0.26 |
| 3 | 4.5 | 3.07 | 8,900 | 1.11 | 0.26 | 0.49 |
| 4 | 7.5 | 3.89 | 11,300 | 1.13 | 0.31 | 0.50 |
| 5 | 9.8 | 4.18 | 12,400 | 1.14 | 0.32 | 0.57 |

Example 206

10 ml of styrene, 0.063 g of CuBr, 0.420 g of 4, 4'-di-(5-nonyl)-2,2'-bipyridine and 64 1 of ethyl-(2-bromoisobutyrate) were added under argon to a three-neck round bottom flask equipped with a condenser and a stir bar. The reaction mixture was heated at 100∞C. and the second comonomer, butyl acrylate, was added via an HPLC pump with a rate of addition 0.02 ml/min (total amount added 41 ml). Samples of the reaction mixture were withdrawn at the prescribed time intervals. The molecular weights and molecular weight distributions were determined by Gel Permeation Chromatography vs. polystyrene standards. The polymer yield was determined gravimetrically. The cumulative copolymer composition (Fc) was determined by $^1$H-NMR. Based on the GPC and NMR results, the instantaneous copolymer composition (Fi) was calculated. The results are tabulated below.

| sample | time (hrs.) | polymer yield (g) | $M_n$(GPC) | $M_w/M_n$ | $F_{cBA}$(NMR) | $F_{iBA}$ |
|---|---|---|---|---|---|---|
| 1 | 4.3 | 1.57 | 2,300 | 1.17 | 0.06 | 0.06 |
| 2 | 6.7 | 3.77 | 5,100 | 1.08 | 0.07 | 0.08 |
| 3 | 8.5 | 4.34 | 6,100 | 1.08 | 0.08 | 0.13 |
| 4 | 10.5 | 4.97 | 7,400 | 1.09 | 0.10 | 0.20 |
| 5 | 14.8 | 5.19 | 8,100 | 1.08 | 0.12 | 0.34 |
| 6 | 17.8 | 5.29 | 9,200 | 1.08 | 0.17 | 0.57 |
| 7 | 20.8 | 5.41 | 9,600 | 1.08 | 0.18 | 0.42 |
| 8 | 23.8 | 5.65 | 10,400 | 1.08 | 0.20 | 0.44 |
| 9 | 29.8 | 5.89 | 10,600 | 1.08 | 0.22 | 0.54 |
| 10 | 33.8 | 6.01 | 11,100 | 1.08 | 0.29 | 0.64 |

Example 207

Synthesis of End-functional Gradient Copolymer 10 ml of styrene, 0.063 g of CuBr, 0.205 g of 2,2'-bipyridine and 100 1 of functional initiator (glycidyl 2-bromopropionate) were added under argon to a three-neck round bottom flask equipped with a condenser and a stir bar. The reaction mixture was heated at 80° C. and the second comonomer, butyl acrylate was added via HPLC pump with a rate of addition 0.05 ml/min (total amount added 36 ml). Samples of the reaction mixture were withdrawn at the prescribed time intervals. The molecular weights and molecular weight distributions were determined by Gel Permeation Chromatography vs. polystyrene standards. The cumulative copolymer composition and end-functionality were determined by $^1$H-NMR. Based on the GPC and NMR results, the instantaneous copolymer composition was calculated. The results are tabulated below. The final yield of the precipitated and purified polymer, as determined gravimetrically, was 12 g. The epoxy functionality as determined by $^1$H-NMR was 0.91.

| sample | time (hrs.) | $M_n$(GPC) | $M_w/M_n$ | $F_{c\ BA}$(NMR) | $F_{iBA}$ |
|---|---|---|---|---|---|
| 1 | 2.5 | 950 | 1.34 | 0.12 | 0.12 |
| 2 | 5. | 1700 | 1.20 | 0.18 | 0.25 |
| 3 | 7.5 | 3500 | 1.20 | 0.24 | 0.34 |
| 4 | 9 | 4200 | 1.21 | 0.28 | 0.44 |
| 5 | 12 | 4800 | 1.22 | 0.31 | 0.56 |

The final polymer (0.5 g) was dissolved in dry THF (5.0ml) and 1.5 ml of a THF solution of tetrabutyl ammonium fluoride (1M) and 0.4 ml of trimethyl silyl azide were added under argon. The reaction was stirred vigorously for 6.5 hr. The final product was isolated by precipitation into MeOH, purified by repeated precipitation into MeOH and dried at RT under vacuum for 24 hrs. The GPC analysis of the material show unchanged molecular weight and polydispersity. The $^1$H-LNMR analysis showed that epoxy functionality was preserved entirely. Additionally, FT-IR measurements of the material confirmed that the bromine moiety at the other chain end was replace with azide group with yield of 73%.

Example 208

Synthesis of Symmetrical Gradient Copolymer

10ml of styrene, 0.063 g of CuBr, 0.205 g of 2,2'-bipyridine and 0.3ml of a difunctional initiator (1,2-bis (bromopropionyloxy)ethane) were added under argon to a three-neck round bottom flask equipped with a condenser and a stir bar. The reaction mixture was heated at 80° C. and the second comonomer, butyl acrylate was added via HPLC pump with a rate of addition 0.05 ml/min (total amount added 42 ml). Samples of the reaction mixture were withdrawn at the prescribed time intervals. The molecular weights and molecular weight distributions were determined by Gel Permeation Chromatography vs. polystyrene standards. The cumulative copolymer composition and two-way growth pattern of the chain were determined by $^1$H-NMR. Based on the GPC and NMR results, the instantaneous copolymer composition was calculated. The results are tabulated below. The final yield of the precipitated and purified polymer, as determined gravimetrically, was 20 g.

| sample | time (hrs.) | $M_n$(GPC) | $M_w/M_n$ | $F_{c\ BA}$(NMR) | $F_{iBA}$ |
|---|---|---|---|---|---|
| 1 | 2.5 | 1300 | 1.34 | 0.20 | 0.20 |
| 2 | 4. | 3500 | 1.23 | 0.31 | 0.45 |
| 3 | 6 | 6800 | 1.23 | 0.40 | 0.56 |
| 4 | 8 | 7200 | 1.21 | 0.44 | 0.61 |
| 5 | 12 | 9400 | 1.24 | 0.48 | 0.64 |
| 6 | 14 | 10000 | 1.25 | 0.52 | 0.72 |

Graft Copolymers
PVC Graft Copolymer

Example 209

To 0.0500 g (1.00×10−6 mole) poly(vinyl chloride-r-vinyl chloroacetate (1%)), 0.0100 g (6.97×10−5 mole) CuBr, and 0.0570 g (1.39×10−4 mole) 4,4'-di(5-nonyl)-2,2'-bipyridine in glass tube, 2.0 g (4.13×10−$^5$ mole) styrene was added under argon atmosphere. The glass tube was sealed under vacuum and the reaction mixture was heated at 110° C. for 12 hours. The reaction mixture was then dissolved in THF and the polymer precipitated into methanol three times. The content of styrene determined by $^1$H NMR was 84%. $M_n$=93,600 $M_w/M_n$=3.11.$T_g$=78.5∞C. and 107.9∞C.
Graft Copolymers with Polyethylene Backbones Example 210
Chlorosulfonated Polyethylene with Styrene Grafts by ATRP The following amounts of reagents were weighed into glass tube under ambient temperature: 0.3 g (2×10$^{-5}$ mol) chlorosulfonated polyethylene ($M_m$=14900, $M_w/M_n$=2.36), 12 mg (8.37×10$^{-2}$ mmol) of CuBr, 1.00 mL (0.909 g, 8.73 mmol) of styrene, and 60 mg (0.175 mmol) 4,4'-di-(5-nonyl)-2,2'-bipyridine. Two "freeze-pump-thaw" cycles were performed on the contents of the tube to ensure that oxygen was removed from the polymerization solution. The tube was sealed under vacuum and placed in an oil bath thermostated at 90° C. The tube was removed from the oil bath and cooled at 0° C. in order to quench the polymerization. Afterwards, the tube was broken, and the contents were dissolved in 10 mL of THF. Conversion of the monomer was measured using GC, and the molecular weight and polydispersity were measured by GPC. After 24 h, the conversion of styrene was 87%, $M_n$=85,600, $M_w/M_n$=1.79. $^1$H NMR spectrum shown that graft copolymer contain 70% styrene.

Example 211
Chlorosulfonated Polyethylene with Methyl Methacrylate Grafts by ATRP The following amounts of reagents were weighed into a glass tube under ambient temperature: 0.3 g (2×10$^{-5}$ mol) chlorosulfonated polyethylene ($M_n$=14900, $M_w/M_n$=2.36), 12 mg (8.37×10$^{-2}$ mmol) of CuBr, 1.00 mL (0.936 g, 9.36 mmol) of methyl methacrylate, and 60 mg (0.175 mmol) 4,4'-di-(5-nonyl)-2,2'-bipyridine. Two "freeze-pump-thaw" cycles were performed on the contents of the tube to insure that oxygen was removed from the polymerization solution. The tube was sealed under vacuum and placed in an oil bath thermostated at 90° C. After 8 h, the tube was broken, and the contents were dissolved in 10 mL of THF. Conversion of the monomer was measured using GC, and the molecular weight and polydispersity were measured by GPC. The conversion of methyl methacrylate was 41%, $M_n$=26,300, $M_w/M_n$=1.75. The $^1$H NMR spectrum showed that the graft copolymer contained 39% methyl methacrylate.
Isobutene Graft Copolymers Example 212
Graft Copolymer of Styrene—Isobutene Elastomer by ATRP The following amounts of reagents were weighed into glass tubes under ambient temperature: 0.3 g(3×10$^{-7}$ mol) brominated p-methylstyrene-isobutene elastomer (Exxon) ($M_n$=108000, $M_w/M_n$=2.31), 12 mg (8.37×10$^{-2}$ mmol) of CuBr, 1.00 ml (0.909 g, 8.73 mmol) of styrene, and 60 mg (0.175 mmol) 4,4'-di-(5-nonyl)-2,2'-bipyridine. Two "freeze-pump-thaw" cycles were performed on the contents of the tubes in order to insure that oxygen was removed from the polymerization solution. The tubes were sealed under vacuum and were placed in an oil bath thermostated at 90° C. At various time intervals the tubes were removed from the oil bath and cooled to 0° C. to quench the polymerization. Afterwards, the tubes were broken, and the contents dissolved in 10 mL of THF. Conversion of the monomer was measured using GC, and the molecular weight and polydispersity were measured by GPC.

| Time (h) | $M_{n,SEC}$ | $M_w/M_n$ | mol % St, $^1$H NMR | $T_g$, (° C.)DSC |
|---|---|---|---|---|
| 0 | 108000 | 2.31 | — | −60 |
| 1 | 139000 | 2.48 | 13.8 | −52 |
| 1.5 | 179000 | 2.55 | 27.3 | 0 |
| 2 | 193000 | 2.59 | 33.1 | 5 |
| 7 | 250000 | 2.38 | 69 | −60/98 |

Example 213
Isobutene—Isobornyl Acrylate Graft Copolymer by ATRP

The following reagents were weighed into a glass tube under ambient temperature: 0.3 g(3×10$^{-7}$ mol) brominated p-methylstyrene-isobutene elastomer (Exxon) ($M_n$=108380, $M_w/M_n$=2.31), 12 mg (8.37×10$^{-2}$ mmol) of CuBr, 1.00 mL (0.986 g, 5 mmol) of isobornyl acrylate, and 60 mg (0.175 mmol) 4,4'-di-(5-nonyl)-2,2'-bipyridine. Two "freeze-pump-thaw" cycles were performed on the contents of the tube to insure that oxygen was removed from the polymerization solution. The tube was sealed under vacuum and placed in an oil bath thermostated at 90° C. After 2 h the tube was removed from the oil bath and cooled to 0° C. to quench the polymerization. Conversion of the monomer was measured using GC; the molecular weight and polydispersity were measured by GPC. Conversion of isobornyl acrylate was 30%, $M_n$=141000, $M_w/M_n$=2.61. $^1$H NMR spectrum showed that the graft copolymer contained 30% isobornyl acrylate. By DSC measurement one $T_g$ was found at 2 ° C.
Butyl Rubber Graft Copolymers Example 214
Bromo-Butyl Rubber—Styrene Graft Copolymers by ATRP The following amounts of reagents were weighed into a glass tube under ambient temperature: 0.3 g(1.1×10$^{-7}$ mol)

bromo-butyl rubber (Exxon) ($M_n$=272500, $M_w/M_n$=1.78), 12 mg (8.37×10$^{-2}$ mmol) of CuBr, 1.00 mL (0.986 g, 5 mmol) of isobornyl acrylate, and 60 mg (0.175 mmol) 4,4'-di-(5-nonyl)-2,2'-bipyridine. Two "freeze-pump-thaw" cycles were performed on the contents of the tube to insure that oxygen was removed from the polymerization solution. The tube was sealed under vacuum and placed in an oil bath thermostated at 90° C. After 2 h the tube was removed from the oil bath and cooled at 0° C. to quench the polymerization. Conversion of the monomer was measured using GC, and the molecular weight and polydispersity were measured by GPC. Conversion of styrene was 21%, $M_n$=359000, $M_w/M_n$=1.72. $^1$H NMR spectrum showed that the graft copolymer contained 14% styrene. By DSC measurement one $T_g$ was found at –51 ° C.

Example 215
Bromo-Butyl Rubber—Isobornyl Acrylate Graft Copolymers by ATRP

The following amounts of reagents were weighed into a glass tube under ambient temperature: 0.3 g(1.1×10$^{-7}$ mol) bromo-butyl rubber (Exxon) ($M_n$=272500, $M_w/M_n$=1.78), 12 mg (8.37×10$^{-2}$ mmol) of CuBr, 1.00 mL (0.909 g, 8.73 mmol) of isobornyl acrylate, and 60 mg (0.175 mmol) 4,4'-di-(5-nonyl)-2,2'-bipyridine. Two "freeze-pump-thaw" cycles were performed on the contents of the tube to insure that oxygen was removed from the polymerization solution. The tube was sealed under vacuum and placed in an oil bath thermostated at 90 ° C. After 2 h, the tubes were removed from oil bath and cooled at 0° C. in order to quench the polymerization. Conversion of the monomer was measured using GC, and the molecular weight and polydispersity were determined by GPC. Conversion of isobornyl acrylate was 23%, $M_n$=387000, $M_w/M_n$=1.70. $^1$H NMR spectrum showed that the graft copolymer contained 18% isobornyl acrylate. By DSC measurement one $T_g$ was found at –52° C.

Block Copolymers

Example 216
Preparation of PMA-b-PMMA

A dry Schlenk flask with magnetic stirring bar was charged with CuCl (17.0 mg; 0.17 mmol), 4,4-di(5-nonyl)-2,2-bipyridine (138.7 mg; 0.34 mmol) and purged with argon for 20 min. Degassed methyl methacrylate (5.0 ml, 46.7 mmol) was added to the flask using degassed syringes and stainless steel needles. Poly(methyl acrylate) terminated with a Br atom (0.51 g; 0.08 mmol; $M_n$=5,900; $M_w/M_n$=1.32) was dissolved in diphenyl ether (5.0 ml), which was injected into the Schlenk flask under argon. The solution was then degassed by repeated freeze-pump-thaw cycles, sealed under an argon atmosphere, and the flask placed in an oil bath held at 90° C. At various times, samples were taken via syringe to monitor conversion (GC) and molecular weight (SEC).

| Time (h) | Conversion (%) | $M_n$ (theor.) | $M_n$ (SEC) | $M_w/M_n$ |
|---|---|---|---|---|
| 0 | N/A | N/A | 5900 | 1.32 |
| 1 | 29 | 23,400 | 28,200 | 1.16 |
| 2 | 54 | 38,200 | 39,200 | 1.13 |
| 3 | 65 | 44,400 | 45,000 | 1.13 |
| 4 | 71 | 47,900 | 48,400 | 1.12 |
| 18 | 97 | 63,500 | 63,400 | 1.15 |

Example 217
Preparation of PMMA-b-PBA

A small, dry vial was charged with CuBr (3.6 mg; 0.025 mmol), 4,4-di(5-nonyl)-2,2-bipyridine (20.4 mg; 0.05 mmol) and butyl acrylate (0.72 ml; 5.0 mmol). The vial was sealed with a rubber septum and the solution degassed by repeated freeze-pump-thaw cycles. Poly(methyl methacrylate) initiator (0.3 g; 0.025 mmol; $M_n$=12,000; $M_w/M_n$=1.19) was added to the vial quickly under an argon atmosphere. The vial was sealed and immersed in an oil bath held by a thermostat at 110° C. for 10 hours. This gave $M_n$=35,000 and $M_w/M_n$=1.30 (SEC). Conversion of butyl acrylate to polymer was approximately 70% ($^1$H NMR).

Example 218
Preparation of PMMA-b-PBA

A dry small vial was charged with CuBr$_2$ (1.7 mg; 0.0075 mmol), Cu(0) (1.6 mg; 0.025 mmol), 4,4-di(5-nonyl)-2,2-bipyridine (20.4 mg; 0.05 mmol), diphenyl ether (0.72 ml) and butyl acrylate (0.72 ml; 5.0 mmol). The vial was sealed with a rubber septum and the solution degassed by repeated freeze-pump-thaw cycles. Poly(methyl methacrylate) initiator (0.3 g; 0.025 mmol; $M_n$=12,000; $M_w/M_n$=1.19) was quickly added to the vial under an argon atmosphere. The vial was sealed, the solution stirred for 5 min., and the flask immersed in an oil bath held by a thermostat at 110° C. for 25 hours. This gave $M_n$=51,500 and $M_w/M_n$=1.71 (SEC). Conversion of butyl acrylate to polymer was 70% ($^1$H NMR).

Example 219
Preparation of PMMA-b-PMA

A dry round-bottomed flask with magnetic stirring bar was charged with CuBr (3.6 mg; 0.025 mmol), 4,4-di(5-nonyl)-2,2-bipyridine (20.4 mg; 0.05 mmol) and methyl acrylate (0.45 ml; 5.0 mmol). The flask was sealed with a rubber septum and the solution degassed by repeated freeze-pump-thaw cycles. Poly(methyl methacrylate) initiator (0.3 g; 0.025 mmol; $M_n$=10,700; $M_w/M_n$=1.13) was added to the flask quickly under an argon atmosphere. The flask was sealed, the solution stirred for 2 min., and the flask immersed in an oil bath held by a thermostat at 90° C. for 3 hours. This gave $M_n$=16,900 and $M_w/M_n$=1.18 (SEC).

Example 220
Preparation of PMMA-b-PMA-b-PSTY

A dry Schlenk flask with magnetic stirring bar was charged with CuBr$_2$ (1.0 mg; 0.0048 mmol), Cu(0) (1.0 mg; 0.0145 mmol), 4,4-di(5-nonyl)-2,2-bipyridine (6.0 mg; 0.0145 mmol) and styrene (0.7 ml; 2.92 mmol). The flask was sealed with a rubber septum and the solution degassed by one freeze-pump-thaw cycle. Poly(methyl methacrylate-b- butyl acrylate) initiator (0.28 g; 0.0145 mmol; $M_n$=19,200; $M_w/M_n$=1.15) was quickly added and the flask under an argon atmosphere. The flask was sealed, and immersed in an oil bath held by a thermostat at 110° C. for 16 hours. This gave $M_n$=36,800 and $M_w/M_n$=1.61 (SEC).

Example 221
ABA Block Copolymer (Methyl Methacrylate/Butyl Acrylate/Methyl Methacrylate)

To a 10 ml round bottom flask with a stir bar, 2,2'-bipyridine (32.8 mg, 0.21 mmol), copper (I) bromide (10.2 mg, 0.07 mmol), and α,α'-dibromo-p-xylene (18.5 mg, 0.07 mmol) were added. The flask was sealed with a rubber septum and the contents of the flask degassed by applying a vacuum and backfilling with argon. Degassed butyl acrylate (5.0 ml, 34.9 mmol) was added via syringe. The reaction mixture was heated at 100° C. and stirred. After eight hours the reaction was viscous. Conversion was found to be 93% by $^1$H NMR; $M_n$=60,500, $M_w/M_n$=1.3. The reaction was cooled to 50° C. and then placed under vacuum to remove residual butyl acrylate. After 1 hour, degassed methyl methacrylate (2.25 ml, 21 mmol) was added via syringe and the reaction heated to 100° C. After 12 h, the reaction was stopped. Conversion of the methyl methacrylate was 96%; $M_n$=93,600, $M_w/M_n$=1.5. The polymer was purified by dissolving in THF and passing over alumina, followed by repeated precipitation into methanol. $^1$H NMR showed that the polymer contained 32% methyl methacrylate.

Example 222
ABA Block Copolymer (Styrene/Butyl Acrylate/Styrene)

To a 10 ml round bottom flask with a stir bar, 2,2'-bipyridine (32.8 mg, 0.21 mmol), copper (I) bromide (10.2 mg, 0.07 mmol), and α,α'-dibromo-p-xylene (18.5 mg, 0.07 mmol) were added. The flask was sealed with a rubber septum and the contents of the flask degassed by applying a vacuum and backfilling with argon. Degassed butyl acrylate (5.0 ml, 34.9 mmol) was added via syringe. The reaction mixture was heated at 100•C. and stirred. After six hours the reaction was viscous. Conversion was found to be 89% by $^1$H NMR; $M_n$=57,300, $M_w/M_n$=1.4. The reaction was cooled to 50•C. and then placed under vacuum to remove residual butyl acrylate. After 2 hours, degassed styrene (2.3 ml, 21 mmol) was added via syringe and the reaction heated to 100° C. After 12 h, the reaction was stopped. Conversion of the styrene was 85%; $M_n$=75,200, $M_w/M_n$=1.4. The polymer was purified by dissolving in THF and passing over alumina, followed by repeated precipitation into methanol. $^1$H NMR showed that the polymer contained 28% styrene.

Example 223
ABA Block Copolymer (Perfluoroacrylate 2-Ethylhexyl Acrylate/Perfluoroacrylate)

To a 100 ml round bottom flask with a stir bar, 4,4'-di(5-nonyl)-2,2'-bipyridine (587.5 mg, 1.44 mmol), copper (I) bromide (104.7 mg, 0.72 mmol), and 1,2-bis(2-(bromopropionyloxy)ethane (114 µL, 0.57 mmol) were added. The flask was sealed with a rubber septum and the contents of the flask degassed by applying a vacuum and backfilling with argon. Degassed butyl acrylate (45.0 ml, 216 mmol) was added via syringe. The reaction mixture was heated at 90° C. and stirred. After five hours the reaction was viscous. Conversion was found to be 96% by $^1$H NMR; $M_n$=55,500, $M_w/M_n$=1.4. The reaction was precipitated three times into methanol from THF, then dried overnight in a vacuum oven at 70° C. under vacuum. The poly(2-ethylhexyl acrylate) (10.0 g) was then added to a 100 ml round bottom flask with a stir bar, 4,4'-di(5-nonyl)-2,2'-bipyridine (310 mg, 0.76 mmol), copper (I) bromide (55.3 mg, 0.38 mmol). After degassing by applying a vacuum and backfilling with argon, degassed α,α,α-trifluorotoluene (10.0 ml) and Dupont's Zonyl TA-N (3.125 ml, 5 g) were added and the reaction heated to 100° C. After 2 days, the reaction was stopped. Conversion of the Zonyl TA-N was 79%. The polymer was purified by dissolving in 1,1,2,-trifluorotrichloroethane and passing over alumina, followed by precipitation into methanol. $^1$H NMR showed that the polymer contained 28% styrene.
Styrene and Butyl Acrylate Example 224

5.0 ml of styrene, 0.0530 g of CuBr, 0.0573 g of 2,2'-bipyridine, 25 l of 1-phenylethyl bromide were added to a schlenk flask under argon and the reaction mixture was heated at 100° C. The reaction was carried out until the medium solidified. A sample was withdrawn for molecular weight analysis (from Gel Permeation Chromatography: $M_n$=19,000 and $M_w/M_n$=1.15) and the unreacted styrene was removed under vacuum. Then, 10 ml of butyl acrylate and 0.02 g of CuBr were added under argon and the reaction was allowed to continue at 110° C. for 24 hrs. A sample was again withdrawn from the reaction mixture and analyzed by Gel Permeation Chromatography vs. polystyrene standards giving $M_n$=28,000 and $M_w/M_n$=1.60. The copolymer contained 32% of butyl acrylate as determined by $^1$H-NMR. The overall yield of precipitated copolymer was 50% (determined gravimetrically).

Example 225

5.0 ml of styrene, 0.0530 g of CuBr, 0.353 g of 4, 4'-di-(5-nonyl)-2,2'-bipyridine, 25 l of 1-phenylethyl bromide were added to a schlenk flask under argon and the reaction mixture was heated at 120° C. The reaction was carried out until the medium solidified (17 hrs.). A sample was withdrawn for molecular weight analysis (from Gel Permeation Chromatography: $M_n$=29,000 and $M_w/M_n$=1.08) and the unreacted styrene was removed under vacuum. Then, 10 ml of butyl acrylate and 0.02 g of CuBr were added under argon and the reaction was allowed to continue at 100° C. for 24 hrs. A sample was again withdrawn from the reaction mixture and analyzed by Gel Permeation Chromatography vs. polystyrene standards giving $M_n$=73,000 and $M_w/M_n$=1.09. The copolymer contained 45% of butyl acrylate as determined by $^1$H-NMR.
Butyl Acrylate and 2-Hydroxyethyl Acrylate Example 226
Block Copolymerization of Butyl Acrylate with 2-Hydroxyethyl Acrylate by ATRP Under an argon atmosphere, 13.3 mL (9.3×10$^{-2}$ mol) of butyl acrylate was added to 4 g (2.5×10$^{-2}$ mol)of 2,2'-bipyridine and 1.33 g (1.2×10$^{-2}$ mol) CuBr in a 50 mL glass flask. The initiator 1.32 µL (1.2×10$^{-2}$ mol) methyl 2-bromopropionate was then added via syringe. The flask was then immerse in an oil bath at 90° C. After 7 h of reaction (the conversion of monomer was 99% and $M_n$=1100, $M_w/M_n$=1.45) the second monomer, 6 mL (5×10$^{-2}$ mol) of 2-hydroxyethyl acrylate was added. After another 7 h of reaction the flask was cooled to 0° C. to quench the polymerization. Afterwards, the contents of the flask were dissolved in 100 mL of THF. Conversion of the monomer was measured using GC, and the molecular weight and polydispersity were measured by GPC. The conversion was 97%, $M_n$=2,100, $M_w/M_n$=1.57. $^1$H NMR spectrum shown that the copolymer contained 40% of 2-hydroxyethyl acrylate and 60% butyl acrylate.
Block Copolymers with Polynorbornene Example 227
Preparation of Polynorbornene Macroinitiator The following procedures were done in a glove box: 0.066 g (1.2×10$^{-4}$ mole) Mo(CHCPhMe$_2$)(NAr)(O-t-Bu)$_2$ (Ar=2, 6-diisopropylphenyl) in 7 ml toluene was placed in a schlenk flask. With stirring, 0.60 g (6.37×10$^{-3}$ mole) norbornene in 14 ml toluene was added to the flask over 2 min. After stirring for 1.5 hours at room temperature, the reaction was terminated by adding 0.1 g (5.02×10$^{-4}$ mole) 4-bromomethyl benzaldehyde in 5 ml of toluene. After stirring 1 hour, the reaction mixture was taken from the glove box and mixed with hexane and methanol to precipitate the polymer. The obtained polymer was dissolved in toluene and precipitated into methanol. $M_n$=12,300 (GPC), $M_w/M_n$=1.24 $T_g$=32° C.

Example 228
ATRP of Styrene Using Polynorbornene as a Macroinitiator

To 0.100 g ($1.35 \times 10^{-5}$ mole) polynorbomene, 5.9 mg ($4.13 \times 10^{-5}$ mole) CuBr, and 0.0338 g ($4.13 \times 10^{-5}$ mole) 4,4'-di(5-nonyl)-2,2'-bipyridine in a glass tube, 0.43 g ($4.13 \times 10^{-5}$ mole) styrene was added under an argon atmosphere. The glass tube was sealed under vacuum and the reaction mixture was heated at 90° C. for 19 hours. The reaction mixture was then dissolved in THF and precipitated into methanol three times. The content of styrene determined by NMR was 62%. $M_n$=32,100 Mw/Mn=1.16, $T_g$=45° C. and 95° C.

Example 229
ATRP of Methyl Acrylate Using Polynorbonene as a Macroinitiator

To 0.050 g ($6.76 \times 10^{-6}$ mole) polynorbonene, 7.2 mg ($5.02 \times 10^{-5}$ mole) CuBr, and 0.0408 g ($1.04 \times 10^{-5}$ mole) 4,4'-di(5-nonyl)-2,2'-bipyridine in a glass tube, 0.667 g ($4.13 \times 10^{-5}$ mole) methylacrylate and 1.0 ml toluene were added under an argon atmosphere. The glass tube was sealed under vacuum and the reaction mixture heated at 90° C. for 19 hours. The reaction mixture was then dissolved in THF and precipitated into methanol three times. The content of methylacrylate determined by NMR was 37%. Mn=18,500, Mw/Mn=1.31, $T_g$=43° C. and 7° C.

Block Copolymers with Dicyclopentadiene by ATRP

Example 230
Preparation of Polydicyclopentadiene Macroinitiator

Following procedures were done in glove box. The Mo-alkylidene complex $Mo(CHCPhMe_2)(NAr)(O-t-Bu)_2$ (Ar=2,6-dilsopropylphenyl) 0.066 g ($1.2 \times 10^{-4}$ mole) in 7ml toluene was placed in a schlenk flask. With stirring, 0.60 g ($4.54 \times 10^{-3}$ mole) dicyclopentadiene in 14 ml toluene was added over 2 min. After stirring 1.5 h at room temperature, the reaction was terminated by adding 0.1 g ($5.02 \times 10^{-4}$ mole) 4-bromomethyl benzaldehyde in 5 ml of toluene. After stirring an additional hour, the reaction mixture was taken from the glove box. The reaction mixture was mixed with hexane and methanol to precipitate the polymer and the pale yellow precipitate obtained was dissolved in toluene and precipitated again into methanol. Yield of isolated polymer 0.607 g (95.1%). Mn (NMR)=7,400 ($M_{n,t}$=5,000) and $M_n$ (GPC)=12,400, $M_w/M_n$=1.21. $T_g$=118.9° C.

Example 231
ATRP of Styrene Using Polydicyclopentadiene as Macroinitiator

To 0.100 g ($1.35 \times 10^{-5}$ mole) polydicyclopentadiene, 5.9 mg ($4.1333 \times 10^{-5}$ mole) CuBr, and 0.0338 g ($4.13 \times 10^{-5}$ mole) 4,4'-di(5-nonyl)-2,2'-bipyridine in a glass tube, 0.43 g ($4.13 \times 10^{5}$ mole) styrene was added under an argon atmosphere. The glass tube was sealed under vacuum and the reaction mixture heated at 90° C. for 19 hours. The reaction mixture was then dissolved in THF and precipitated into methanol three times. The content of styrene determined by $^1$H NMR was 70%. $M_n$=20,300, $M_w/M_n$=1.37. $T_g$=86.4° C. and 106.9° C.

Example 232
ATRP of Methyl Acrylate Using Polydicyclopentadiene as Macroinitiator To 0.050 g ($6.76 \times 10^{-6}$ mole) polydicyclopentadiene, 7.2 mg ($5.02 \times 10^{-5}$ mole) CuBr, and 0.0408 g ($1.04 \times^{-5}$ mole) 4,4'-di(5-nonyl)-2,2'-bipyridine in glass tube, 0.667 g ($4.13 \times 10^{-5}$ mole) methyl acrylate and 1.0 ml toluene were added under argon atmosphere. The glass tube was sealed under vacuum and the reaction mixture was heated at 90° C. for 19 hours. The reaction mixture was then dissolved in THF and precipitated into methanol three times. The content of methylacrylate determined by $^1$H NMR was 80%. $M_n$=25,600, $M_w/M_n$=1.48. $T_g$=11.6° C. and 107.0° C.

ABA-type Block Copolymers by Transformation of "Living" Carbocationic into "Living" Radical Polymerization

Example 233
Synthesis of Difunctional Macroinitiator by "Living' Carbocationic Polymerization of Isobutene The difunctional macroinitiator Cl-Styrene-Polyisobutene-Styrene-Cl (Cl-St-PIB-St-Cl) was obtained by "living" cationic of isobutene (5.6 g, 0.1 mole) with the p-dicumyl methyl ether (0.166 g, $0.75 \times 10^{-3}$ mole)/$TiCl_4$ ($2 \times 10^{-2}$ mole) initiating system in the presence of 2,6-di-tert-butylpyridine ($0.3 \times 10^{-3}$ mole) at –80° C. in methylene chloride (40 mL)/hexane (60 mL) in a Schlenk flask under a nitrogen atmosphere (dry-box). After 60 minutes of reaction, the "living" PIB was capped with an average of 3–4 units of styrene ($5 \times 10^{-3}$ mole). The polymerization was quenched by addition of prechilled methanol. The polymer was purified by repeated dissolution-precipitation in dichloromethane/methanol and dried under vacuum. The molecular weight and polydispersity were measured by SEC, $M_n$=7800, $M_w/M_n$=1.31. The structure of the difunctional macroinitiator was confirmed by $^1$H NMR spectroscopy.

Example 234
ABA Block Copolymers by ATRP of Styrene and (Meth) acrylate Using as Macro-initiator Cl-St-PIB-St-Cl The following reagents were weighed in an appropriate amount into glass tube under ambient atmosphere: CuCl ($3.85 \times 10^{-5}$ mole), 4,4,'-di(5-nonyl)-2,2'-bipyridine ($7.70 \times 10^{-5}$ mole), monomer (styrene $1.05 \times 10^{-5}$ mole, methyl acrylate $1.03 \times 10^{-5}$ mole, meth methacrylate $2.08 \times 10^{-5}$ mole, Isobornyl acrylate $1.3 \times 10^{-5}$ mole), toluene (1 mL), and difunctional polyisobutene (styrene end-capped) macroinitiator ($3.85 \times 10^{-5}$ mole). Two "freeze-pump-thaw" cycles were performed on the contents of each tube to insure that oxygen was removed from the polymerization solution. Each tube was sealed under vacuum and placed in an oil bath thermostated at 100° C. After 12 h, the tubes were removed from the oil bath and cooled to 0° C. in order to quench the polymerization. Afterwards, the individual tubes were broken and the contents dissolved in 7 ml of THF. Percent conversion of each monomer was measured using gas chromatography, molecular weights and polydispersities were measured using size exclusion chromatography.

| Exp. | Monomer | $M_{n,th}$ | $M_{n,exp}$ | $M_w/M_n$ |
|---|---|---|---|---|
| 1 | Styrene | 13370 | 13350 | 1.18 |
| 2 | Methyl acrylate | 11800 | 12200 | 1.41 |
| 3 | Methyl methacrylate | 23100 | 22500 | 1.45 |
| 4 | Isobornyl acrylate | 17270 | 18850 | 1.44 |

The GPC measurements showed that the molecular weight distributions of the triblock copolymers were monomodal and narrow. No signal attributed to starting macroinitiator was detected. The M, was also determined from IH NMR spectra by integration of the —$CH_2$-protons of PIB initiator, the aromatic protons from polystyrene and of the —C(O)

OCH$_n$— from the polyacrylates and poly(methyl methacrylate) segments. All are close to the value determined by GPC. DSC measurements showed that the thermoplastic elastomers based on PIB had two distinct glass transitions for the PIB block at −71 °C. and for the polystyrene block at 91° C. Similar results were obtained for triblock copolymers with poly(methyl methacrylate) (94° C.) and poly(isobornyl acrylate) (93° C.)

Thermal Properties of ST/BA Copolymers.

Thermal properties of the various ST/BA copolymers were measured via DSC (DSC Plus from Rheometrics). The samples (10 mg) were heated from −100 to 200° C. with a rate 20° C./min. The cooling rate was 40° C./min. The second heating was analyzed and the results are reported below:

| sample | type | % BA | $M_n$ (MWD) | Tg (° C.) |
|---|---|---|---|---|
| Example 188 | statistical | 34 | 34,000 (1.10) | 20.91 |
| Example 204 | gradient | 57 | 45,400 (1.59) | 0.90 |
| Example 206 | gradient | 24 | 13,000 (1.08) | −51.84 |
|  |  |  |  | 4.49 |
| Example 225 | block | 45 | 73,000 (1.15) | −59.99 |
|  |  |  |  | 99.39 |

Functionalization of Hyperbranched Polymers

Example 235

Preparation of Hyperbranched Polymer with Azide (N$_3$) Functional Groups

Material (0.5 g) as prepared in Example 113, was dissolved in THF (4.0 ml) under dry conditions. Tetrabutyl ammonium fluoride (1.5 ml, 1 M in THF) and trimethylsilyl azide (0.4 ml, 3 mmol) was added via syringe. The exothermic reaction was stirred for six hours. The reaction was quenched by precipitation into MeOH / H$_2$O (2×). After drying under vacuum at room temperature, the material was analyzed by IR spectroscopy; a peak at 2115 cm−1 had formed and was assigned to the azide group. Yield=80%. SEC of the azide functional material gave the same molecular weight as the starting material.

Crosslinked Materials from Hyperbranched Polymers

Example 236

Figure 2:
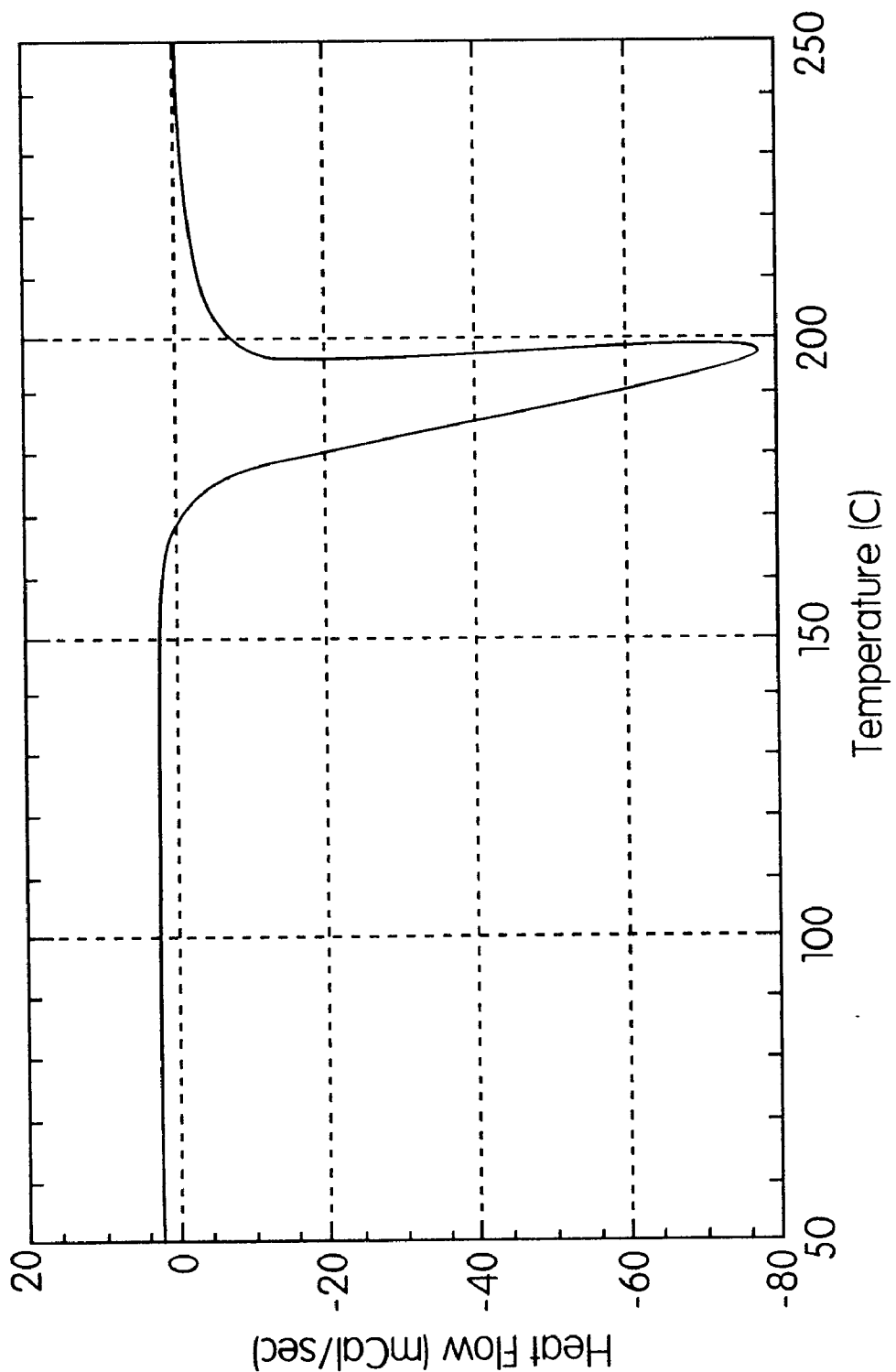
FIG. 2 is a graph from a differential scanning calorimetry measurement on the crosslinked material of Example 236.

Preparation of Crosslinked Material by Heating 15.4 mg of polymer obtained from Example 235 was placed in a DSC pan and heated to 250° C. at 20° C/min using a Rheometrics DSC Plus. A large exotherm was observed with peak temperature, 198° C., FIG. 2. After cooling the material was removed from the pan and found to be hard and intractable. It was insoluble in THF.

Example 237

Preparation of crosslinked material by heating

Figure 3:
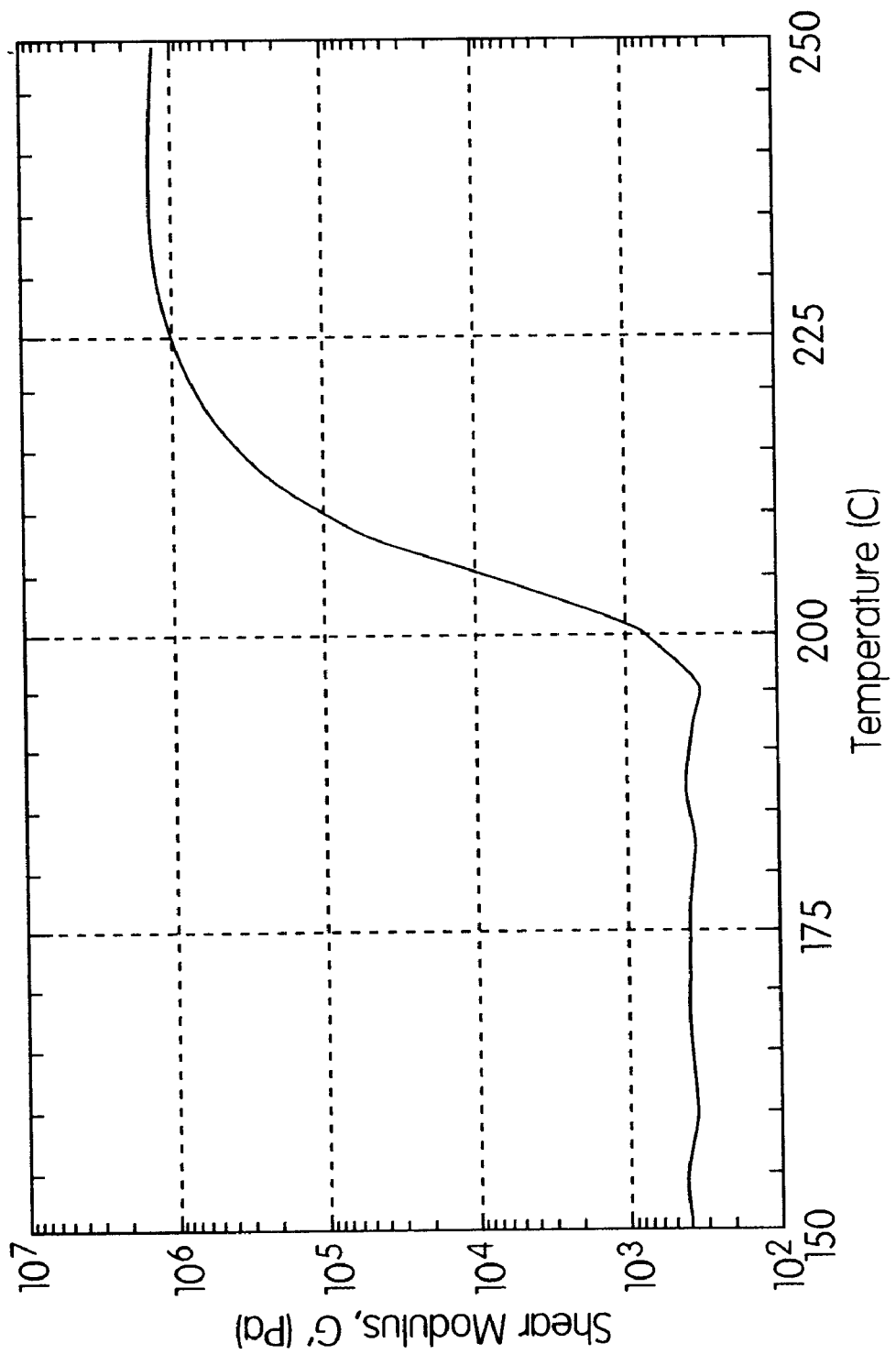
FIG. 3 is a graph of shear modulus vs. temperature of the crosslinked material of Example 237.

Polymer obtained from Example 235 was loaded for simple shear onto a Rheometrics MKIII Dynamic Mechanical Thermal Analyzer and heated to 250° C. at 10° C./min. At 200° C. the shear modulus (G') began to increase from 300 Pa until it reached a maximum of 1,000,000 Pa at 220° C.} FIG. 3. After cooling the material was removed from the pan and found to be hard and intractable. It was insoluble in THF.

Example 238

Preparation of Crosslinked Material by Irradiation 10.0 mg of polymer obtained from Example 235 was placed on a glass slide and irradiated using a mercury lamp. After 6 h the material was found to be soft but no longer able to flow. It was insoluble in THF.

Synthesis of End Functional Polymers

Styrene

Example 239

Synthesis of End-Functionalized Polystyrene by ATRP

The following amounts of reagents were weighed into a glass tube under ambient temperature: 6.5 mg (4.54×10$^{-2}$ mmol) of CuBr, 37.1 mg (9.09×10$^{-2}$ mmol) 4,4'-di-(5-nonyl)-2,2'-bipyridine, initiator (4.54×10$^{-2}$ mmol) and 0.50 mL (4.54×10$^{-1}$ g, 4.35 mmol) of styrene. Three "freeze-pump-thaw" cycles were performed on the contents of the tube to insure that oxygen was removed from the polymerization solution. The tube was sealed under vacuum and placed in an oil bath thermostated at 110° C. After 3 h the tube was broken, and the contents were dissolved in 5 mL of THF. Conversion of the monomer was measured using GC, and the molecular weight and polydispersity were measured by GPC.

| Initiator Name | % Conv. | $M_{w, SEC}$ | $M_w/M_n$ |
|---|---|---|---|
| 4-Methylbenzyl bromide | 51 | 4,400 | 1.17 |
| 4-Cyanobenzyl bromide | 48 | 5,500 | 1.10 |
| 4-Bromo-benzyl bromide | 48 | 4,500 | 1.16 |
| 2-Bromopropionitrile | 48 | 5,100 | 1.09 |
| Bromoacetonitrile | 48 | 4,500 | 1.10 |
| Glyeidyl 2-bromoproprionate | 62 | 6,800 | 1.12 |
| tert-Butyl 2-bromoproprionate | 41 | 4,000 | 1.17 |
| Hydroxyethyl 2-bromoproprionate | 48 | 7,500 | 1.10 |
| Vinyl chloroacetate | 94 | 5,800 | 1.12 |
| Allyl chloroacetate | 14 | 2,600 | 1.77 |
| α-Bromobutyrolactone | 41 | 4,000 | 1.17 |
| 2-Chloroacetamide | 12 | 4,000 | 1.51 |

Methyl Acrylate

Example 240

Synthesis of End-Functionalized Poly(Methyl Acrylate) by ATRP

The following amounts of reagents were weighed into a glass tube under ambient temperature: 6.8 mg (4.7×10$^{-2}$ mmol) of CuBr, 39.1 mg (9.4×10$^{-2}$ mmol) 4,4'-di-(5-nonyl)-2,2'-bipyridine, initiator (1.2×10$^{-1}$ mmol) and 0.50 mL (5.5 mmol) of methyl acrylate. Three "freeze-pump-thaw" cycles were performed on the contents of the tube to insure that oxygen was removed from the polymerization solution. The tube was sealed under vacuum and placed in an oil bath thermostated at 110° C. After 1.7 h the tube was broken, and the contents were dissolved in 5 mL of THF. Conversion of the monomer was measured using GC, and the molecular weight and polydispersity were measured by GPC.

Example 241

Preparation of Functional Poly(Methyl Acetate) Prepared by ATRP

| Initiator Names | % Conv. | $M_{n, SEC}$ | $M_wM_n$ |
|---|---|---|---|
| Allyl Bromide | 89 | 6220 | 1.34 |
| 2-Bromoproprionic acid tert-butyl ester | 94 | 3980 | 1.22 |
| Hydroxyethyl 2-bromoproprionate | 97 | 4560 | 1.30 |
| α-Bromo-n-butyrolactone | 83 | 4120 | 1.13 |
| 4-Cyanobenzyl bromide | 93 | 4110 | 1.13 |

-continued

| Initiator Names | % Conv. | $M_{n.\ SEC}$ | $M_w/M_n$ |
|---|---|---|---|
| Glycidyl 2-bromoproprionate | 93 | 4020 | 1.23 |
| 2-bromopropionitrile | 82 | 3550 | 1.10 |
| 2-Chloroacetamide | 32 | 7220 | 1.22 |
| Vinyl chloroacetate | 70 | 3260 | 1.34 |
| 4-Bromo-benzylbromide | 95 | 4010 | 1.22 |

Carboxylic Acid Containing Initiators

Example 242

Initiators Used

BBA=2-bromobutyric acid; BIA=2-bromoisobutyric acid; TMSBB=trimethylsilyl 2-bromobutyrate; BDMSBB=tert-butyldimethylsilyl 2-bromobutyrate; BBP=tert-butyl 2-bromopropionate.

Bulk Polymerization of Styrene/N,N,N',N',N'-Pentamethyldiethylenetriamine/CuBr/Initiator A dry round-bottom flask was charged with CuBr (39 mg, 0.27 mmol), the initiator (0.27 mmol), styrene (3 ml, 26.2 mmol), and a magnetic stir bar. The flask was sealed with a rubber septum and degassed by three freeze-pump-thaw cycles. The flask was immersed in an oil bath thermostated at 110° C. and N,N,N',N',NN'-pentamethyldiethylenetriamine (56.3 ml, 0.27 mmol) was added. At various times, the samples were taken and dissolved in THF to measure conversion (GC) and molecular weight (SEC). The siloxane protected acid groups were deprotected by washing with dilute acid after polymerization.

| Initiators | Time (h) | Conversion (%) | $M_{n,th}$ | $M_{n.SEC}$ | $M_w/M_n$ |
|---|---|---|---|---|---|
| BBA | 2 | 67 | 6700 | 18400 | 1.17 |
| BIA | 2.17 | 68.5 | 6850 | 23400 | 1.25 |
| TMSBB | 1.05 | 66.6 | 6660 | 10700 | 1.13 |
| BDMSBB | 1.25 | 58.8 | 5880 | 10360 | 1.14 |
| BBP | 1.33 | 76 | 7600 | 7600 | 1.12 |

| Initiator | Time (h) | Conv. (%) | Mn,th | $M_{n.sec}$ | $M_w/M_n$ |
|---|---|---|---|---|---|
| TMSBB | 0.33 | 17.5 | 1750 | 4810 | 1.03 (cut) |
| TMSBB | 0.67 | 33.2 | 3320 | 6480 | 1.06 |
| TMSBB | 1.0 | 43.4 | 4340 | 7920 | 1.08 |
| TMSBB | 1.33 | 49.4 | 4940 | 9080 | 1.09 |
| TMSBB | 1.67 | 56.7 | 5670 | 10100 | 1.10 |
| TMSBB | 2.0 | 61.2 | 6120 | 10850 | 1.18 |

| Initiator | Time (h) | Conv. (%) | Mn,th | $M_{n.sec}$ | $M_w/M_n$ |
|---|---|---|---|---|---|
| BDMSBB | 0.33 | 19.4 | 1940 | 3810 | 1.10 |
| BDMSBB | 0.67 | 35.8 | 3580 | 5660 | 1.08 |
| BDMSBB | 1.0 | 46.8 | 4680 | 6890 | 1.08 |
| BDMSBB | 1.45 | 55.3 | 5530 | 7450 | 1.09 |
| BDMSBB | 2.01 | 64.0 | 6400 | 8440 | 1.10 |
| BDMSBB | 2.5 | 69.4 | 6940 | 8680 | 1.11 |

| Initiator | Time (h) | Conv. (%) | Mn,th | $M_{n.sec}$ | $M_w/M_n$ |
|---|---|---|---|---|---|
| BBP | 0.33 | 21.7 | 2170 | 2630 | 1.17 |
| BBP | 0.72 | 39.8 | 3980 | 4560 | 1.13 |
| BBP | 1.12 | 50.0 | 5000 | 5860 | 1.08 |
| BBP | 1.5 | 58.1 | 5810 | 6230 | 1.12 |
| BBP | 1.92 | 63.7 | 6370 | 6800 | 1.13 |
| BBP | 2.67 | 72.4 | 7240 | 7270 | 1.15 |
| BBP | 3.25 | 77.2 | 7720 | 7520 | 1.16 |

Transformation of End Groups

Example 243

Synthesis of pMA-Br

Solution Polymerization of Methyl Acrylate/Methyl-2-bromopropionate/CuBr: A dry round-bottomed flask was charged with ethylene carbonate (15 g, 0.17 mol), 2,2'-dipyridyl (1.6 g, 0.01 mol) and CuBr (470 mg, 3.3 mmol). The flask was sealed with a rubber septum and cycled between vacuum and nitrogen for three times to remove the oxygen. Degassed methyl acrylate (20 ml, 222 mmol) and methyl-2-bromopropionate (0.88 ml, 7.9 mmol) were added and the flask was immersed in an oil bath held by a thermostat at 90° C. After 3 hours stirring, at 90% conversion the reaction was stopped. The reaction mixture was diluted with THF, filtered over a short alumina column and the polymer was precipitated in n-hexane. Molecular weight measured by SEC was $M_n$=1850, $M_w$=2025, $M_w/M_n$=1.1. From the $^1$H-NMR spectrum $M_n$=2140. The integration of the peak at 4.3 ppm which corresponds to the —CH(COOMe)—Br end group indicated that all chains are terminated with a bromine end group.

Example 244

Transformation of Bromine to Azide

A dry round-bottom flask was charged with bromo end-functionalized poly(methyl acrylate) (1 g, 0.5 mmol) and trimethylsilyl azide (0.2 ml, 1.5 mmol) under Argon. To the mixture was added a solution of TBAF (I M THF solution, 1.5 ml, 1.5 mmol) at room temperature. After stirring for 36 h, the reaction mixture was passed through a short silica gel column and the solvent evaporated. Note: TBAF can be used in catalytic amounts (0.15 ml, 0.15 mmol) in combination with potassium fluoride (87 mg, 1.5 mmol).

Example 245

Transformation of Bromine to Azide

Figure 4:
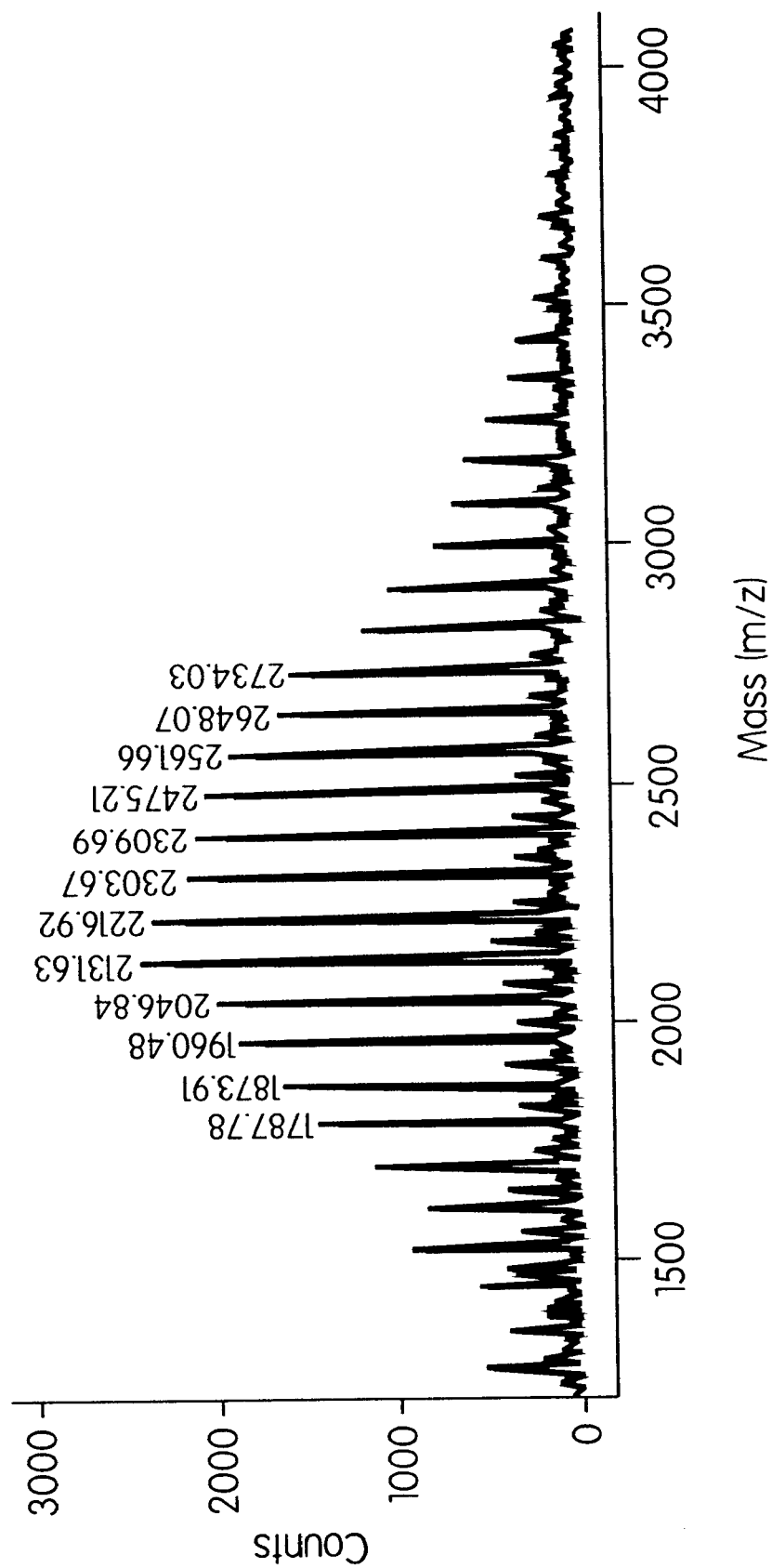
FIG. 4 is a mass spectrum of the product of Example 245.

Bromo end-functionalized poly(methyl acrylate) (1 g, 0.5 mmol) was dissolved in DMF and sodium azide (39 mg, 0.6 mmol) was added. After stirring for 36 hours, the reaction mixture was diluted with ethyl acetate and water was added. After extraction with water for three times, the organic phase was dried with anhydrous magnesium sulfate and the solvent was evaporated. The product was characterized by FT-IR (cm$^{-1}$): 2113 (s), which was assigned to the azide groups. The MALDI-TOF MS spectrum is shown in FIG. 4. The theoretical mass of azide end-functionalized poly(methyl acrylate) corresponds to [87 (CH$_3$CH(COOMe)-)+n*86 (—CH$_2$CH(COOMe)-)+42 (—N$_3$)+23 (Na)]$^+$. Theoretical and obtained mass values are comparable in an error range of +/−4. Small peaks due to the loss of N$_2$, N$_3$ and N$_3$+CH$_3$ during the mass spectrometry experiment were observed.

Example 246

Transformation of Azide to Iminophosphorane

Figure 5:
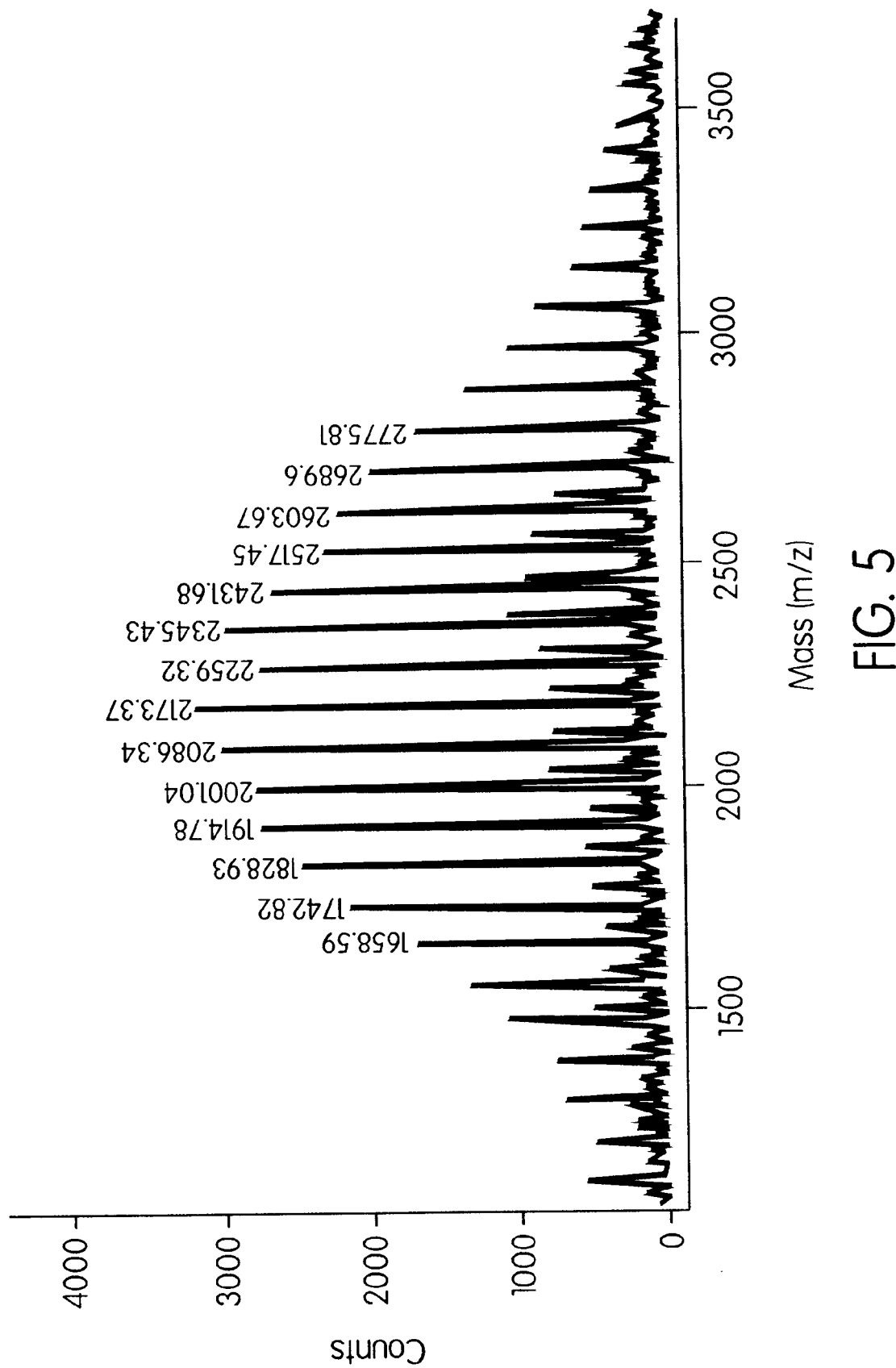
FIG. 5 is a mass spectrum of the product of Example 246.

To a solution of azido end-functionalized poly(methyl acrylate) (1 g, 0.5 mmol) in dry tetrahydrofuran, triphenylphosphine (157 mg, 0.6 mmol) was added. After stirring the reaction mixture at room temperature overnight, the product was purified by reprecipitation in n-hexane. Complete conversion of the azido end groups into iminophosphorane groups was observed by $^1$H-NMR through comparison of the integration of the following peaks: δ=7.3 to 7.7 ppm (3 phenyl groups) and δ=1.15 ppm (CH$_3$ of the initiating group). In the MALDI-TOFMS spectrum, shown in FIG. 5, two series of peaks are observed. The major and minor peaks correspond to iminophosphorane end-functionalized poly(methyl acrylate) ionized respectively with H⁺ and Na⁺. The masses observed are thus within an error range of +/−4 [87 (CH₃CH(COOMe)-)+n*86 (—CH₂CH(COOMe)-)+276 (—N=PPh₃)+1 or 23 (H or Na)]⁺.

Example 247
Transformation of Iminophosphorane to Primary Amines

Figure 6:
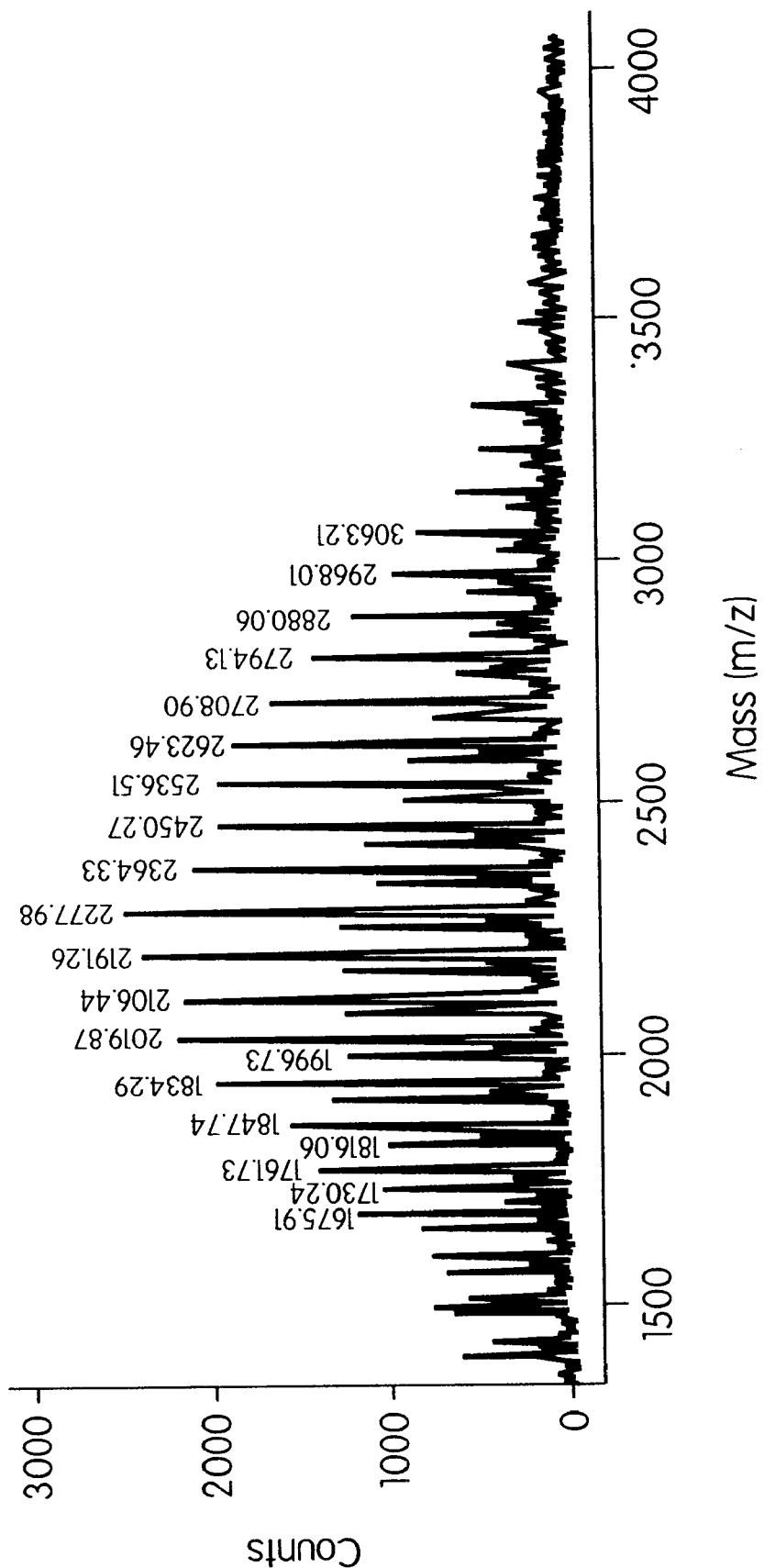
FIG. 6 is a mass spectrum of the product of Example 247.

To a solution of iminophosphorane end substituted poly (methyl acrylate) (1 g, 0.5 mmol) in tetrahydrofuran, water (90 l, 5 mmol) was added. The reaction mixture was stirred for 48 h at room temperature and the product was purified by reprecipitation in n-hexanes. The MALDI-TOFMS spectrum, shown in FIG. 6, represents the amino terminated poly(methyl acrylate) with theoretical mass [87 (CH₃CH (COOMe)-)+n*86 (-CH₂CH(COOMe)-)+(—NH₂)+23 (Na)]⁺. Peaks of lower intensity are caused by the loss of a methoxygroup and the least intense peaks which are observed between the two others are due to the loss of the amino group.

Example 248
Transformation of Halogen to Secondary Amines

Figure 7:
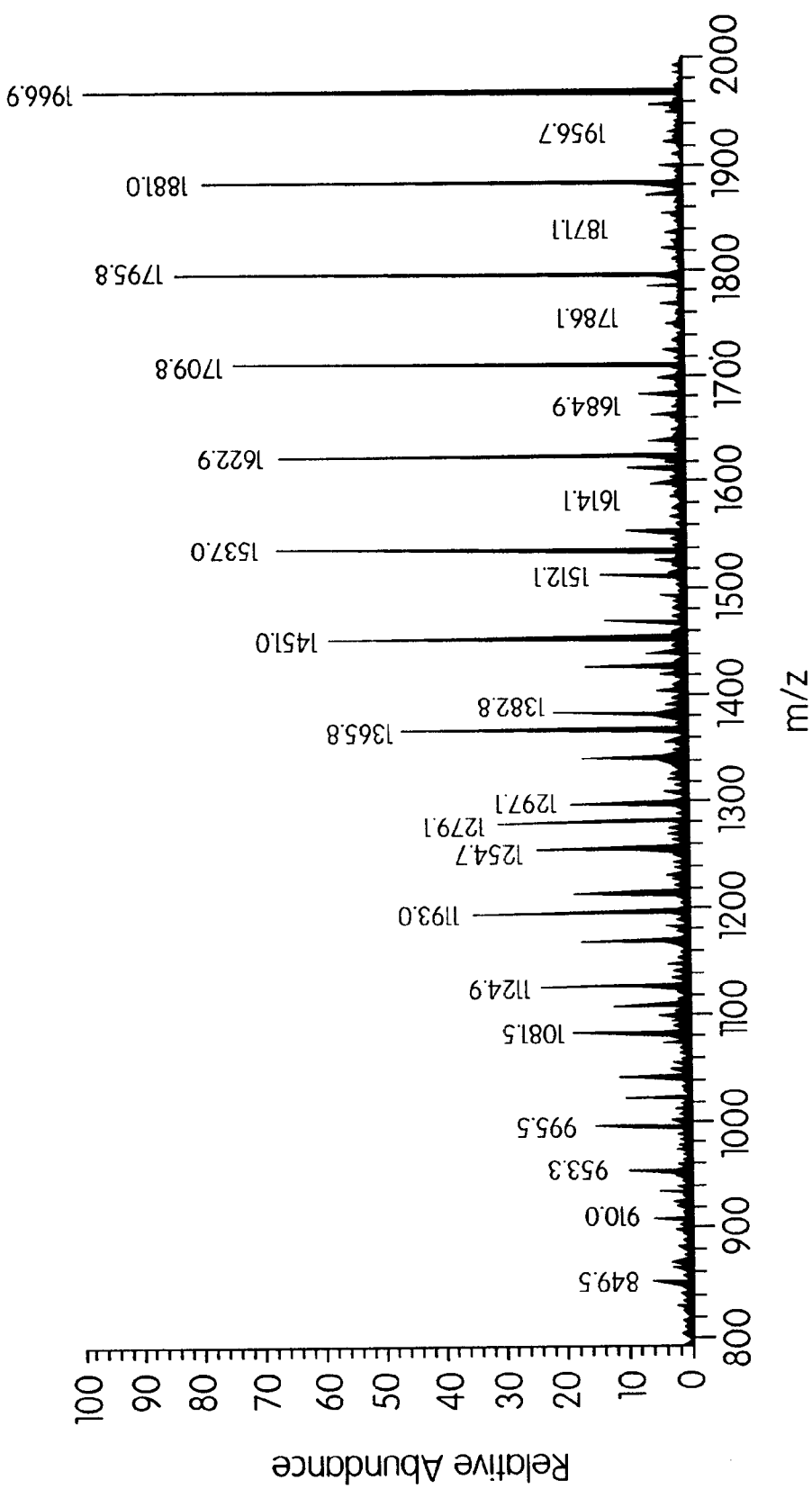
FIG. 7 is a mass spectrum of the product of Example 248.

Poly(methyl acrylate) (1 g, 0.5 mmol) was dissolved in DMSO and n-butylamine (365 mg, 5 mmol) was added. After stirring for 35 hours at room temperature, the product was extracted in ethylacetate. Characterization was done with electrospray MS, FIG. 7. Two series of peaks were observed. The mass of the major peaks correspond within an error range of +/−0.5 to the mass of the parent product, namely mass [87 (CH₃CH(COOMe)-)+n*86 (—CH₂CH (COOMe)-)+72 (—NH—(CH₂)₃—CH₃) +1 (H)]⁺. The minor series of peaks corresponds to the doubly ionized species.

Example 249
Transformation of Halogen to Alcohol

Figure 8:
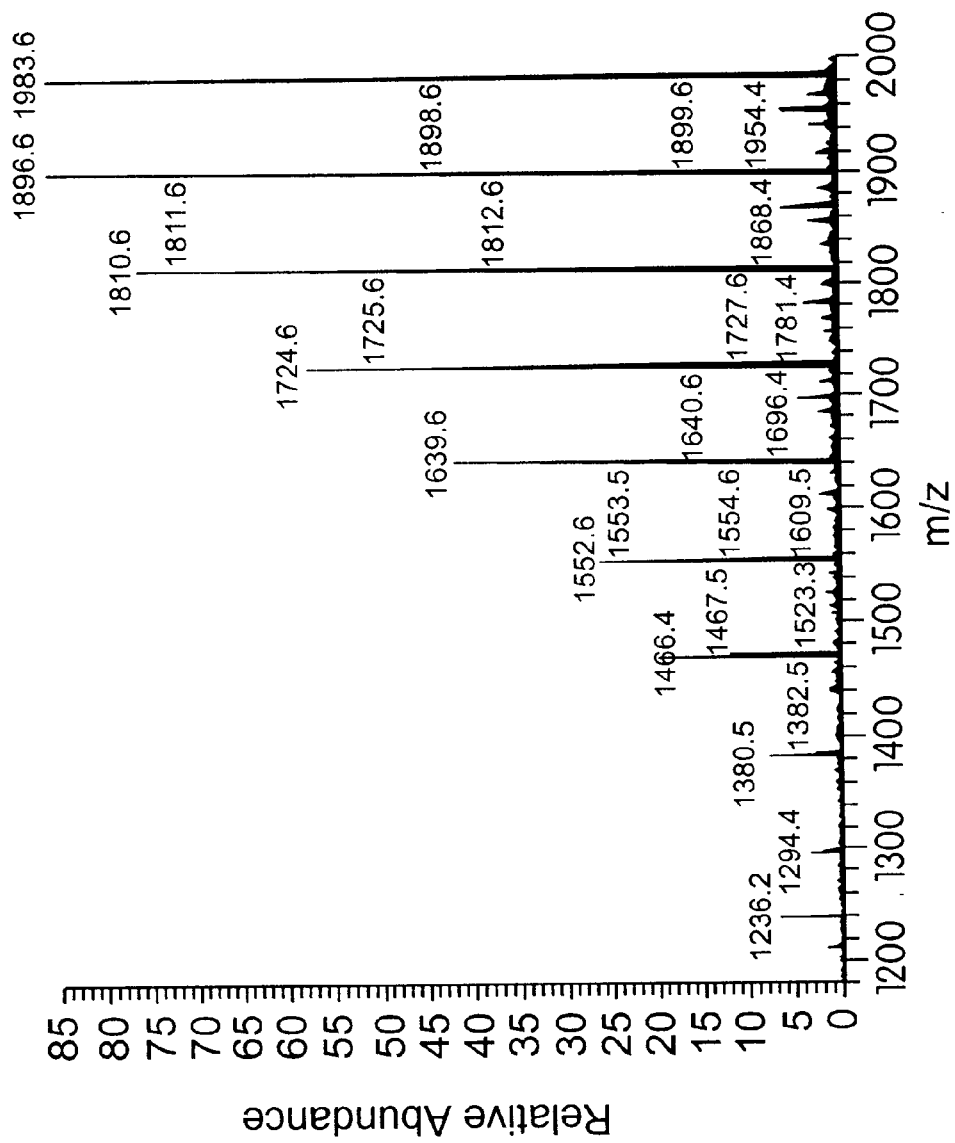
FIG. 8 is a mass spectrum of the product of Example 249.

To poly(methyl acrylate)-Br (1 g, 0.5 mmol), dissolved in DMSO, butanolamine (0.47 ml, 5 mmol) was added. After stirring for 30 hours at room temperature, the product was analyzed by electrospray MS, FIG. 8. The peaks in the spectrum correspond with the to the mass of the parent product, namely mass [87 (CH₃CH(COOMe)-)+n*86 (—CH₂CH(COOMe)-)+84 (—NH—(CH₂)₄—OH)+1 (H)+ 23 (Na)]⁺.

Example 250
Transformation to an Ester

Poly(methyl acrylate) (1 g, 0.5 mmol) was dissolved in DMSO and silver acetate (125 mg, 0.75 mmol) and sodium acetate (410 mg, 5 mmol) were added. After stirring for 36 hours at room temperature, the product was extracted in ethyl acetate using 1% HNO₃-solution as water phase. The product was analyzed by ¹H-NMR: the CH—peak assignable to the end group was completely shifted from 4.4 ppm (CH—Br) to 5.0 ppm (CH—OAc).
Multifunctional Initiators 1,2-bis(bromopropionyloxy) ethane)

Example 251
Synthesis of 1,2-bis(bromopropionyloxy)ethane

A 500 ml schlenk flask containing a ¾ inch stir bar was flame dried under argon and charged with 10 ml (0.18 mol) of ethylene glycol, 28 ml (0.20 mol) of triethylamine and 50 ml of diethyl ether. The flask was fitted with a reflux condenser and purged constantly with argon. The apparatus was submerged into an ice/water bath to maintain a 0° C. reaction temperature. Dropwise addition of 47 ml (0.45 mol) of bromopropionyl bromide to the reaction solution proceeded. At completion of the reaction, the reaction mixture was filtered to remove insoluble salts. The organic product was separated from byproducts and unreacted starting materials by three 50 ml extractions from an aqueous saturated sodium bicarbonate solution followed by three 50 ml extractions from deionized water. The organic liquid was dried over magnesium sulfate and filtered. The solvent was removed by evaporation. Final purification of the product was achieved by vacuum distillation at 82–86° C., 2 mm Hg. ¹H NMR (CDCl₃): δ=4.40 (s, 4H), 4.35 (q, 1H), 1.81 (d, 3H). IR (polyethylene film): 3500, 3000, 2950, 2900, 1700, 1460, 1400, 1350, 1290–1230, 1170, 1080 cm⁻¹.

Example 252
Bulk Polymerization of n-Butyl Acrylate (Initiator=1,2- is (bromopropionyloxy)ethane)

A dry round-bottomed flask was charged with CuBr (50.8 mg; 0.349 mmol) and 2,2'-bipyridyl (163.5 mg; 1.05 mmol). The flask was sealed with a rubber septum and was cycled between vacuum and argon three times to remove the oxygen. Degassed n-butyl acrylate (28.6 ml; 199.5 mmol) was added using degassed syringes and stainless steel needles. The 1,2-bis(bromopropionyloxy) ethane(1.0 ml; 5 mmol) was added and the flask was immersed in an oil bath held by a thermostat at 80° C. After stirring overnight, the conversion was 95%, and the produced poly(n-butyl acrylate) had $M_n$=5070 (Mn, th=5,100) and $M_w/M_n$=1.28. Hexakis(4-(2-methylbromopropionyloxy)phenoxy) cyclotriphosphazene Example 253
Synthesis of Hexakis(4-(2-bromopropionyloxymethyl) phenoxy)cyclo-triphosphazene Hexakis(4-hydroxymethylphenoxy)cyclotriphosphazene was prepared according to the method of Chang et al. (Chang, J. Y., Ji, H. J.; Han, M. J.; Rhee, S. B.; Cheong, S.; Yoon, M. *Macromolecules* 1994, 27, 1376.) Hexakis(4-hydroxymethylphenoxy)cyclotriphosphazene (3.20 g, 3.66× 10⁻³ mol) was placed into a 250 ml three neck flask containing a ¾ inch stir bar. The flask, flushed continuously with argon, was fitted with a 125 ml addition funnel and reflux condenser. THF (125 ml) and triethylamine (3.41 g, 3.37×10⁻² mol) were then transferred to the flask. The solution was cooled to 0° C. with an ice/water bath. The addition funnel was charged with 2-bromopropionyl bromide (7.11 g, 3.29×10⁻² mol) and THF (20 ml). This solution was added dropwise to the cyclotriphosphazene solution at a rate of 1 drop every 3 seconds. When addition of the bromopropionyl bromide solution was complete, the reaction was allowed to warm to room temperature overnight. The mixture was transferred to a 1 L separatory funnel. Unreacted acid and soluble salts were separated from the product by three 250 ml extractions into an aqueous saturated sodium bicarbonate solution followed by another 250 ml extraction into deionized water. The organic phase was dried over magnesium sulfate and the solvent removed by evaporation. The product orange oil was isolated in 95% yield. ¹H NMR (CDCl₃): δ=7.2 (d, 2H), 6.9 (d, 2H), 5.2, (q, 2H), 4.4 (q, 1H), 1.8 (d, 3H).

Example 254
Polymerization of Methyl Acrylate from Hexakis(4-bromomethylphenoxy)-cyclotriphosphazene To a 50 ml 3-neck flask fitted with an argon adapter, reflux condenser and glass stopper was added 13 mg (1.01×10⁻⁵ mole) hexakis(4-bromo-methylphenoxy) cyclotriphosphazene. Into a 25 ml round bottom 1-neck flask was added 17 mg (1.20×10⁻⁴ mole) copper bromide and 99 mg (2.42×10$^{-4}$ mole) di-4,4'-(5-nonyl)-2,2'-bipyridyl. The oxygen was removed from both flasks by a 1 mm Hg vacuum at 25° C. for 15 minutes after which argon was admitted to each vessel. The 3-neck and 1-neck flasks were charged with 5.74 g (6.66×10$^{-2}$ mole) and 3.82 g (4.44×10$^{-2}$ mole) respectively of methyl acrylate degassed by an argon bubble through a stainless steel needle at 25° C. The two mixtures were stirred under an argon atmosphere at 25° C. until homogeneous solutions were observed. The solution in the 1-neck flask was then transferred to the 3-neck flask with a stainless steel needle and degassed syringe. The flask was then placed into a 90° C. oil bath. Kinetics samples were removed from the reaction through the argon adapter with a stainless steel needle and degassed syringe.

| Sample | Time (h) | Conversion (%) | $M_{n.\ Cal}$ | $M_{n.\ SEC}$ | $M_w/M_n$ |
|---|---|---|---|---|---|
| 1 | 0 | 0 | 1251 | 805 | 1.01 |
| 2 | 0.3 | 6.85 | 64800 | 32900 | 2.43 |
| 3 | 0.9 | 15.56 | 147000 | 94800 | 1.36 |
| 4 | 2.8 | 34.03 | 322000 | 178000 | 1.19 |
| 5 | 4.2 | 44.02 | 417000 | 224000 | 1.19 |
| 6 | 5.2 | 54.17 | 513000 | 269000 | 1.19 |

Example 255
Polymerization of Styrene from Hexakis(4-bromomethylphenoxy)-cyclotriphosphazene To a 25 ml Schlenk flask was added 88 mg (7.06×10$^{-5}$ mole) of hexakis(4-bromo-methylphenoxy)cyclotriphosphazene, 20 mg (1.42×10$^{-4}$ mole) copper bromide and 116 mg (2.84×10$^{-4}$ mole) di-4,4'-(5-nonyl)-2,2'-bipyridyl. The flask was covered with a rubber septum and the solids degassed by a 25° C. vacuum (1 mm Hg) for 15 minutes. The flask was then filled with argon and 4.24 g (4.06×10$^{-2}$ mole) styrene and 6.93 g (4.07×10$^{-2}$ mole) diphenyl ether (both degassed separately by a 25° C. argon bubble for 15 minutes) were added via degassed syringes and stainless steel needles. The mixture was stirred at 25° C. for 30–40 minutes at which time a homogeneous maroon solution formed. The flask was then placed into a 105° C. oil bath under a positive pressure of argon. Kinetics samples were removed through stainless steel needles into degassed syringes.

| Sample | Time (h) | Conversion (%) | $M_{n.\ Cal}$ | $M_{n.\ SEC}$ | $M_w/M_n$ |
|---|---|---|---|---|---|
| 1 | 0 | 6.91 | 4100 | 840 | 1.08 |
| 2 | 2.7 | 19.75 | 11800 | 7886 | 1.08 |
| 3 | 7.0 | 34.12 | 20500 | 10200 | 1.11 |
| 4 | 12.0 | 38.66 | 23200 | 12200 | 1.10 |
| 5 | 23.5 | 49.54 | 29700 | 13800 | 1.07 |
| 6 | 33.6 | 63.92 | 38300 | 14300 | 1.07 |

Example 256
Polymerization of Methyl Acrylate from lexakis(4-(2-bromopropionyloxy-methyl)phenoxy)cyclotriphosphazene To a 50 ml 3-neck flask fitted with an argon adapter, reflux condenser and glass stopper was added 112 mg (6.64×10$^{-5}$ mole) hexakis(4-(2-bromopropionyloxymethyl)phenoxy)cyclotriphosphazene. The oxygen was removed from the vessel by a I mm Hg vacuum at 25° C. for 20 minutes after which argon was admitted to the vessel. Into a 25 ml round bottom 1-neck flask was added 19 mg (1.32×10$^{-4}$ mole) copper bromide, 108 mg (2.65×10$^{-4}$ mole) di-4,4'-(5-nonyl)-2,2'-bipyridyl and 20 g (0.23 mole) of methyl acrylate. The flask was covered with a rubber septum and the contents degassed by an argon bubble through a stainless steel needle at 25° C. The copper bromide/di-4,4'-(5-nonyl)-2,2'-bipyridyl/methyl acrylate was stirred under argon at 25° C. until a homogeneous solution was obtained. This solution was then transferred to the 3-neck flask with a stainless steel needle and degassed syringe. The flask was then placed into a 90° C. oil bath. Kinetics samples were removed from the reaction through the argon adapter with a stainless steel needle and degassed syringe.

| Sample | Time (h) | Conversion (%) | $M_{n.\ Cal}$ | $M_{n.\ SEC}$ | $M_w/M_n$ |
|---|---|---|---|---|---|
| 1 | 0 | 0 | 1684 | 1300 | 1.01 |
| 2 | 1.4 | 3.05 | 28800 | 10300 | 1.34 |
| 3 | 4.0 | 22.83 | 217000 | 21200 | 1.26 |
| 4 | 9.1 | 32.74 | 311000 | 32200 | 1.36 |
| 5 | 34.4 | 37.17 | 353000 | 55700 | 1.25 |

Example 257
Bulk Polymerization of n-Butyl Acrylate (Initiator=hexakis(4-(2-methylbromopropionyloxy)phenoxy)cyclotriphosphazene)

A dry round-bottomed schlenk flask was charged with CuBr (15.0 mg, 0.10 mmol) and 4,4'-di(5-nonyl)-2,2'-bipyridine (85.4 mg, 0.21 mmol). The flask was sealed with a rubber septum and held under vacuum for 20 minutes to remove oxygen. Degassed n-butyl acrylate (23.3 ml, 0.16 mol) was then added to the flask under an argon atmosphere using degassed syringes and stainless steel needles. The homogeneous solution was infused with 0.20 ml of a 0.17 M hexakis(4-(2-methylbromopropionyloxy)phenoxy)cyclotriphosphazene (3.5×10$^{-5}$ mol) solution in benzene. The solution was degassed by sparging with argon for 20 minutes. The septum was replaced with a glass stopper and the flask immersed in an oil bath held by a thermostat at 90° C. At timed intervals, the glass stopper was substituted for a rubber septum and two samples were withdrawn from the flask using a degassed syringe. One sample was added to deuterated chloroform for conversion measurements by NMR while the other was dissolved in THF for molecular weight determination by SEC.

| Sample | Time (h) | Conversion (%) | Mn, th. | Mn, SEC | Mw/Mn |
|---|---|---|---|---|---|
| 1 | 0 | 0 | 1,700 | 1,200 | 1.05 |
| 2 | 0.3 | 0 | 1,700 | 7,300 | 1.54 |
| 3 | 0.8 | 3.4 | 20,400 | 8,400 | 1.70 |
| 4 | 1.8 | 4.3 | 25,900 | 9,500 | 2.04 |
| 5 | 3.8 | 8.1 | 48,700 | 24,600 | 1.40 |
| 6 | 8.4 | 16.8 | 101,000 | 45,900 | 1.67 |
| 7 | 13.9 | 31.8 | 191,000 | 57,400 | 2.37 |

Example 258
Inorganic/Organic Polymers
Siloxane Cube End Groups
Preparation of Siloxane Cube Initiator 0.265 g (1.1×10$^{-3}$ mol) of allyl-2-bromopropionate was dissolved in 10 ml dry THF and mixed in a 50 ml two necked round bottom flask equipped with a septum and a reflux condenser under an argon atmosphere. 291 (2.77×10$^{-6}$ mol) of Karstedt catalyst in a xylene solution was added. 1 g (1.1×10$^{-3}$ mol) 1-hydrido-3,5,7,9,11,13,15- heptacyclopentylpentacyclo[9.5.1.1$^{3.9}$.1$^{5.15}$.1$^{7.13}$] octasiloxane in 2 ml of try THF was added slowly to the mixture. The mixture was then heated under reflux for 24h. The THF was evaporated.

Example 259
Polymerization Using Siloxane Cube Initiator 72 mg (5×10$^{-4}$ mol) CuBr, 408 mg (1×10$^{-3}$ mol) 4,4'-di-t-butyl-2,2'-dipyridine and 5.0 g (0.048 mol) styrene were mixed in a 10 ml round bottom flask under an argon atmosphere. The solution was degassed by freeze-pump-thaw cycles three times. The solution was heated at 90° C. for 2 min and then 0.554 g (5×10$^{-4}$ mol) modified silsesquioxane were added. The flask was placed in an oil bath at 90° C.

Polysiloxane Copolymers

Example 260
Preparation of Polysiloxane Macroinitiator 3.41 g (1.65×10$^{-2}$ mol) allyl-2-bromopropionate solved in 25 ml dry THF were mixed in a 50 ml two necked round bottom flask equipped with a septum and a reflux condenser under an argon atmosphere with 29 1 (2.77×10$^{-6}$ mol) Karstedt catalyst in xylene solution. 0.991 g (4.12×10$^{-3}$ mol) 2,4,6,8-tetramethylcyclosiloxane in 5 ml try THF were added slowly to the mixture. The mixture was heated under reflux for 18 h. The THF was evaporated.

Example 261
Polymerization of Styrene Using Polysiloxane Macroinitiator 72 mg (5×10$^{-4}$ mol) CuBr, 408 mg (1×10$^{-3}$ mol) 4,4'-di-t-butyl-2,2'-dipyridine and 5.0 g (0.048 mol) styrene were mixed in a 10 ml round bottom flask under an argon atmosphere. The solution was degassed by freeze-pump-thaw cycles three times. The solution was heated at 90° C. for 2 min and then 0.588 g (5×10$^{-4}$ mol) of macroinitiator, Example 261, were added. The flask was placed in an oil bath at 90° C.

Example 262
Poly(dimethylsiloxane) Macromonomers

In a nitrogen filled dry box a 25 ml round-bottom flask was charged with 4.75 g (2.14×10$^{-2}$ mole) hexamethylcyclotrisiloxane and 3.2 ml THF. To this was added 0.99 ml (1.58×10$^{-3}$ mole) n-butyllithium (1.6 M solution in hexanes) at 25° C. The reaction was stirred for 35 minutes at which time 0.40 ml (1.74×10$^{-3}$ mole) 4-(chlorodimethylsilylethyl)styrene (m, p-isomeric mixture) was injected into the flask producing a white precipitate within 60 seconds. The flask was removed from the glovebox and the solvent evaporated. The flask was charged with 20 ml ether and precipitated into 300 m/s methanol producing a stable suspension. The volume was reduced to 60 m/s where the suspension settled to a separate phase below the methanol. The lower phase was separated from the methanol and dried at 60° C. in a vacuum oven overnight. Yield=35%. $^1$H NMR (CDCl$_3$): δ=6.9–7.4 (m, 4H), 6.6–6.8 (m, 1H), 5.6–5.9 (m, 1H), 5.2–5.4 (m, 1H), 2.6–2.8 (m), 1.3–1.5 (m), 1.2–1.3 (m), 0.8–1.0 (m), 0.6 (t, 3H), 0.1 (s, 6H). $M_n$ (SEC)=1540, $M_w/M_n$=1.30; $M_n$ ($^1$H NMR)=4560.

Example 263
Poly(dimethylsiloxane) Macroinitiators

In a nitrogen filled dry box a 10 ml round bottom flask was charged with 0.94 g (4.23×10$^{-3}$ mole) hexamethylcyclotrisiloxane and 0.6 ml THF. To this was added 0.20 ml (3.20×10$^{-4}$ mole) n-butyllithium (1.6 M solution in hexanes) at 25° C. The reaction was stirred for 46 minutes at which time 0.23 ml (9.30×10$^{-4}$ mole) ((chloromethyl)phenylethyl)dimethylchlorosilane (m,p-isomeric mixture) was injected into the flask producing a white precipitate within 10 seconds. The flask was removed from the glovebox and diluted to 8 mls with THF producing a homogeneous solution. The solution was precipitated into 150 mls hexane and the mixture filtered through a 0.2 μm syringe filter. The solvent was removed from the filtrate by rotary evaporation and the remaining clear, colorless liquid dried at 60° C. in a vacuum oven overnight. Yield=74%. $^1$H NMR (CDCl$_3$): δ=7.1–7.3 (m), 6.2 (m), 5.7 (m), 4.6 (m, 2H), 2.7 (m), 2.2 (m), 1.3 (m), 0.9 (m), 0.6 (t, 3H), 0.1 (s, 6H). $M_n$ (SEC)=1990, $M_w/M_n$=1.20; $M_n$ ($^1$H NMR)=1700. The initiator in the above experiment can also be a mono- or multifunctional alkoxide or silanolate. For example, reaction of dilithio salt of bisphenol A with hexamethyl-cyclotrisiloxane in THF or a THF/toluene mixture followed by termination with ((chloromethyl)phenylethyl)dimethylchlorosilane and an analogous work up could yield a difunctional PDMS initiator.

Example 264
Poly(dimethylsiloxane) Polymeric Brushes

To a 5 ml round bottom flask was added 1.0 g (4.14×10$^{-3}$ mole) styrene terminal poly(dimethylsiloxane) macromonomer, 0.60 g (3.36×10$^{-5}$ mole) benzyl chloride terminal (poly(dimethylsiloxane) macroinitiator, 3.3 mg (3.33×10$^{-5}$ mole) and 28 mg (6.83×10$^{-5}$ mole) di-4,40-(5-nonyl-2,20-bipyridyl. The flask was covered with a rubber septum and degassed under a 1 mm Hg vacuum for 15 min. at 25° C. the flask was filled with argon and placed into a 130° C. oil bath. The reaction was run for 43.5 hours The reaction displayed an increased viscosity at that time. SEC (vs. linear polystyrene standards) was bimodal indicating that some of the macromonomer was not totally consumed: $M_n$ ($M_w/M_n$) 12,400 (1/0.35), 1882 (1.19). Conversion of macromonomer to polymer was 78% as determined by the relative heights of the high and low molecular weight polymer peaks on the SEC chromatogram.

Polyphosphazene Copolymers

Example 265

Poly(dichlorophosphazene) (prepared by either ring opening polymerization of hexachlorocyclotriphosphazene or cationic polymerization of trichlorotrimethylsilylphosphoranimine) is substituted at phosphorous by reaction with glycidyl-2-bromopropionate (or glycidyl-2-bromoisobutyrate) in THF. Polymerization of styrenes, acrylates, and methacrylates in the presence of 1% (mole relative to monomer) copper bromide, 2% (mole relative to monomer) di-4,4'-(5-nonyl)-2,2'-bipyridyl (or 1% (mole relative to monomer) N,N,N',N',N'-pentamethyldiethylenetriamine) in bulk or solution (dimethoxybenzene or diphenyl ether) at 80–110° C. under conditions where the reaction is degassed by argon gas bubble purges through a stainless steel needle in a flask covered with a rubber septum affords the desired graft copolymers. If substitution of poly(dichlorophosphazene) is quantitatively achieved with glycidyl-2-bromopropionate (or glycidyl-2-bromoisobutyrate) followed by polymerization a polymeric brush results. If poly(dichlorophosphazene) is first substituted with a non-initiating moiety such as trifluoroethoxy group followed by complete reaction with glycidyl-2-bromopropionate (or glycidyl-2-bromoisobutyrate), polymerization from the initiating site will result in a graft copolymer with grafts randomly distributed along the polyphosphazene backbone.

Glycidyl-2-bromopropionate (or glycidyl-2-bromoisobutyrate) is prepared by reaction of glycidol with 1.2 mole equivalents of 2-bromopropionyl bromide (or 2-bromoisobutyryl bromide) and 1.2 mole equivalents of triethylamine (or pyridine) in THF at 0°C. The product is isolated by extraction of the reaction three times from a saturated sodium bicarbonate/ether mixture followed by extraction from deionized water. After removal of solvent, the product is purified by distillation or column chromatography.

Modification of Surfaces

Example 266
Trialkoxysilane Method

The silica particles were activated by heating in a vacuum at 200° C. for 48 h. After this treatment they were stored under an dry inert gas atmosphere. 5 g activated silica was mixed with 80 ml dry toluene in a 250 ml Schlenk flask equipped with a reflux condenser under an argon atmosphere. 1 g ($3.63 \times 10^{-3}$ mol) ((chloromethyl)-phenylethyl)-trimethoxysilane was added to the mixture and it was stirred for 48 h under reflux. The toluene was evaporated and the silica was dried at 50° C. in vacuo for 24 h. The product was extracted with methanol in a Soxlett apparatus during 24 h. The product was dried at 50° C. in vacuo for 24 h.

Example 267
Chlorosilane Method

Silica particles were activated by heating in a vacuum at 200° C. for 48 h. After this treatment they were stored under an dry inert gas atmosphere. 5 g activated silica was mixed with 80 ml dry toluene in a 250 ml three necked round bottom flask flask equipped with a reflux condenser and a dropping funnel under an argon atmosphere. 1 g ($4.04 \times 10^{-3}$ mol) ((chloromethyl)phenylethyl)dimethylchlorsilane solved in 10 ml dry toluene was added slowly to the mixture and it was stirred for 24 h under reflux. The toluene was evaporated and the silica was dried at 50° C. in vacuo for 24 h. The product was extracted with methanol in a Soxlett apparatus during 24 h. The product was dried at 50° C. in vacuo for 24 h.

Example 268
Catalyst Support

Silica particles were activated by heating in a vacuum at 200° C. for 48 h. After this treatment they have to be stored under an dry inert gas atmosphere. 5 g activated silica was mixed with 80 ml dry toluene in a 250 ml Schlenk flask equipped with a reflux condenser under an argon atmosphere. 1 g ($3.76 \times 10^{-3}$ mol) N'-[3-(trimethoxysilyl)-propyl] diethylenetriamine was added to the mixture and it was stirred for 48 h under reflux. The toluene was evaporated and the silica was dried at 50° C. in vacuo for 24 h. The product was extracted with methanol in a Soxlett apparatus during 24 h. The product was dried at 50° C. in vacuo for 24 h. Loading of the surface analyzed with thermogravimetric analysis: 0.59 mmol ligand per gram particles.

Example 269
Polymerization of Styrene Using Silica Supported Catalyst 7.2 mg ($5 \times 10^{-5}$ mol) CuBr, 340 mg modified silica and 5.0 g (0.048 mol) styrene were mixed in a 10 ml round bottom flask under an argon atmosphere. The solution was degassed by freeze-pump-thaw cycles three times. The solution was heated at 90° C. for 2 min and 9.3 mg ($5 \times 10^{-5}$ mol) 1-bromoethylbenzens were added. The flask was placed in an oil bath at 90° C. The reaction kinetics were followed by GC and the evolution of molecular weight by SEC.

| Time (min) | Conversion (%) | $M_n$ | $M_w/M_n$ |
|---|---|---|---|
| 31 | 2.1 | 32,500 | 2.3 |
| 60 | 6.1 | 56,100 | 2.6 |
| 99 | 12.3 | 64,500 | 2.8 |
| 130 | 16.1 | 56,500 | 3.4 |
| 193 | 22.9 | 89,900 | 2.5 |
| 344 | 40.0 | 66,500 | 3.6 |

Formation of Macroinitiators by Radical Polymerization

Example 270
Synthesis of 2,2' Azobis [2-methyl-N-(2-(2-bromoisobutyryloxy)-ethyl) propionamide]=(AMBEP)

Under argon, 2 bromoisobutyryl bromide (5.63ml, 43.4 mmol) was added dropwise to a stirring mixture of 2,2'-Azobis [2-methyl-N-(2-hydroxyethyl)-propionamide] (5.00 g, 17.3 mmol) and triethylamine (6.02ml, 43.4 mmol) in 150 ml CHCl$_3$. The reaction was cooled in an ice bath. After the complete addition of the acid bromide, 1h, the reaction was stirred at r.t. for 3 h. The reaction mixture was washed with water (150ml, 3×), then dried over MgSO$_4$. Evaporation of CHCl$_3$ gave a yellowish solid. This solid was recrystallized with ethyl acetate. Yield 3.35 g (44.1%).

Example 271
Preparation of Polystyrene Macroinitiator (V-96-2)

The homopolymerization of styrene was performed in a sealed tube. Typical copolymerization was carried out as follows: To a glass tube, 76.4 mg ($1.74 \times 10^{-4}$ mole) AMBEP, was weighed under ambient atmosphere. 1.0 ml ($1.74 \times 10^{-2}$ mole) deaerated styrene was added using syringe under argon atmosphere. After three freeze-pump-thaw cycle, the glass tube was sealed under vacuum and the reaction mixture was heated at 90° C. for 5 hours. The reaction mixture was dissolved in THF and then precipitated in methanol. $M_n$(SEC)=79,000 and $M_w/M_n$(SEC)=2.05.

Example 272
Block Copolymerization Using Polystyrene Macroinitiator with Other Monomers The copolymerization was performed in a sealed tube. To a glass tube, 0.0500 g ($6.25 \times 10^{-7}$ mole) prepared polystyrene macroinitiator (V-96-2), 0.0200 g ($6.97 \times 10^{-5}$ mole) CuBr and 0.1140 g ($1.39 \times 10^{-4}$ mole) dNbipy were weighed under ambient atmosphere. 1.0 ml ($1.74 \times 10-2$ mole) deaerated styrene, butyl acrylate, methyl acrylate, or methyl methacrylate was added using syringe under argon atmosphere. After three freeze-pump-thaw cycles, the glass tube was sealed under vacuum and the reaction mixture was heated at 90° C. for 12 hours. The reaction mixture was dissolved in THF and then precipitated in methanol.

| Monomer | Reaction Time (h) | $M_n$(SEC) | $M_w/M_n$ |
|---|---|---|---|
| Starting P(Styrene) | — | 79000 | 2.05 |
| BA | 14.5 | 208000 | 1.72 |
| MA | 3.25 | 225000 | 1.68 |
| MMA | 1.25 | 288000 | 2.41 |
| St | 5.5 | 289000 | 1.84 |

Temp = 90° C., Monomer = 1 ml, [CuBr]$_o$ = [dNbipy]$_o$/2 = $6.97 \times 10^{-2}$ M, [polystyrene]$_o$ = $6.25 \times 10^{-4}$ M,

Example 273
Synthesis of Difunctional Initiator 2,2'-Azobis[2-methyl-N-(2-(4-chloromethyl)benzolyoxy)-ethyl)propinamide] (AMCBP)

Under argon, 4-chloromethyl chloride (4.95 g, 26.9 mmol in 5 ml $CHCl_3$.) was added dropwise to a stirring mixture (it was not totally soluble initially) of 2,2'-Azobis [2-methyl-N-(2-hydroxyethyl)-propionamide (3.10 g, 10.8 mmol) and triethylamine (3.7 ml, 26.7 mmol) in 150 ml $CHCl_3$. The reaction was cooled in an ice bath. After the complete addition of the acid chloride, 1 h, the reaction was stirred at RT for 3 h. The reaction mixture was washed with water (150 ml, 3×), then dried over $MgSO_4$. Evaporation of $CHCl_3$ gave yellowish solid. This solid was fresh filtered using silica gel and was recrystalized in ethyl acetate. Yield: 0.5 g (11%).

Example 274
Preparation of Poly(vinyl acetate) Macroinitiator

Homopolymerization of vinyl acetate was performed in a sealed tube. To a glass tube, 0.118 g ($2.71 \times 10^{-4}$ mole) AMCBP, was weighed under ambient atmosphere. 5.0 ml ($1.74 \times 10^{-2}$ mole) deaerated vinyl acetate and 5.0 ml benzene were added using syringe under argon atmosphere. After three freeze-pump-thaw cycle, the glass tube was sealed under vacuum and the reaction mixture was heated at 90° C. for 5 hours. The reaction mixture was dissolved in THF and then purified using dialysis.

Example 275
Poly(dimethylsiloxane) Polymeric Brushes

To a 5 ml round bottom flask was added 1.0 g ($4.14 \times 10^{-3}$ mole) styrene terminal poly(dimethylsiloxane) macromonomer ($M_n=1540$, $M_w/M_n=1.3$), 0.60 g ($3.36 \times 10^{-5}$ mole) benzyl chloride terminal poly(dimethylsiloxane)macroinitiator ($M_n=1770$, $M_w/M_n=1.2$), 3.3 mg ($3.33 \times 10^{-5}$ mole) and 28 mg ($6.83 \times 10^{-5}$ mole) di-4,4'-(5-nonyl)-2,2'-bipyridyl. The flask was covered with a rubber septum and degassed under a 1 mm Hg vacuum for 15 min. at 25° C. The flask was filled with argon and placed into a 130° C. oil bath. The reaction was run for 43.5 hours. The reaction showed increased viscosity at that time. SEC (vs. linear polystyrene standards): $M_n(M_w/M_n)$ 12,400 (1.35), 1880 (1.19) (Residual macromonomer/macroinitiator). Conversion of macromonomer to polymer was 78% as determined by the relative heights of the high and low molecular weight polymer peaks on the SEC chromatogram.

Reverse ATRP of Styrene w/BPO

Example 276
Bulk Polymerization of Styrene Using BPO/Cu(I)Br/dNbpy

Copper (1) bromide (6.5 mg), 4,4'-di(5-nonyl)-2,2-bipyridine (37.1 mg), styrene (0.5 ml) and BPO (5.5 mg) were charged to a dry glass tube. A stir bar was added and the contents of the tube was degassed by freeze-pump-thaw (3×). The tube was then sealed under vacuum and placed in an oil bath thermostatted at 110° C. The tube was removed from the oil bath after 1 h and opened and the contents dissolved in THF. The conversion was determined by gas chromatography (conversion=0.43) and molecular weight by SEC ($M^n=11,200$, $M_w/M_n=1.22$).

Use of linear amines with Cu(O)

Example 277
Bulk Polymerization of Styrene Using Cu(O)/Cu(I)Br/PMEDA

Copper(0) (1.2 mg), copper(I) bromide (5.2 mg), PMEDA (7.6 ul), styrene (2.0 ml) and 1-phenylethyl bromide (24.8 ml) were charged to a dry glass tube. A stir bar was added and the contents of the tube was degassed by freeze-pump-thaw (3×). The tube was then sealed under vacuum and placed in an oil bath thermostatted at 110° C. The tube was removed from the oil bath after 2.25 h and opened and the contents dissolved in THF. The conversion was determined by gas chromatography (conversion=0.67) and molecular weight by SEC ($M_n=5,450$, $M_w/M_n=1.10$).

Example 278
Bulk Polymerization of MA Using Cu(O)/Cu(I)Br/PMEDA

Copper(0) (0.9 mg), copper(I) bromide (4.1 mg), PMEDA (6.0 ul), MA (3.0 ml) and ethyl 2-bromopropionate (18.6 ul) were charged to a dry glass tube. A stir bar was added and the contents of the tube was degassed by freeze-pump-thaw (3×). The tube was then sealed under vacuum and placed in an oil bath thermostatted at 90° C. The tube was removed from the oil bath after I h and opened and the contents dissolved in THF. The conversion was determined by gas chromatography (conversion=0.78) and molecular weight by SEC ($M_n=12,500$, $M_w/M_n=1.14$).

Example 279
Bulk Polymerization of MMA Using Cu(O)/CuBr/PMEDA

Copper(0) (0.9 mg), copper(I) bromide (4.0 mg), PMEDA (6.0 ul), MMA (3.0 ml), anisol (3.0 ml) and p-toluene sulfonyl chloride (26.7 mg) were charged to a dry glass tube. A stir bar was added and the contents of the tube was degassed by freeze-pump-thaw (3×). The tube was then sealed under vacuum and placed in an oil bath thermostatted at 90° C. The tube was removed from the oil bath after 3.5 h and opened and the contents dissolved in THF. The conversion was determined by gas chromatography (conversion=0.58) and molecular weight by SEC ($M_n=12,900$, $M_w/M_n=1.23$)

Example 280
Preparation of Star Polymers Using DVB

Copper(1) bromide (11.2 mg), PMEDA (16.2 ul), polystyrene-Br macroinitiator ($M_n=2,560$, $M_w/M_n=1.20$, 200 mg), anisol (1.0 ml) and divinyl benzene (120 ul) were charged to a dry glass tube. A stir bar was added and the contents of the tube was degassed by freeze-pump-thaw (3×). The tube was then sealed under vacuum and placed in an oil bath thermostatted at 90° C. The tube was removed from the oil bath after 5 h and opened and the contents dissolved in THF. Molecular weight of final polymer was determined by SEC against linear styrene standards (Mhd n=15,200, $M_w/M_n=1.80$)

Example 281
Model Study of Bromoacetonitrile

A stock solution of Cu(I)Br/2dNbpy in toluene was prepared in advance, the concentration of which was $8 \times 10^{-3}$ M. In a dry box, 1.9 ml of the stock solution was transferred with a syringe to a side-armed glass tube equipped with a stir bar and a UV probe, then diluted with 2.9 ml of degassed toluene. The glass tube was taken out of the dry box thereafter and protected with a nitrogen flow. A certain amount of degassed bromoacetonitrile (BAN) was introduced to the glass tube through the side arm. At the same moment, UV measurement of the copper (I)/(II) complexes was begun to monitor the generation of $Cu(III)Br_2$ in the system. The concentration of $Cu(II)Br_2$ was calculated based on its absorbance at 750 nm. The reaction conditions and the results are summarized in the following table. The conversion refers to the conversion of Cu(I)Br to $Cu(II)Br_2$.

| Temp. (° C.) | [CuBr]$_0$(M) | [BAN]$_0$(M) | time (sec) | Conv. (%) |
|---|---|---|---|---|
| 20 | 3 × 10$^{-3}$ | 0.6 | 35 | 33 |
| 20 | 3 × 10$^{-3}$ | 9.6 × 10$^{-2}$ | 30 | 30 |
|  |  |  | 3900 | 33 |
| 0 | 3 × 10$^{-3}$ | 9.6 × 10$^{-2}$ | 28 | 30 |
|  |  |  | 10800 | 33 |
| −78 | 3 × 10$^{-3}$ | 9.6 × 10$^{-2}$ | 120 | 13 |
|  |  |  | 900 | 50 |
|  |  |  | 3600 | 100 |

Example 282

Synthesis of the Macroinitiator Poly(2-(2-isobutyryloxy) ethyl Acrylate

In a 5 mL round bottomed flask, 0.0113 g(5.9×10$^{-5}$ mol), and 3.0 mL(0.0148 mol) trimethylsilyl protected 2-hydroxyethyl methacrylate were combined and the solution sparged with argon for 30 minutes. In a 5 mL round bottomed flask, 0.0086 g(6.0×10$^{-5}$ mol) CuBr and 0.0490 g(12.0×10$^{-5}$ mol) dNbpy were combined and the flask was degassed by vacuum followed by argon backfill three times. The monomer solution was then cannula transferred in to the round bottom flask while stirring. The solution turned green immediately and then returned to a red color within 5 minutes. The flask was placed in an 80° C. oil bath for 23 hours. A small samples was removed at that time for analysis by SEC and $^1$H NMR. M$_n$(SEC)=51,700, M$_w$/M$_n$=1.17 No peaks corresponding to the resonance of vinyl protons were visible by $^1$H NMR. The entire solution was immediately diluted with 15 mL dry THF. A dry 100 mL round bottom was charged with 2 g(0.035 mol) KF, 15 mL dry THF, 4.3 mL(0.035 mol) 2-bromoisobutyryl bromide, and 0.09 mL of a 75 wt % solution of TBAF in water (2.6×10$^{-4}$ mol TBAF). The polymer solution was transferred into a round bottomed flask containing the mixture and stirred over night. Upon addition of the polymer, the solution began to bubble. To ensure transesterification of all trimethylsilyl groups, 1.0 mL N(Et)$_3$ was added and the solution was stirred for an additional two hours. The sample was precipitated into water/methanol 50/50, redissolved in THF, precipitated into hexanes three times, passed over neutral alumina and reprecipitated into hexanes. M$_n$(SEC)=51,800, M$_w$/M$_n$=1.16 Yield was 64%.

Example 283

Synthesis of Bottle Brush Polymer (Styrene Grafts)

A 5 mL pear shaped flask was charged with 0.0052 g(0.036 mmol) CuBr, 0.0294 g(0.072 mmol) dNbpy, 0.0006 g(2.7×10$^{-6}$ mol) CuBr$_2$ and 0.124 g(0.9 mmol) dimethoxybenzene and degassed by vacuum followed by argon backfill three times. A 5 mL round bottomed flask was charged with 0.025 g(0.09 mmol) poly(2-(2-bromoisobutyryloxy)ethyl acrylate) (Mn(SEC)=55,500, M$_w$/M$_n$=1.3) and similarly degassed. Styrene (2.05 mL, 18 mmol) which had been sparged with argon for an hour was added via argon washed syringe to the pear shaped flask and the red/brown solution stirred for 30 minutes to ensure dissolution of all solids. The solution was then transferred via cannula into the round bottom flask and the flask was placed in an 80° C. oil bath for three hours. The polymer was then precipitated into methanol twice (once from THF) and a white powder was obtained. Small samples removed before cannula transfer and after three hours at 80° C. indicated 13 % conversion by GC. M$_n$(SEC)=237,000, M$_w$/M$_n$=1.31.

Effect of Salt

Example 284

Bulk Polymerization of Styrene/1-Phenylethyl Bromide/Cu(I)Br

A dry long glass-tube was charged with CuBr (13 mg, 0.09 mmol), 4,4'-di(5-nonyl)-2,2'-bipyridine (74.6 mg, 0.18 mmol), tetrahexylammonium bromide (Hex$_4$NBr39.5 mg, 0.09 mmol), 1-phenylethyl bromide (12.4 μl, 0.09 mmol), styrene (1 ml, 8.7 mmol), and a magnetic stir bar. The glass tube was degassed by three freeze-pump-thaw cycles and was then sealed by flame. The glass tube was immersed in an oil bath thermostated at 110° C. After a certain time, the glass tube was taken out and broken.

The sample was dissolved in THF to measure conversion (GC) and molecular weight (SEC).

|  | Time | Conv. | M$_{n,th}$ | M$_{n,sec}$ | M$_w$/M$_n$ |
|---|---|---|---|---|---|
| Without | 5.43 h | 67.8% | 6780 | 5520 | 1.15 |
| With HeX$_4$NBr | 5.43 h | 20.2% | 2020 | 700 | 3.60 |

Example 285

Synthesis of Poly((styrene-co-acrylonitrile)-b-butyl acrylate-b-(styrene-co-acrylonitrile))

To a 10 ml round bottom flask, 0.2200 g (6.88×10$^{-6}$ mole) prepared poly(butyl acrylate) difunctional macroinitiator, 0.0059 (4.14×10$^{-5}$ mole) Cu(I)Br and 0.0338 (8.27×10$^{-5}$ mole) dNbpy were weighed under ambient atmosphere. 1.50 ml (1.31×10$^{-2}$ mole) deaerated styrene and 0.5ml (7.60× 10$^{-3}$ mole) deaerated acrylonitrile were added to the round bottom flask using syringe under argon atmosphere. The reaction mixture was passed over neutral alumina and the solvent was evaporated under vacuum. MP(SEC) increased to 40.2K from 29.6K (poly(butyl acrylate) macroinitiator). 19.2 mol-% of styrene and 11.2mol-% of acrylonitrile were incorporated in copolymer. ($^1$H-NMR)

Example 286

Preparation of Poly(acrylonitrile) Macroinitiator

To a 100 ml Schlenk flask, 0.7118 (4.56×10$^{-3}$ mole) bipyridyl, 0.2179 (1.52×10$^{-3}$ mole) Cu(I)Br and 50 of ethylene carbonate were weighed under ambient atmosphere. The Schlenk flask was connected to vacuum line. The atmosphere inside the Schlenk flask was changed with argon by applying vacuum and argon alternatively three times. 20.0 ml (0.304 mole) deaerated acrylonitrile was added to the Schlenk flask using syringe under argon atmosphere. The Schlenk flask was placed into the oil bath set at T=64° C. and was heated at for 1.5 hours. The reaction mixture was precipitated in methanol. M$_n$($^1$H-NMR)=2240 and M$_w$/M$_n$(SEC)=1.10.

Example 287

Block Copolymerization Using Poly(acrylonitrile) Macroinitiator with Methyl Acrylate To a 50 ml Schlenk flask, 0.2729 (1.75×10$^{-3}$ mole) bipyridyl, 0.0370 g (5.28×10$^{-4}$ Cu(O), 0.0260 (116×10$^{-4}$ mole) Cu(H)Br$^2$ and 10.00 g of ethylene carbonate were weighed under ambient atmosphere. The Schlenk flask was connected to vacuum line. The atmosphere inside the Schlenk flask was changed with argon by applying vacuum and argon alternatively three times. 4.0 ml (4.44×10$^{-2}$ mole) deaerated methyl acrylate was added to the Schlenk flask using syringe under argon atmosphere. The Schlenk flask was placed into the oil bath set at T=90° C. and was heated at for 16 hours. The reaction mixture was diluted with DMF and precipitated in methanol. $M_n$($^1$H-NMR)=14,300 and $M_w M_n$(SEC)=2.03. 78.7 mol-% of methyl acrylate was incorporated. ($^1$H-NMR).

Example 288
Synthesis of Tris(2-(N-dimethylamino)ethyl)amine(Tren-Me)

To a stirred solution of formic acid (13.7 ml) at 0° C. was added dropwise TREN (2.0 ml), followed by the addition of aqueous formaldehyde (12.0 ml). The solution was refluxed for 24 h and then concentrated in vacuo. The yellow residue was cooled in an ice bath and aqueous NaOH solution (5.0 N) was added to make the resulting solution pH=11–12. The solution was extracted with $CH_2Cl_2$ twice. The combined organic phase was washed with brine, dried over $Na_2SO_4$, filtered and concentrated in vacuo to give a yellow liquid which was used without further purification. Characterization: $^1$H NMR (300 MHZ, $CDCl_3$) 2.6 (t, 6H), 2.38 (t, 6H), 2.2 (s, 18H).

Example 289
Tris(2-(N, N-dimethylamino)ethyl)amine as Ligand for Cu(I)Br ATRP of Styrene Bulk Polymerization of styrene using 1-PEBr/CuBr/Tren-Me: copper (1) bromide (13 mg), Tren-Me (24.6 ul), styrene (1.0 ml) and 1-PEBr (12.4 ul) were charged to a dry glass tube. A stir bar was added and the contents of the tube was degassed by freeze-pump-thaw (3×). The tube was then sealed under vacuum and placed in an oil bath thermostatted at 110° C. The tube was removed from the oil bath after 1 h and opened and the contents dissolved in THF. Conversion=0.43, Mn=11,200, $M_w/M_n$=1.22.

Example 290
Tris(2-(N, N-dimethylamino)ethyl)amine as ligand for Cu(I)Br ATRP of Methyl Acrylate Bulk Polymerization of MA using 2-EBP/CuBr/Tren-Me: copper (1) bromide (6.8 mg), Tren-Me (13 ul), MA (1.0 ml) and ethyl 2-bromopropionate (6.2 ul) were charged to a dry glass tube. A stir bar was added and the contents of the tube was degassed by freeze-pump-thaw (3×). The tube was then sealed under vacuum. After stirring for 15 min at room temperature, the tube was opened and the contents dissolved in THF. Conversion=0.85, $M_n$=21,000, $M_w/M_n$=1.17.

Example 291
Tris(2-(N,N-dimethylamino)ethyl Amine as Ligand for Cu(I)Br ATRP of Methyl Methacrylate Solution Polymerization of MMA using 2-EBiB/CuBr/Tren-Me: copper (1) bromide(6.6 mg), Tren-Me (12.8 ul), MMA (1.0 ml), anisole (1.0 ml) and ethyl 2-bromoisobutyrate (6.9 ul) were charged to a dry glass tube. A stir bar was added and the contents of the tube was degassed by freeze-pump-thaw (3×). The tube was then sealed under vacuum. The tube was then sealed under vacuum and placed in an oil bath thermostatted at 70° C. The tube was removed from the oil bath after 1 h and opened and the contents dissolved in THF. Conversion=0.50, $M_n$=13,400, $M_w/M_n$=1.32.

Example 292
Synthesis of DETA-BU [$(Bu)_2NCH_2CH_2N(Bu)CH_2CH_2(BU)_2$]

To a stirred solution of ethylene triamine (1.0 ml) in dry MEOH (40 ml) at 0° C. was added dropwise butyaldehyde (6.05 ml). The solution was allowed to stir for 10 min, then NaCNBH$^3$ (1.0 g) was added in small portions. The resulting solution was allowed to stir for 4 h at 0° C., maintaining pH=6–7 by the occasional addition of glacial acetic acid. Afterwards, concentrated HCl was added until pH=12, and the solution was concentrated. The residue was taken up in water (50 ml) and extracted with ether. The aqueous phase was brought up to pH=11–12 with solid NaOH and extracted with ether. The combined organic phase was washed with brine, dried over $Na_2SO_4$, filtered and concentrated in vacuo to give a light yellow liquid which was used without further purification.

Characterization: 1H NMR (300 MHZ, $CDCl_3$) 2.4–2.5 (m, 18H), 1.2–1.4 (m, 20H), 0.9 (t, 15H).

Example 293
Solution Polymerization of MMA Using BPN/CuBr/DETA-Bu

Copper (1) bromide (3.3 mg), DETA-BU (10.0 ul), MMA (1.0 ml), anisole (1.0 ml) and 2-bromopropionitrile (4.0 ul) were charged to a dry glass tube. A stir bar was added and the contents of the tube was degassed by freeze-pump-thaw (3×). The tube was then sealed under vacuum. The tube was then sealed under vacuum and placed in an oil bath thermostatted at 90° C. The tube was removed from the oil bath after 1.5 h and opened and the contents dissolved in THF. Conversion=0.80, $M_n$ 17,200, $M_w/M_n$=1.28.

Example 294
Solution Polymerization of Acrylonitrile Using 2-bromopropionitrile/Cu(I)Br/Hexamethyltriethylenetetramine Copper (1) bromide (11.6 mg), hexamethyltriethylenetetramine (22.0 ul), acrylonitrile (1.0 ml), DMF (1.0 ml) and 2-bromopropionitrile (6.9 ul) were charged to a dry glass tube. A stir bar was added and the contents of the tube was degassed by freeze-pump-thaw (3×). The tube was then sealed under vacuum. The tube was then sealed under vacuum and placed in an oil bath thermostatted at 50° C. The tube was removed from the oil bath after 5 h and opened and the contents dissolved in DMF. Conversion=0.42, $M_n$=7,860, $M_w/M_n$=1.19.

Example 295
Mass Spectroscopic Analysis of Poly(isobutene-alt-butyl acrylate) Copolymers The isobutene/butyl acrylate copolymers were analyzed by $^1$H NMR, MALDI and ESI-MS. $^1$H NMR data gave basic compositional information about the copolymers, while MALDI and ESI-MS were used to probe the structure of the samples in more depth.

Figure 9:
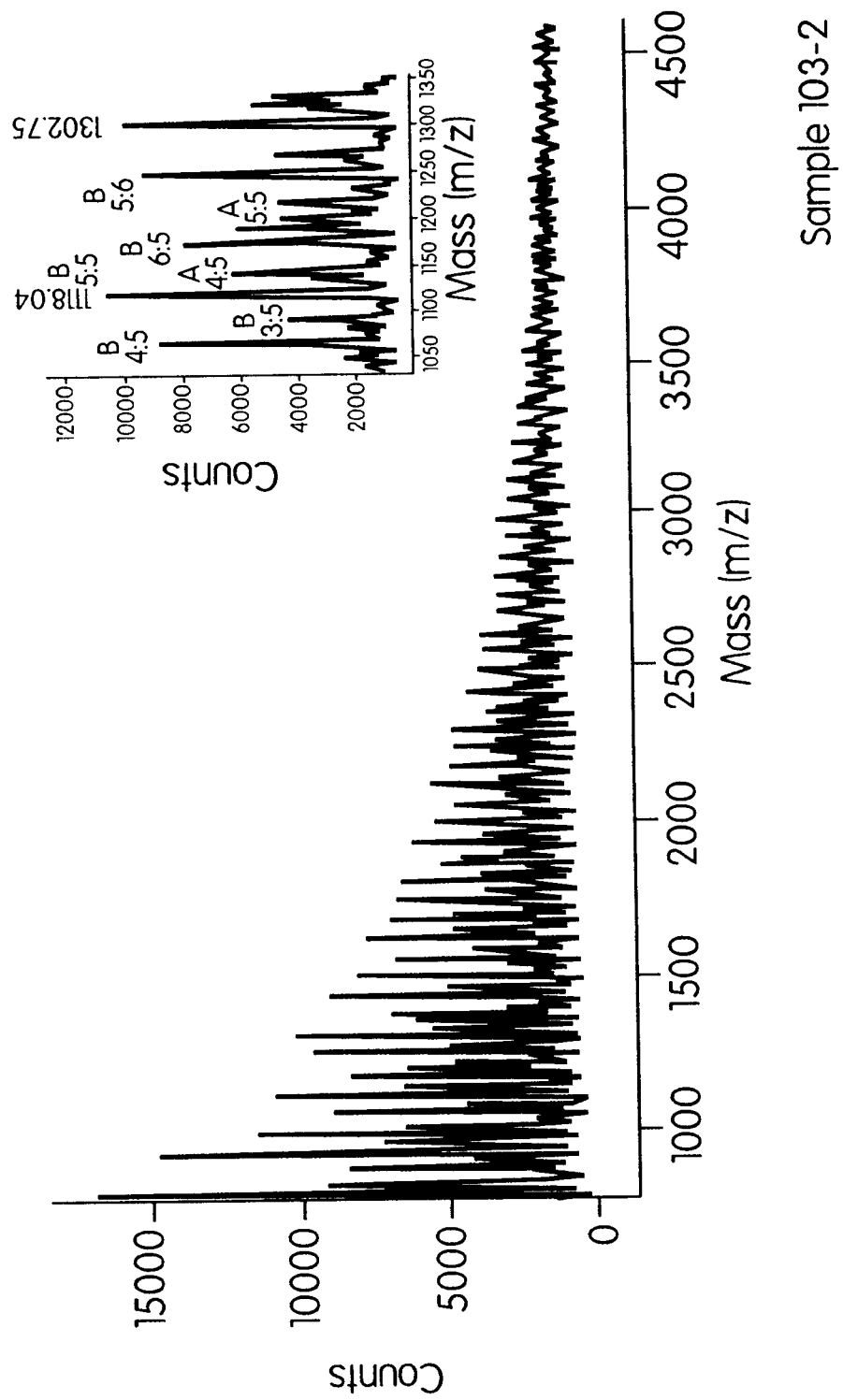
FIGS. 9 and 10 are two different types of mass spectra of the product of Example 295.
Figure 10A:
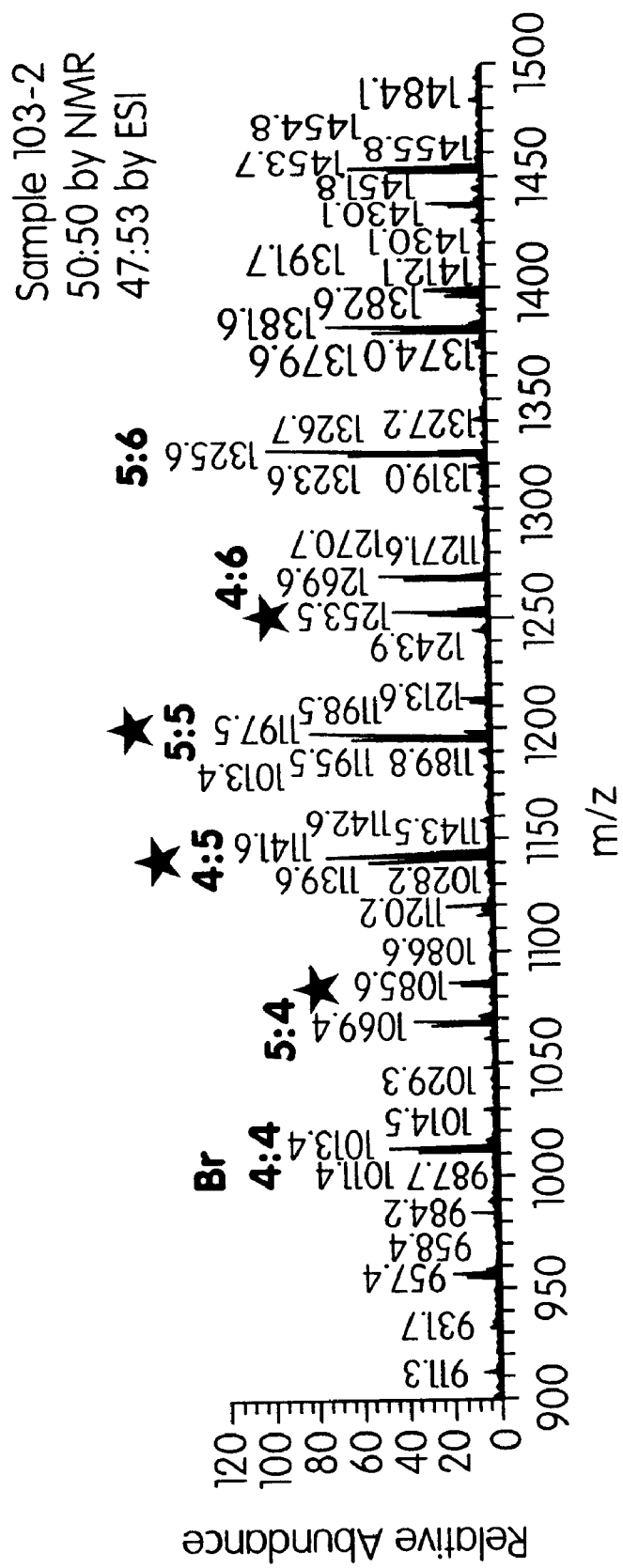
Figure 10B:
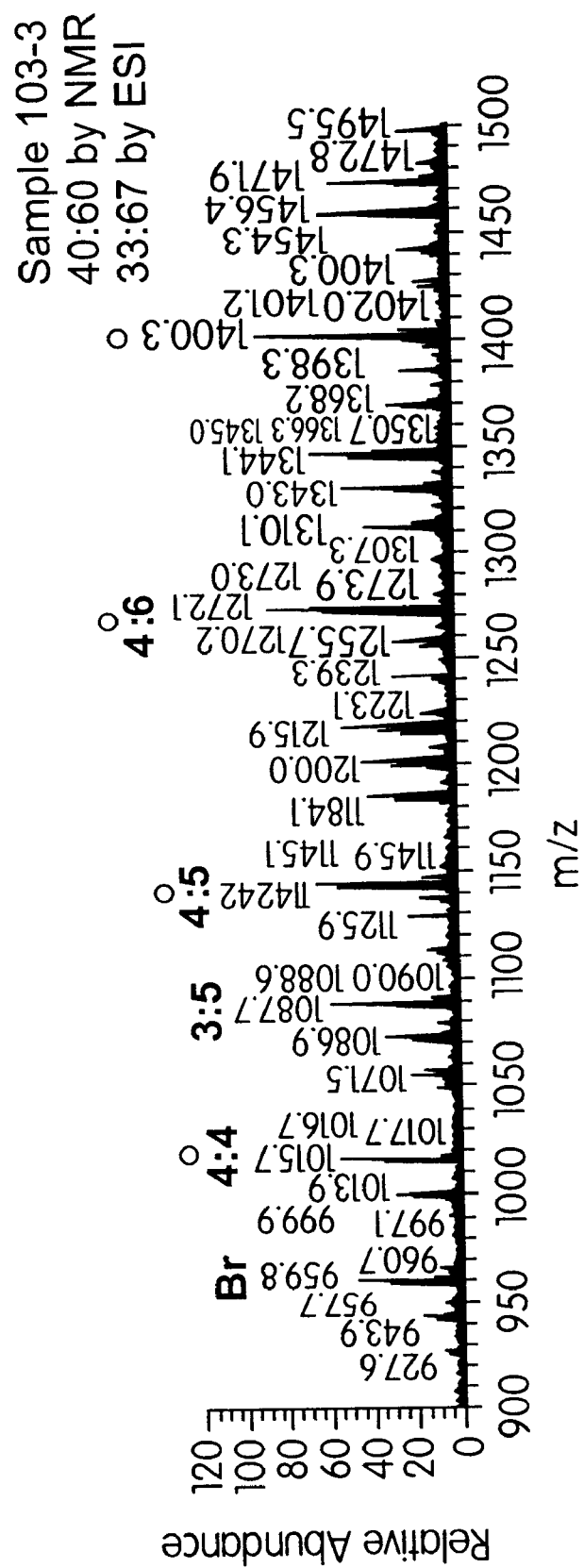

Experimental Conditions
MALDI-MS (FIG. 9)

A $10^{-6}$ M solution of the copolymer was made up in THF. This was mixed with dithranol (0.1M solution in THF) in a 25:35 volumetric ratio, prior to being spotted on the MALDI slide.

ESI-MS (FIG. 10)

1 mg of copolymer sample was dissolved in a 50:50 DMF:THF mixture which gad been doped with 10 $\mu$l of a saturated NaCl solution (in ETOH) per ml of analyte solution. The samples were infused tot he mass spectrometer at a flow rate of 3 $\mu$l min$^{-1}$. Dissociation studies were conducted in ESI-MS to investigate the production of fragments. Dissociation energies typically used were 10%, 20%, 40%, 60%, 80% and 95%.

Analysis of Spectra

Peaks were analyzed on the basis of the formulae:

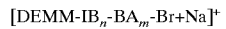

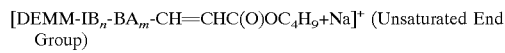 (Unsaturated End Group)

No unsaturation was observed in the ESI-MS data, however in MALDI spectra the peaks corresponding to HBr abstraction were the most intense.

Example 296

Preparation of Poly(acrylonitrile-b-butyl acrylate-b-acrylonitrile)

To a glass tube 0.004 ($3.04 \times 10^{-5}$ mole) CuBr and 0.0248 ($6.08 \times 10^{-5}$ mole) 4,4'-di(5-nonyl)-2,2'bipyridine were added. To a 5 ml vial, 0.3000 g ($1.06 \times 10^{-4}$ mole) of α,ω-dibromopoly(butyl acrylate) ($M_n$=124,000; $M_w/M_n$=1.33; measured using SEC against linear polystyrene standards) and 2 ml ($3.04 \times 10^{-2}$ mole) of acrylonitrile was added. This solution was bubbled with Ar and then added to the glass tube by using a syringe under an argon atmosphere. After three freeze-pump cycles, the tube was sealed under vacuum. The tube was placed in an oil bath set at 70° C. and heated for 1.5 h. The reaction mixture was dissolved in DMF and polymer was precipitated from solution by pouring into a methanol/water mixture (50/50 v/v). SEC was performed on the diblock copolymer in DMF to obtain the polydispersity ($M_w/M_n$=1.93). The obtained polymer was dried under vacuum overnight, and composition information (45 mol % acrylonitrile) was determined by NMR in DMSO-$d_6$. Molecular weight of the block copolymer ($M_n$=225.000) was calculated based on $M_n$ of macroinitiator and composition of the final polymer.

Example 297

Transformation of Bromine End Group to Hydrogen

Figure 11:
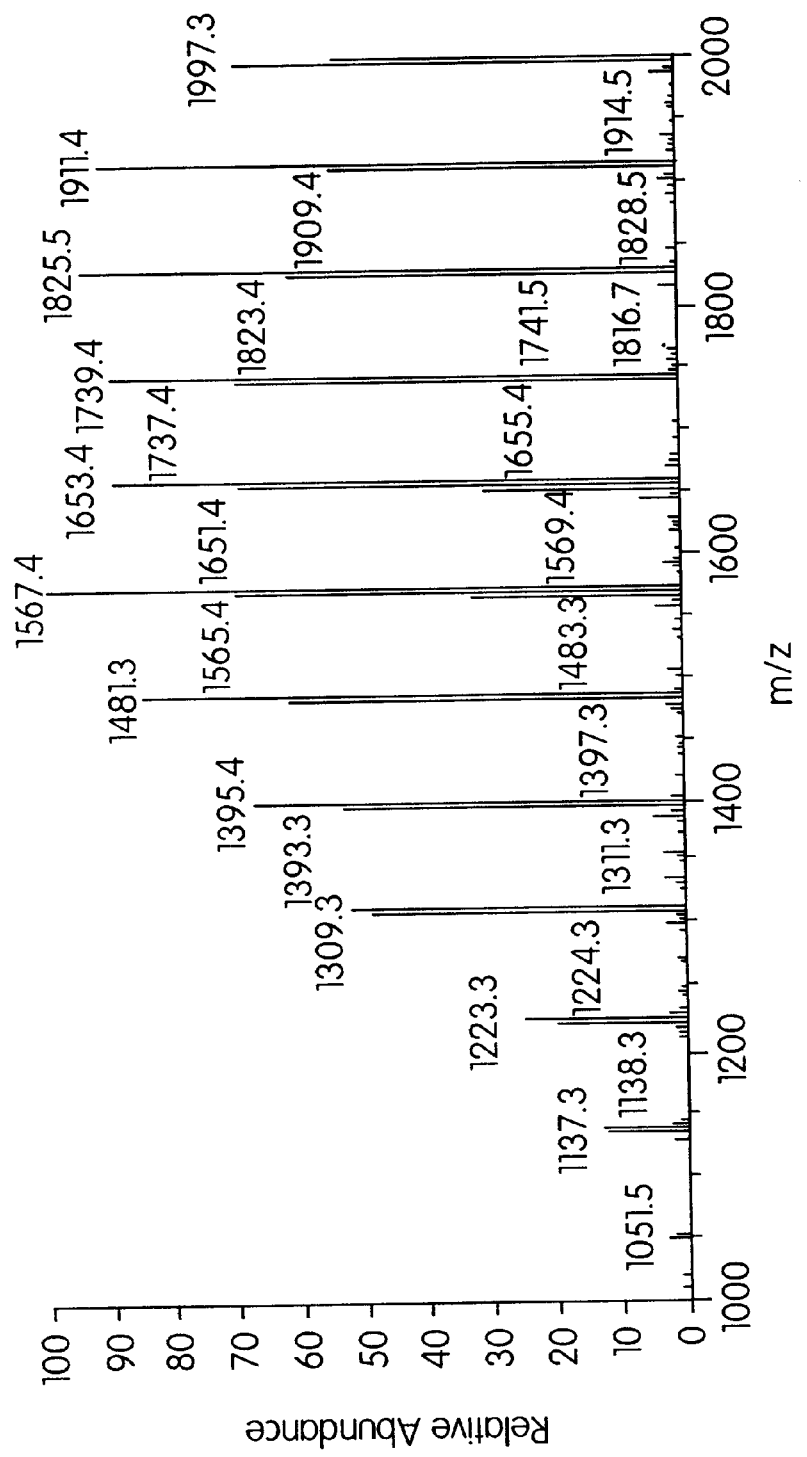
FIGS. 11 and 12 are mass spectra of the bromine and hydrogen terminated products of Example 298, respectively.
Figure 12:
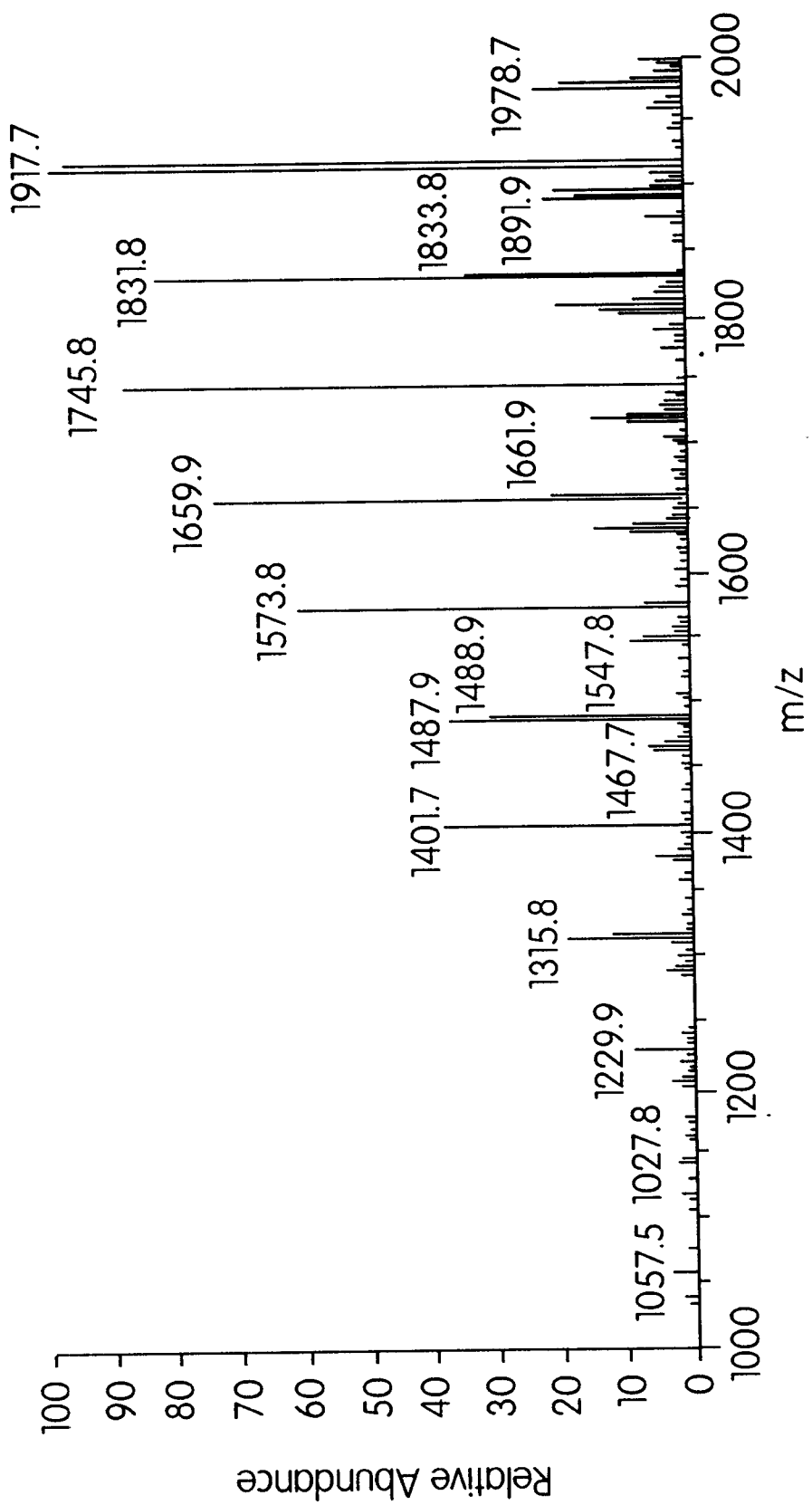

Methyl acrylate (5 ml, 55.5 mmol) was polymerized in ethylene carbonate (5 ) using 2,2'-dipyridyl (515 mg, 3.3 mmol)/CuBr (157 mg, 1.1 mmol) as catalyst system and methyl-2-bromopropionate (0.3 ml, 2.6 mmol) as initiator. After stirring for 2 hours at 90° C., tributyltin hydride (2.1 ml, 7.8 mmol) was added, followed by a mixture of CuBr (70 mg, 0.5 mmol) and Cu(0) (150 mg, 2.4 mmol). The mixture was stirred for 3 hours more, then it was diluted with THF and filtered over alumina. After precipitation in hexane, the polymer was characterized by $^1$H-NMR and ESI spectroscopy. Complete replacement of the bromine end group by hydrogen was observed. ESI spectra of respectively the bromine terminated (pMA-Br, Na$^+$) and the hydrogen terminated polymethylacrylate (pMA-H, Na$^+$ or H$^+$) are shown in FIGS. 11 and 12.

The present application is based upon Provisional U.S. Applications Serial Nos.: 60/039,543 and 60/041,620, filed with the U.S. Patent Office on Mar. 11, 1997 and Apr. 2, 1997, respectively, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed is:

1. A process for coupling molecules, comprising:
    contacting at least one first molecule comprising one or more radically transferable atoms or groups, and at least one second molecule comprising one or more radically transferable atoms or groups with a system comprising:
    a transition metal, wherein said transition metal is at least partially present in an oxidation state that can participate in a redox reaction with the radically transferable atoms or groups; and
    one or more N-, O-, P-, or S-containing ligands which can coordinate in a σ-bond or a π-bond to the transition metal, or a C containing compound which can coordinate in a π-bond to the transition metal;
    thereby coupling the first molecule and the second molecule.

2. The process of claim 1, wherein the second molecule is the same as the first molecule.

3. The process of claim 1, further comprising:
    contacting a plurality of the first molecule with the system, wherein the first molecule comprises two radically transferable atoms or groups, and the process results in a chain extension reaction.

4. The process of claim 3, wherein the first molecule is dibromo-p-xylene.

5. The process of claim 1, wherein the transition metal is added in at least a stoichiometric amount relative to a total molar amount of the radically transferable atoms and groups present on the first molecules and the second molecules.

6. The process of claim 1, further comprising a plurality of first molecules, wherein the first molecules comprise, on average, more than two radically transferable atoms or groups, and wherein the process produces a crosslinked compound.

7. The process of claim 6, wherein said transition metal is at least partially present in a zero valent state and the crosslinked compound forms a coating.

8. The process of claim 1, wherein the first molecule comprises three or more radically transferable atoms or groups, and the second molecule is a telechelic molecule.

9. The process of claim 8, wherein the first molecule is a (hyper)branched (co) polymer and the second molecule is a telechelic (co)polymer.

10. The process of claim 9, wherein the (hyper)branched (co)polymer comprises an initial functional group, and further comprising after coupling, contacting a third molecule with the initial functional group, wherein the third molecule is capable of reacting with a radical.

11. The process of claim 1, further comprising a transition metal at least partially in a zero oxidation state.

12. The process of claim 11, further comprising a transition metal substantially in a zero oxidation state.

13. The process of claim 1, wherein the first molecule is a polymer having a radically transferable atom or group at each termini.

14. The process of claim 13, wherein the second molecule further comprises a second functional group and a polymer comprising the second functional group at one or more termini is formed.

15. A process for coupling molecules, comprising:
    contacting a first molecule comprising one or more radically transferable atoms or groups and a second molecule which is capable of reacting with a radical, wherein the second molecule is not an olefin, with a system comprising;
    a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
    a reducing agent; and
    thereby coupling the first molecule and the second molecules.

16. The process of claim 15, wherein the reducing agent comprises a species that reduces a higher oxidation state transition metal to a lower oxidation state by electron transfer.

17. The process of claim 15, wherein a ratio of the number of radically transferable atoms and groups to the number of second molecules is less than or equal to one.

18. The process of claim 15, wherein the first molecule comprises a functional group and the second molecule is a non-homopolymerizable molecule comprising the same functional group present on the first molecule.

19. The process of claim 15, wherein the reducing agent is added in at least a stoichiometric amount relative to a total molar amount of the radically transferable atoms and groups present on the first molecules and the second molecules.

20. The process of claim 15, wherein the reducing agent is added at less than a stoichiometric amount relative to a total molar amount of the radically transferable atoms and groups present on the first molecules and the second molecules.

21. The process of claim 15, wherein the reducing agent is added in at least a stoichiometric amount relative to a total molar amount of the radically transferable atoms and groups present on the first molecule to be replaced by the second molecules.

22. The process of claim 15, wherein the first molecule comprises two radically transferable atoms or groups.

23. The process of claim 22, wherein a molar ratio of the second molecule to the first molecule is from 1:100 to 100:1.

24. A process for coupling molecules, comprising:
contacting a first molecule comprising one or more radically transferable atoms or groups and a second molecule which is capable of reacting with a radical, with a system comprising;
a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
a reducing agent, comprising a transition metal in the zero oxidation state;
and thereby coupling to the first molecule and the second molecules.

25. A process for coupling molecules, comprising:
contacting a first molecule comprising one or more radically transferable atoms or groups and a second molecule which is capable of reacting with a radical, with a system comprising;
a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
a reducing agent selected from the group consisting of electric current, a reductive metal, an organic reagent and an inorganic reagent;
to couple the first molecule and the second molecules.

26. A process for coupling molecules, comprising:
contacting a first molecule comprising one or more radically transferable atoms or groups and a stable free radical which is capable of reacting with a radical, with a system comprising;
a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
a reducing agent; and
thereby coupling the first molecule and the stable free radical.

27. A process for coupling molecules, comprising:
contacting a first molecule comprising one or more radically transferable atoms or groups and a hydrogen transfer agent which is capable of reacting with a radical, with a system comprising;
a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
a reducing agent; and
thereby reacting the first molecule with the hydrogen transfer agent.

28. The process of claim 27, wherein the hydrogen transfer agent is a member selected from the group consisting of thiols, silyl hydrides and tin hydrides.

29. A process for coupling molecules, comprising:
contacting a polymer formed by atom transfer polymerization comprising one or more radically transferable atoms or groups and a second molecule which is capable of reacting with a radical, with a system comprising;
a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
a reducing agent; and
thereby coupling the polymer formed by atom transfer radical polymerization and the second molecules resulting in a polymer with a terminal olefin group and, optionally, isolating the polymer.

30. A process for coupling molecules, comprising:
contacting at least one first molecule comprising one or more radically transferable atoms or groups and at least one second molecule which reacts with a radical, wherein the second molecule is not an olefin, with a system comprising;
a transition metal, wherein the transition metal can participate in a redox reaction with the radically transferable atoms or groups; one or more N-, O-, P-, or S-containing ligands which can coordinate in a σ-bond or a π-bond to the transition metal, or a C containing compound which can coordinate in a π-bond to the transition metal; and
a reducing agent; and
thereby coupling the first molecule and the second molecules wherein the molar ratio of first molecule to second molecule is substantially 50:50.

31. A process for the formation of a telechelic functional material, comprising:
coupling at least two molecules, wherein each molecule comprises at least one radically transferable atom or group and a terminal non-radically transferable functional group, in the presence of:

a transition metal, optionally in the zero oxidation state; and one or more N-, O-, P-, or S-containing ligands which can coordinate in a σ-bond or a π-bond to the transition metal, or a C containing compound which can coordinate in a π-bond to the transition metal;

to form a telechelic functional material; and optionally, isolating the telechelic functional material.

32. The process of claim 31, wherein the transition metal can participate in a reversible redox cycle with said radically transferable atom or group.

33. A process for formation of telechelic polymers comprising:

polymerizing one or more radically (co) polymerizable monomers in the presence of a system initially comprising:

an initiator having one or more radically transferable atoms or groups, a transition metal compound that participates in a reversible redox cycle with the initiator, a dormant polymer chain end, or a growing polymer chain end, and one or more N-, O-, P-, or S-containing ligands which can coordinate in a σ-bond or a π-bond to the transition: metal, or any C containing compound which can coordinate in a π-bond to the transition metal, to form a (co) polymer having a radically transferable atom or group at one terminus thereof; and reacting the (co) polymer with a second initiator having a radically transferable atom or group, in the presence of a zero oxidation state transition metal to couple the second initiator and the (co) polymer.

34. The process of claim 33, wherein at least one of the first initiator and second initiator comprises a functional group and wherein the process results in a product comprising a telechelic molecule capable of further reaction such as chain extension or crosslinking.

35. A process for the formation of a telechelic functional material, comprising:

coupling at least two molecules, wherein each molecule comprises at least one radically transferable atom or group and a terminal non-radically transferable functional group and at least one molecule comprises two or more radically transferable atoms or groups, in the presence of:

a transition metal, optionally in the zero oxidation state; and one or more N-, O-, P-, or S-containing ligands which can coordinate in a σ-bond or a π-bond to the transition metal, or a C containing compound which can coordinate in a π-bond to the transition metal;

to form a telechelic functional material; and optionally, isolating the telechelic functional material.

* * * * *